US007079555B2

(12) United States Patent
Baydar et al.

(10) Patent No.: US 7,079,555 B2
(45) Date of Patent: Jul. 18, 2006

(54) INTEGRATED DIGITAL LOOP CARRIER SYSTEM WITH VIRTUAL TRIBUTARY MAPPER CIRCUIT

(75) Inventors: Ertugrul Baydar, Grapevine, TX (US); J. Bradley Boudreaux, Stephens City, VA (US); Nicholas Carter, Chantilly, VA (US); Chung Chen, Herndon, VA (US); Steven Klonsky, Arlington, VA (US); Michael Moran, Darien, IL (US); Peter Renucci, Grapevine, TX (US); Jeffrey Timbs, Sterling, VA (US); Thomas Tucker, Washington, DC (US); Waleed Wardak, Grapevine, TX (US)

(73) Assignee: Pulse Communications, Inc., Herndon, VA (US)

( * ) Notice: Subject to any disclaimer, the term of this patent is extended or adjusted under 35 U.S.C. 154(b) by 788 days.

(21) Appl. No.: 09/985,686

(22) Filed: Nov. 5, 2001

(65) Prior Publication Data

US 2002/0097743 A1   Jul. 25, 2002

Related U.S. Application Data

(60) Division of application No. 08/471,224, filed on Jun. 6, 1995, now Pat. No. 5,784,377, and a continuation-in-part of application No. 08/031,395, filed on Mar. 9, 1993, now abandoned, and a continuation-in-part of application No. 08/251,848, filed on May 31, 1994, now abandoned.

(51) Int. Cl.
*H04J 3/04* (2006.01)
(52) U.S. Cl. .................. 370/532; 370/540
(58) Field of Classification Search ............. 370/532, 370/535, 536–540
See application file for complete search history.

(56) References Cited

U.S. PATENT DOCUMENTS

| | | | |
|---|---|---|---|
| 4,811,340 A | 3/1989 | McEachern et al. | 370/505 |
| 4,888,765 A | 12/1989 | Dyke | 370/458 |
| 4,967,405 A | 10/1990 | Upp et al. | 359/135 |

(Continued)

OTHER PUBLICATIONS

Table of Contents-Bellcore Technical Reference TRN-NWT-000253; Synchronous Optical Network (SONET) Transport Systems: Common Generic Criteria.

(Continued)

*Primary Examiner*—Brenda Pham
(74) *Attorney, Agent, or Firm*—Alfred N. Goodman; Mark S. Bicks; Stacy J. Longanecker

(57) ABSTRACT

An integrated digital loop carrier (IDLC) system includes digital line feeders and signal processors to interface with the feeders an to ultimately provide data to subscriber instruments. The system can be employed as a central office terminal (COT) or remote digital terminal (RDT) with analog, T1 or SONET feeders and any conventional link medium. Data are put in DS1 format and multiplexed onto token ring optical loops for delivery to banks of channel units wherein the optical signals are translated to electrical signals for delivery to the Cus and subscribers. A method and apparatus is provided for mapping and demapping signals between virtual tributaries (VT) and digital signal formats in the RDT of an integrated digital loop carrier. An application-specific circuit provides such mapping and demapping functions as Floating Byte Synchronous VT to Locked Byte Synchronous VT, Floating Asynchronous VT to Locked Byte Synchronous VT, Floating Asynchronous VT to Floating Asynchronous VT, DS1 to Locked Byte Synchronous VT, DS1 to Floating Asynchronous VT, and DS1 to Floating Byte Synchronous VT.

8 Claims, 72 Drawing Sheets

U.S. PATENT DOCUMENTS

| | | | |
|---|---|---|---|
| 4,967,410 A | 10/1990 | Takase et al. | 370/510 |
| 4,998,242 A | 3/1991 | Upp | 370/392 |
| 5,001,708 A | 3/1991 | Williams et al. | 370/509 |
| 5,007,070 A | 4/1991 | Chao et al. | 375/371 |
| 5,030,951 A | 7/1991 | Eda et al. | 341/100 |
| 5,033,064 A | 7/1991 | Upp | 375/372 |
| 5,040,170 A | 8/1991 | Upp et al. | 359/135 |
| 5,050,164 A | 9/1991 | Chao et al. | 359/135 |
| 5,054,050 A | 10/1991 | Burke et al. | 379/26.02 |
| 5,062,105 A | 10/1991 | McKnight et al. | 370/538 |
| 5,067,126 A | 11/1991 | Moore | 370/544 |
| 5,079,763 A | 1/1992 | Chao et al. | 370/440 |
| 5,111,485 A | 5/1992 | Serack | 375/112 |
| 5,131,013 A | 7/1992 | Choi | 375/372 |
| 5,134,614 A | 7/1992 | Baydar et al. | 370/552 |
| 5,144,297 A | 9/1992 | Ohara | 340/226 |
| 5,151,935 A | 9/1992 | Slife et al. | 370/240 |
| 5,161,152 A | 11/1992 | Czerwiec et al. | 370/463 |
| 5,165,091 A | 11/1992 | Lape et al. | 370/216 |
| 5,168,494 A | 12/1992 | Mueller | 370/535 |
| 5,185,736 A | 2/1993 | Tyrrell et al. | 370/358 |
| 5,189,673 A | 2/1993 | Burton et al. | 370/490 |
| 5,195,124 A | 3/1993 | Ishioka | 379/27.08 |
| 5,210,745 A | 5/1993 | Guinand et al. | 370/446 |
| 5,214,651 A | 5/1993 | Baydar et al. | 514/11 |
| 5,278,824 A | 1/1994 | Kremer | 370/223 |
| 5,282,195 A | 1/1994 | Hood et al. | 370/378 |
| 5,297,180 A | 3/1994 | Upp et al. | 375/112 |
| 5,598,445 A | 1/1997 | Castano Pinto et al. | 375/372 |
| 5,608,720 A * | 3/1997 | Biegel et al. | 370/249 |
| 5,640,387 A | 6/1997 | Takahashi et al. | 370/359 |
| 5,682,257 A * | 10/1997 | Uchida | 398/43 |

OTHER PUBLICATIONS

Table of Contents-Bellcore Technical Reference TR-NWT-000496; SONET Add-Drop Multiplex Equipment (SONET ADM) Generic Criteria.

Table of Contents-Bellcore Technical Reference TR-TSY-000008; Digital Interface Between the SLC 96 Digital Loop Carrier System and A Local Digital Switch.

* cited by examiner

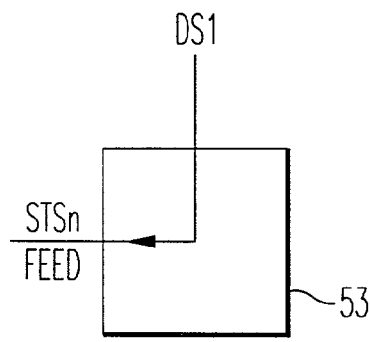
FIG. 11A
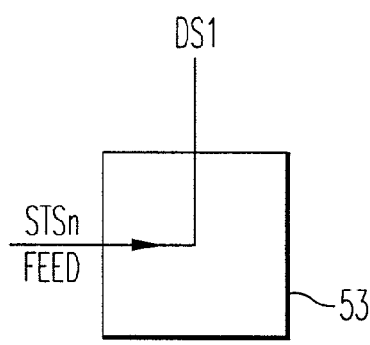
FIG. 11B
FIG. 11C
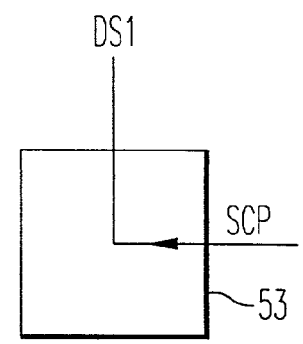
FIG. 11D
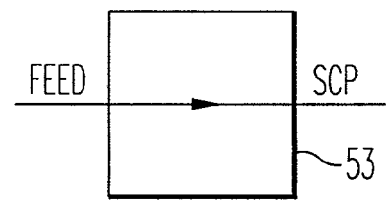
FIG. 11E
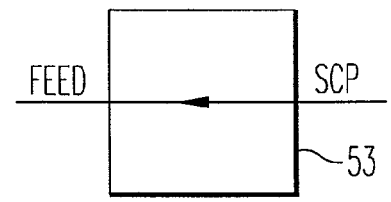
FIG. 11F

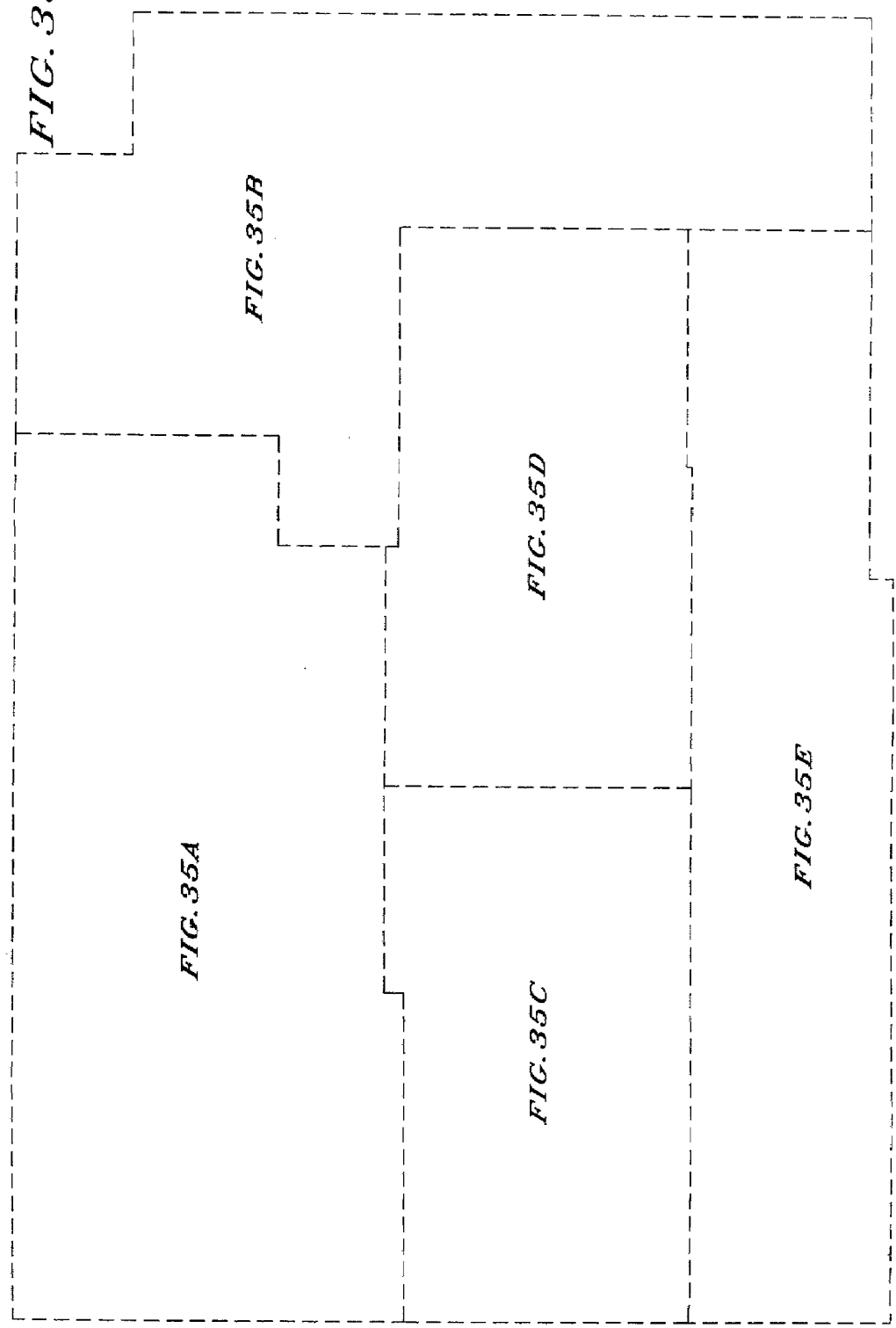

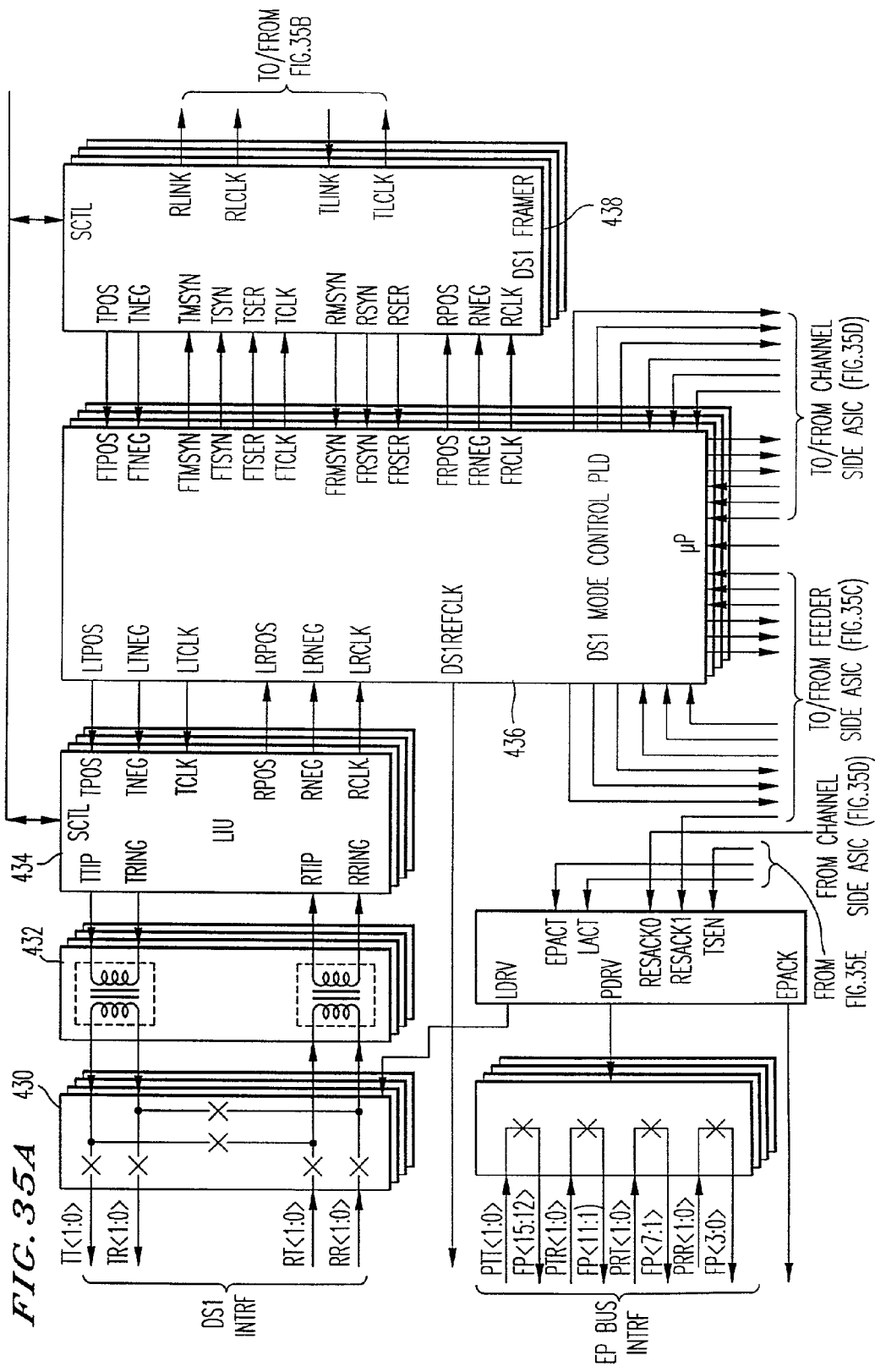

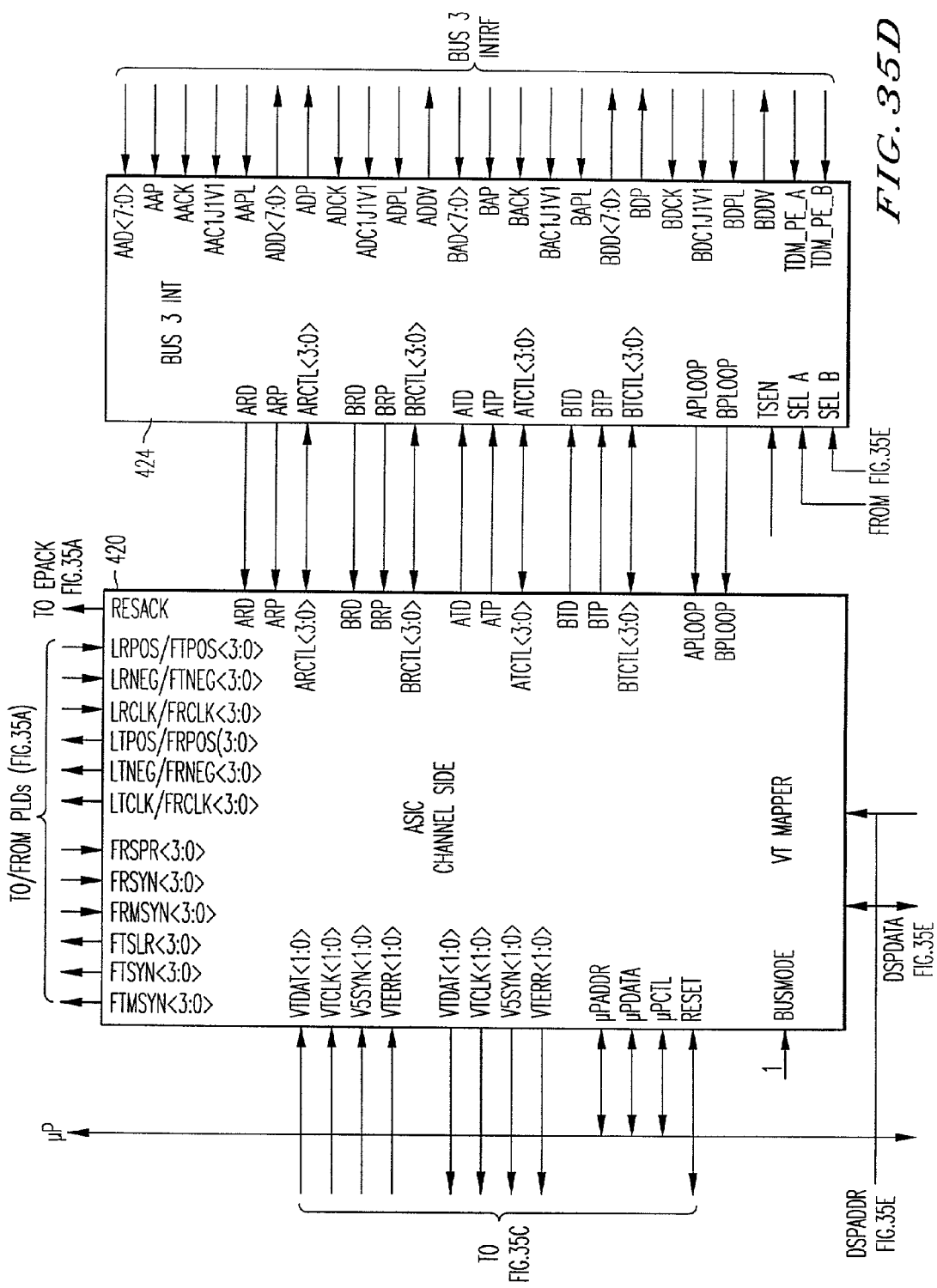

FIG. 38
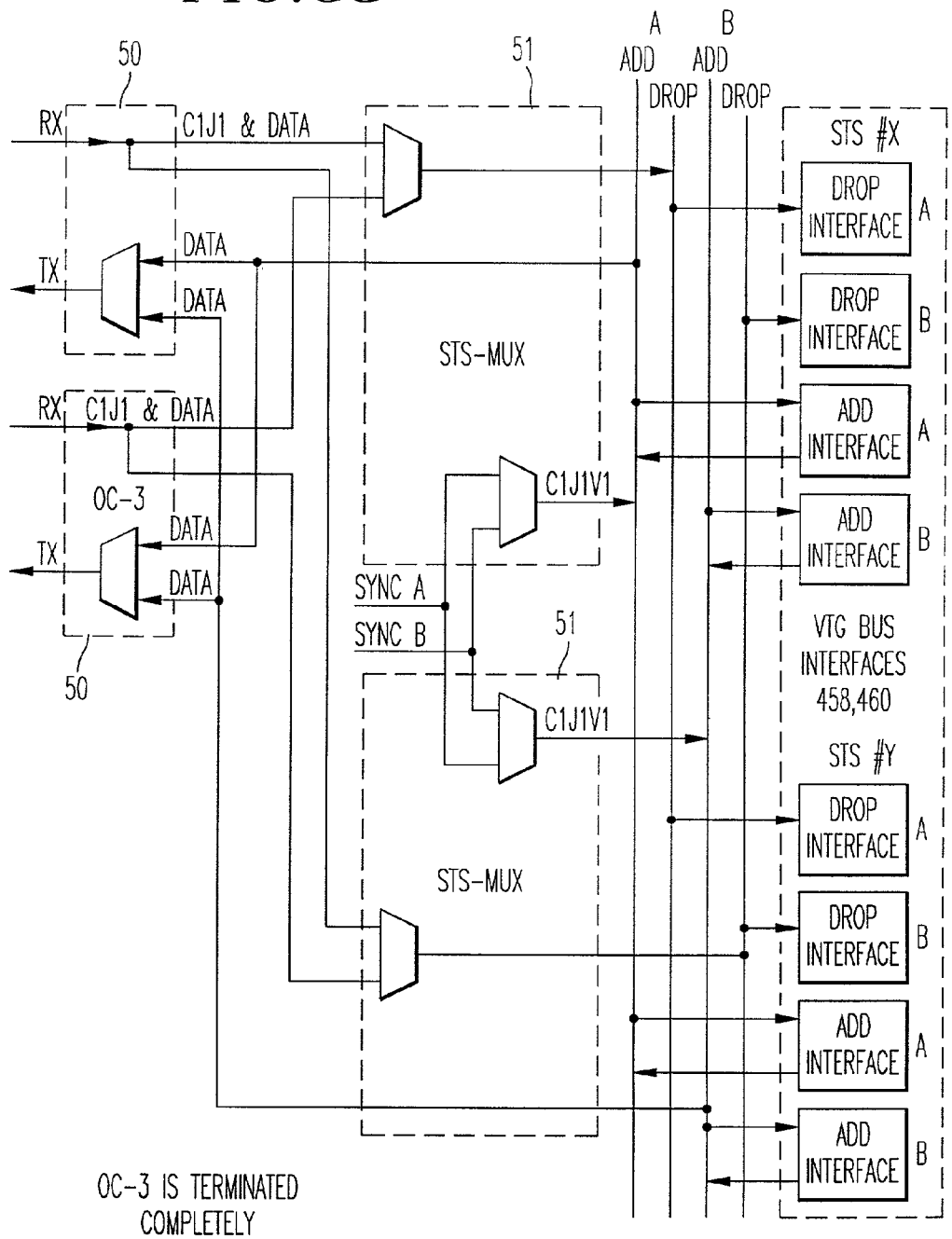
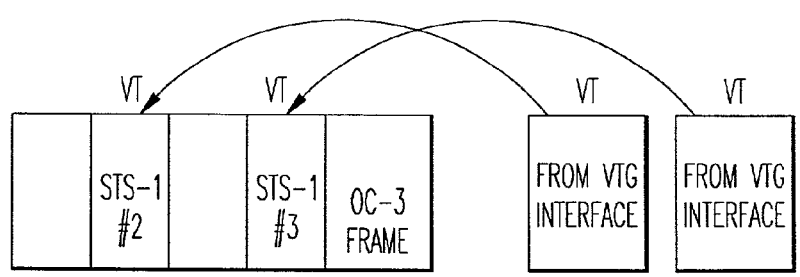

FIG. 39
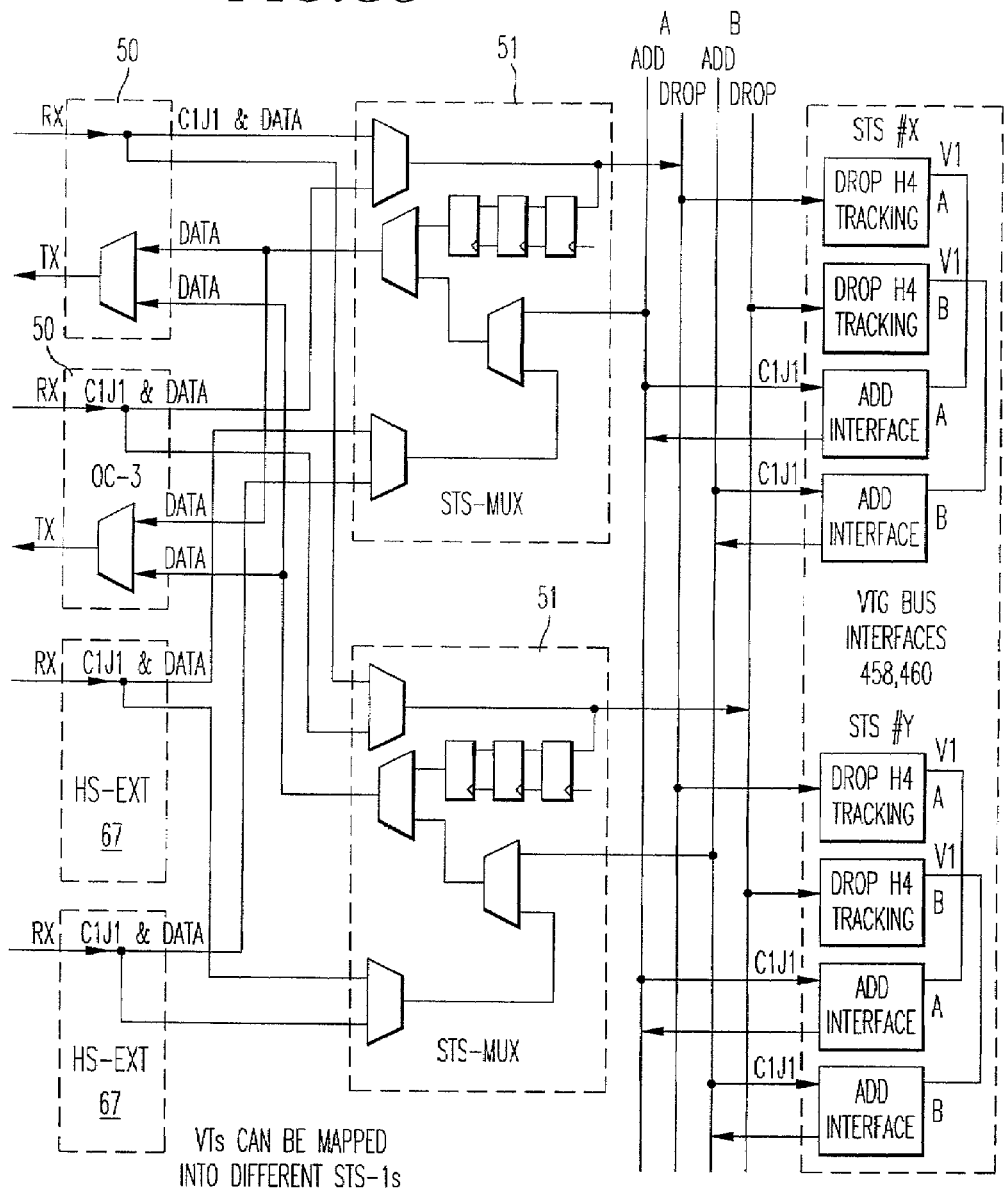
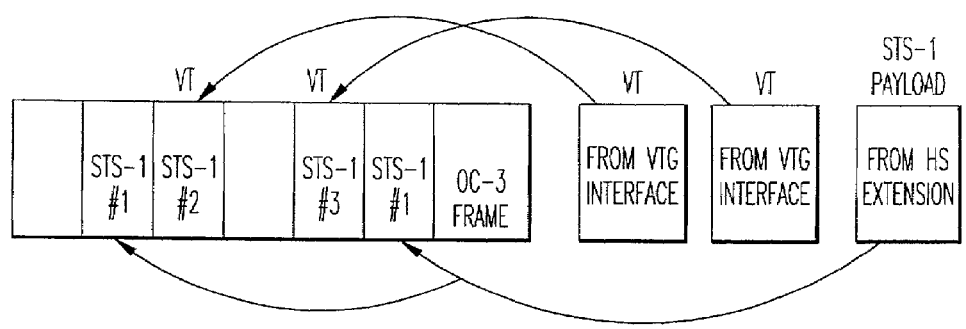

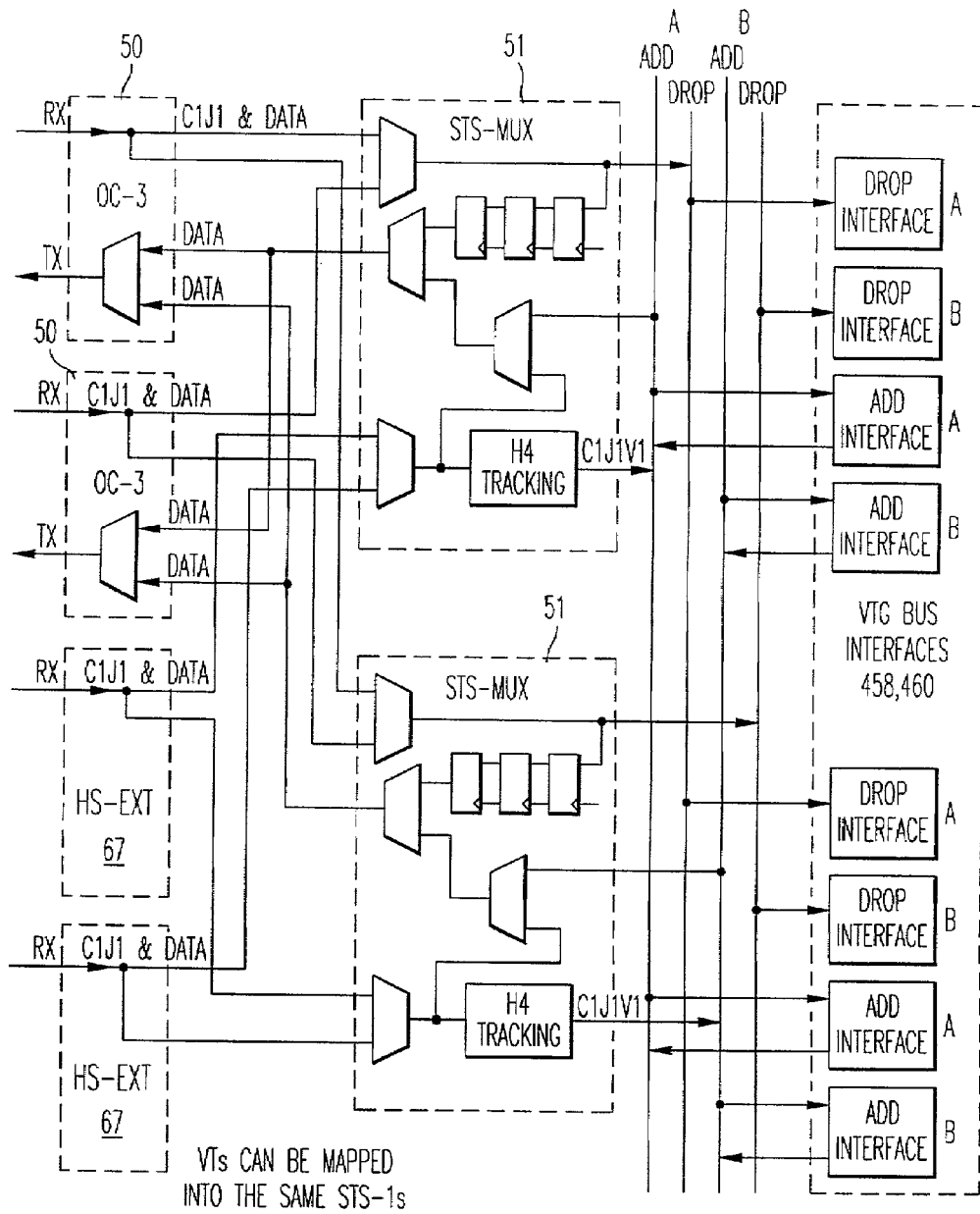
FIG. 40
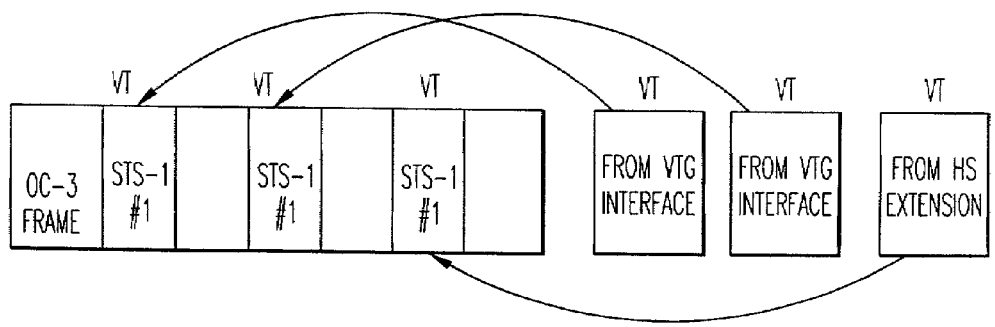

FIG. 41
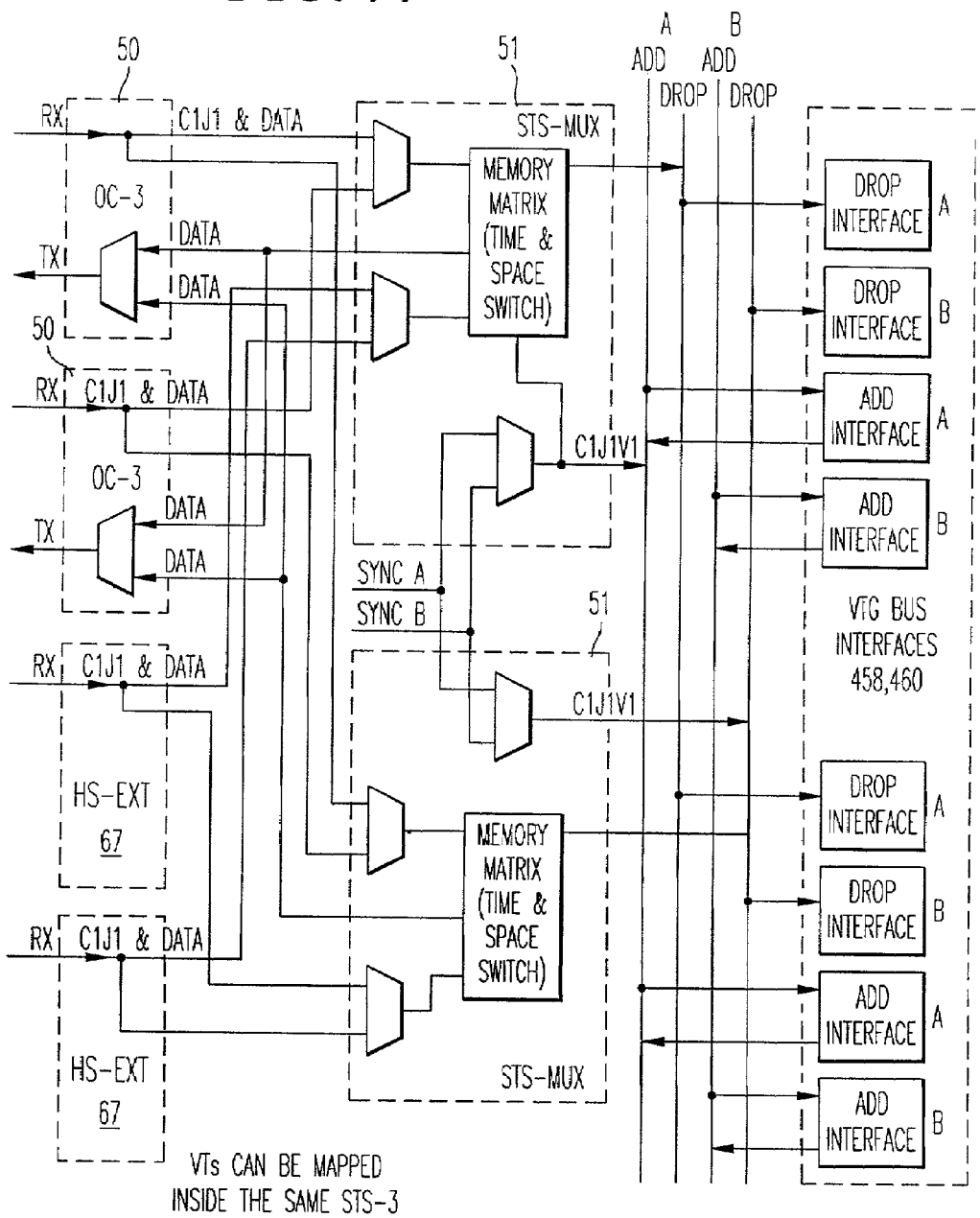
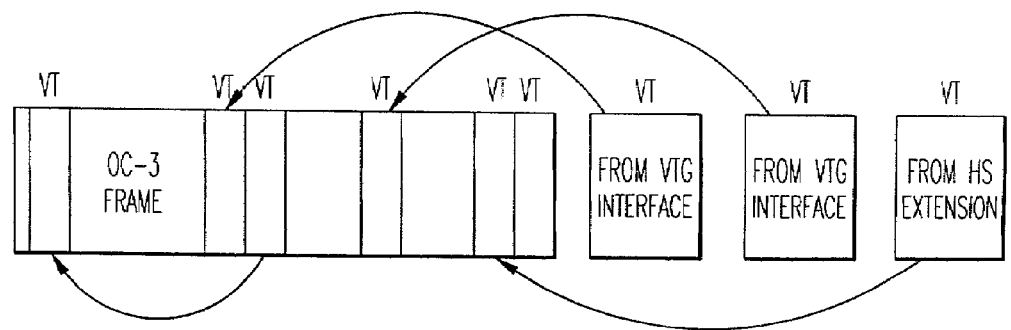

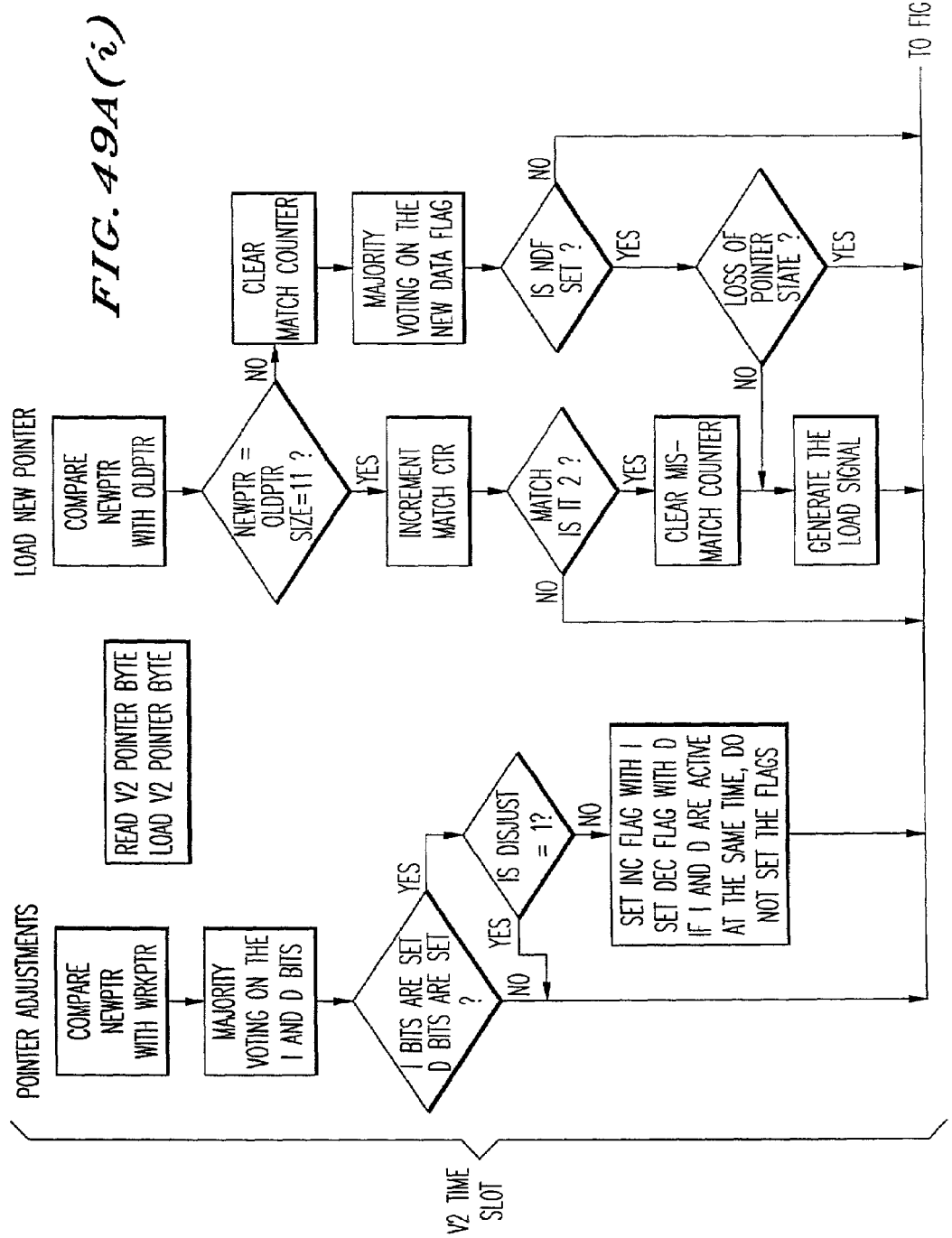

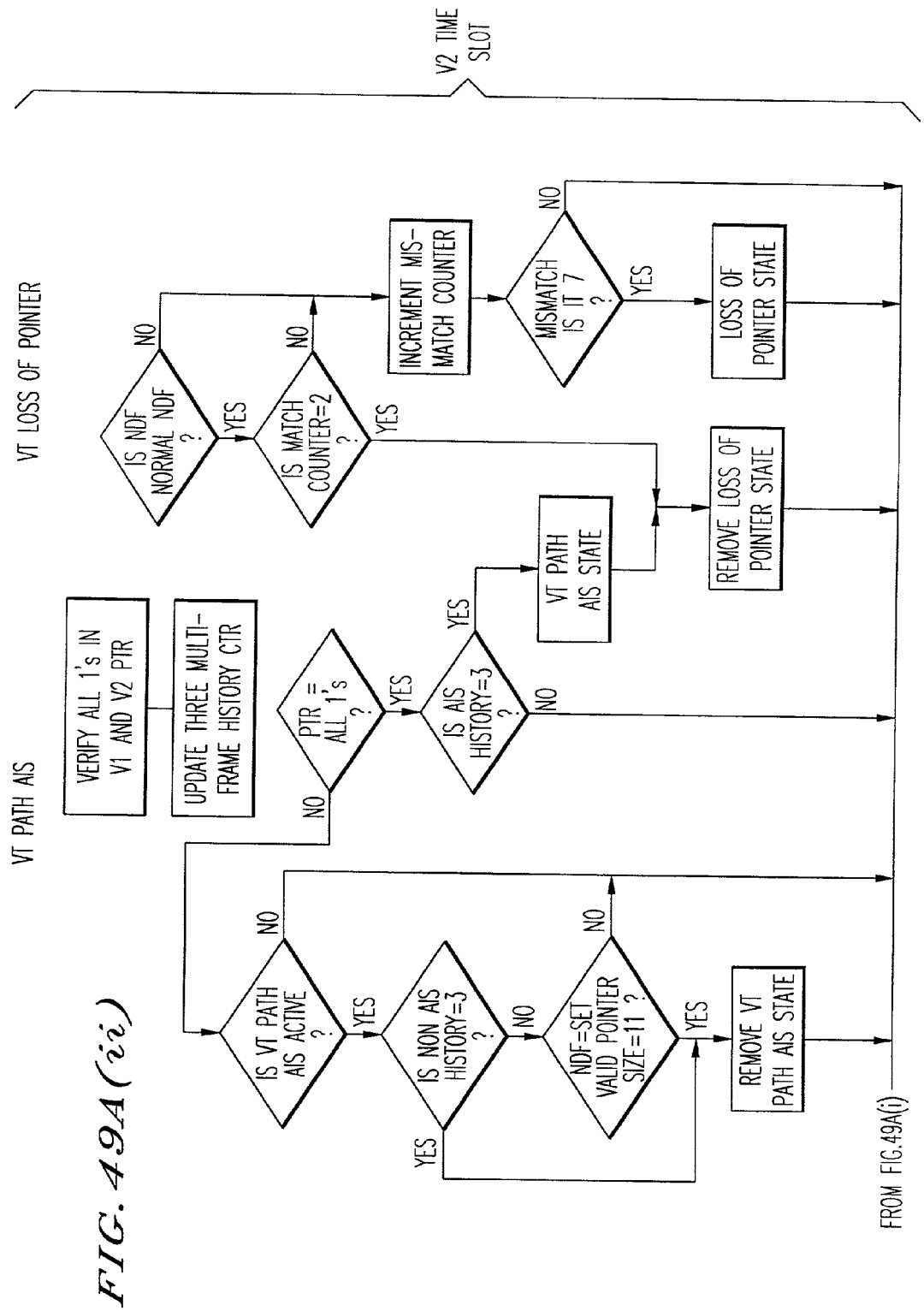
FIG. 49A(ii)

| MULTI-FRAME | FRAME | FS-BIT (SF MODE) | FS-BIT (SLC-96 MODE) |
|---|---|---|---|
| 1 | 2 | 0 | 0 |
| 1 | 4 | 0 | 0 |
| 1 | 6 | 1 | 1 |
| 1 | 8 | 1 | 1 |
| 1 | 10 | 1 | 1 |
| 1 | 12 | 0 | 0 |
| 2 | 2 | 0 | 0 |
| 2 | 4 | 0 | 0 |
| 2 | 6 | 1 | 1 |
| 2 | 8 | 1 | 1 |
| 2 | 10 | 1 | 1 |
| 2 | 12 | 0 | C1 |
| 3 | 2 | 0 | C2 |
| 3 | 4 | 0 | C3 |
| 3 | 6 | 1 | C4 |
| 3 | 8 | 1 | C5 |
| 3 | 10 | 1 | C6 |
| 3 | 12 | 0 | C7 |
| 4 | 2 | 0 | C8 |
| 4 | 4 | 0 | C9 |
| 4 | 6 | 1 | C10 |
| 4 | 8 | 1 | C11 |
| 4 | 10 | 1 | 0 |
| 4 | 12 | 0 | 1 |
| 5 | 2 | 0 | 0 |
| 5 | 4 | 0 | M1 |
| 5 | 6 | 1 | M2 |
| 5 | 8 | 1 | M3 |
| 5 | 10 | 1 | A1 |
| 5 | 12 | 0 | A2 |
| 6 | 2 | 0 | S1 |
| 6 | 4 | 0 | S2 |
| 6 | 6 | 1 | S3 |
| 6 | 8 | 1 | S4 |
| 6 | 10 | 1 | 1 |
| 6 | 12 | 0 | 0 |

*FIG. 59*

INTEGRATED DIGITAL LOOP CARRIER SYSTEM WITH VIRTUAL TRIBUTARY MAPPER CIRCUIT

This application is a division of application Ser. No. 08/471,224, filed Jun. 6, 1995, which is issued as U.S. Pat. No. 5,784,377, and is a continuation-in-part of abandoned U.S. patent applications Ser. No. 08/031,395, filed Mar. 9, 1993, and Ser. No. 08/251,848, filed May 31, 1994.

FIELD OF THE INVENTION

This invention relates to an improved integrated digital loop carrier (IDLC) system which is integrated with a local digital switch (LDS) and which is provided with interface equipment capable of terminating a variety of different feeders. This invention also relates to a method of mapping and demapping signals between virtual tributaries (VT) and digital signals and to a circuit for performing the VT mapping functions.

BACKGROUND OF THE INVENTION

Because of the rapid evolution of telephone exchange equipment in the years since about 1980, a variety of types of transmission media exist in telephone exchanges throughout North America. On the other hand, because of the increasing demands for higher density and otherwise improved telephone systems, as well as for special features and services, there is increased impetus for still greater advances. A new system introduced today is ideally capable of high density service with data handling, as well as voice handling capability, and with provision for the special features and services that are becoming more common. Further, a new system should be able to interface with switch systems of the future, as well as those presently in service, including analog and digital systems.

Integrated digital loop carrier (IDLC) systems have been developed which use virtual tributary groups to facilitate data handling or organization. An IDLC system generally comprises a remote digital terminal (RDT), a local digital switch (LDS) having a high speed termination function, and a synchronous optical network (SONET) or DS1-based digital transmission facility connecting them. The SONET protocol for optical transmission data and voice is standardized at specified line rates designated in Megabits per second (Mbs). A first level, Optical Carrier level 1, or OC-1, transmits data at the rate of 51.84 Mbs. This carrier level has a corresponding electrical level (i.e., signals transported over wire versus optical fiber) called Synchronous Transport Signal level 1, or STS-1. Higher levels of SONET carriers include OC-3 (155.52 Mbs), OC-6 (3.04 Mbs), OC-9 (466.56 Mbs) and OC-12 (622.08 Mbs).

In order to access a high frequency carrier such as an STS-1 signal, access products are required so that lower bandwidth carriers can be introduced into or extracted from the STS-1 signal. Access products provide a SONET network with nodes where components of an STS-1 signal can be added to or dropped out of the main signal. The components that are extracted must be reorganized to produce a signaling format compatible with currently used telephone standards. Components that are added must be reorganized for insertion into a SONET signal. A typical component of an STS-1 signal is a DS1 signal having a bit rate of 1.544 Mbs. Twenty-eight DS1 signals can be supported by an STS-1 signal. Twenty-four DS0 signals with a rate of 64 kbs can be supported within each DS1 signal.

An STS-1 SONET formatted signal comprises 810 bytes. The 810 bytes are organized in a frame structure comprising 9 rows by 90 columns of eight bit bytes that are serially transmitted row by row from left to right. The 27 bytes found in the first three columns of the frame are section and line overhead bytes. The payload is the 783 bytes found in the remaining 87 columns of the frame. Nine of the payload bytes that are arranged in a single column are allocated to path overhead. A Synchronous Payload Envelope (SPE) can begin anywhere within the 9 by 87 bytes allocated to payload, and typically begins in one SONET frame and ends in the next consecutive SONET frame. A payload pointer (i.e., H1 and H2 bytes contained in the line overhead) indicate the frame payload byte where the SPE begins.

Information within a SPE is transported in sub-STS payloads called virtual tributaries. A virtual tributary (VT) represents a portion of the total amount of data carried by an optical channel, or a portion of the total data capacity of the optical channel. A 27 byte structure, or 9 rows by 3 columns, of the SPE has a rate of 1.728 Mbs and can therefore accommodate a 1.544 Mbs DS1 signal. Accordingly, this particular VT is designated VT1.5. VTs of other sizes are similarly designated by a number following the initials, e.g., VT2, VT3 and VT6, which can accommodate CEPT-1 (2.048 abs), DS1C (3.152 Mbs) and DS2 (6.912 Mbs) signal payloads, respectively. Typically, 28 1.728 Mbs virtual tributaries or VT1.5s are embedded with overhead into an STS-1. Finally, the STS-1s are multiplexed with an overhead into the OC-3 (3 STS-1s) or OC-12 (12 STS-1s) signal.

As will be described, the present invention can, in accordance with an embodiment thereof, terminate VT1.5s and handle Floating Byte-Synchronous and Floating Bit-Asynchronous payload mapping, as required-by Bellcore Technical Reference TR-TSY-303. In the Floating VT mode, four consecutive 125 microsecond (µs) frames of the STS-1 SPE are organized into a 500-µs superframe, the phase of which is indicated by the Indicator byte (H4) in the STS path overhead (POH). This defines a 500 µs structure for each of the VTs, which is called the VT Superframe. The VT Superframe contains the VT Payload Pointer and the VT SPE. Four bytes of the VT Superframe are designated for VT Pointer use (V1, V2, V3, and V4, which is undefined). The remaining bytes define the VT Envelope Capacity, which is different for each VT size. The VT Payload Pointer provides for flexible and dynamic alignment of the VT SPE within the VT Envelope Capacity, independent of other VT SPEs.

In the Locked VT mode, the VT structure contains synchronous payloads that are "locked" to the STS-1 SPE. Because the tributary information is fixed and immediately identifiable with respect to the STS-1 Pointer, there are no VT pointers to process. Asynchronous mapping does not require frame acquisition and generation. Byte-synchronous mapping of synchronous DS1 signals, that is, DS1 signals whose timing is traceable to a common timing reference source, allows direct identification and access to the DS0 channels carried in the DS1s, and therefore requires frame acquisition and generation. A byte-synchronous DS0 interface places the 24 DS0 channels of a DS1 signal into the corresponding DS0 channel positions of a Locked VT1.5. The words "synchronous" and "asynchronous" will hereinafter be abbreviated as "sync" and "async", respectively.

In the Floating Byte-Sync mode, the DS0s within the VT are accessed and aligned to the internal frame timing, and the VT1.5 path overhead bytes no longer required. In the Floating Bit-Async mode, the VT1.5 is passed intact transparently to channel units where it is processed.

SUMMARY OF THE INVENTION

An aspect of the present invention is a digital loop carrier system having increased bandwidth for each channel and the capability of providing a broader variety of services than existing equipment.

Briefly described, the present invention is a digital terminal for a telephone system comprising the combination of a plurality of digital line feeders and signal processor means connected to the feeders for receiving digital signals therefrom and for translating the digital signals into optical signals. The terminal comprises at least one channel unit shelf, the shelf comprising a plurality of channel units and first and second optical-electrical interface units for converting optical signals into electrical signals. First and second optical transmission signal conducting means are connected to the signal processor means for receiving therefrom and carrying the optical signals, the first optical signal conducting means being connected in a serial loop to the first optical-electrical interface unit and the signal processor means and the second optical signal conducting means being connected in a serial loop to the second optical-electrical interface unit and the signal processor means for delivering to the optical-electrical units the optical signals. A channel shelf processor is in each channel unit shelf for selectively delivering to individual ones of the channel units electrical signals converted to electrical signals from at least one of the optical signals delivered by one of the first and second optical transmission signal conducting means.

Another aspect of the present invention is a method and apparatus for mapping and demapping channels between virtual tributary and subscriber service signals, as well as between virtual tributaries.

Still yet another aspect is a circuit for performing the mapping and demapping functions, especially in the context of an IDLC such as that mentioned above.

In accordance with the present invention, VT Group (VTG) cards are used to provide digital signal-to-VT, VT-to-digital signal and VT-to-VT mappings in an STS payload. The mapping capability of the card is advantageous because it permits, for example, DS1 based telecommunications systems to continue processing DS1-type signals, while also accommodating gradually evolving industry standards for optical communications, that is, SONET signaling. Since DS1 transmission facilities represent a significant portion of the existing telecommunications transmission network, the expenditures normally associated with adopting a new system, such as purchasing equipment upgrades and hardware and software modifications to embrace new capabilities, is therefore reduced. Further, in accordance with an embodiment of the invention, floating to locked conversion is provided in an RDT or other network element to obtain multiframe, frame and byte observability of the selected STS-1 payload for digital loop carrier (DLC) access. The mappings discussed below are performed for VT1.5s and DS1 format signals for illustrative purposes only. The concepts disclosed and claimed herein are also applicable to different sizes of VTs and other subscriber service formats (e.g., CEPT-1, DS1C and DS2).

BRIEF DESCRIPTION OF THE DRAWINGS

In order to impart a full understanding of the manner in which these and other advantages are attained in accordance with the invention, a particularly advantageous embodiment thereof will be described with reference to the accompanying drawings, which form a part of this disclosure, and wherein:

FIGS. 11A through 11F are diagrams illustrating the directions of signal flow through a VTG/QDS1 card constructed in accordance with an embodiment of the present invention and under different conditions in accordance with an embodiment of the present invention;

FIG. 38 is a schematic block and functional flow diagram illustrating timing flow when the RDT is configured in accordance with an embodiment of the present invention as a terminal multiplexer;

FIG. 39 is a schematic block and functional flow diagram illustrating timing flow for VT mapping from VTG cards and for STS-1 mapping from high speed extension (HSE) cards for outgoing OC-3 in accordance with the present invention;

FIG. 40 is a schematic block and functional flow diagram illustrating timing flow for mapping from VTG and/or HSE cards in accordance with the present invention;

FIG. 41 is a schematic block and functional flow diagram illustrating timing flow for full VT mapping from any source into the OC-3 in accordance with the present invention;

FIG. 59 is a table listing the SLC-96 facility datalink pattern that can be transmitted from a VTG circuit;

DESCRIPTION OF THE PREFERRED EMBODIMENTS

Before discussing the system of the present invention, the reader should be aware that there are several basic background documents which express desired end results in the form of system descriptions or which set standards. These documents have been prepared so that equipment manufactured for use in or with telephone systems in North America will be compatible with other equipment, existing or future, and so that such variables as frequencies, bit rates, voltage levels and impedances can be selected with reasonable assurance that, when system parts are joined, they will operate together as expected. These documents are published by one or more entities such as Bellcore, IEEE and ANSI. In the present application, familiarity with these documents is assumed and the following are specifically incorporated by reference:

Electrical Interface Standard for DSX-1. American National Standards Institute ANSI T1. 102-1987 (1987).

Digital Interface Between the SLC 96 digital Loop Carrier System and a Local Digital Switch. Bellcore Technical Reference TR-TSY-000008.

Synchronous Optical Network (SONET) Transport Systems: Common Generic Criteria. Bellcore Technical Reference TR-TSY-000253.

Integrated Digital Loop Carrier System Generic Requirements, Objectives and Interface. Bellcore Technical Reference TR-TSY-000303.

SONET Add-Drop Multiplex Equipment (SONET ADM) Generic Criteria for a Self-Healing Ring Implementation. Bellcore Technical Reference TR-TSY-000496.

Bellcore Technical Reference TR-TSY-000909.

Also, for the reader's convenience, a glossary of abbreviations, initials and acronyms used with telephone equipment (and used herein) is provided in Appendix A.

Figure 1:
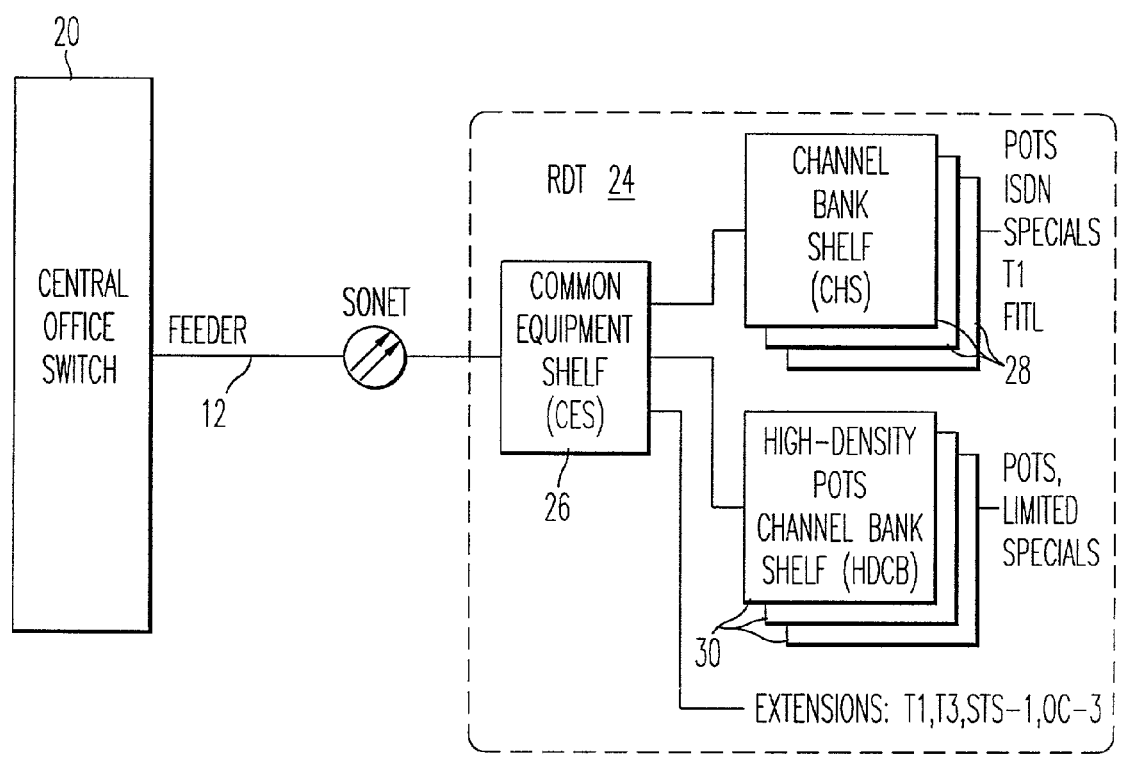
FIG. 1 is a block diagram illustrating the organization of that portion of an integrated digital loop carrier (DLC) system to which the present invention relates and showing equipment employed in an RDT in accordance with an embodiment of the present invention.

In general terms, the system of the present invention provides connectivity from the customer or subscriber premises to the central office (CO) switch. To put the system in context, FIG. 1 shows a general block diagram of a system including a central office switch 20 with switching and interface equipment connected to a multi-channel feeder 12 which can be a SONET (Synchronous optical NETwork) fiber optic link (typically OC-3 or OC-12, 155 Mbps and 622 Mbps respectively) used to transport multiple digitized channels (up to 6048 for OC-3 rate) from the switch 20 to a Remote Digital Terminal (RDT) 24, which is located in a CEV (controlled environment vault), cabinet or business location in the vicinity of the users. A SONET cable is symbolized by a circle with double diagonal arrows. The RDT provides the conversion from the SONET feeder signal to the various drop-side interfaces. In accordance with the present invention, interfaces supported by the architecture include:

POTS—Plain Old Telephone Service

ISDN—144 Kbps Basic rate and 1.544 Mbps Primary Rate

Special Services—Includes pay phones, DDS data ports, foreign exchange, etc.

Extensions—T1 (with and without DS0 switching at RDT),

T3, STS-1 and OC-3

FITL—Fiber to the curb (equipment pedestal serving typically eight homes) or home.

The present system comprises equipment located in three shelf types: a CES (common equipment shelf) 26, a CHS (channel shelf) 28, and a HDCB (high density POTS channel bank) shelf 30. Each RDT 24 has one CES 26 providing common functions such as:

Feeder interfaces (T1, SONET)

Multiplexing/demultiplexing

Time Slot Multiplexing—combining of DS0s or DS0 groups for grooming or concentration.

Synchronization

Facility test access

Signaling processing and translation

Interfaces for non-groomed extensions (T1, T3, STS-1 and OC-3)

Control and administration including local craft interface, embedded operations channel (EOC) support (SONET datacomm channels, TR-303 EOC, Common Signaling Channel (CSC) and Time Management channel (TMC), TR-8 datalink channel) and operations support systems (OSS) channels for connection to remote administration systems.

The CHS 28 houses a variety of channel unit (CU) modules, each of which supports a certain type of subscriber service. It provides a time slot interchange capability to convert line terminations to the appropriate feeder STS-1 time slot. This shelf can support existing channel units for the Series 5 DLC system, (except the Digital Connectivity Unit), as well as new channel units. The HDCB houses new high density POTS channel units and a small quantity of special service channel units. In the embodiment shown, the service offered by this high density card is restricted to POTS in order to achieve lowest possible cost for this pervasive service.

Figure 2:
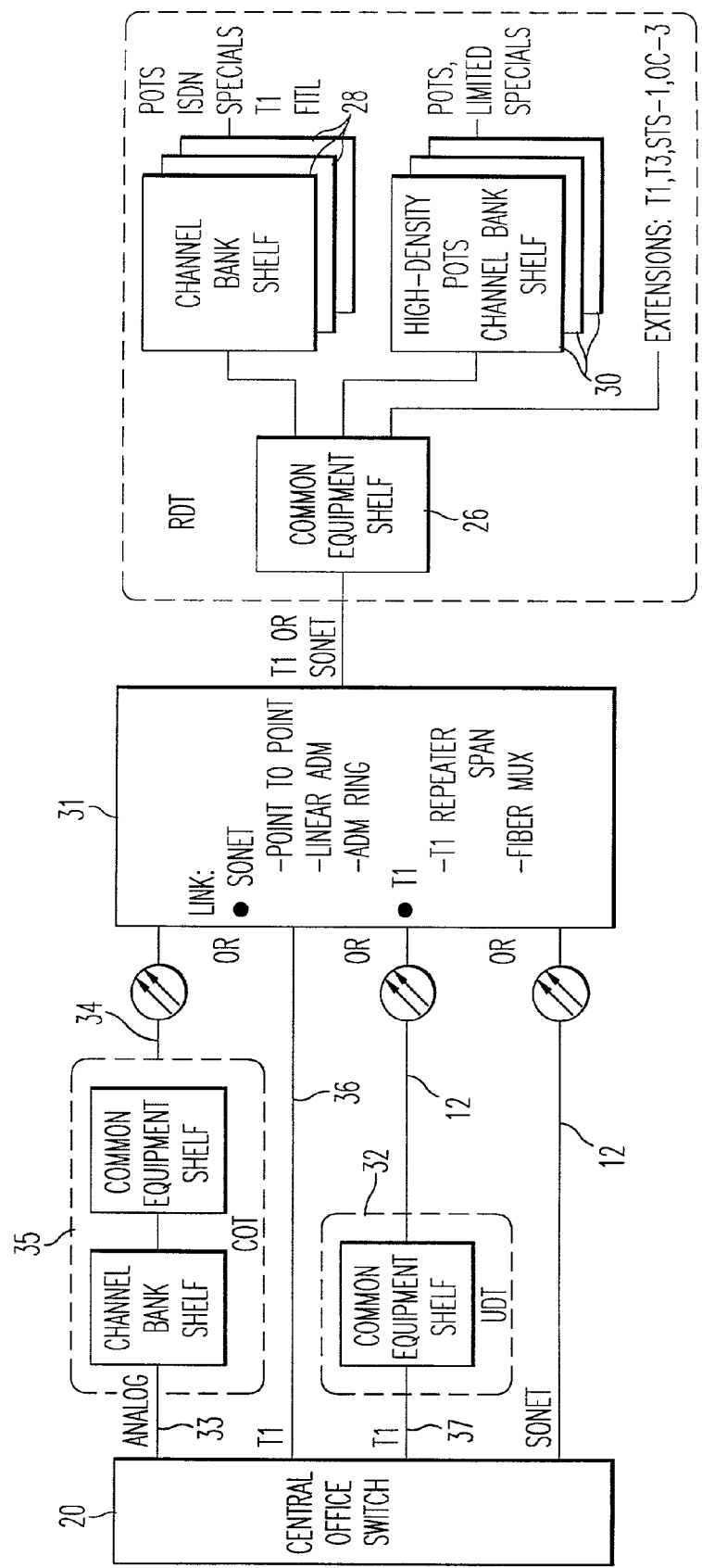
FIG. 2 is a block diagram of a universal DLC system showing Central Office (CO) interface equipment in accordance with the present invention.

FIG. 2 shows in block form a universal digital loop carrier (UDLC) system and introduces a number of different central office configurations which can be used to solve the network transition problem by providing an interface with existing central office switches. FIG. 2 also shows some of the expected feeder options. It is understood that not all of these feeder options would usually (perhaps ever) be employed in a single system. Block 31 represents any of a variety of different kinds of links, i.e., transmission equipment and/or media used by a telephone company. A link can be, for example, T1, SONET, multiplex, microwave or wire. The remote end of the link is typically T1 or SONET.

The most common loop interfaces for currently deployed central office switches are analog copper twisted pair cables 33. An analog cable of this type can interface with a SONET channel 34 using a COT 35 having a CHS and CES in accordance with the present invention, the CHS and CES being substantially the same as those used in the RDT. Integrated DLC systems interface to switches by means of TR-8 compatible T1s for supporting SLC-96 and Series 5-type DLC systems and some TR-303 compatible T1s for newer DLC systems. FIG. 2 shows that these scenarios can be supported with configurations of the same equipment used in RDT 24. Analog interfaces can be supported by using the SLC-96 COT (central office terminal).

T1 interfaces 36 or 37 from the switch can be transported over transmission facilities and interface with the RDT using the T1 feeder interface. This configuration is called an IDLC (integrated DLC) system. The present system can support both TR-8 and TR-303 systems using T1 interfaces. SONET optical transport 12 can be used with an IDLC-equipped central office switch by using the system of the present invention configured as a UDT (universal digital terminal) 32. The UDT requires only the common equipment shelf to convert the T1s into the SONET optical signal. The SONET feeder case has been discussed above.

As background information, the PSC-5 is a system of small size, basically two co-located modules of 96 channels sharing some common equipment, the size being controlled by the historical availability and use, as in a PSC-96, of groups of 4 DS1 trunk feeders. The-availability of SONET and cheaper fiber optics as a transport mechanism, as well as the perceived need for larger bandwidth and flexibility to support future digital services, has permitted the definition by Bellcore (in TR-TSY-303) of a 28 DS1 group as the basic interface building block to support a remote digital terminal and its group of channels. The size of this 28 DS1 group, 672 channels (7×96), requires a system with multiple shelves to support it, in comparison to the PSC-5 single unit which has a single module of shelves that supports both common equipment and 192 channels. Multiple shelves in the system of the present invention provide the ability to configure small systems and to provide smooth growth without incurring unreasonable cost penalties at any growth increment.

The preferred growth increment is 96 channels for various reasons including the fact that it is one carried by integral numbers of DS1s (4). In order not to burden this repeated increment of channel growth with common equipment whose function can be shared, the common functions are all put in a separate common equipment shelf. As will be seen below, the common functions are much increased from the PSC-5, and are not reasonably accommodated with a limited group of channel units. As the common functions now need to support a larger number of channels, the functions are supplied in a redundant manner to prevent any failure from causing significant loss of channel service.

The architecture required is fairly straight-forward when fed only with DS1s, but when optical feeders are introduced the problems and opportunities expand dramatically. To cope with the embedded SONET, the DLC system of the present invention preferably also acts as a SONET terminal, processing the SONET overhead, measuring and reporting on SONET errors and error rates, and using-the SONET communications channels for maintenance commands. To allow for future configurations and growth, the SONET terminal portion of the DLC provides an architecture that can accommodate an upgrade to OC-12 from the basic OC-3. It allows for local dropping of the excess bandwidth in future configurations as an add/drop multiplexer, and allows for use as a member of a SONET ring structure. The termination of the OC-3 (or OC-12) bandwidth provides an opportunity for use of more bandwidth than the standard TR-TSY-303 DLC (28 DS1s). The OC-3 bandwidth supports three DLC RDTs, or a smaller number of RDTs with bandwidth to spare. The bandwidth beyond the first RDT needs to be available for other uses, requiring the add/drop multiplexer configuration. Drops are preferably available as DS1s and DS3s, and also as OC-3, STS-1 electrical, quad DS1 optical and other formats so that the subscriber can utilize the OC-3 (or OC-12) bandwidth.

Using the SONET signal for DS1 transport requires considerable signal alteration. The SONET signal contains several layers of added overhead and multiplexed interleaving on top of the DS1. The DS1 is embedded with individual overhead into a virtual tributary (VT). As stated previously, a virtual tributary is a CONET term referring to a portion of the total amount of data carried by an optical channel, or to a portion of the total data capacity of the optical channel. VTs of various sizes are designated by a number following the initials, e.g., VT1.5, just as the optical channel itself is designated with a number to indicate channel capacity, e.g., OC-3 or OC-12. 28 virtual tributaries are embedded with overhead into an STS-1 (synchronous transport signal) and finally the STS-1s are multiplexed with an overhead into the OC-3 (3 STS-1s) or OC-12 (12 STS-1s) signal.

TR-TSY-303 specifies message-based communications on the DS0s allocated as the EOC (embedded operations channel) for administration and maintenance, and the TMC (time-slot management channel) or CSC (common signaling channel) for time slot assignment and signaling. The system of the present invention is modeled in an object-oriented manner to allow use of ASN.1 (abstract syntax notation 1) messages for DLC control and maintenance. All administrative communications between the switch and the DLC (except CSC/TMC, which do not use ASN.1) are defined as being in ASN.1. In addition, the system of the present invention supports TL-1 messages for SONET maintenance, for DLC test and test access, and for craft terminal access. Furthermore, the present system supports the existing PSC-5 compatible relay alarm interfaces with relay contact closures, external contact sensing, alarm cutoff, and optionally the telemetry byte-oriented serial (TBOS) interface.

Thus, the system of the present invention supports many stages of signaling evolution. It supports TSI (time slot interchange) control and channel signaling transport from the bit-oriented PSC-5, hybrid signaling using the TMC for TSI control and call set-up and in-band robbed bits for 16-state TR-TSY-303 signaling, and the use of the CSC for both message-based call control and channel signaling. When SONET feeders are used, the channel signaling is carried in the VT1.5 overhead, and preferably only converted to robbed-bit format at the terminating end if needed. This makes synchronization easier and prevents multiple "bit robbings" in different multiframes, which would degrade signal quality. It also makes use of clear channels easier. In addition, per DS0 channel AIS (Alarm Indication Signal) or UNICODE are detected and supported by associated trunk conditioning, when using a SONET feeder.

TR-TSY-303 requires time slot interchange and assignment. This is required for all channels across a 28 DS1 group (672 channels). This channel group can service seven 96-line shelves of channels without concentration. The present system allows interchange and assignment to any of the available 672. This allows grooming from any channel into any of the 28 feeder DS1s. Grooming is defined as reorganizing subscriber traffic in different data paths.

Test systems are evolving also, and the system of the present invention accommodates the evolving test environment. It is compatible with existing test systems and with use of the current loop and channel test facilities. It is capable of migration to the use of an integral remote test unit and to communication with new test operations systems.

It can be seen from the discussion above that the requirements and internal architectural needs of the system of the present invention are different from the PSC-5. Consequently, the architecture is different except for places where compatibility is required to accommodate compatibility with existing equipment such as channel units.

Internal coordination of activities between the cards in the CES and CHS is through several message-based LANs. All cards in the CES preferably communicate via a redundant backplane LAN providing a CSMA/CD physical layer and LAPx (Link Access Procedures on channel A, B, C OR D) link and network layers. Cards in a CHS communicate via a single-master/multiple-slave link. Series 5 cards use a single-word addressing scheme known as the Old Message Line. Cards unique to the system of the present invention use a variable-length message system known as the New Message Line. Connection between the CES and the CHS is via dedicated DS0s from the Signaling Control Processor to the CSPs running an HDLC protocol.

The overall system operations support environment of TR-TSY-303 is more comprehensive than that of the prior art DLC. The new environment described includes integration of OSSs (operations support systems) for provisioning, maintenance and testing, and their interfaces to the DLC equipment. The system of the invention provides the needed support interfaces, yet provides a means to interface the functions to the current OSSs and to service personnel. It is able to migrate to use of the new OSSs when they are available. This is done through the use of an interim supervisory system that provides both direct interfaces to the system of the present invention and a gateway to OSSs when not available elsewhere. In addition, if a terminal (UDT or COT) of the present invention is provided at the CO, an OS port is provided at the terminal.

The system of the present invention also incorporates integrated test abilities. The current DLC system can test POTS services, bit the advent of fiber feeder requires expensive external testers to test loops and there has not been a good way to test special services in the current RTs. The system of the present invention integrates a test architecture compatible with that defined by Bellcore, and provides significantly enhanced test capability over current systems.

The new DLC presumes an increased emphasis on digital services, especially those based on ISDNs (integrated services digital networks) and the new operations system environment. To provide flexibility for new digital services, the system architecture of the present invention has been designed with the ability to provide much larger bandwidth to any subscriber than the current DLC systems and yet be economical when providing standard POTS services. The channel shelf provides up to 27 DS0s (a virtual tributary) from every two slots, or up to 12 DS0s from every slot.

Figure 3:
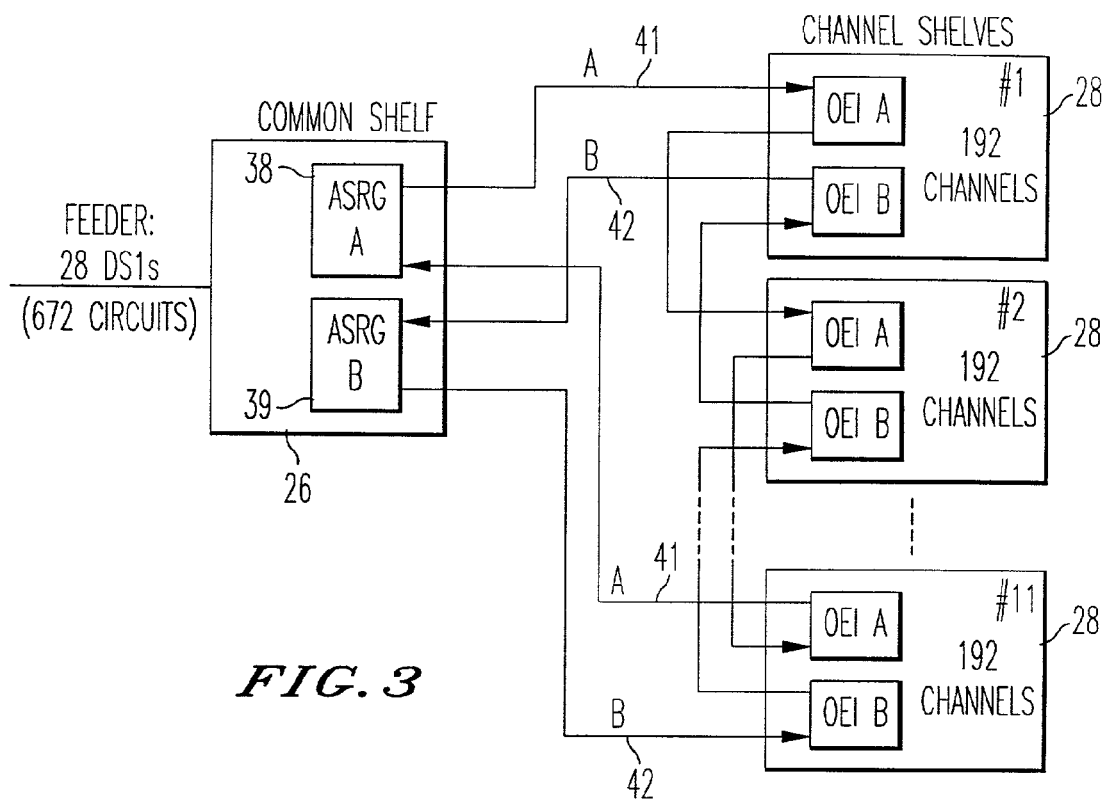
FIGS. 3 and 4 show different configurations of a portion of a system constructed in accordance with the present invention to accommodate different feeders.

As shown in FIG. 3, when equipped with DS1 feeders, the system of the present invention can support up to 28 DS1s, providing the maximum feeder interface size specified by TR-TSY-303. CES 26 is shown with two Access Shelf Ring Gateway (ASRG) cards 38 and 39, one each for A and B optical communication loops 41 and 42, which will be described in greater detail. On the channel side, with 8 additional shelves, for example, the system can support up to 1536 DS0 channel services, providing TSI and concentration for those channels. This requires the use of quad POTS CUs. The TR-TSY-303 specified maximum is 2048 channels, which can be supported by the described architecture using additional shelves or higher line density channel shelf distribution such as high-density POTS or fiber in the loop. The architecture can support an even larger channel group by dividing it into multiple virtual RDTs.

Figure 4:
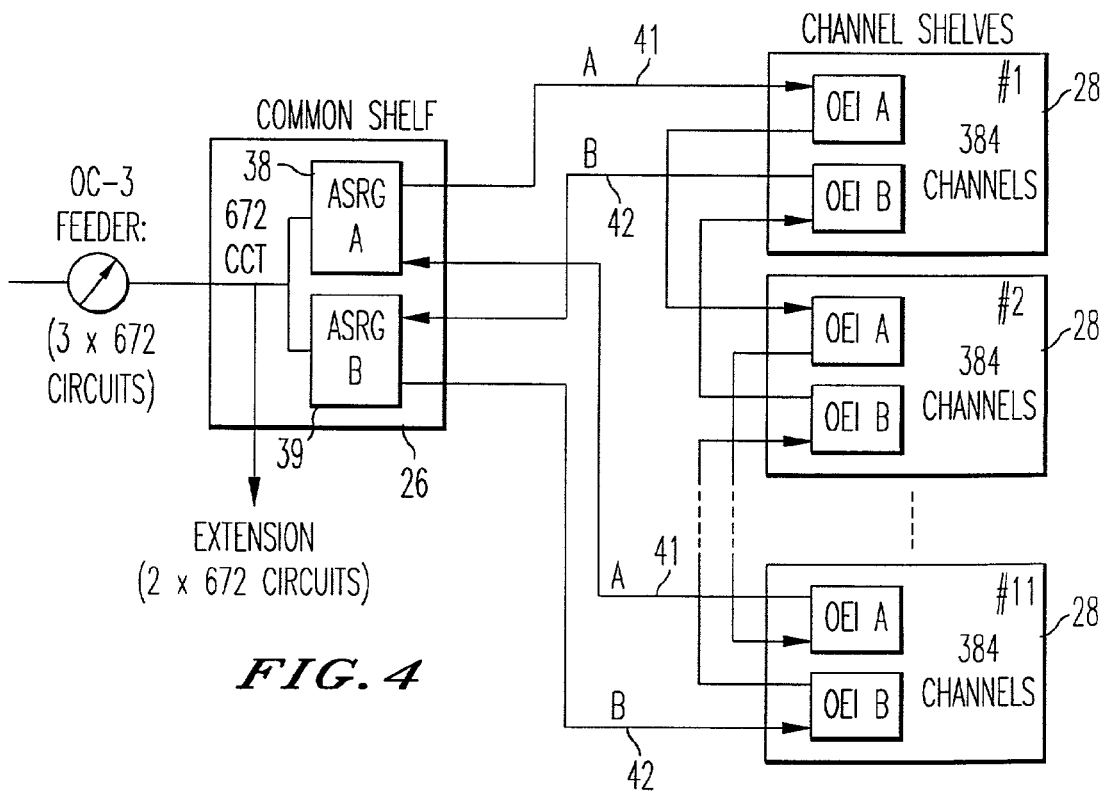

When equipped with a SONET feeder as shown in FIG. 4, the system of the present invention can support three RDT groups of 28 DS1s (the 84 DS1s total comprising the OC-3 payload). Each RDT 28 DS1 group can -support 672 feeder circuits concentrated from 2016 DS0 channel services, providing TSI and concentration for those channels within each RDT group. Each 28 DS1 group will occupies a SONET STS-1 payload. This allows a system maximum size of three RDTs totalling 6048 DS0 channels. Note that the full utilization of this capacity requires channel shelf distribution for 2016 channels per ASRG card. TR-TSY-303 specifies that each RDT occupy a complete 28 DS1 space on the feeder when entering the SONET path. The SONET terminating equipment is defined to provide the capability to then groom the used DS1s onto the SONET feeder path. In integrating the SONET terminal, each RDT is never required to appear as "28 DS1s" and can be directly groomed onto the SONET path in the common shelf, providing economy and flexibility in use of feeder interface bandwidth.

The architecture also provides for future SONET add/drop capability, and future expansion of SONET feeder bandwidth to OC-12 with capability to configure the feeder linearly or in a ring. The overall DLC system architecture supported by the system of the present invention preferably covers a wide range of DLC configurations, both to broaden the market acceptability and to ease transition between current switches and the future TR-TSY-303 switches.

Changes in technology have resulted in several generations of switches which means that a new system preferably has backward compatibility with several levels of technology. The progression of switch technology to be interfaced by the present system is:

1. Analog Loop Terminating, requiring a universal configuration with SLC-96 COT. This can use DS1 or OC-3 feeder to the RT depending on the transmission requirement.
2. Integrated TR-008, requiring superframe DS1s with AB signaling, TSI control for SLC-96 mode 2 concentration carried in the data link, and POTS test access and test termination control carried in the data link. This requires the RDT to have DS1 interfaces unless a system of the present invention "Universal Digital Terminal" is used at the central office to convert the DLC optical feeder to TR-008 interface to the switch. The UDT in this instance serves as a byte sync SONET MUX and an OIM. An alternative in transition is to transport the async DS1s on an async SONET path. One RT then has to provide asynchronous termination of VT1s, DS1s, and data link extraction in a SONET environment for ease of transition.
3. Integrated DS1 TR-TSY-303, requiring extended superframe DS1s, with locally switched services using:
    Hybrid signaling (ABCD robbed-bit signaling plus TMC TSI control), or
    Common Channel Signaling, (with both signaling and TSI control carried by messages in the CSC).

Non-switched services using ABCD or AB (ABAB) robbed bit signaling in-band. TSI grooming control for the non-locally switched services is carried over the EOC from the memory administration OS. The TSI timeslots are "nailed up."

Non-locally switched services using AB or ABCD robbed-bit signaling in band. TSI grooming control is via the EOC from the memory administration OS. The timeslots are permanently allocated and there is no per-call time-slot management (unless configured as a separate virtual RDT).

These services can use DS1 RDT feeders or OC-3 carried as async or byte-sync mapping.

4. Integrated SONET TR-TSY-303, requiring SONET byte synchronous optical interface at the LDS (Local Digital Switch), and DS0 transmission in virtual tributaries to the RDT. This requires the use of CSC carrying signaling and TSI control for locally switched services, and ABCD signaling with EOC memory administration TSI control for non-locally switched services. This requires use of integrated SONET at the RDT or DS1 feeders with an external byte sync MUX.

The system of the present invention provides both a DS1 feeder interface and an OC-3 (or OC-12 Add-Drop Multiplexer or ADM) interface. While the LDS is limited to CSC use with optical feeder interface (the case specified by TR-TSY-303, Suppl. 2), the system of the present invention is not. This is useful to accommodate configurations using DS1 LDS/IDT (Integrated Digital Terminal) interface and requiring optical feeder, when TMC or CSC can be used.

To allow termination of asynchronous SONET muxes with an integrated SONET interface, the system of the present invention provides asynchronous termination of VT1s, DS1s, and data link extraction to ease transition in an asynchronous SONET environment.

Figure 5:
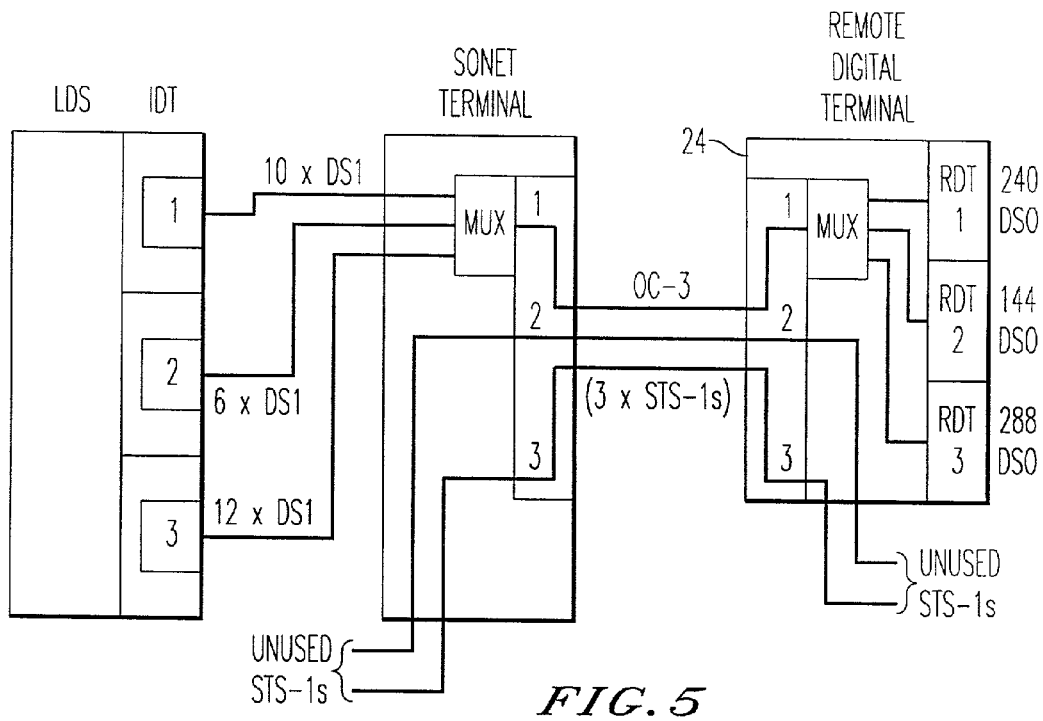
FIG. 5 is a schematic diagram of organization of paths forming virtual RDTs in accordance with the present invention.

To provide flexibility in load equalization, referring to FIG. 5, the system of the present invention permits the user, i.e., the BOC, to define groups of channels fed by groups of DS1s or SONET VT1.5s as virtual RDTs. Each defined group of channels and associated DS1s appears to the switch as a complete stand-alone RDT. A single RDT 24 can be divided in this way into a maximum of three TR-TSY-303 groups (virtual RDTs), each of which appears to the switch like an independent RDT from the point of call processing, TSI control, and administration. Within each virtual RDT, concentration is performed within that group of DS0s, allowing each group to have a different concentration ratio dependant upon the traffic need. This allows the BOC network administrator to reassign or regroup channels to different IDTs and switch ports to even out the traffic applied to the switch ports and optimize utilization and service. The BOC can determine which subscriber channels go into certain feeders and can assign across the whole feeder and channel bandwidths. Each of the groups can have concentration ratios assigned within the TR-TSY-303 range of 1:1 to 9:1, from a remote location without having to go to the RDT and physically change any equipment.

This is distinct from the standard view of the 28 DS1 group as an RDT, although the maximum size of the RDT is still 28 DS1s, whether the RDT is a virtual RDT or a single 2016 channel DLC system. The virtual RDT, from the view of the LDS/IDT is a complete RDT, having its own EOC and its own TMC or CSC to manage its concentration.

The system of the present invention can architecturally support seven virtual TR-8 RDTs. This flexibility allows deployment of a single system of the present invention as the equivalent of multiple TR-8 systems, with groups of 96 lines each optionally providing the SLC-96 Mode 2 concentration, or as multiple TR-TSY-303 RDTs, of varied sizes and concentration ratios, or even as a mix of TR-TSY-303 and TR-8 systems. It also provides for multiple 96-line RDTs as required by AT&T generic switch software 5E8. This virtual RDT capability is available when using the SONET or DS1 feeders.

Common Equipment Shelf Hardware

As mentioned above, the system of the present invention comprises three basic hardware elements: the common equipment shelf (CES) 26, the channel shelf (CHS) 28, and the auxiliary shelf, which is illustrated as part of the CES 26 although it can be a separate shelf. Each of these components is described in detail in the following sections. RDT mountings allow access to the rear panel and backplane.

Figure 6:
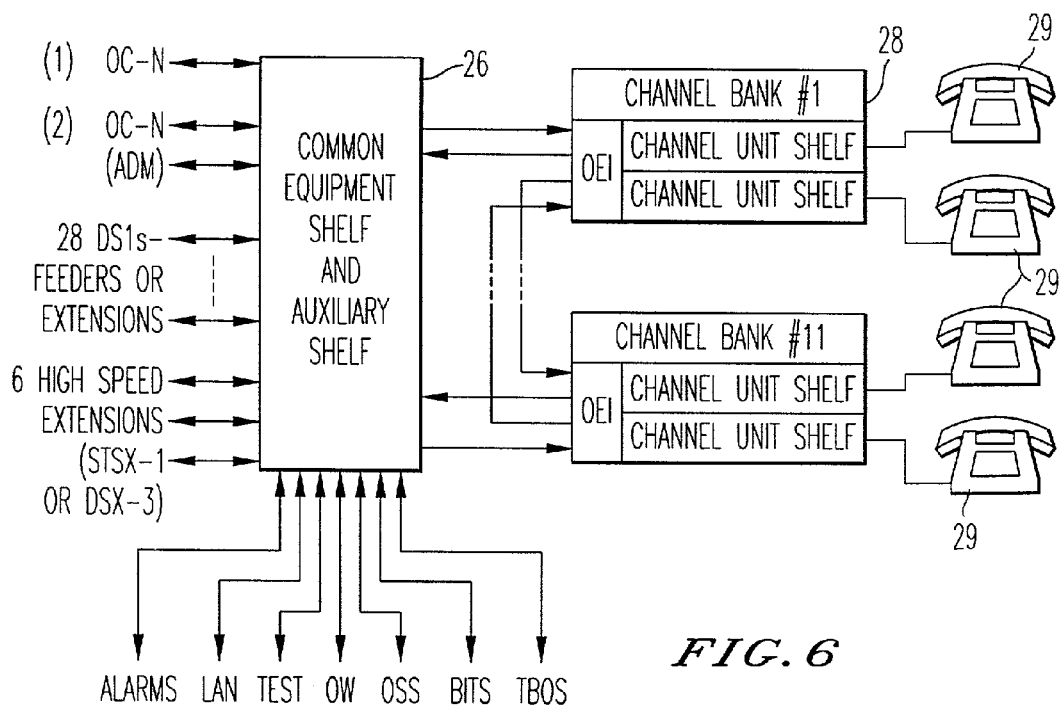
FIG. 6 is a schematic diagram illustrating the overall connection between the common equipment and channel shelves with the channel banks, showing the inputs and outputs to the shelf units, in accordance with the present invention.

The CES provides all of the centralized functions of the system of the present invention. The CES interfaces to the feeder(s) on the network side and from 1 to 8 channel shelves on the subscriber side. A system block diagram, showing the various signals into and out of the CES and auxiliary shelf, is shown in FIG. 6. The feeder interfaces can be SONET OC-3, OC-12 or DS1s as shown in the figure. As schematically indicated, each channel bank has a plurality of channel unit shelves 28, depending on the size of the system, and the individual channel units in each channel shelf serve subscriber devices such as individual telephone instruments 29, data transmitter/receivers or the like. Normally, two telephone instruments are served by each channel unit.

Figure 7:
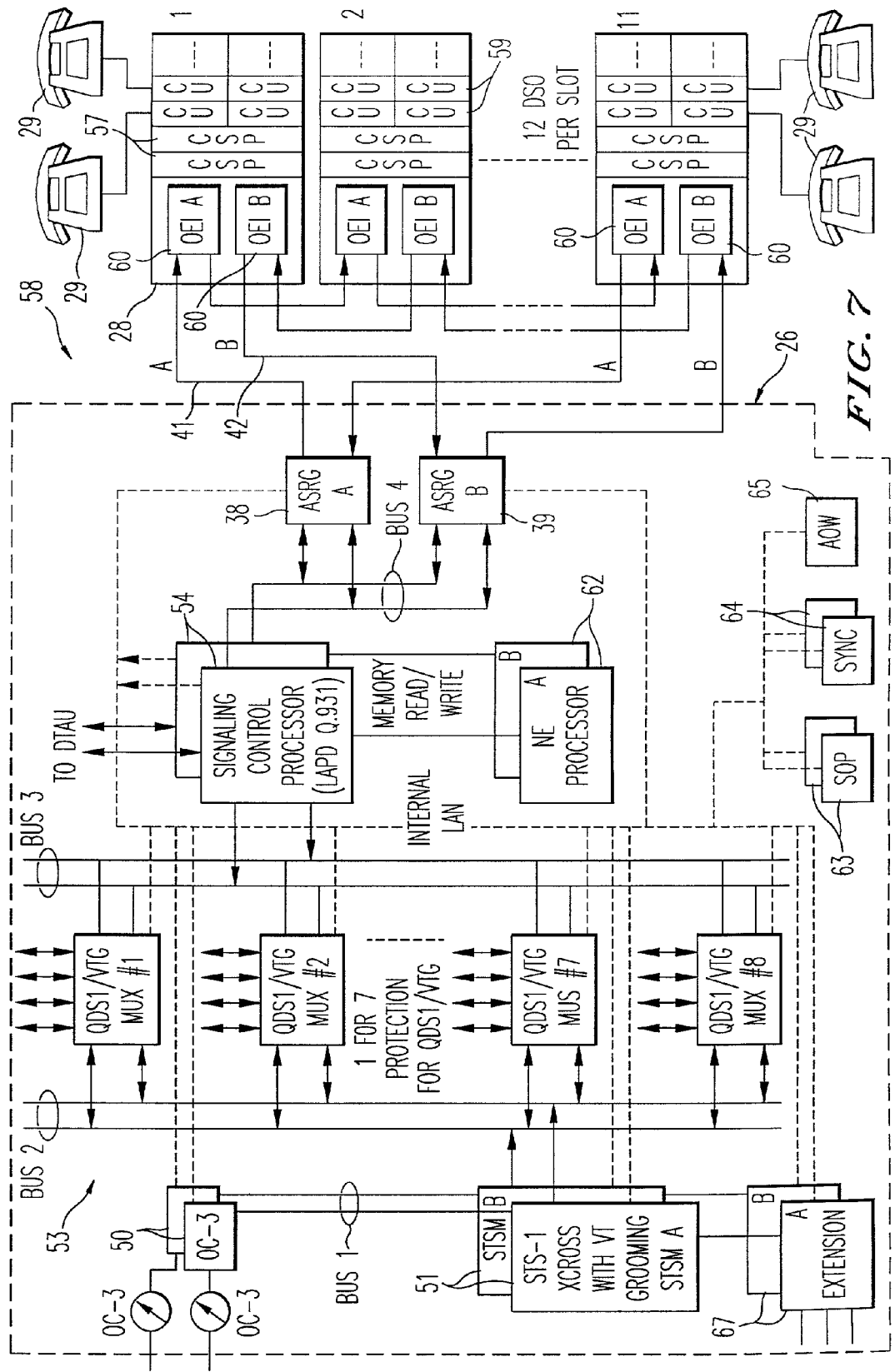
FIG. 7 is a schematic block diagram of a common equipment shelf (CES) and channel shelves (CHSs) in a remote digital terminal (RDT) in an integrated digital loop carrier (IDLC) system in accordance with an embodiment of the present invention.

A more detailed block diagram of the CES 26 and the connections to the channel shelves 28 are shown in FIG. 7. This figure shows the module partitioning, major functions, and basic signal flow. The descriptions below are intended to give a brief overview of the CES. More detailed descriptions and requirements for each card in the CES can be found in the remainder of this section. The self-monitoring functions are capable of monitoring hardware and software troubles. In this figure, the dashed lines indicate connections of an internal LAN for administration and the solid lines indicate signal/data flow and busses B1, B2 and B3.

The OC-3 (OC-3 TX/RX LR) optical interface cards 50 perform the optical-to-electrical conversion function, as well as OC-N to STS-1 demultiplexing. As with most of the signal-flow cards in these units, there are two usually identical cards, one each for channels A and B. STS-1 Synchronous Payload Envelope (SPE) pointer processing is also performed by the OC-3 card. Other functions performed by the OC-3 card are Section, Line, and Path Termination functions which include alarm detection, performance monitoring and allowing other modules to access both the DCC (Data Communications Channel) and AOW (Alarm & Order Wire) fields.

The demultiplexed STS-1 streams are then fed on Bus 1 to the STSM (STS-1 Multiplexer) module which contains the STSM cards 51. The STSM cards provide STS-1 Space Switching and the capability to Add/Drop STS-1 streams to/from High Speed Extension Cards (HSEXT) 67. The STSM provides a parallel STS-1 data interface on Bus 2 to the VTG/Quad DS-1 (VTG) cards indicated generally at 53. The STSM cards also perform diagnostic loopbacks to diagnose and isolate faults on both the OC-3 interface side and the VTG side of the STSM. There are seven VTG cards and one standby VTG. Each VTG card provides termination for four VT1.5s. The VTG cards can handle Floating Byte-Sync and Floating Bit-Asynchronous payload mapping as required by TR-TSY-303. In Floating Byte-Sync mode, the DS0s within the VT are accessed and aligned to the internal frame timing. The VTG output is Locked Byte-Sync payload mapping, with the VT1.5 path overhead bytes no longer required. This Locked Byte-Sync STS-1 is output in parallel on the CES internal bus 3 to be further processed by the Signaling Control Processor (SCP) cards 54. For Floating Bit-Asynchronous mode, the VT1.5 is passed intact transparently through the VTG cards 53, SCP cards 54, ASRG cards 38 and 39, and through optical ring paths 41 and 42 to a Channel Shelf Processor card (CSP) 57, and finally to the channel units 59 where it is processed.

The SCP card 54 converts the Locked Byte-Sync VT format to a unique Locked Byte-Sync format. To accomplish this, the signaling bits contained in the VTs are reformatted so that all the signaling bits for a given subscriber appear in the same byte. The SCP also performs DS0 Unicode and Yellow Alarm processing on a per-subscriber basis and translates signaling between TR-TSY-303 mode and TR-TSY-8 mode, as required, on a per-subscriber basis. After the VT1.5s have been processed and reformatted by the SCP, the data is passed to an ASRG card 38 or 39, which adds the STS-1 Path and Transport Overhead and then converts the 51.84 megahertz (MHz) data stream to an optical signal. This optical signal is then broadcast to all channel shelves on an optical token ring indicated generally at 58. The ring includes two separate paths 41 and 42 on which signals pass in opposite A and B directions.

The optical signals are converted back to electrical signals in the channel shelf 28 by the Optical Electrical Interface (OEI) cards 60. Two OEI cards are associated with each CHS 28, one each for the A and B portions of ring 58. These signals are then fed to a Channel Shelf Processor (CSP) 57. The CSP recovers the STS-1 clock and data and then performs STS-1 pointer processing to locate the STS-1 SPE. The CSP then performs rate conversion on the VT payload and passes the VT DS0 Byte-synchronously to synchronous channel units. In the case of Async services, the CSP passes the VT transparently, without timing modification, to the channel unit 59. Other functions of the CSP include dial pulse digit collection and insertion, DS0 grooming and Dynamic Timeslot Assignment (blocking), ISDN D channel multiplexing, and alarm processing.

The control of the entire system of the present invention is maintained by one 1:1 redundant processor group comprising two boards. these boards are the Network Element Processor (NEP) 62 and the Signaling Control Processor (SCP) 54. Network element control, OSI (open system interconnect) protocol processing, signaling processing and database functions are contained in the NEP/SCP processor group. The NEP and the SCP communicate with each other via a memory read/write interface. The SCP also contains a redundant LAN interface, shown by the dotted lines, to enable it to communicate with the redundant NEP/SCP group as well as with other cards in the CES. The communication is also extended to the CUs 59 via embedded data channels in the STS-1 rate signals, allowing communication with both common shelf and channel shelf cards. All other cards in the system (with the exception of older CUs) have on-board microprocessors which deal with real-time processing. This keeps the real-time processing required by the main processors to a minimum. The call-processing function is preferably the only major function which requires real-time processing by the NEP/SCP processor group.

The following functions are not located in the main signal path but are contained in the CES. A brief description of how these functions fit with the main signal path is given below.

The synchronization of the system of the present invention is controlled by 1:1 redundant SYNC cards 64. Each of these cards can select one of six fundamental timing references as a source to provide all of the internal timing required by the system of the present invention. These sources are one of two DS1 BITS (building integrated timing supply), the receive clock from one of the eight VTG cards 53, one of two OC-3 clocks, the sync from the adjacent SYNC card, or the internal temperature controlled crystal oscillator (TCXO). Each card requiring timing from the SYNC cards selects between the primary and backup SYNC cards to allow protection switching of the SYNC cards.

DTAU (digital test access unit), MTAU (metallic test access unit), and CTU (channel test unit) testing functions are also contained in the Auxiliary Shelf (AUXS) but are not shown in FIG. 7. These cards enable full test access to the digital bitstream, analog loops, and analog channels (inward from the loop). By utilizing a RTU (remote test unit), remote testing is possible. The CTU provides channel termination and signaling detection under control of a PGTC (pair gain test controller), and provides loop switching to external bypass pair access.

28 DS1 feeders or extensions are also available from the CES. These DS1s can be SF or ESF (Superframe or Extended Superframe) and can be mapped into async or byte-sync SONET floating mode VT1.5 formats. As feeders, the DS1s can be TR-8 or TR-303 formatted. The 8 DS1 interface cards (VTG) 53 each have four duplex DSX-1 interfaces, arranged in a 1:7 equipment protection scheme, In the case of a VTG module failure, the complete module (4*DS1) is switched off the bus and the 8th VTG module is switched onto the bus. The DS1 feeders can be transported to the RDT on SONET and terminated on the VTG/QDS1 card.

Slots are also provided in the CES for a 1+1 redundant High Speed Extension capability shown at 67. These higher bandwidth extensions are usually only of use with OC-12 optical interfaces due to the bandwidth limitations of OC-3. This slot can support a number of extensions, including OC-3, 3*STS-1, 3*DS3, or Pulsecom low-cost interfaces.

All cards in the CES receive power from 1:1 redundant bulk power supplies, not shown, which are powered from the −48. volt DC feed. Each card in the common shelf has a dedicated pinout to the backplane on which is hard-coded via ground open connections using a unique combination that allows the card to determine which one of a particular card group it is. A maximum of three bits is required, as the maximum group of cards is preferably eight (quad DS1 extension). Redundant card pairs only need one bit.

OC-3 Card

Figure 8:
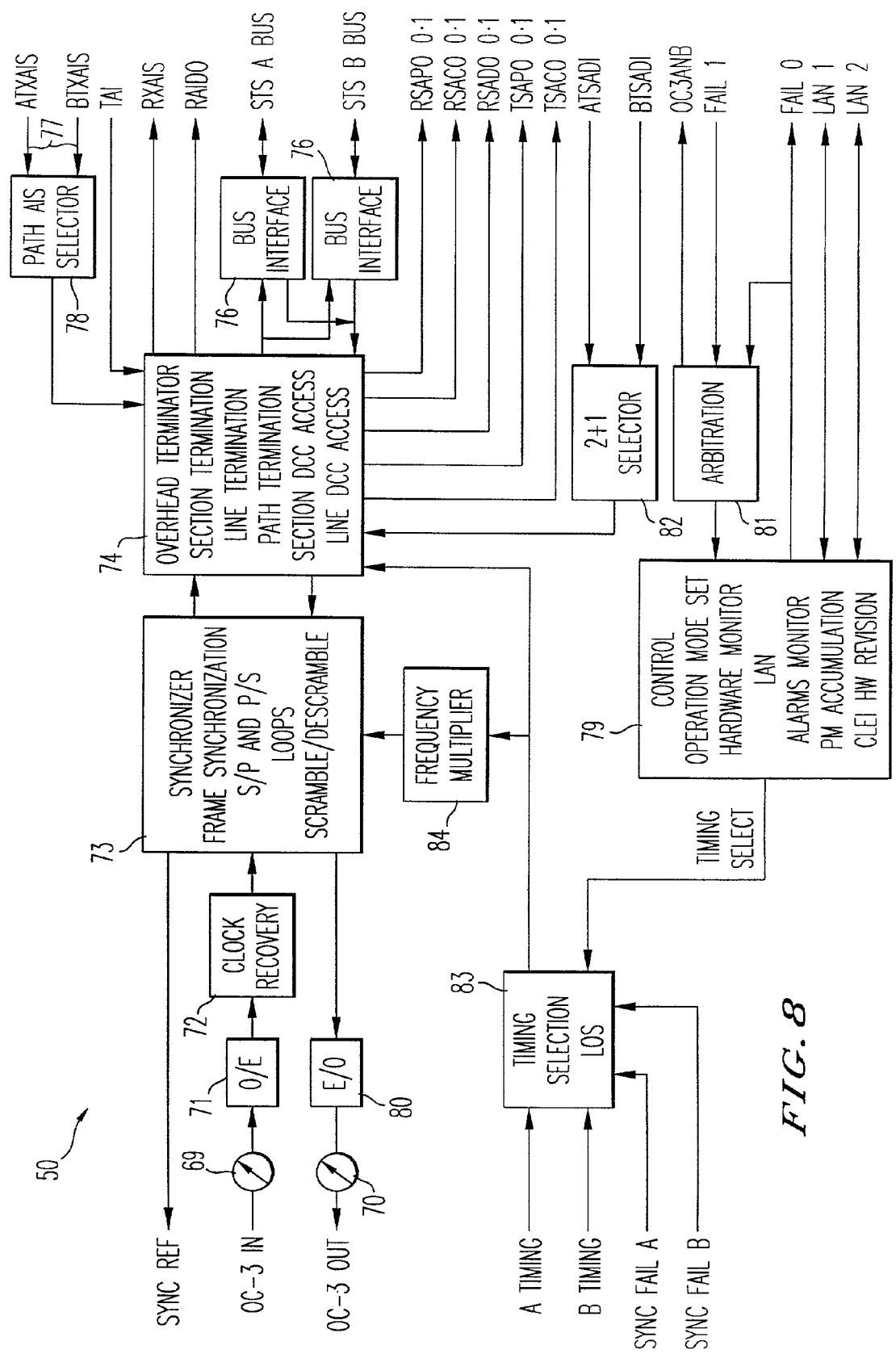
FIG. 8 is a schematic block diagram of an OC-3 card constructed in accordance with an embodiment of the present invention and usable in the shelves of the RDT of FIG. 7.

The OC-3 card block diagram is shown in FIG. 8. The OC-3 card 50 is the optical interface for the system of the present invention, The card interfaces to the network via two optical fibers 69 and 70 that carry an OC-3 level signal, one for transmit and one for receive. The transmitter complies with SONET intermediate range requirements. It handles the Section and Line overheads for an STS-3 signal, and the Path overhead for three STS-1 signals. The card performs pointer processing in the receive and transmit directions to adjust the received frequency and the transmit frequency to the internal frequency.

The OC-3 card is considered a part of the facility, and failure of an OC-3 card is equivalent to a facility failure. In both cases, a protection algorithm switches OC-3 cards. For equipment failures the arbitration algorithm decides from which card the STS Mux should read received data. Protection can be set to 1:1 or 1+1.

Data Communications Channels (DCCs) and order wires (OWs) are recovered and forwarded to the SOP cards 63 and AOW cards 165 for handling. The DCCs and OWs from those cards are inserted into the OC-3 signal. Automatic Protection Switching (APS) is locally handled. The card communicates with the STS Mux cards through two parallel 19.44 Mhz busses. Bus selection is based on bus diagnostics.

An optical-to-electrical interface 71 converts the optical signal into an Emitter Coupled Logic (ECL) serial stream. A clock recovery circuit 72 on the card recovers the clock and data from the ECL stream and forwards them to a synchronizer 73. The synchronizer synchronizes on the signal, descrambles it, and forwards it to the SONET overhead terminator circuit 74 as a 19.44 MHz eight-bit-wide parallel data stream. SONET overhead terminator 74 performs Section, Line and Path termination for the whole STS-3 signal, including alarms monitoring, performance monitoring (PM), DCC and OW recovery and APS handling, and also performs pointer processing for each STS-1 SPE within the STS-3 to adjust the frequency to the internal frequency and frame pulse. The data along with its parity bit, clock, and frame pulse is forwarded to the STS Mux cards through two eight-bit parallel busses 76. The DCC and OW are forwarded to the SOP and AOW cards 63 and 65, respectively.

In the transmit direction, eight bits parallel data, along with its parity bit, clock, and frame pulse are received from the STSM card 51 through the active one of busses 77. The data are forwarded through a path AIS selector 78 to SONET Overhead terminator 74, which adds the Section and Line overheads for the whole STS-3 based on the serial stream from the SOP and AOW cards. Path -Overhead can be added by the SONET Overhead Terminator, or passed transparently from the parallel input. Selector 79 chooses between transmit transport overhead serial access port data signals from the SOP cards, ATSADI and BTSADI, and delivers the selected signal to overhead terminator 74 to control the access functions. Alarms are added by selector 78 based on the receive status for non-ring operations, on the other OC-3 card receive status for ring operations, and on the STS-1 receive status from the active STS Mux card in ring operation. The data are then forwarded to synchronizer 73 that scrambles it and converts it into an ECL STS-3 serial stream. An electrical-to-optical interface 80 converts the serial stream electrical signal into an optical signal and transmits it to the optical fiber 70 with a laser.

Section path monitoring (PM) in a control section 81 is based on the B1 byte that indicates BIP-8 (byte interleaved parity) errors. BIP-8 errors are accumulated as raw counts for the current and last fifteen minutes. The parameters specified in T1M1.3/92-0051 are computed and accumulated for the current and last fifteen minute intervals. Laser transmit power and bias current for the optical fiber transmitter are also monitored. In addition, LOS (Loss of Signal) and LOF (Loss of Frame) alarms are monitored. If LOS or LOF are detected, AIS is indicated through E1, and VT AIS is sent in the receive direction. The E1 bit is defined in the SONET standard TR-TSY-253.

The Section DCC and OW codes are stripped in the receive direction and forwarded to the SOP and AOW cards with the whole transport overhead as a serial stream of 81 bytes. Two identical streams are produced for redundancy. The DCC and OW are received in the same way from the SOP and AOW cards; the OC-3 card can select from two serial streams for redundancy.

Line PM is based on the B2 byte of the first STS-1 that indicates BIP-8 errors. BIP-8 and pointer adjustments are accumulated as raw counts for the current and last fifteen minutes. The parameters specified in T1M1.3/92-0051 are computed and accumulated for the current and last fifteen minute intervals. Protection switching count and duration are provided for the current and last fifteen minute intervals.

Loss of parity (LOP), Line far-end receive failure (FERF), and Line AIS alarms are monitored in a control circuit 81. If LOP or Line AIS are detected, AIS is indicated in E1, and VT AIS is forced, in the receive direction. For Line AIS, Line FERF is transmitted. Transmitted alarms are in accordance with the received status for non-ring applications, and with the other OC-3 card receive status for ring applications. DCCs and OW are conveyed in the same streams as the Section DCC and OW.

Path Performance Monitoring (PM) is based on the B3 bytes that indicates BIP-8errors and on the far-end block error (FEBE) bits. BIP-8 and FEBE errors are accumulated as raw counts for the current and last fifteen minutes. The parameters specified in T1M1.3/92-0051 are computed and accumulated for the current and last fifteen minutes intervals. FEBE is transmitted in accordance with the receiver status for non-ring applications, and with the other OC-3 card receive status for ring applications.

LOP, Path AIS and Path Yellow alarms are monitored. If LOP or Path AIS are detected STS Path Yellow is transmitted, AIS is indicated in E1, and VT Path AIS is forced, in the receive direction.

Synchronizer 73 also can provide loops for maintenance and fault isolation. In Loop Terminal mode, the received signal is replaced with the transmitted signal; the transmit signal is passed to the line. In Loopback line mode, the transmitted signal is replaced with the received signal after regeneration; the received signal continues to be fed to the equipment.

Timing selector 83 selects one of two groups of timing signals A and B from the two redundant SYNC cards 64. The SYNC cards 64 produce signals to indicate which one is producing valid timing, and this information is provided on syncfail A and syncfail B lines to selector 83 along with a timing select signal from control unit 81. On the basis of this information, the selected timing signal is provided to overhead terminator 74 as a clock for the system side. The selected timing signal is also multiplied in frequency multiplier 84 for delivery to synchronizer 73. The multiplication is necessary because the maximum frequency of the timing signal out of selector 83 (19.44 MHz) is less than that needed for synchronization at the OC-3 rate (155.5 MHz) in synchronizer 73.

1:1 and 1+1 facility protection architectures, are supported. In 1+1 architecture the transmit signal is bridged to both OC-3 cards; the default operation mode is unidirectional. In both cases, the K1 and K2 bytes are handled. The K1 and K2 bytes are defined in the SONET standards. Facility protection switch forces a OC-3 active-to-standby switch. The whole facility protection algorithm is accomplished by the OC-3 cards without network element processor intervention. The 1:1 protection switch operates as a 1+1 switch if the far end indicates 1+1 protection switch in the K2 mode indication bits.

1:1 equipment protection switch is provided. A switch to takes place if the active OC-3 card fails and the standby card is operational. The only significant difference between the active and stand-by OC-3 cards in 1+1 facility protection architecture is that the STSM cards 51 receive their information from the active OC-3 card. An arbitration result from an arbitration circuit 82 is sent to the STSM cards. On power-up OC-3 A has priority over OC-3 B to become active.

The OC-3 card 50 diagnostics are distributed between the card, the adjacent OC-3 and the STSM cards 51. The OC-3 card performs internal diagnostic tests to verify its own functionality. These tests are the hardware monitoring tests performed by the software (which includes memory and peripheral checks and synchronizer to SONET Overhead Terminator received alarms comparison), a hardware watch-dog that monitors the software sanity, laser power and bias monitors, SYNC card timing signals activity tests, and bus parity checks in busses received from STSM cards. In the case that a parity failure is detected, the OC-3 forces parity errors towards the STSM card for a preselected number of milliseconds. A failed OC-3 card continuously forces parity errors in its STSM busses.

In 1+1 facility protection architecture, both OC-3 cards receive the same signals and they compare the alarms and PM through the LAN. If any discrepancies are found, the standby OC-3 card performs terminal loopback and verifies that its detectors are operational. A switch is then performed. After the switch, the formerly active OC-3 card also performs terminal loopback and verifies its detectors to decide if the fault is in the card or in the facility. If the failure is in the facility, the OC-3 card FAIL signal is negated. The same verification is done whenever a facility switch is requested by the remote site after the facility protection is performed. If a SYNC timing signals failure is detected by the standby OC-3 card, it commences using the other SYNC card timing signals and immediately activates its FAIL signal. If the active OC-3 card detects a SYNC timing signals failure, it waits a selected number of milliseconds and then activates its FAIL signal. The SYNC timing signals fail condition is indicated to the SYNC cards through the LAN.

The active STSM card 51 continuously monitors the parity generated by the OC-3 cards. If a failure is detected, the STSM card forces parity errors back. The OC-3 card can request through the LAN from either STSM card to force a bus fail to verify the detection circuits operation. If the OC-3 detects parity or bus clock fails in an STSM bus, it forces parity errors back for a limited period and uses the other STSM as source of its transmit data. If both STSM busses fail, the OC-3 card activates its FAIL signal, and an OC-3 equipment protection switch occurs.

The NEP communicates to the OC-3 card for any STSM card removal or failure, and the OC-3 ignores the busses connected to the missing card.

The arbitration circuit is exercised by inhibiting OC-3 card switches in a STSM card through the LAN, and performing a dummy switch and switch back. The STSM cards report the switch line change.

Backplane Interfaces

The STSM busses (referred as A1 and B1) are two parallel busses running at 19.44 Mhz. The busses typically include eight bits of data, one parity bit, a bus clock, and framing pulses. The clock and framing pulses are synchronized to the internal timing.

The cards can be monitored and provisioned through two open collector LANs. One of these LANs is also used for communication between cards for equipment or facility protection. The clock for these LANs is produced by the active SYNC card 64, and is received as two RS-422 signals. Preferably only one LAN is active at a time, while the standby LAN carries short (less than 32 bytes) diagnostic messages. The OC-3 card 50 communicates with the NEP 62, the adjacent OC-3 card, the SYNC card, and the STSM cards 51. CLEI (Common Language Equipment Identification) code and revision of the card can be read through the LAN.

Timing for the STSM busses towards the STSM cards 51 is in accordance with the internal timing received by timing selection circuit 83 from the active SYNC card 64. Timing for the STSM busses from the STSM cards is embedded in the busses.

The line timing is in accordance with the East or West timing received from the active SYNC cards 64. In the system of the present invention, East and West timing can be synchronized to the internal timing. The OC-3 card transmits its received frame pulse to the SYNC cards as reference.

In the following discussion of the individual cards, it should be recognized that each card can be reset by its own watch-dog or by activating the RSTEX signal. After reset, the card is set to its default configuration. The arbitration circuit decides if the card is active or standby. When inserting a card, it is held in reset until both sense pins make contact. When removing the card, it is reset as soon as one of the sense pins is disconnected.

STS Multiplexer Card

Figure 9:
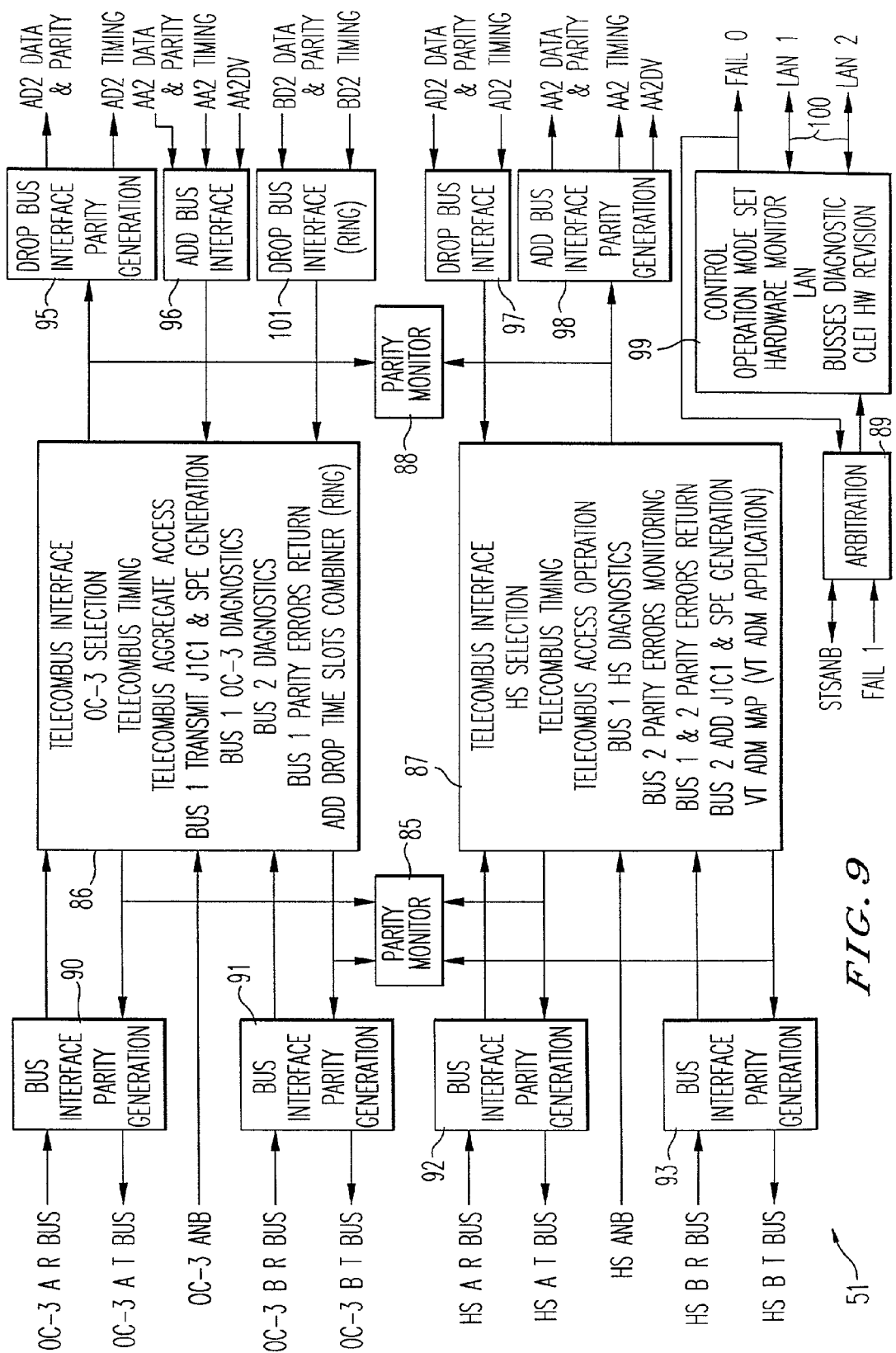
FIG. 9 is a schematic block diagram of a Synchronous Transport Signal Multiplexer (STSM) card constructed in accordance with an embodiment of the present invention and usable in the shelves of the RDT of FIG. 7.

The STSM card block diagram is shown in FIG. 9. The STS Mux card mediates between the OC-3 cards 50 and HS Extension (HSE) cards 67 and the Bus 2 that is configured similar to a TelecomBus. The TelecomBus is defined in IEEE standard P1396. The STSM cards interface with the OC-3 and HSE cards with interface circuits 86 and 87 through parallel 19.44 MHz busses B1 and B2. Each STSM card communicates with both OC-3 cards and both HSE cards. The STSM card transmits the same data to both OC-3 cards and the same data to both HSE cards to provide 1+1 facility protection. The data to be transmitted to Bus 2 is selected based on the OC-3 and HSE arbitration signals and on Bus 1 sanity. The STSM card can access Bus 2 as an Aggregate for the OC-3 cards, or as an Access for the HSE cards. Timing for Bus 2 is derived from Bus 1, and timing for Bus 1 is derived from Bus 2.

Two STSM cards provide 1:1 redundancy. Each OC-3 or HSE card selects which STSM card to use based on Bus 1 sanity; QDS1/VTG cards select the STSM card to use based on the STSM arbitration signal and Bus 2 parity errors. An arbitration circuit 89 decides which STSM card is active based on fail indications from both cards.

In the feeder-to-channel direction, data is received from the OC-3 card by bus interface circuits 90 and 91 along with its parity, clock, J1C1and SPE indicators. Parity monitor circuit 85 on the card checks the parity, produces new parity, and forwards the whole stream to Drop A Bus 2 for STSM card A, and to Drop B Bus 2 for STSM card B through drop bus interface circuits 95, 96, 97 and 98.

In the other direction, data is read from Add A Bus 2 for STSM card A, and from Add B Bus 2 for STSM card B, along with its parity and J1C1V1 and SPE indicators through circuits 95–98 using the corresponding Drop Bus 2 clock. The card checks the parity in monitor circuit 88, produce new parity, and forwards the whole stream to both OC-3 cards.

In the high speed extension-to-channel direction, the data are received through interface circuits 92 and 93 from the HSE card along with its parity, clock, J1C1 and SPE indicators. The card checks the parity, generates parity, J1C1 and SPE signals that comply with a STS-3 signal by adding dummy STS-1s synchronized with the OC-3 Bus 1 clock if necessary, and forwards the data, parity, and generated J1C1V1 and SPE signals to the Add A bus 2 for STSM card A, and Add B bus 2 for STSM card B through interface circuit 98. J1C1 and SPE signal are generated even if no HS Extensions are used.

In the channel-to-HS extension direction, data are read by interface circuits 95–98 from Drop A Bus 2 for STSM card A and from Drop B Bus 2 for STSM card B, along with its parity, clock, and J1C1 and SPE signals. The card checks the parity, produces new parity, and forwards the whole stream to both HSE cards.

Backplane Interfaces

The STSM busses referred to as A1 and B1 for the OC-3 cards, and as C1 and D1 for the HSE cards, are two parallel busses running at 19.44 MHz. The busses typically include eight bits of data, one parity bit, a bus clock, and framing pulses. The clock and framing pulses are synchronized to the internal timing.

The feeder busses (referred as bus A2 and B2) are two TelecomBusses running at 19.44 MHz. The STSM cards access this bus as aggregates for the OC-3 data and as access for the HSE data. Timing for the Add bus can be in accordance with the Drop or Add bus on an STS-1 basis. The card includes BTL interfaces, i.e., interfaces using the commercial logic family known as BTL, to access this bus.

The cards can be monitored and provisioned through two open collector LANs 100. These LANs are also used for communication between cards for equipment protection. The clock for these LANs is produced by-the active SYNC card 64 and is received as two RS-422 signals. Preferably only one LAN is active at a time, while the standby LAN carries short (less than 32 bytes) diagnostic messages.

Timing is taken from the busses except for add-drop multiplex applications. Bus 1 receive timing is embedded in the receive bus. The STSM card uses the clock and frame pulse transmitted by the OC-3 card to produce the timing for the Drop Bus 2 and for Add Bus 2 . J1C1 and SPE signals for Drop Bus 2 are in accordance with these signals in Bus 1 from OC-3 ; and J1C1 and SPE for the Add Bus 2 are produced by the STSM card by combining the J1C1 and SPE from the OC-3 card with the same signals from the HSE card. If no active HSE card is inserted, the J1C1 and SPE signals for Add Bus 2 are in accordance with the signals from OC-3 card.

Bus 1 transmit timing is in accordance with Add Bus 2 for non-ring operation. For ring operation, the STSM card combines the J1C1 and SPE signals from the Received Drop and Add Bus 2 signals, depending on the presence of High Speed Extensions.

ODS1/VTG Card

Figure 10:
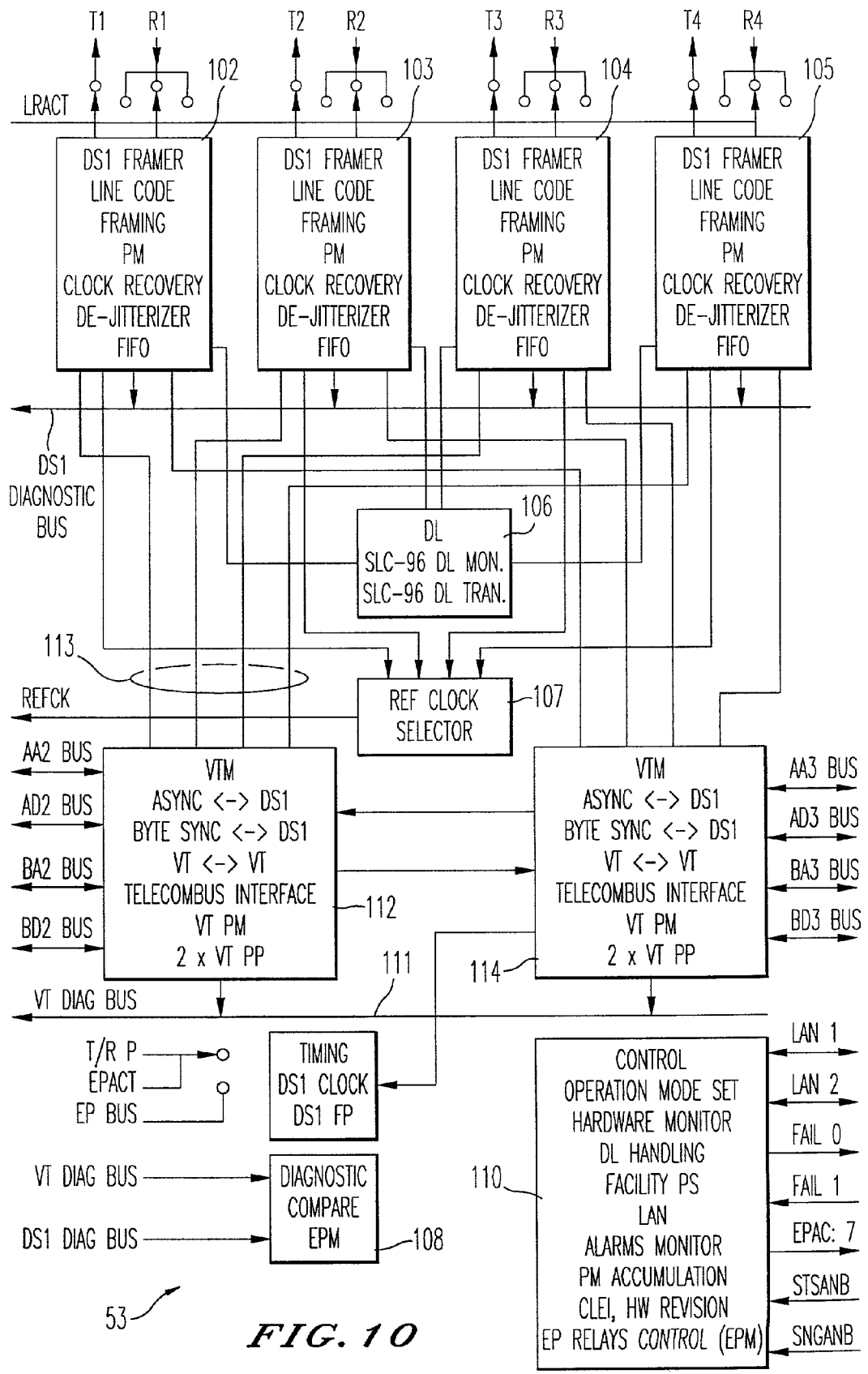
FIG. 10 is, a schematic block diagram of a virtual tributary group/quad DS-1 (VTG/QDS1) card constructed in accordance with an embodiment of the present invention and usable in the shelves of the RDT of FIG. 7.

The QDS1/VTG card 53 block diagram is shown in FIG. 10. This card can operate in three different modes: as a DS1 feeder, as a DS1 extension, or as a VT interface. When operating as a feeder or an extension, the QDS1/VTG card maps (or demaps) DS1 to (or from) asynchronous or byte-synchronous VT1.5s with line interface circuits 102, 103, 104 and 105. When operating as a VT interface, these circuits fix the VT pointers for up to four byte-synchronous VT1.5s by using slip buffers, or they perform pointer processing for up to four asynchronous VT1.5s to justify their frequency to the internal or line frequency using a reference clock selector 107. The VT mode is selectable on a "per VT" basis.

Equipment protection of 1:7 is provided. The QDS1/VTG card inserted in a first position is the Equipment Protection Module and is referred as the EPM. In that card, an EPM circuit 108 monitors the functionality of the other seven cards through a DS1 or VT diagnostics bus and activates equipment protection relays if equipment protection is needed. No NEP intervention is required.

Facility protection of 1:4 and 1:27 is provided in accordance with TR-TSY-8 and TR-TSY-303. Facility protection is achieved by using the flexibility of the parallel Bus 3 and the communication LAN. No NEP intervention is required.

The DS1s connected to the cards may use AMI or B8ZS line codes, and SF, ESF, or SLC-96 framing format. Performance monitoring parameters are accumulated for two fifteen minute intervals. Performance Monitoring Reports and Bit Oriented messages are produced and received in accordance with ANSI.T1-403.

SLC-96 data link concentration data is debounced and forwarded to the NEP 62. The NEP can request transmission of data through the data link. The cards communicate through a control module 110 with the STSM and SCP cards through Bus 2.

Parity is monitored in all busses, and active bus selection is based on arbitration signals from the STSM cards (ST-SANB) and the SCP cards (SNGANB).

Seven different configurations of the VT1.5 and DS1 signal flow are described in the following. FIGS. 11A through 11F are provided to indicate the general direction of data/signal flow through card 53 and these will be referred to in each of the configurations.

1. For use of the DS1 as an extension, it is mapped as a DS1 to VT float Async feeder. On the DS1 receive side, FIG. 11A, the Line Interface 102–105 receives the data stream received at one of R1–R4, performs line code decoding, clock recovery and data dejitterization, and forwards the 1.544 MHz stream to the VT mapper in circuit 112 on lines 113 connected to Add Bus 2 (AA2 or BA2 BUS). The VT mapper maps the 1.544 MHz stream into a asynchronous VT1.5 by calculating the C stuff bits needed to adjust the received frequency to the Add Bus 2 frequency. VT Pointers are fixed, so no VT pointer processing is performed.

DS1 Loss and AIS alarms are monitored, and bipolar violations are accumulated, in control circuit 110. If DS1 Loss is declared, the 1.544 MHz data stream is replaced by an all "ones" stream. If VT-Path AIS or LOP is declared, a VT-Path Yellow code is transmitted.

On the DS1 Transmit Side, FIG. 11B, the VT mapper 112 reads the VT from Drop Bus 2 (AD2 or BD2 BUS), recovers the 1.544 MHz clock by interpreting the VT pointers and C bits, dejitterizes the clock and data, and forwards the 1.544 MHz stream with its clock to a Line Interface, one of 102–105. The Line Interface converts the data stream into a bipolar AMI or B8ZS signal and transmits it to the line on T1–T4. VT LOP, Path AIS and Path Yellow alarms are monitored in circuit 110, and BIP-2 errors and FEBE bits are accumulated. If LOP or Path AIS are declared, DS1 AIS signals replace the 1.544 MHz stream.

2. For use of the DS1 as an extension mapped as a DS1 to VT float sync feeder, on the DS1 receive side, FIG. 11A, the Line Interface 102–105 performs line code decoding, clock recovery and data dejitterization, and forwards the 1.544 MHz stream to the framer. The framer performs frame synchronization and forwards the data stream along with a signaling stream and a data link stream to the VT mapper 112 connected to Add Bus 2 (AA2 or BA2). The VT mapper maps the data, signaling and data link streams into a byte-synchronous VT1.5 by performing VT pointer processing to adjust the received frequency to the Add Bus 2 frequency.

DS1 Loss, RED alarm, AIS, Yellow alarms are monitored, and bipolar violations, CRC-6 when in ESF, framing errors and Out Of Frames are accumulated for local, and remote if available. If DS1 Loss, or Out Of Frame is declared, VT-Path AIS is transmitted; and if Yellow is declared, VT-Path Yellow is transmitted. If VT-Path AIS or LOP is declared, VT-Path Yellow is transmitted. Data link is passed to the feeder.

On the transmit side, FIG. 11B, the VT mapper reads the VT from Drop Bus 2, recovers the 1.544 MHz clock by interpreting the VT pointers, dejitterizes the clock and data, and forwards the data stream along with its clock, a signaling stream, and a data link stream to the framer in the Line Interface. The framer combines the data with the signaling and data link streams, and produces a DS1 frame. The Line Interface 102–105 converts the data stream into a bipolar AMI or B8ZS signal and transmits it to the line T1–T4.

VT LOP, Path AIS and Path Yellow alarms are monitored, and BIP-2 errors and FEBE bits are accumulated. If LOP or is; Path AIS are declared, DS1 AIS is transmitted; and if VT-Path Yellow is declared, DS1 Yellow is transmitted. If DS1 RED, LOS or AIS is declared, DS1 Yellow is transmitted. The data link is passed from the feeder.

3. For use of the DS1 as a feeder mapped to VT float asynch channel, on the DS1 Receive Side, FIG. 11C, the Line Interface performs line code decoding, clock recovery, and data dejitterization, and forwards the 1.544 MHz stream to the VT mapper in circuit 114 connected to Add Bus 3 (AA3 or BA3 BUS). The VT mapper maps the 1.544 MHz stream into a asynchronous VT1.5 by calculating the C stuff bits needed to adjust the received frequency to the Add Bus 3 frequency. VT Pointers are fixed, so no VT pointer processing is performed. This is used where a complete DS1 is transported to a channel unit such as, for example, a primary rate ISDN or DS1 extension at a remote channel shelf location.

DS1 Loss and AIS alarms are monitored, and bipolar violations are accumulated. If DS1 Loss is declared, the 1.544 MHz data stream is replaced by an all-ones stream. If VT-Path AIS or LOP is declared, VT-Path Yellow is transmitted. No data link is handled in this mode.

On the DS1 Transmit Side, FIG. 11D, the VT mapper reads the VT from Drop Bus 3(AD3 or BD3 BUS), recovers the 1.544 MHz clock by interpreting the VT pointers and C bits, dejitterizes the clock and data, and forwards the 1.544 MHz stream with its clock to the Line Interface. The Line Interface converts the data stream into a bipolar AMI or B8ZS signal and transmits it to the line.

VT LOP, Path AIS, and Path Yellow alarms are monitored, and BIP-2 errors and FEBE bits are accumulated. If LOP or Path AIS are declared, DS1 AIS signals replaces the 1.544 MHz stream. No data link is generated in this mode.

4. For use as a DS1 feeder for DS0 channelized application, mapped to VT Locked Byte Sync Channel, on the DS1 Receive Side, FIG. 11C, the Line Interface 102–105 performs line code decoding, clock recovery, and data dejitterization, and forwards the 1.544 MHz stream to the framer. The framer performs frame synchronization, adjusts the frequency to the internal frequency using a slip buffer, and forwards the data stream along with a signaling stream to the VT mapper connected to Add Bus 3. The VT mapper maps the data and signaling streams into a byte-synchronous VT1.5.The byte-synchronous VT has fixed pointers because the DS1 frequency, after the slip buffer, is locked to the internal frequency. This is the normal mode for a DS1 loop carrier feeder.

DS1 Loss, RED alarms, AIS and Yellow alarms are monitored, and bipolar violations, CRC-6 when in ESF, framing errors and Out Of Frames are accumulated for local, and remote if available. If DS1 Loss or Out Of Frame is declared, VT-path AIS is transmitted; and if Yellow is declared, VT-Path Yellow is transmitted. If VT-Path AIS or LOP is declared, VT-Path Yellow is transmitted.

The framer monitors the ESF data link in ESF mode in accordance with ANSI.T1-403. In SLC-96 mode, the framer forwards the data link to the DL block that accumulates the SLC-96 data link for the controller.

On the DS1 Transmit Side, FIG. 11D, the VT mapper reads the VT from Drop Bus 3 (AD3 or BD3), recovers the 1.544 MHz clock by interpreting the VT pointers, dejitterizes the clock and data, and forwards the data stream along with its clock and a signaling stream to the framer. The framer combines the data with the signaling streams and produces a DS1 frame. The Line Interface converts the data stream into a bipolar AMI or B8ZS signal and transmits it to the line T1–T4.

VT LOP, Path AIS and Path Yellow alarms are monitored, VC and BIP-2 errors and FEBE bits are accumulated. If LOP or Path AIS are declared, DS1 AIS is transmitted; and if VT-Path Yellow is declared, DS1 Yellow is transmitted. If DS1 RED, LOS or AIS is declared, DS1 Yellow is transmitted.

The framer produces the ESF data link, when in ESF mode, in accordance with ANSI.T1-403. In SLC-96 mode, the framer receives the data link from the DL block 106 that converts the parallel data from the controller into a SLC-96 data link frame.

5. For use as a SONET-fed VT for DS0 channelized applications, mapping VT Float Asynch to VT Locked Byte Sync, Feeder to Channel Side, FIG. 11E, the VT mapper reads the VT from Drop Bus 2, recovers the 1.544 MHz clock by interpreting the VT pointers and C bits, dejitterizes the clock and data, and forwards the 1.544 MHz stream with its clock to the DS1 receive input of the framer. The framer performs frame synchronization, adjusts the frequency to the internal frequency using a slip buffer, and forwards the data stream along with a signaling stream to the VT mapper connected to Add Bus 3. The VT mapper maps the data and signaling streams into a byte-synchronous VT1.5. The byte-synchronous VT has fixed pointers because the DS1 frequency, after the slip buffer, is locked to the internal frequency.

VT LOP, Path AIS and Path Yellow alarms are monitored, and BIP-2 errors and FEBE bits are accumulated. VT alarms are passed from the feeder side to the channel side.

The framer monitors the ESF data link in ESF mode in accordance with ANSI. T1-403. In SLC-96 mode, the framer forwards the data link to the DL block that accumulates the SLC-96 data link for the controller.

On the Channel to Feeder Side, FIG. 11F, the VT mapper reads the VT from Drop Bus 3, recovers the 1.544 MHz clock by interpreting the VT pointers, dejitterizes the clock and data, and forwards the data stream along with its clock and a signaling stream to the framer. The framer combines the data with the signaling streams and produces a DS1 frame. The DS1 along with its clock is fed to the VT mapper connected to Add bus 2. The VT mapper maps the 1.544 MHz stream into an asynchronous VT1.5 by calculating the C stuff bits needed to adjust the received frequency to the Add Bus 2 frequency. Since VT pointers are fixed, no VT pointer processing is performed.

VT LOP, Path AIS and Path Yellow alarms are monitored, and BIP-2 errors and FEBE bits are accumulated. VT alarms are passed from the channel side to the feeder side.

The framer produces the ESF data link, when in ESF mode, in accordance with ANSI. T1-403. In SLC-96 mode, the framer receives the data link from the DL block 106, which converts the parallel data from the controller into a SLC-96 data link frame.

6. For use on SONET feeder in DS0 channelized applications, mapping VT Float Byte Sync to VT Locked Byte Sync, on the Feeder to Channel Side, FIG. 11E, the VT mapper reads the VT from Drop Bus 2, recovers the 1.544 MHz clock by interpreting the VT pointers and C bits, dejitterizes the clock and data, and forwards the 1.544 MHz stream with its clock to the DS1 receive input of the framer. The framer performs frame synchronization, adjusts the frequency to the internal frequency using a slip buffer, and forwards the data stream along with a signaling stream to the VT mapper in circuit 114 connected to Add Bus 3 (AA3 or BA3). The VT mapper maps the data and signaling streams into a byte-synchronous VT1.5. The byte-synchronous VT has fixed pointers because the DS1 frequency, after the slip buffer, is locked to the internal frequency. This is the SONET feed mode specified in TR-TSY-303.

VT LOP, Path AIS and Path Yellow alarms are monitored, and BIP-2 errors and FEBE bits are accumulated. VT alarms are passed from the feeder side to the channel side.

The framer monitors the ESF data link in ESF mode in accordance with ANSI.T1-403. In SLC-96 mode, the framer forwards the data link to the DL block that accumulates the SLC-96 data link for the controller.

On the Channel to Feeder Side, FIG. 11F, the VT mapper reads the VT from Drop Bus 3 (AD3 or BD3 BUS), recovers the 1.544 MHz clock by interpreting the VT pointers, and forwards the data stream along with its clock to the VT mapper connected to Add bus 2 (AA2 or BA2 BUS). The VT mapper maps the 1.544 MHz stream into a synchronous VT1.5 by performing VT pointer processing to adjust the VT timing to the Add Bus 2 timing.

VT LOP, Path AIS and Path Yellow alarms are monitored, and BIP-2 errors and FEBE bits are accumulated. VT alarms are passed from the channel side to the feeder side.

When in SLC-96 mode, the VT mapper connected to Add bus 2 receives the data link from the DL block.

7. For delivering SONET fed DS1s to channel units, mapping VT Float Async to VT Float Async, on the Feeder to Channel Side, FIG. 11E, the VT mapper reads the VT from Drop Bus 2, recovers the 1.544 MHz clock by interpreting the VT pointers, and forwards the data stream along with its clock to the VT mapper connected to Add bus 3. The VT mapper maps the 1.544 MHz stream into an asynchronous VT1.5 by performing VT pointer processing to adjust the VT timing to the Add Bus 3 timing.

VT LOP, Path AIS and Path Yellow alarms are monitored, and BIP-2 errors and FEBE bits are accumulated. VT alarms are passed from the feeder side to the channel side. Data link is not handled in this mode.

On the Channel to Feeder Side, FIG. 11F, the VT mapper reads the VT from Drop Bus 3, recovers the 1.544 MHz clock by interpreting the VT pointers, and forwards the data stream along with its clock to the VT mapper connected to Add bus 2. The VT mapper maps the 1.544 MHz stream into an asynchronous VT1.5 by performing VT pointer processing to adjust the VT timing to the Add Bus 2 timing.

VT LOP, Path AIS and Path Yellow alarms are monitored, and BIP-2 errors and FEBE bits are accumulated. VT alarms are passed from the channel side to the feeder side. Data link is not handled in this mode.

Loopbacks

DS1 loops are provided for maintenance and fault isolation. In Loop Terminal, the received DS1 can be replaced with the transmitted DS1; DS1 AIS is transmitted to the line. In Loopback Line, the transmitted DS1 signal is replaced with the received DS1 signal after regeneration; the received DS1 continues to be fed to the equipment. In Payload Loopback, the transmitted DS1 payload is replaced with the received DS1 payload. The received payload continues to be fed to the equipment.

Line and Payload Loopback can be requested through the ESF data link by a remote site, and the NEP can request to send a Line or Payload Loopback request through the ESF data link.

Diagnostics and Fault Isolation

The QDS1/VTG card diagnostic is distributed between the card, the EPM and the STSM and SCP cards. The QDS1/VTG card performs internal diagnostic tests to verify its own functionality. The EPM 108 periodically compares its signals with the signals produced by the rest of the QDS1/VTG cards. The STSM and SCP cards verify the parity generated by the QDS1/VTG cards on Add Busses AA2, BA2, AA3 and BA3.

The internal diagnostic tests are the hardware monitoring tests performed by the software (includes memory and peripherals checks), a hardware watch-dog that monitors the software sanity, and parity and timing checks on Drop Busses AD2, BD2, AD3 and BD3. If a bus FAIL is detected, the card forces parity errors back through the same bus.

The EPM periodically requests each card to supply through diagnostic bus 111 a DS1 signal and a corresponding VT1.5. It processes them and compares the results. A DV (data valid) signal from each bus can also be transmitted through the diagnostics bus 111 to verify the internal VT mapper counters. A DV signal qualifies a time slot used on a bus.

The STSM and SCP cards continuously monitor the parity generated by the QDS1/VTG cards, based on the DV signal. The STSM card can ask through the LAN from any QDS1/VTG card to force a bus fail to verify the detection circuit's operation.

If the internal diagnostics find a problem, the common FAIL signal is forced low by the card, and the DV signals are inhibited to avoid propagation of the fault to the adjacent STSM and SCP cards. In response to the FAIL signal, the EPM performs a fast poll to verify which QDS1/VTG card failed. It replaces the failed card by activating the equipment protection relays to connect the DS1 lines of the failed card to the equipment protection bus, and by mapping its VT1.5 into the time slots of the protected card in Bus 2 and/or 3. The same procedure of protection is followed if the EPM finds a failure in one QDS1/VTG card. Before performing the equipment protection, the EPM verifies that only one card has failed, to avoid protection, caused by EPM failures. FAIL signal is also activated when the card is removed.

If the STSM or SCP cards detect a Bus 2 or 3 failure, they indicate this condition to the EPM. If no FAIL is indicated by the QDS1/VTG cards, the EPM commences replacing QDS1/VTG cards until the failed card is isolated.

The EPM tests its parallel busses' drivers by accessing empty slots in Bus 3, and in Bus 2, if empty time slots are available. It tests its DS1 interfaces by activating the loopback relays. The NEP communicates to the QDS1/VTG cards and EPM cards for any STSM card removal or failure. The QDS1/VTG and EPM cards ignore the busses connected to the missing card. Whenever the card is being protected, its facilities are metallically looped back. The card can perform different tests to verify its functionality.

Backplane Interfaces

The feeder busses (referred as bus A2 and B2) are two busses similar to TelecomBusses running at 19.44 MHz. The QDS1/VTG cards access this bus as accesses. They read information out from the Drop busses and write information into the Add busses. Timing for the Add bus can be in accordance with the Drop or Add bus. The QDS1/VTG card includes BTL interfaces to access this bus.

The channel busses (referred as bus A3 and B3) are two Telecom-like busses running at 19.44 MHz. The QDS1/VTG cards access this bus as accesses. They read information out from the Drop busses and write information into the Add busses. Timing for the Add bus can be in accordance with the Drop or Add bus. The card includes BTL interfaces to access this bus.

The Diagnostic bus is used by the EPM to monitor the QDS1/VTG operation. All card outputs are connected together. Each card, one at a time, is requested by the EPM to drive this bus with one of its DS1s with its clock, and the correspondent VT with its clock. The Diagnostic bus is input to the EPM so the EPM can compare its data with the card under test data. The EPM can also request a card to drive the Diagnostic bus with one of its DV signals.

Timing for bus 2 and bus 3 is in accordance with the bus timing as specified for TelecomBus. Timing for the DS1s in byte-synchronous modes is produced from the active Drop Bus 3 timing, the DS1 clock is synthesized from the 19.44 MHz Drop Bus 3 and the DS1 frame pulse from the J1C1 Drop Bus 3 signal. For the channel side locked mode, the timing is such that the VT pointers are set to 78.

LAN

The QDS1/VTG cards are also monitored and provisioned through one of the two open collector LANs 100 which are also used for communication between cards for equipment or facility protection. The QDS1/VTG cards communicate with the NEP, the EPM and the SYNC cards. The EPM communicates also with the STSM and SCP cards. CLEI code and revision of the card can be read through the LAN.

SYNC Card

Figure 12:
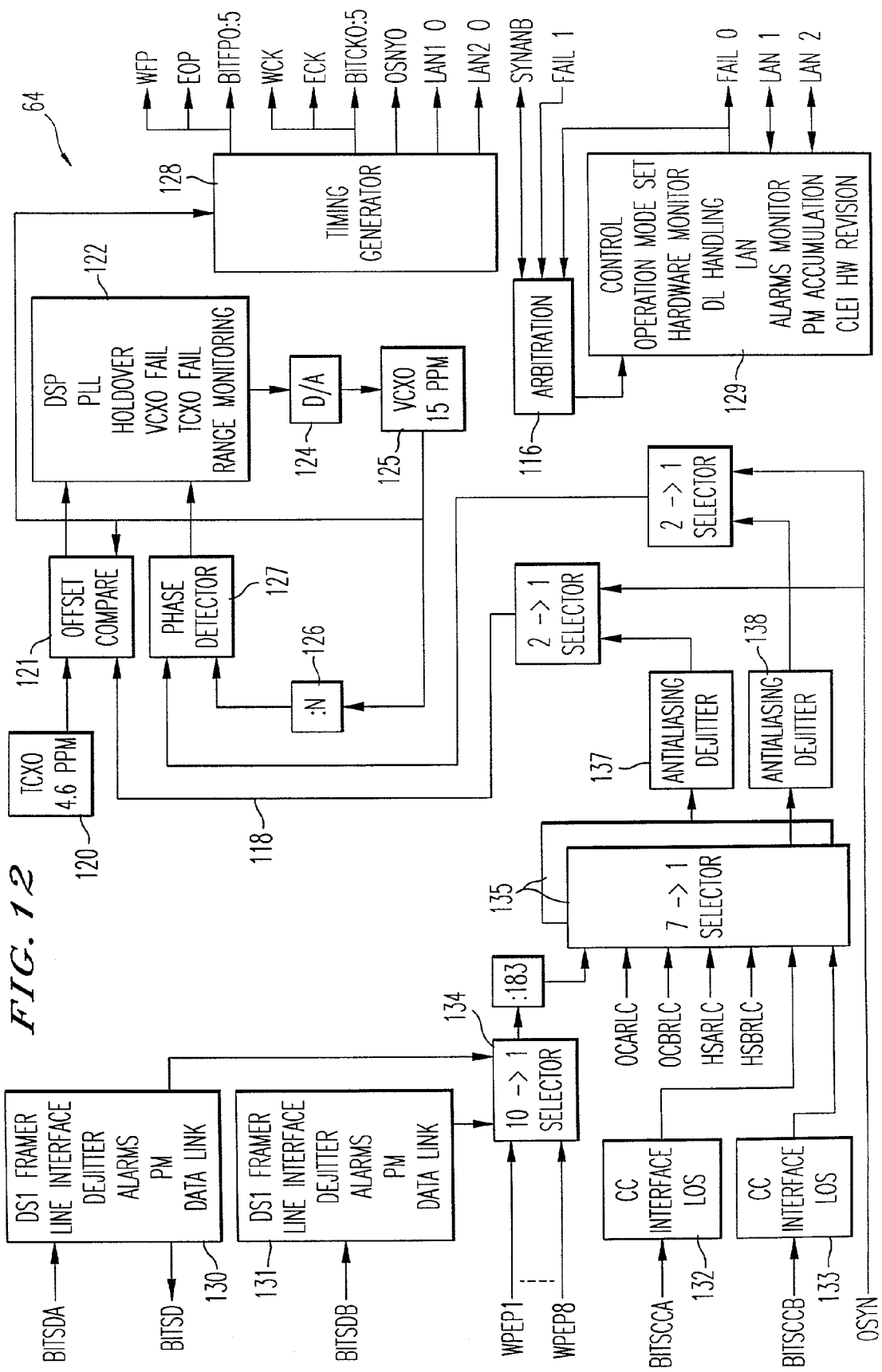
FIG. 12 is a schematic block diagram of a SYNC card constructed in accordance with an embodiment of the present invention and usable in the shelves of the RDT of FIG. 7.

A block diagram of a SYNC card 64 is shown in FIG. 12. The SYNC card provides the system timing signals for the system of the present invention. It accepts reference signals from interface cards or from external inputs, phase-locks the system timing to one of them using a phase-locked loop (PLL), and provides a DS1 BITS (Building Integrated Timing Supply) output.

Two reference signals can be selected as sources for the internal timing. One operates as primary and is the source as long as it is operating properly, and the second one operates as secondary and becomes the timing source whenever the primary source fails. If both sources fail, the SYNC card is able to provide an internal source (holdover) that complies with Stratum 3 requirements. The switch is revertive; once a higher reference becomes active, it is used as input to the PLL.

Two SYNC cards can be inserted into the system of the present invention to provide 1:1 redundancy. Each card that receives timing is capable of selecting between the two SYNC card inputs, based on the result of arbitration between the SYNC cards and on diagnostic tests. An arbitration circuit 116 decides which SYNC card is active based on fail indications from both cards. The standby SYNC card locks its phase to the active one to provide minimum phase difference between the cards.

The PLL uses a Digital Signal Processor (DSP) 122 to achieve the SONET requirements, including holdover. To meet the holdover requirements, an operating frequency on line 118 is compared with the frequency of a temperature-controlled crystal oscillator (TCXO) 120 in a comparison circuit 121 and the result is stored by DSP circuit 122. This stored result is used to keep the frequency in case both primary and secondary sources fail. The PLL includes a feedback circuit having a digital-to-analog converter 124 which supplies a frequency-dependent voltage to a voltage controlled crystal oscillator (VXCO) 125. The output of VXCO 125 is divided by an integer in a divider 126, and the result is compared with the input OSYN. The VXCO output is also supplied to a timing generator 128. The SYNC cards produce the LAN clocks LAN1 O and LAN2 O from timing generator 128.

External DS1 synchronization signal interfaces 130 and 131 on the SYNC card accept two DS1s BITSDA and BITSDB through selector 134. Composite clock (CC) interfaces 132 and 133 accept BITSCCA and BITSCCB from the BITS and produces one DS1 output BITSD. CC select-ion is made by a selector 135. Reference clock is recovered from the DS1 or CC, divided down to 8 Khz, and dejitterized in circuits 137 or 138 prior to being fed to the PLL.

The DS1 signals can use AMI or B8ZS line code and SF or ESF framing format. They are monitored in control circuit 129 for LOS, RED alarm and AIS alarms and for BER (bit error rate) of more than a defined threshold. BER can be calculated based on BPVs (Bipolar Violations), framing errors, or CRC-6 when in ESF mode. In ESF mode, the Bit Oriented Line and Payload Loopback requests and Clock Traceability messages are monitored. The DS1 output payload is all "ones". The CC signals are monitored for LOS and bipolar density violations.

The QS1/VTG cards each send one of its recovered DS1 clocks OCARLC and OCBRLC to the SYNC card 64 as WPEP1 through WPEP8. FAIL signals on the DS1 being used to produce the reference clock are communicated by the QDS1/VTG to the SYNC card. If the QDS1/VTG card fails, the NEP communicates this event to the SYNC card. Clock Traceability messages received on the reference sources are also reported to the SYNC card. The reference clocks received from the QDS1/VTG cards are routinely connected to an activity monitoring circuit.

Each OC-3 card 50 or HS Extension (HSE) card 51 sends recovered clock to the SYNC card 64 as OCxRLC and HSxRLC (x=A or B) through selectors 135. FAIL signals on the OC-3 or HSE cards are communicated by the OC-3 or HSE card to the SYNC card. If the OC-3 or HSE card fails, the NEP communicates this event to the SYNC card.

Diagnostics and Fault Isolation

The SYNC card diagnostic is distributed between the card, the adjacent SYNC, and the cards that receive timing inputs from the SYNC card. The SYNC card performs internal diagnostic tests to verify its own functionality. These tests include the hardware monitoring tests performed by control circuit 129, the software that includes memory and peripheral checks, a hardware watch-dog that monitors the software sanity, and a hardware watch-dog that monitors the DSP software sanity, VCXO and TCXO frequency, and references functionality.

Both SYNC cards receive the same references, monitor them and compare the results through the LAN. If one card has activity failures that the other one has not and the reference circuit activity detector is operational, or if one of the cards that receives timing inputs from the SYNC card indicates that one of the SYNC cards' signals failed, the SYNC card assumes that it failed and a switch is performed.

If the active card is not able to synchronize its PLL to the primary or secondary references, the standby card tries to synchronize to them. If it succeeds, the active card is declared failed and a switch is performed. The active SYNC card monitors the standby SYNC card frequency accuracy and the standby SYNC card monitors the active SYNC frequency accuracy. If the frequency is out of the accuracy range, the cards decide to switch or not based on the reference frequency and the VCXO and TCXO status. Arbitration circuit 116 is exercised by sending an inhibit switch command to all cards that use reference timing from the SYNC cards and by performing a dummy switch and switch back.

Timing is synchronized to the highest priority selected reference from among internal clock, internal frame pulse, and LAN clocks. The internal clock is distributed as a 19.44 MHz signal with a different driver for each OC-3, HSE and SCP card. The internal frame pulse is distributed as a 51.44 ns single pulse every 125 us with a different driver for each OC-3, HSE, and SCP card.

SONET Overhead Processor Card

Figure 13:
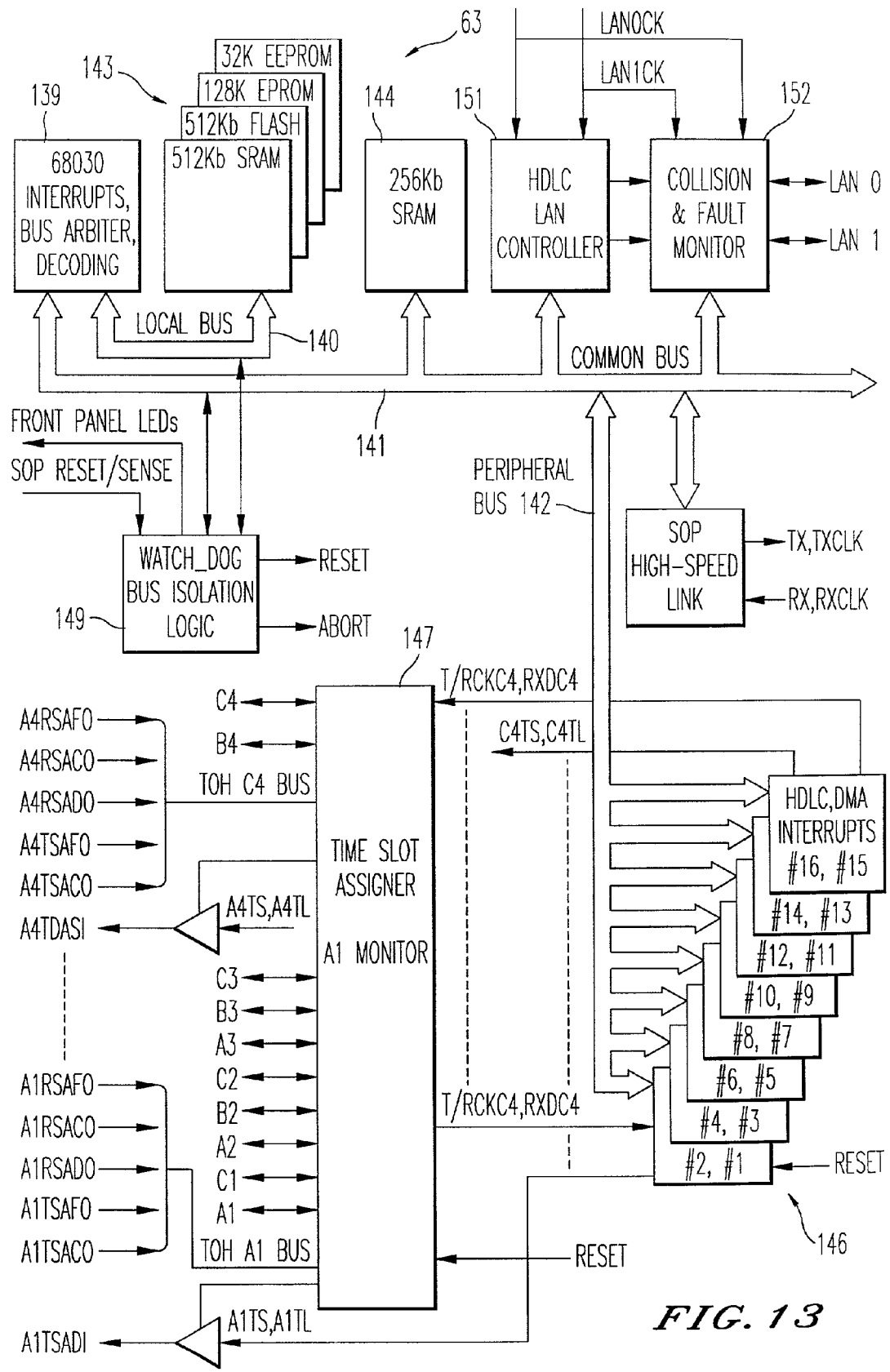
FIG. 13 is a schematic block diagram of a SONET overhead processor (SOP) card constructed in accordance with an embodiment of the present invention and usable in the shelves of the RDT of FIG. 7.

The SONET Overhead Processor (SOP) board is a full-sized board in the common shelf in a system of the present invention. A functional block diagram of the SOP card is shown in FIG. 13. The card provides termination of the SONET datacomm channels and extraction of the messages in them that are destined for use in the common chassis in which it is located. It also provides for re-routing of messages to SONET paths that continue the SONET DCC to other equipment. The SOP architecture supports interfaces to the equipment using TL-1, CMISE and FTAM transactions.

Functionally, the SOP card 63 provides an interface to the full duplex SONET data communication channel (DCC) streams from the four possible SONET interface cards (redundant OC-3 Feed and redundant OC-3 HS Extension). Each SONET OC-3 card 50 requires interface to the Section and Line DCCs. The DCC processing for physical, data link, and network layers are the same for both Section and Line DCCs. The SOP card participates in implementation of the Section EOC path protection switching and other-physical layer requirements as specified in TR-253. The physical interface to the OC-3/STSM cards to transmit and receive from the DCCs can be via dedicated links or via the 155 MB/s bus.

The SOP card uses the redundant internal LAN for communication of messages to and from the SONET DCCs and the NEP card 62 which contains the upper layers of the ISO stack. The message packets are carried in ICN (Internal Communications Network) message envelopes, and delivered to the Level 4 processing modules on the NEP. ICN protocols ensure proper transfer of packets between the boards.

Structurally, the main processor unit 139 of the SOP card carries a MC68EC030 microprocessor running at 25 MHz which is the main processor on the card. The 68030 microprocessor has on-chip instruction and data caches. The SOP card prevents the microprocessor from caching accesses to any device other than local memory by activating a cache inhibit signal during the accesses.

The SOP card includes a data bus structure arranged to accommodate 8-bit, 16-bit and 32-bit ports that reside on the card. Address and data busses are split into a Local Bus 140, accessible preferably only by the 68030 microprocessor, a Common Bus 141 which is shared by the microprocessor as well as by Integrated Multi-protocol Processors (IMPs), and a Peripheral Bus 142 which is accessible preferably only by the IMPs.

Local memory on the card, indicated generally at 143, is divided into four groups, the sizes given being typical:
(a) 0.5 Mbytes fast SRAM which contains the SOP card program and variables. The program is down-loaded from the Flash PROM in order to decrease instruction fetch cycle time.
(b) 0.5 Mbytes of Flash PROM which stores the SOP card application program and various debug and maintenance programs. The SOP supports on-board programming of the EPROM while the board is inserted in the common shelf.
(c) 256 K bytes of boot EPROM which stores the RESET interrupt vector-and boot program. This device is an 8-bit port and requires 4 access cycles for each long word fetch.
(d) 32 K bytes of EEPROM which stores configuration information and error logging data. The EEPROM group is an 8-bit port.

A shared memory 144 is mainly used as a buffer pool of high-level data link control (HDLC) frames. The IMPs and the main 68030 microprocessor access this memory in order to read and write incoming and outgoing frames. Since this memory resides outside the local memory, accesses to this space do not interfere with the operation of the unit 139. The size of this memory is typically 256 K bytes and it is configured as a 16-bit port.

The microprocessor in unit 139 can be interrupted by a number of sources. All interrupt sources (except the ABORT interrupt) are software enabled/disabled. A 68302 microprocessor in unit 139, which handles the LAN communication for the 68030 microprocessor, also serves as the interrupt handler device, and resides on local bus 140 and decodes address bus and function codes to determine when an interrupt cycle is in progress. When the interrupt handler detects an interrupt acknowledge cycle at the level it is interrupting on, it passes a status/identification vector.

A multiport arbiter controls and synchronizes the access to shared memory 144. Since this memory may be accessed by either the 68030 microprocessor, its attached IMP or one of the peripheral IMPs, each device that requires an access to the shared memory becomes the common bus master. The arbiter accepts the requests and grants the bus to one of the requesters. The peripheral devices have priority over the 68030 microprocessor.

A peripheral arbiter in processor unit 139 controls and synchronizes access to the peripheral bus (68302 bus). This bus is shared by six 68302 devices, so each device that requires an access to the peripheral bus (or the common bus) must first become the peripheral bus master. It issues a bus-request to the peripheral arbiter. The arbiter accepts all the requests and grants the bus to one of the requesters, according to a pre-assigned priority. The priority assignment is as follows:
SONET DCC Controllers (5×68302)
SOP-SOP link+1×Line DCC (68302)
The peripheral arbiter also enables the 68030 microprocessor to access the peripheral bus in order to control the various devices on this bus. It generates the appropriate addressing in order to access one of the six communication controllers.

A local bus decoder in unit 139 decodes the 68030 microprocessor address and control bus, selects the local memory group and devices to be accessed and issues a Common Bus/Peripheral Bus requests. It also generates the appropriate Data Size Acknowledge (DSACK0/1) signals which indicate the port size (8/16/32 bits).

The common bus decoder decodes the address and control lines fed from either the local or peripheral bus and selects the appropriate memory devices to be accessed. It also generates the appropriate Data-Size-Acknowledge (DSACK0/1) signals which indicate the port size (16/32 bits).

The SOP card 63 uses the redundant internal LAN for communication of messages to and from the Sonet DCCs and the KEP card 62 which contains the upper layers of the OSI (open system interconnect) stack. The message packets are carried in ICN message envelopes, and delivered to the level 4 processing modules on the NEP. The LAN also carries control messages destined for the SOP card. The active LAN channel operates at a rate of 3.088 Mhz. The stand-by channel operates at a rate of 193 Khz. The NEP is the master of the LANs. The LAN clock is produced by the SYNC card. The LAN data physical interface 151 is implemented by push-pull transistors, current sink detectors, a PAL 152 that handles collisions, and the SCC 1 and 2 of the 68302 microprocessor which is the slave of the 68030 microprocessor. The LAN drivers can be disabled by either a software command or during a critical hardware failure. The collision logic waits for IDLE condition (8 consecutive ones). Once IDLE is detected, the controller starts to transmit the packet. If a collision occurs, the collision logic determines whether to continue or to abort the transmission and relinquish bus access until the bus becomes IDLE again. Any collision event can be reported to the microprocessor. The microprocessor also performs LAN fault monitoring and support fault isolation under the control of the NEP. The diagnostics and fault isolation of the LAN is performed by the NEP. The SOP card communicates with the NEP for provisioning, status reports, fault isolation and software download.

HDLC controllers 146 are based on 68302 devices and handle the DCC bit stream fed from the Time-Slot Assigner 147. Each of the 16 channels is handled by a dedicated. HDLC controller with an attached DMA controller. The DMA controller stores all HDLC frames in the shared memory, in a cyclic buffer, and interrupts the microprocessor upon each frame received. Since the receive and transmit buffers are separate, the receive and transmit processes are not synchronized to each others In the receive direction (down-stream), each controller receives a gaped clock along with its corresponding data as fed from the TSA assigner and processes the data in synchronization with the clock. In the transmit direction (upstream), the controller transmits data in synchronization with the transmit clock fed from the TSA assigner. Any pair of controllers that handle the section and line DCC from a single TOH bus are capable of processing any combination of 12 bytes, an average throughput of 768 K bps (192 K+576 K) for each TOH channel.

The Time Slot Assignment for each channel is set by the microprocessor by loading the TSA-RAM with the appropriate pattern, as part of the SOP card initialization process. Out of the 12 TOH busses, preferably only 8 may be concurrently active (one or two active busses for each slot). Thus, the setup also determines which TOH busses are active. As long as the TSA-RAM is not initialized, and the SOP card has not been activated by the NEP, the SOP card prevents any access to any of the TOH busses by tri-stating all the transmit (upstream) buffers. The transmit buffers are automatically disabled upon a RESET assertion. Once the TSA-RAM is programmed, and the SOP card is activated by the NEP, the Time Slot Assigner enters the active state: for each channel, the TSA synchronizes itself on the TOH frame signal and feeds each HDLC controller with the selected DCC octets. Thus, the HDLC controller virtually accepts a continuous bit stream and is not aware of the time slotting. Since each transport overhead port contains two logical channels (section and line), each pair of Section+Line Data Channels are multiplexed into the same physical TOH serial data bus, and de-multiplexed into two HDLC controllers in the receive (downstream) direction. The TSA also determines which SOP card drives the Section DCC and which SOP card drives the-Line DCC, according to the SOP ID and/or NEP setup. When a switch between the active and the redundant OC-3 busses is required, the TSA is programmed to perform the switch operation. The TSA waits for the last bit of the frame before it actually perform the switching. This ensures no loss of data when a periodic bus test is performed. The TSA memory can be accessed by either the microprocessor or the TSA assigner. The TSA RAM contains the Time Slot Assignment of each byte within the transport overhead block, for all the 12 channels. The TSA RAM is double buffered. Thus, its operation is not disturbed by audits, channel updates and such while routing live channels.

The SOP card's EEPROM contains the CLE1 and related information (manufacturing data such as serial number, date of manufacturing etc.). The CLE1 can be read by the NEP through the LAN. The SOP card is able to determine its ID from a back plane strap.

A reset/watchdog and bus isolation circuit 149 enables the SOP card to monitor its bus state and prevent bus hang-ups, while accessing to an illegal address space, trying to write into the EPROM or indefinitely waiting for a Data-Acknowledgement from a faulty peripheral. The watch-dog circuit force the microprocessor to release the bus and enables the processor to detect the fault source. In cases where the microprocessor is unable to operate properly due to a critical failure, the circuit logic forces the SOP card to tristate all the busses, thus preventing the faulty SOP card from impairing other modules that are bussed to the same bus. However, the SOP card continues to listen to the LAN and respond to special instructions. The front panel Amber and green LEDs are also driven by this circuit. Any fault or a RESET state turns on the Amber LED, while normal operation is indicated by a Green LED. The reset/watch-dog circuit is triggered once every 250 msec by performing a high to low transition in the WD signal. Failure to re-trigger the device causes an SOP card reset, activate the FAIL signal and disable the LAN drivers. The card present indication is also activated only if the card is fully inserted. The card present indication is a 10 K ohm, ±5% pull-down resistor.

The SOP card can be reset by the NEP by activating Present/Reset. The card is reset within 25 msec. Activating the external reset signal turns on the FAIL LED. The SOP card provides the SONET DCC data link layer and network layer processing for the EOC. The Link layer uses CCITT Q921 LAP-D protocol. The Network layer specified protocol is CLNP (ISO 8473/AD3).

The SOP card handles, typically, eight independent transport overhead blocks which are fed from either the OC-3 card (one for each OC-3) or the HS EXT card (three for each HS) through the TOH serial port. Time Slot Assigner 147 strips the three Section DCC bytes and the nine Line DCC bytes of each block (along with its clock) and forwards the extracted data to eight Section and eight Line HDLC controllers 146. Each controller receives a separate clock and data and interprets it as a serial bit stream conforming to the LAPD protocol characteristics. The controller detects the opening flag, fetches the address, control and optional information fields, performs CRC calculation and stores the whole frame in a cyclic receive buffer in the SOP card RAM. Upon completion of the frame reception process, it interrupts the CPU and informs the CPU about any error that has been detected during the reception process. The address, control and information bytes are transferred into the SOP card RAM by a dedicated DMA controller. For each DCC, the CPU performs the Link layer and Network layer functions, and forwards data packets to either one of the 16 Data Communication Channels, or the LAN port.

The SOP card is responsible for concurrent transmission of packets to 16 DCCs. Eight are Section overhead (192 K bps) and eight are Line overhead (576 K bps). SOP card constructs each packet and forwards it via a transmit cyclic buffer to its corresponding HDLC controller. Since the receive and transmit cyclic buffers are independent of each other, the receive and transmit operation does not have to be synchronized. The HDLC receives the transmit clock from the TSA, thus allowing the HDLC to transmit data only in a valid time slot. The HDLC controller adds to the packet the opening and closing flags, bit stuffing and CRC, and transmits the frame to the outgoing channel. The TSA is responsible for enabling the tri-state transmit buffer during the transmission process, allowing the DCC data to be inserted into the TOH bus only in the assigned time slot locations.

Alarm and Orderwire Card

The AOW (Alarm and Orderwire) card 65 is responsible for the management of the multiple orderwire interfaces of the system of the present invention. The AOW card handles the alarm functions and local and express orderwire functions of the SONET. The AOW card also provides the alarm interfaces for the system of the present invention, including relay contacts, status inputs, and ACO (Alarm Cut-Off). The actual management of alarm functions is performed by the NEP via LAN messages to/from the AOW card.

Figure 14:
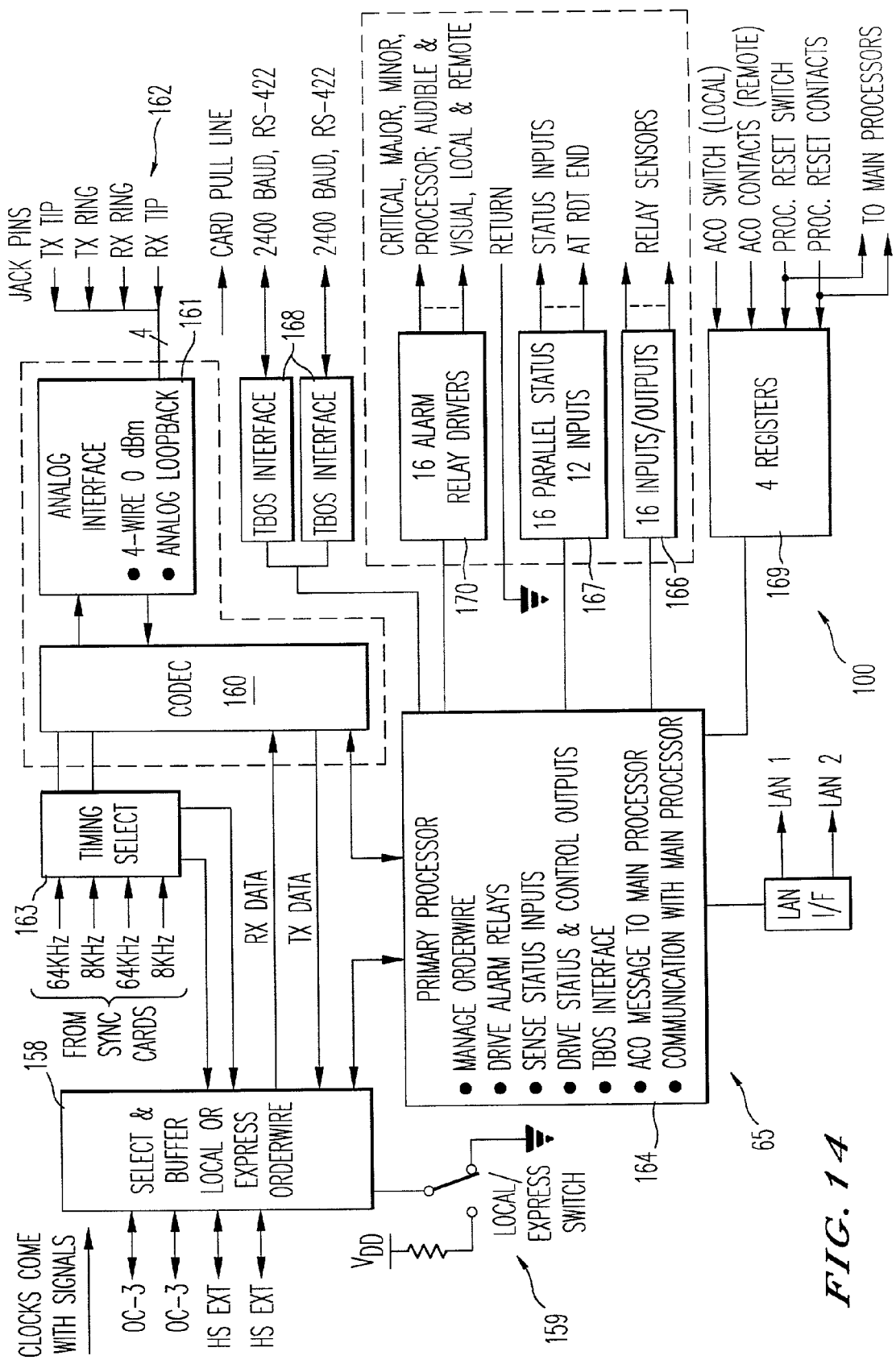
FIG. 14 is a schematic block diagram of an alarm and order wire card constructed in accordance with the present invention and usable in the shelves of the RDT of FIG. 7.

A functional block diagram of the RT AOW card is shown in FIG. 14. The AOW card accepts the SONET overhead from the OC-3 and High-Speed Extension cards at a selector and buffer circuit 158. The selector extracts the local or express orderwire channel from the SONET overhead based on the position of a manually settable LOCAL/EXPRESS SELECT switch 159 mounted on the front panel of the AOW card. The orderwire channel is a DS0 channel which is fed into a CODEC 160. The output of the CODEC is connected through an analog interface circuit 161 and brought out via a jack connector 162 mounted on the front panel of the AOW card. The CODEC performs the analog-to-digital and digital-to-analog conversions and PCM encoding. The analog interface is a 4-wire, 0 dBm signal with an input impedance of 600 ohms as specified in TR-NWT-253. A single CODEC is provided for both express and local orderwires. Codec 160 and selector and buffer circuit 158 communicate transmit and receive information to each other and both communicate with an on-board primary processor 164.

The external status (alarms) and contact closures are input through circuits 166 and 167 and interface to the system of the present invention via the AOW card. Alarm inputs are also received through TBOS interface circuits 168 on 2400 baud serial RS-422 lines. The AOW card accepts these inputs which are monitored continuously by on-board processor 164 to determine their validity (debounced at a 50 mS rate). Upon detecting a valid status change, microprocessor 164 informs the NEP of the status change via a message over the internal LAN 100. The ACO inputs are connected to registers 169 and are handled similarly. These are used to sense external fault conditions. Timing is chosen by selector circuit 163 from inputs obtained from the SYNCH cards 64.

The AOW card provides control, relay drivers 170, and relays. These relays are used to drive Critical, Major, Minor, Processor, Power, CO, and Abnormal alarms for local display and remote maintenance centers. On-board microprocessor 164 activates and deactivates these alarm contacts in response to messages from the NEP via the internal LAN.

Network Element Processor

Figure 15:
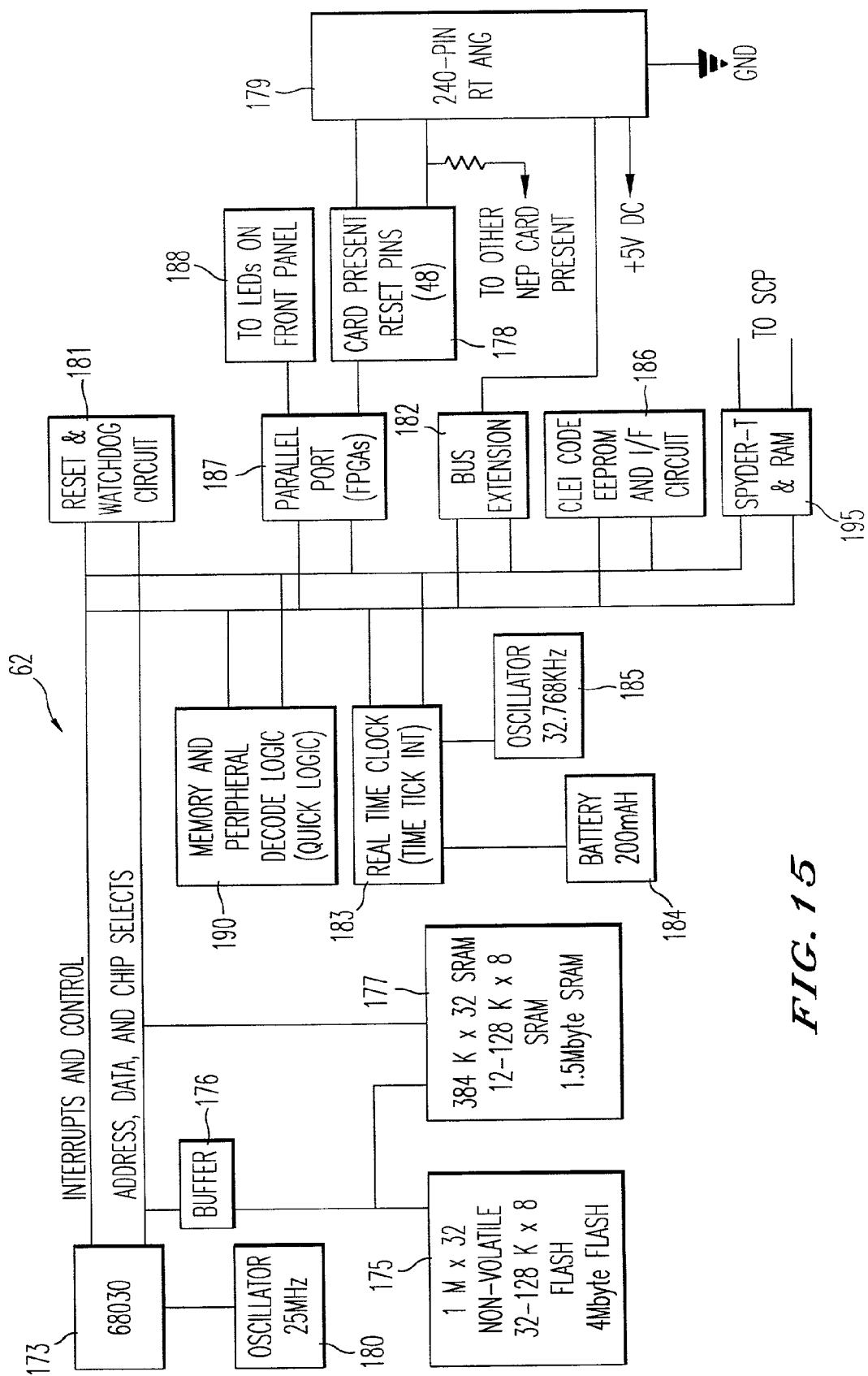
FIG. 15 is a schematic block diagram of a network element processor (NEP) card constructed in accordance with the present invention and usable in the shelves of the RDT of FIG. 7.

The Network Element Processor (NEP) card, FIG. 15, is the central coordinator of activities in the system of the present invention and supports termination of communications for the Embedded Operations Channel (EOC), the Time-Slot Management Channel (TMC) and the Common Signaling Channel (CSC). The NEP card and the signaling control processor (SCP) card act as a single module but are separated into two boards. Here, the hardware is not critical but will be described as it exists in the present embodiment. The processor 173 itself on the NEP card is a Motorola 68030 microprocessor-based hardware platform designed to perform various functions. The 68030 microprocessor has an on-board memory management unit (MMU). The MMU is used to protect memory on a per-task basis. A software task which attempts to access memory to which it does not have privileges causes an MMU interrupt to the microprocessor.

The memory on the card includes FLASH memory 175 and SRAM 177 connected to the processor 173 through a buffer 176. The FLASH memory is for storing executable code for the microprocessor and non-volatile system parameters. The SRAM is volatile storage for the microprocessor stack, data variables and other information which does not need to survive power-down. The FLASH memory size is typically 4 Mbytes, organized as 128K words of 32 bits each organized for a 32-bit data bus. A 25 MHz oscillator 180 provides the clock to operate the microprocessor.

All 32 address, 32 data, and certain bus control signals are available at an edge connector 179 for interface to a message RAM located on the SCP (Signaling I/O Control Processor).

The Card Present/Reset circuit 178 on the NEP can determine which cards are populated in the Common Equipment Shelf (CES) and reset each card in the shelf individually. There is one digital line for each card in the CES which is used to perform both the reset and card detection functions. The circuit 178 appears as 3 parallel ports to the processor 173.

A microprocessor reset on the NEP card is to prevent the card from executing the wrong code and stops the NEP card when it is executing the wrong code. The watchdog circuit 184 operates in accordance with software to permit the resetting of the microprocessor for recovery after it detects a failure in the execution of the program code. The watchdog circuitry is a chip requiring a pulse every 1.6 seconds. The watchdog timer is serviced (i. e. , a 1.6 second timer is restarted) in the background routine. The background is executed between each software task. Each task is designed to take less than 1.6 seconds to execute and return to the background. Any task taking longer than 1.6 seconds is assumed to have caused a problem with the microprocessor, resulting in a reset. If the chip does not see pulse edges, then it activates the microprocessor's reset line. To ensure that the microprocessor is executing valid code, the microprocessor toggles an I/O bit to generate the valid pulse. The toggling routine is not executed if the microprocessor is running invalid code.

The NEP card interfaces to the backplane connector via 179. The mechanics of messaging between the two NEP cards is delegated to the associated SCPs. An NEP wishing to send a message places the message in the shared memory 197 (FIG. 16) on the companion SCP via the memory bus extension 182. The NEP then signals to the SCP processor 199, using an interrupt, that a message is ready. The SCP then sends the message over one of the LANs to the second SCP. The message includes a header that the message is intended to be delivered to the second SCP. The second SCP places the message in its shared memory and interrupts the second NEP to indicate a message has arrived. Most of these messages are the sanity check message. It indicates the sending NEP is operating properly. If a sanity message is not received in a prescribed period of time, the receiving NEP first tests for proper operation of the LAN. If the LAN is working, the NEP which has become silent is reset using the Card Present/Reset circuit 178.

A Real Time Clock (RTC) 183 used on the NEP card provides the microprocessor with the time of day and date. The timer function of the RTC is used as an interval timer. It interrupts the microprocessor to inform it to perform a specific function. An oscillator 185 can be used to clock the RTC which is a 32.768 KHz crystal connected directly to the clock pins of clock chip 183. Alternatively, the timing reference for the RTC is preferably derived from the SONET clock. Frequency division from 19.44 Mhz to 32 KHz is performed in one of the FPGAs 187. A battery 184 can be used to maintain clock 183.

The CLEI, manufacturing information and revision status are contained in a small EEPROM 186, which is programmed at the factory. The processor can read the information and provide it to the OS or craft interface on request. Processor 173 also provides status information on front-panel LEDs 188 for visual inspection.

The software functions performed by the NEP card are:
Power-up system diagnostics and a cold start bootstrap.
Software upload/download of data and code to all cards.
Interpretation of and response to the SONET overhead messages.
Control the provisioning of all cards in the RDT.
Commands and responses to the OS via the EOC.
Commands and responses to the Supervisory System via the POC (Pulse Operations Channel).
Commands and responses to the local craft via a link.
Database exchange and heart beat verification with the NEP card backup.
Receive and store as needed the performance monitoring results for access by the Operations System or Supervisory System.
TL1 (Transaction Language 1) parsing and interpretation to the internal command structure of the OS's via the LDS or Supervisory System.
ASN.1 (Abstract Syntax Notation) parsing and interpretation to the internal command structure of the OS's via the LDS or the Supervisory System.
Route messages to and from the integrated Remote Test Unit (RTU) via the LAN as received over the EOC.

The NEP card includes the memory extension, interrupts to the SCP, interrupts from the SCP, the card present/reset signals, the serial Spyder-T interface, power (+5 volts and ground), and slot ID. The memory extension and interrupts are used to pass messages to and from the mating SCP. This hardware arrangement permits the NEP card to place a message and instructions for handling the message in shared memory via the memory extension, then interrupt the SCP to indicate a message is ready. Likewise, the SCP can place a message in the shared memory, then interrupt the NEP card. The message is then available to the NEP card via the memory extension. The Card Present/Reset permits the NEP card to directly determine which cards are installed in the CES and individually reset any card in the CES. The serial Spyder-T interface contains up to 32 channels of information. The channels can contain various combinations of EOC, CSC, TMC, and POC. The slot ID is a one bit indication of whether the NEP card is installed in the NEP A slot or the NEP B slot.

Signaling Control Processor

Figure 16:
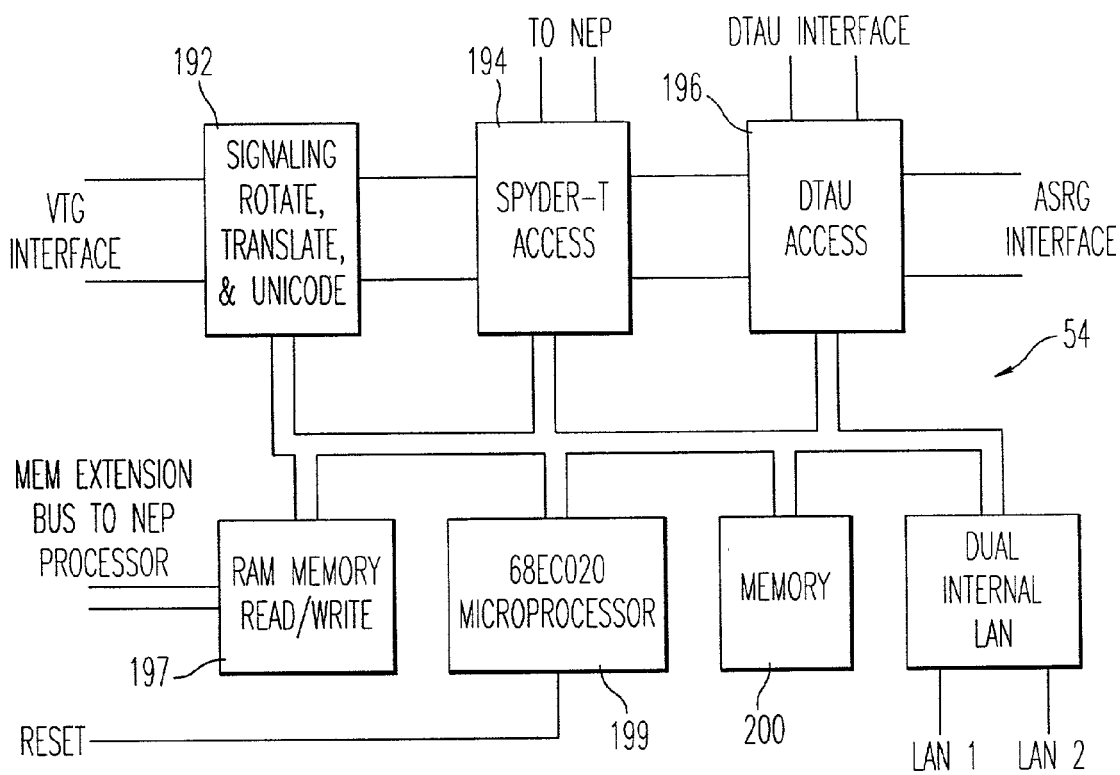
FIG. 16 is a schematic functional block diagram of a signal control processor (SCP) card constructed in accordance with the present invention and usable in the shelves of the RDT of FIG. 7.

Referring to FIG. 16, the Signaling Control Processor (SCP) card performs 7 major functions in the system of the present invention:

1. Translate TR-TSY-303, 16-state signaling from the central office to TR-8, 4-state signaling for older channel units; and translate 4-state signaling to 16-state signaling for connecting older exchanges to newer CUs.

2. Rearrange the signaling bits from the central office such that all 4 signaling bits for a channel appear in one byte (signaling rotation).

3. Perform DS0 processing of the Unicode and DS0 Yellow.

4. Provide DS0 switchable access from the 32-channel serial controller (Spyder-T) to the POCs, EOCs, and TMC/CSCs from the central office.

5. Create a VT1.5 from 24 DS0s passing through the SCP card between the channel shelf processor 57 and the VT Group cards 53 to allow the DTAU splitting or monitoring access.

6. Provide access to the internal Local Area Network (internal LAN).

7. Provide link access procedure D (LAPD) preprocessing for the Network Element Processor (NEP).

These functions are implemented in four major hardware elements shown in the block diagram in FIG. 16. A signaling rotation and translation circuit 192 performs functions associated with the signaling bits. Signaling received from the VTG card interface is in the standard SONET byte format: AAAA, BBBB, CCCC, DDDD. The rotator changes the signaling to the ABCD format. When a quadrette of signaling is assembled, it is then compared against Unicode and DS0 Yellow patterns. A state machine sets E and G signaling bits which are appended to the ABCD quadrette. The ABCD quadrette is then translated into an abcd quadrette which is passed through other system elements to the channel unit. The translation is performed under software control. Any one-to-one translation (including no translation and fixed output) can be selected. There are 256 RAM-based translation tables available.

More specifically, the signaling rotator performs 3 functions associated with signaling:

1. Converting the AAAA, BBBB, CCCC, DDDD format to ABCD format (rotation).

2. Detecting the Unicode and DS0 Yellow alarms.

3. Translating the signaling bits.

While the functions have been integrated into a single gate array hardware element, they can be discussed as separate implementations. A description of how the three functions are integrated follows.

Figure 17A:
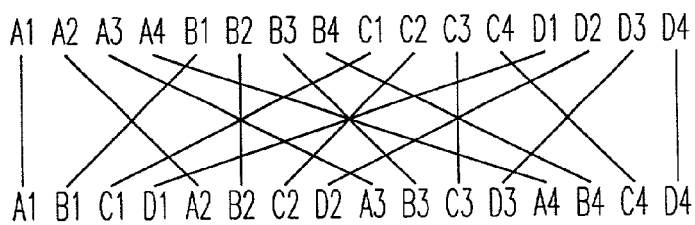
FIGS. 17A and 17B are diagrams illustrating signal rotation as performed by the signal rotation circuit of FIG. 16.
Figure 17B:
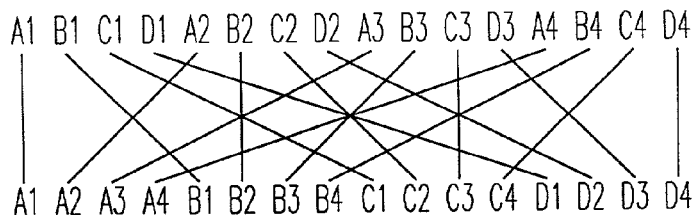

The signaling bit rotation takes the AAAA BBBB CCCC DDDD signaling format described in TR-TSY-253 and reformats the data to an ABCD arrangement for transmission to subscriber equipment from the feeder. Another algorithm for this transformation reverses it. The process is illustrated in FIG. 17A in one direction and FIG. 17B in the other direction. It will be seen in FIG. 17A that each A bit in the top row (incoming), in turn, is positioned at the beginning of each byte in the reformatted arrangement, each B bit is positioned in the second position of each byte, etc. Notice that the bit permutation is the same in either direction.

Figure 18:
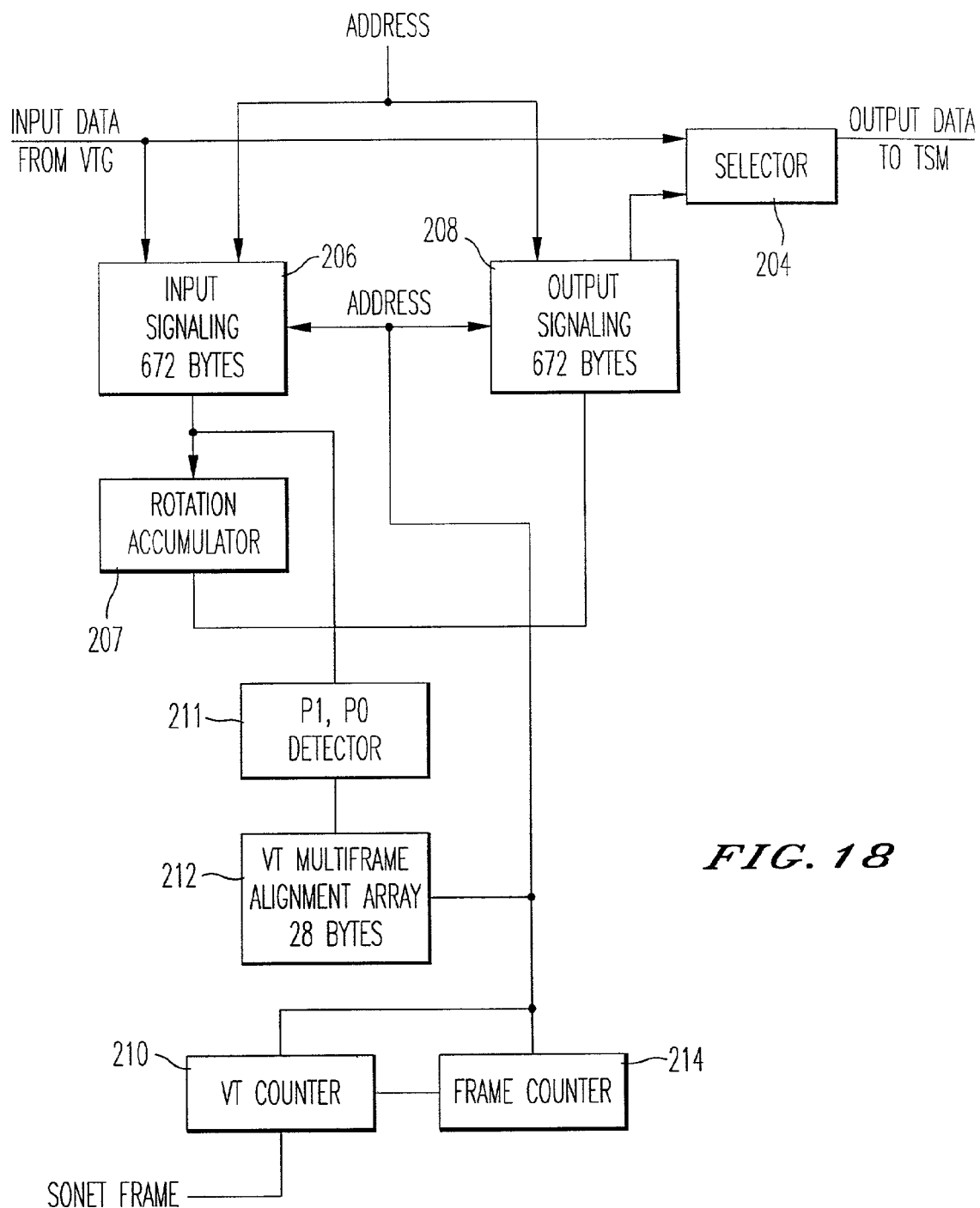
FIG. 18 is a functional block diagram of the signal rotation system of FIG. 16 in accordance with an embodiment of the present invention.
Figure 19:
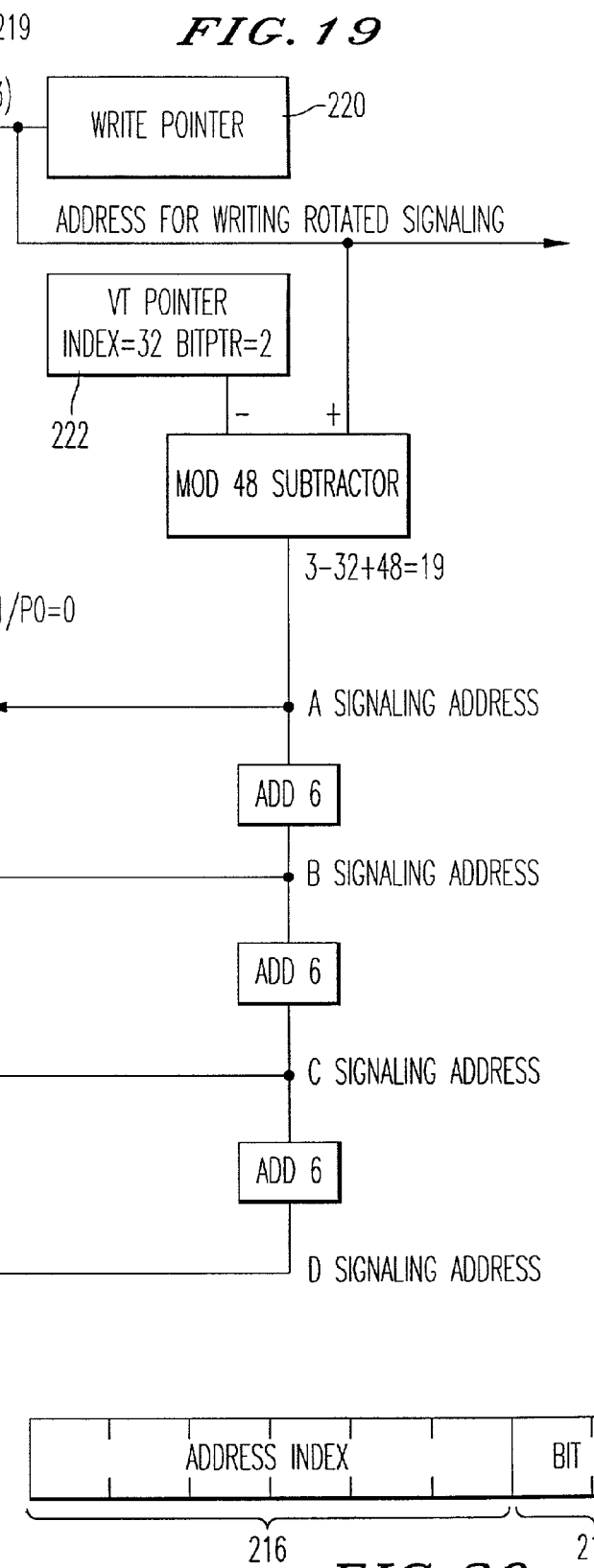
FIG. 19 is a diagram illustrating VT pointer operation in accordance with an embodiment of the present invention.

The implementation of this function is shown in FIG. 18 and will be described with reference also to FIG. 19. FIG. 18 only shows one half of the implementation, from the VTG card 53 toward the ASRG card 38 or 39, but the opposite direction is identical so only one direction is considered to simplify the discussion. Most of the time, the data from the VTG card 53 is passed to the ASRG card 38 or 39, without modification, via an output selector 204. Preferably, only when signaling is present at the input does the selector use processed signaling from RAM instead of the input data.

This presents a timing challenge. Signaling is available at the input for storage into the input signaling RAM 206 at the same time processed signaling from the output signaling RAM is required at the output 208. With some care taken in the design of the controller, the two accesses can be performed in the 154 nanosecond (nsec) clock period using a 55 sec RAM. Alternatively, four separate memories are preferably used.

After 672 bytes of signaling have been accumulated in the input buffer, the rotator 207 begins permutating the signaling bit order. For each input quadrettes of signaling, a new quadrette is generated. Therefore, 28 quadrets are generated every 125 μsec. The alternative to this technique is to wait for an entire superframe of signaling to be collected and perform the rotation. The rotation operation could take up to 3 msec and definitely would require more than 125 μsec. By limiting the operation of the rotator to less than a frame time, the arbitration for RAM access is simplified. Unfortunately, the frame by frame processing implementation is more difficult to follow. Below is a description of the signaling rotation flow:

1. Write 28 signaling bytes received from the VTG card into RAM 206. Read 28 rotated signaling bytes from RAM for output at 208 to the ASRG card. The input STS-1 has all the VT1.5 frames aligned by the VTG cards. This forces all signaling bytes to occur in 28 successive bytes of the SONET frame. This signaling burst is used to delimit the signaling rotation process.
2. Set the VT counter number to VT1.5 #1. This counter 210 is used to select one of the 28 VT1.5's in the SONET superframe.
3. Use the VT number to read the multiframe alignment from the array of multiframe alignment pointers.

Figure 20:
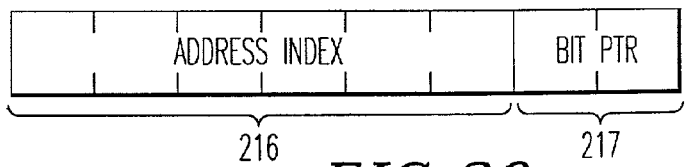
FIG. 20 is an illustration of the VT pointer format.

"VT pointer" is used as a shorthand notation for the VT multiframe alignment pointer. The VT Pointer Format is as shown in FIG. 20, wherein the last six bits 216 are the address index field and the first two 217 are the bit pointer field. The bit pointer field 217 tracks which of the 4 signaling bit positions in the input signaling are to be used to construct the new signaling quadrette and increments every time the flow is executed. Address index field 216 is subtracted (modulo 48) from the address where the last signaling was written. The result is the address of the A signaling input. The B, C, and D addresses are determined by successively adding 6 to the result (FIG. 19). Address index is normally incremented each time through the flow unless the bit pointer rolls over from 11 to 00, then the Address index does not change. When Address index reaches 17 and bit pointer=11, the next state of the Address index is zero. The input buffer is 2 frames long (2×672) so the rotator can operate on a complete data set in one half of the buffer while the incoming frame fills the other half of the buffer.

Continuing with the rotation flow steps,

4. Read the A signaling byte and retain the P0, P1 bits in detector 211.
5. Read the B signaling byte.
6. Read the C signaling byte.
7. Read the D signaling byte.
8. Write ABCD signaling using the VT pointer.
9. IF P0=P1=0 in 211 from step 4, THEN process the VT pointer normally and store. ELSE Do not increment the Address Index of the VT pointer.
10. Increment VT number (mod 28). The next VT is selected for processing instead of generating the next 3 quadrets of rotated signaling. By only generating one quadrette of signaling per VT1.5 for to 0each input quadrette, the process avoids a decision of whether to process the signaling this frame or skip it because it was already computed in a previous frame.
11. IF the VT number counter rolls over,
    THEN wait for the next burst of signaling and continue from step 1.
    ELSE, GO TO step 3 and continue processing.

From the flow description above, one can recognize indexed addressing requirements and iterative looping on a counter. While these constructs are historically the property of software, they can be implemented in hardware on a limited basis.

In step 3 of the flow, there is a description of the VT pointer. To further visualize how this pointer operates, FIG. 19 gives a list of signaling 219 for one VT1.5 in the input buffer and shows the interaction of the VT pointer with the signaling write pointer and the data. The signaling multi-frame is typically not aligned with the RAM buffer start address.

The write pointer 220 contains the address of the next data to be read from the output buffer and points to the last data written to the input buffer. The VT pointer 222 is an index used with the write pointer. The index is performed in such a way that the first read operation of the rotator preferably always accesses 'A' signaling bits, i.e., the VT pointer is updated: BitPtr=+, Index+−. The index is decremented since the write pointer increments and the next signaling data is at the same location. The same access also verifies the P0/P1 bits. When an error is detected, the VT pointer update algorithm is modified. The two LSBs are reset to zero, and the Index portion is set to 24. This is the state of the VT pointer at the beginning of a VT multiframe.

The write operation makes no attempt to align the incoming data with the write pointer, so the VT1.5 multiframe does not necessarily begin at address zero. The store operation happens very fast (154 sec per byte) and there is no time to determine multiframe alignment on a per VT1.5 basis during the receive operation. This burden is shifted to the processing phase of the rotation.

Figure 21:
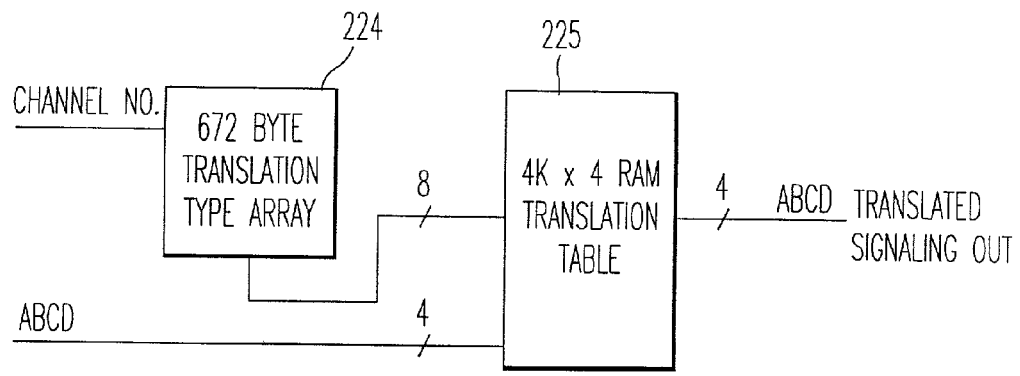
FIG. 21 is a block diagram of a signal translator constructed in accordance with the present invention and usable in the circuit of FIG. 16.

Translation between TR-TSY-8 and TR-TSY-303 is not symmetrical for both the send and receive directions. Primarily, this is due to the differences in interpretation (or meaning) of the signaling bits, i.e., signaling directed toward the channel unit indicates ringing and test while signaling from the channel unit indicates the status of the hook switch. After the signaling bits have been collected with the rotation function, the resulting 4 bits are presented to a lookup table 225 with an 8 bit translation type shown in FIG. 21. The 4 output bits are the new signaling.

The translation table 225 is loaded by the processor before being used by the hardware translator. With a 16 state input, there are $2^{64}$ ($1.8 \times 10^{19}$) possible translations. Since the control word for such a translation would be an ungainly 64 bits long, the translation has been limited to 256 possibilities. Only 9 translations have been identified at this time. The signaling translation occurs after the Unicode detection in the flow chart.

Unicode and DS0 Yellow signals are special signaling states. They are used to indicate alarm or unequipped channel situations. These signaling states are only present from the central office to the remote terminal, so the detector is preferably only present on the receive direction. Each DS0 (of 672) requires its own set of timers for performing the detection. The result of the detection is forwarded to the channel units in the E and G signaling bits. The SCP card can generate the unicode and DS0 yellow signaling state to the central office based upon a message received by the NE Processor. The SCP card is then instructed to select a translation for the transmit direction that always generates Unicode (or DS0 yellow) regardless of the signaling from the channel unit.

Figure 22:
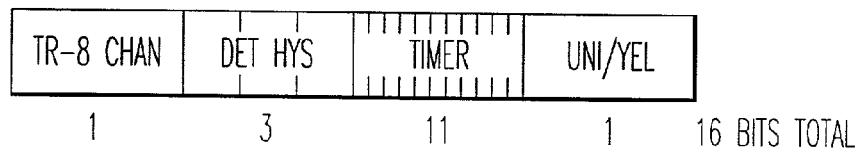
FIG. 22 is a diagram of the bit signal format of Unicode and Yellow Alarm signals.

The DS0 Yellow Alarm and Unicode detection is maintained through the use of a 16 bit structure per channel as shown in FIG. 22.

The MSB is the TR-8 bit. If set, the TR-8 bit prevents detection of either Unicode or DS0 Yellow since these codes are restricted to TR-TSY-303 type channels. This bit is set by the local microprocessor, and is not modified by the detection logic. The LSB is the Unicode/Yellow flag. It is used to keep track of whether the unicode or DS0 Yellow is being detected.

The Det Hys field is a 3-bit state counter used to keep track of the number of consecutive detections or consecutive no-detects of the code. This field works in close cooperation with the Uni/Yel bit to determine the state of the detection process. If Det Hys is zero, the Uni/Yel field is meaningless because the most recently received signaling was neither a unicode nor a DS0 Yellow code. For detection to proceed, two consecutive codes need to be found. If Det Hys is 1, the detector only looks for the code selected by the Uni/Yel bit. If the previous signaling was Unicode, only another Unicode causes the state machine to enter the detected state. Any other code, including DS0 Yellow code, causes the Det Hys counter to be reset to zero. When the detection state is entered, a value of 7 is placed in the Det Hys field. Entering the detection state also loads the timer field with one of 2 values: 833 for DS0 yellow detection or 1083 for unicode detection. This timer is decremented every 3 msec (each time new signaling is available). While this counter is non-zero, the E bit output is set. During this time the Det Hys field is decremented (down to a value of 3) when the appropriate code is not detected and the counter is incremented (up to the value of 7) when the code is detected. If the code is still present at the end of the timeout, the G signaling bit is set. If the code is not present at the end of the timeout, the E and G bits are reset. The E and G bits are reset when 4 consecutive "no detects" occur after the timer expires. Once the E and G bits have been determined for the channel, the signaling byte is stored into the RAM.

The unicode detection-algorithm is described in TR-TSY-303, section 4.7, under Trunk Conditioning.

7a. Read the 2 bytes of Unicode state
7b. Logically combine the signaling with the Unicode state to generate a new Unicode state.
7c. Store the 2 byte Unicode state.
7d. Use the channel number to read the translation type.
7e. Use 8 bit translation type and the 4 bit rotated signaling to access the translation table and keep the translated result.

Returning to FIG. 16, the Spyder-T Access block 194 selects a total of 32 channels, 64 kbps each, for presentation to the Spyder-T serial controller chip 195 on the NEP card, FIG. 15. It also directs the 32 channel output of Spyder-T chip 195 to the designated DS0 s of the two STS-1 rate outputs (to the rotator section 192 and the DTAU Access section 196).

Spyder-T chip 195 is an integrated circuit available from AT&T which allows termination of a DS1 or E1 channel and is used to terminate a large number of control channels. Each communication channel of the Spyder-T is 64 kbps. There are four channels minimum required to communicate with the Operations Systems via the central office. These channels are the Embedded Operations Channel (EOC), the backup EOC, the Timeslot Management Channel/Common Signaling Channel (TMC/CSC), and the backup TMC/CSC. A Pulsecom EOC (PEOC) with backup may also be connected to a Pulsecom Supervisory System at the central office.

Spyder-T chip 195 is also used to communicate with the Channel Shelf Processors (CSPs). The system of the present invention supports up to 8 channel shelves with redundant CSPs. Since each CSP requires a communication channel, there are 16 channels of the Spyder-T assigned to CSP communication.

If there are less than 8 channel shelves installed, the unused Spyder-T channels may be used for other purposes.

The total number of Spyder-T channels described above is 22. This leaves 10 channels available to implement virtual RTs (up to 3) or to selectively increase bandwidth to channel shelves.

Figure 23:
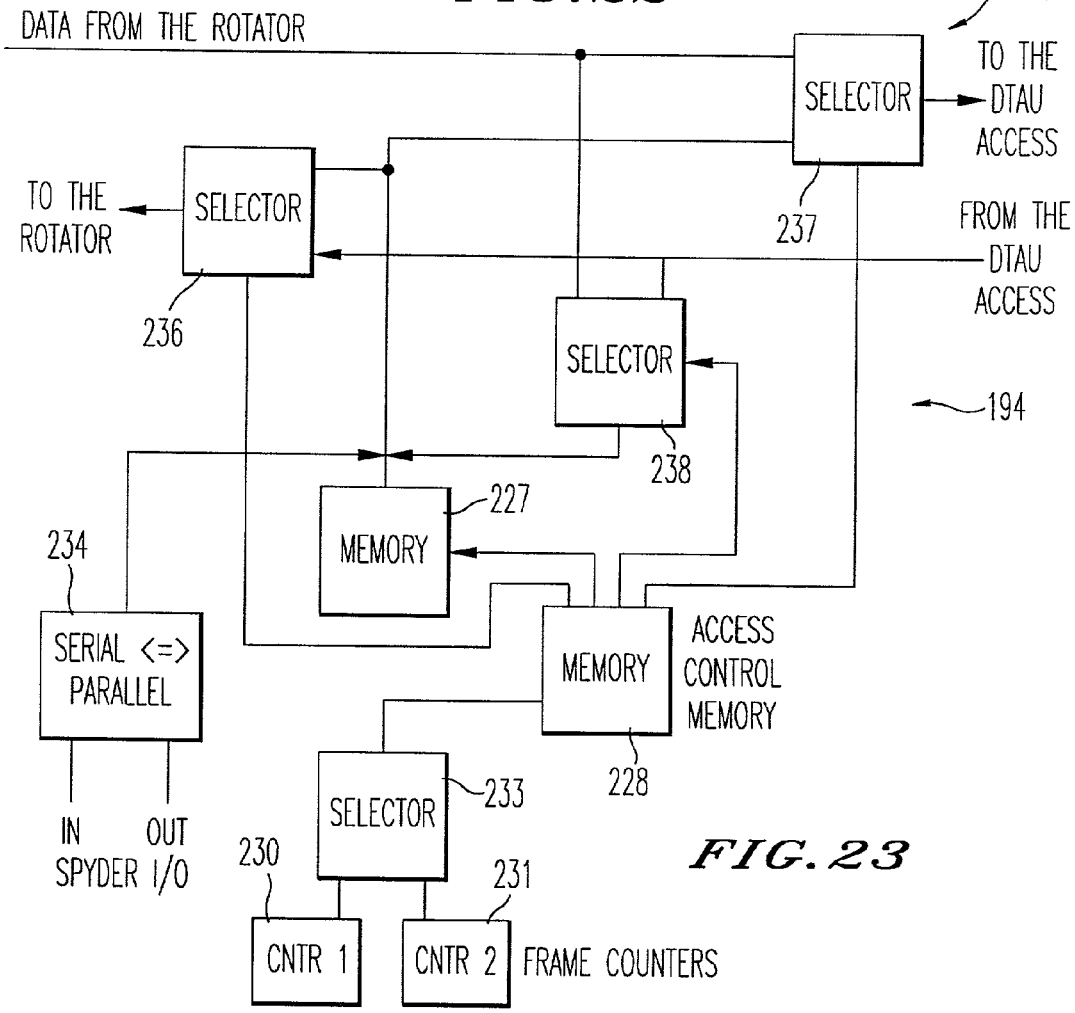
FIG. 23 is a block diagram of a Spyder-T access circuit constructed in accordance with the present invention and used in the SCP card.

The Spyder-T is a 32 channel HDLC controller. It is used to communicate with the Operation Systems (OS) via the Embedded Operations Channel(s) (EOC) and Timeslot Management Channels/Common Signaling Channels (TMC/CSC). The Spyder-T is also responsible for communication to the 8 CSPs. Since the EOC and TMC/CSC have backup channels, and there are redundant CSPs, there are a total of 20 channels that the Spyder-T supports. The remaining 12 channels are available for future enhancements such as virtual terminals (requiring additional EOC and TMC/CSC channels) or faster communications to some of the CSPs. The Spyder-T Access circuit 194, shown in greater detail in FIG. 23, uses a small amount of memory for data rate buffers and a cross connect list. The design of Spyder-T access circuit 194 takes into account the fact that there are two STS-1 signal sources which are not exactly frame aligned, but the framing from the CSP is no more than 90 bytes and no less than 5 bytes delayed compared to the frame alignment from the VTG cards. Communication to the CSPs is conducted within the overhead bytes.

The actual design requires a RAN 227 to collect bytes from the VTG card 53 and Channel Shelf Processor 57 data sources. The bytes to be collected are described in a separate access control memory or connection RAM 228. Connection RAM 228 is addressed by two frame counters: One frame counter 230 for the STS-1 from the VTG card and another counter 231 for the STS-1 from the Channel Shelf Processor (CSP). If the contents of RAM 228 equals zero, a selector 233 ignores the data presented at either interface (zero equals the bit bucket). All other codes indicate a channel. One through 32 are for the Spyder-T channels. The connection RAM 228 data is used as an address to the data RAM 227. When a full frame of data has been collected, a Spyder-T serial interface 234 reads the data from consecutive locations into the data RAM. The design assumes that all channels are full duplex. That is, data received from a particular direction and channel requires data to be transmitted back in the same direction on the same channel.

Since the communication links are full duplex, the data RAM performs two accesses for each active timeslot. For example, the Spyder-T receives an EOC byte from timeslot 12 and sends a byte to timeslot 12 toward the VTG card. The timing of the EOC receive does not overlap the EOC transmit timing due to a 5-byte minimum delay at the CSP. However, the EOC receive could overlap the EOC backup timing. In this case, the data RAM needs to perform 2 accesses per 6.48 Mhz clock. This is possible, but it completely ties up the bandwidth of the data RAM. To prevent other accesses from overlapping, communication to the CSPs are placed away from the EOC and TMC/CSC locations.

Figure 24:
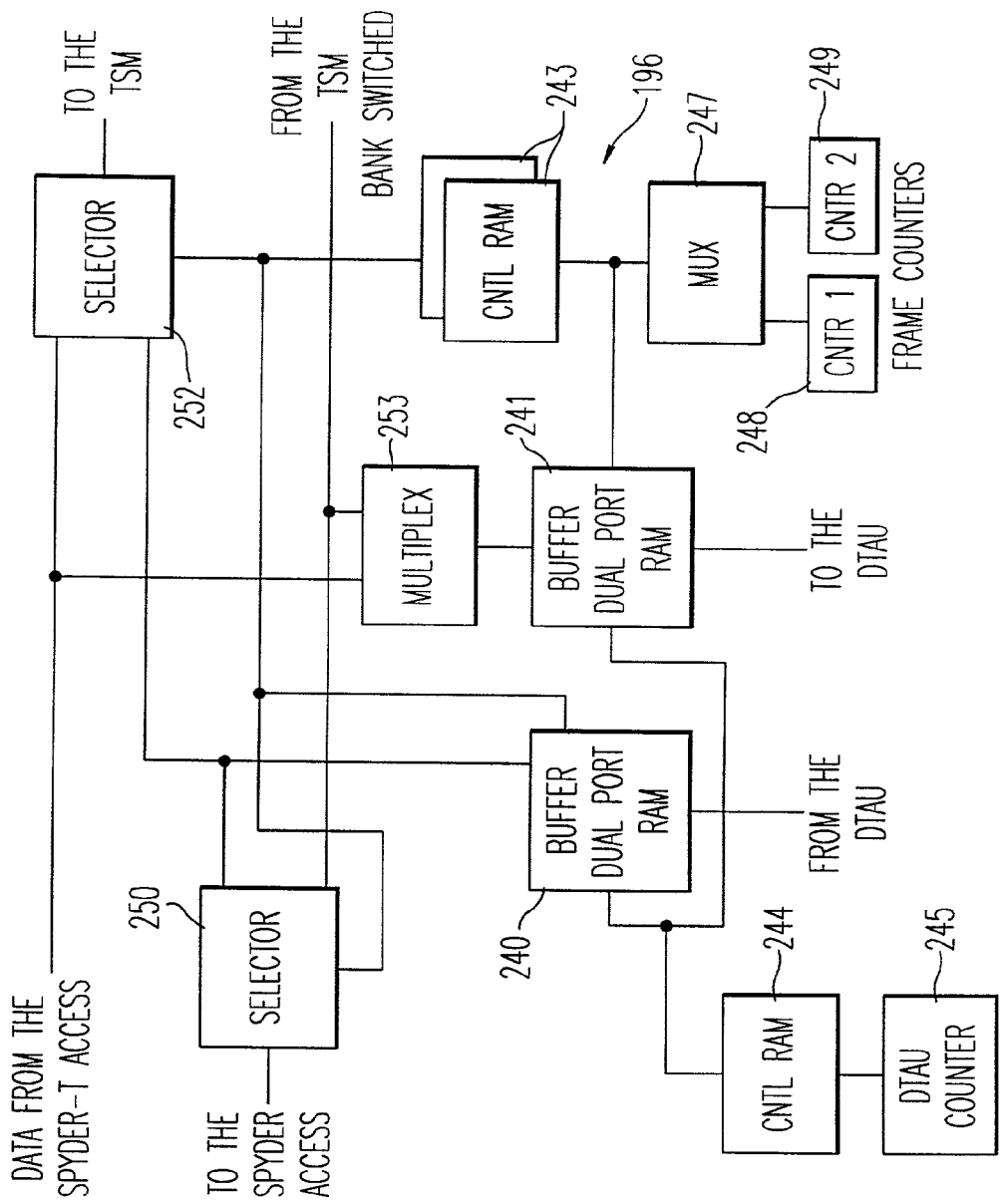
FIG. 24 is a schematic block diagram of a digital test access unit (DTAU) constructed in accordance with the present invention and usable in the SCP card.

Referring now to FIG. 24, the Digital Test Access Unit (DTAU) 196 provides monitoring of splitting access to the subscriber (RBOC) via a Ti interface. The basic interface is a VT1.5 operating byte in parallel with a frame strobe and clock provided by the SCP card. The data from the DTAU to the SCP card use the clock provided by the SCP card and it is frame aligned with the frame strobe from the SCP card. Multiframe alignment is indicated by the framing sequence in the signaling byte of the VT1.5. Multiframe alignment between the transmit and receive portions of the interface is not required.

Data from any direction may be directed to the DTAU in any of the 24 timeslots in the VT1.5. The signaling byte position is reserved for signaling. The V1–V5 bytes can also be used as general purpose timeslots, but this is not a requirement for the DTAU. It is simply a consequence of the SCP design.

While there are some similarities between the DTAU and the Spyder-T Access, the DTAU is less restrictive in its cross connect requirements, and it has the ability to handle signaling. The use of dual port RAM buffers 240 and 241 removes the restriction of multiple simultaneous access in the Spyder-T Access design. This design is not used in the Spyder-T Access because of power requirements and cost of the dual port devices. The top ports operate at up to 2 accesses per clock period of the 6.48 MHz system clock. One access is required for the Spyder-T direction and another is required for the ASRG.

Each buffer on the right is divided into 2 sections: a 672 byte area for signaling storage and a 782 byte area (810–28=782) for the rest of the STS-1. There are 4 buffers in each RAM. One buffer is used for access to the ASRG card and another to the Spyder-T Access. Each of these buffers is duplicated so that a ping-pong buffer scheme can be used. The left RAM stores data received from the DTAU. There are two 26 byte buffers for the DS0 s and two 24 byte buffers for the signaling.

DTAU Access block 196 allows monitoring or splitting access to 24 DS0 s. Any combination of DS0 s from the spyder Access block or the ASRG cards can be forwarded to the DTAU with the appropriate signaling in the signaling position within the VT1.5. The remaining two bytes in the VT1.5 frame are usually reserved for the SONET Vn (V1 through V5) bytes. The interface to the DTAU does not use the Vn bytes, so the Vn byte positions can be used for DS0 s without signaling or even communication channels from the Spyder-T.

A processor 199 coordinates and controls the activities of the other blocks. The drop and insert functions of blocks 192, 194 and 196 are controlled via memory mapped registers in memory 200. While processor 199 does have access to the manipulated data, access is seldom required. An exception is the data accessed via the Spyder-T. In this case, processor 199 preprocesses the LAPD protocol through the link layer for the NEP card. The memory bus extension is used to transfer data between the NEP card and the SCP card rapidly.

An internal LAN interface 202 is used for communication to other common equipment. This is the LAN port for the NEP card. The SCP card is used to handle the low level portion of the protocol just as it handles the low level portion of LAPD.

A Reset input to processor 199 on the SCP card is tied to the NEP cards (both cards of the redundant pair). If the NEP card detects a failure in the SCP card, the NEP card resets the SCP card. This line is also used by the NEP cards to determine if the SCP card is present in the chassis.

Time Slot Multiplexer

Figure 25:
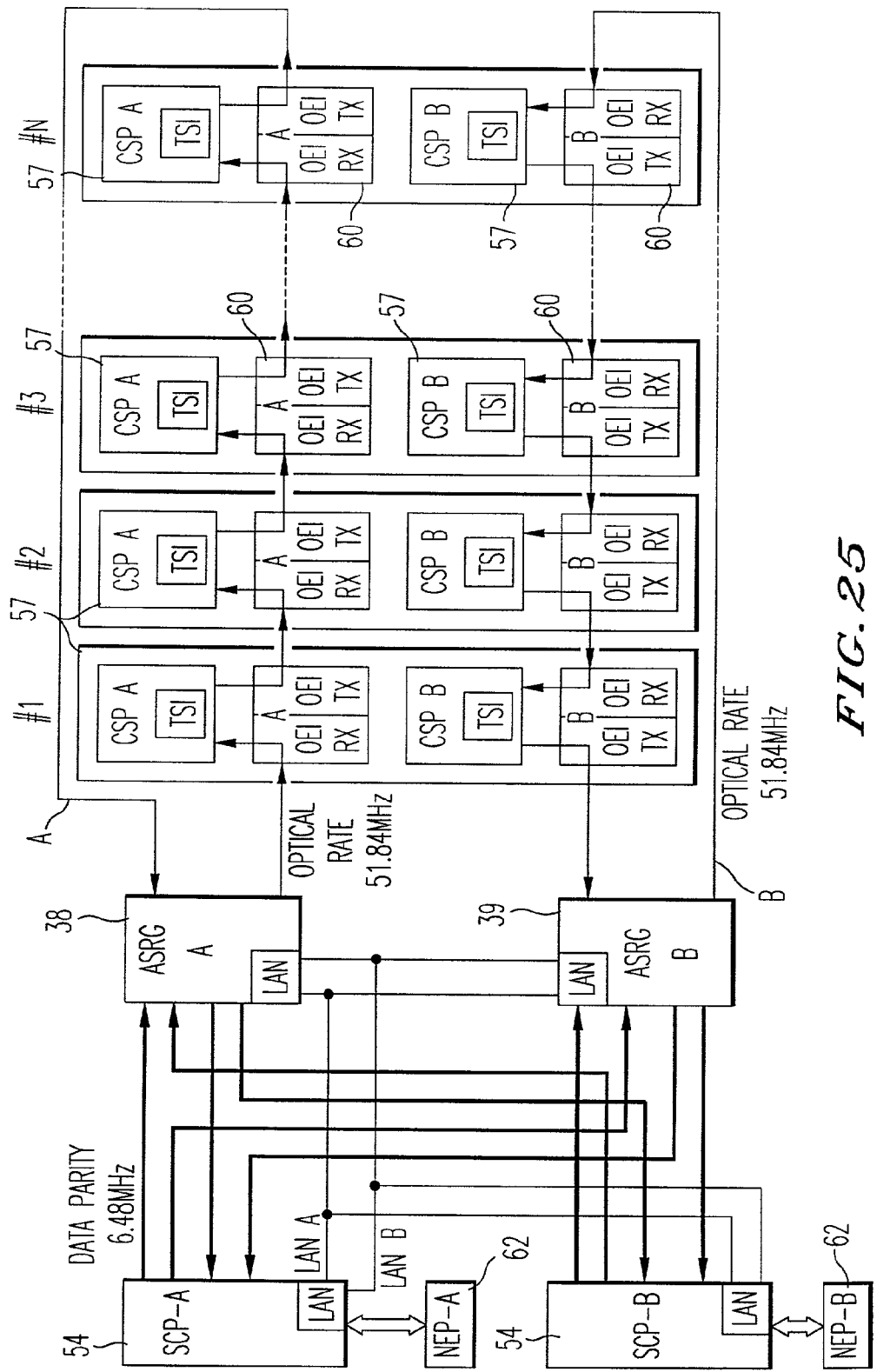
FIG. 25 is a schematic block diagram of the SCP, ASRG and channel shelf interface in accordance with an embodiment of the present invention.
Figure 26:
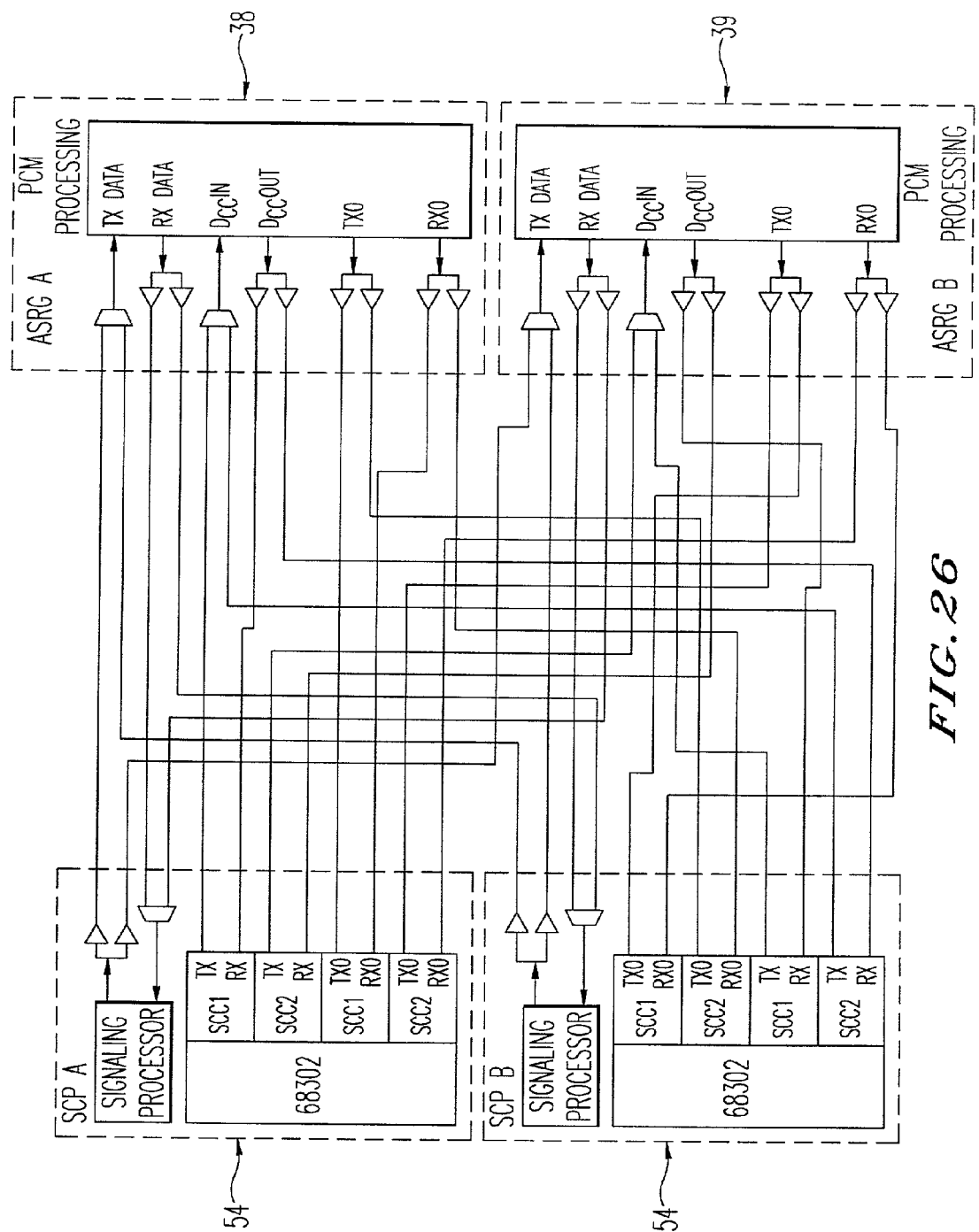
FIG. 26 is a more detailed schematic diagram of the SCP and ASRG card interconnections in accordance with an embodiment of the present invention.
Figure 27A:
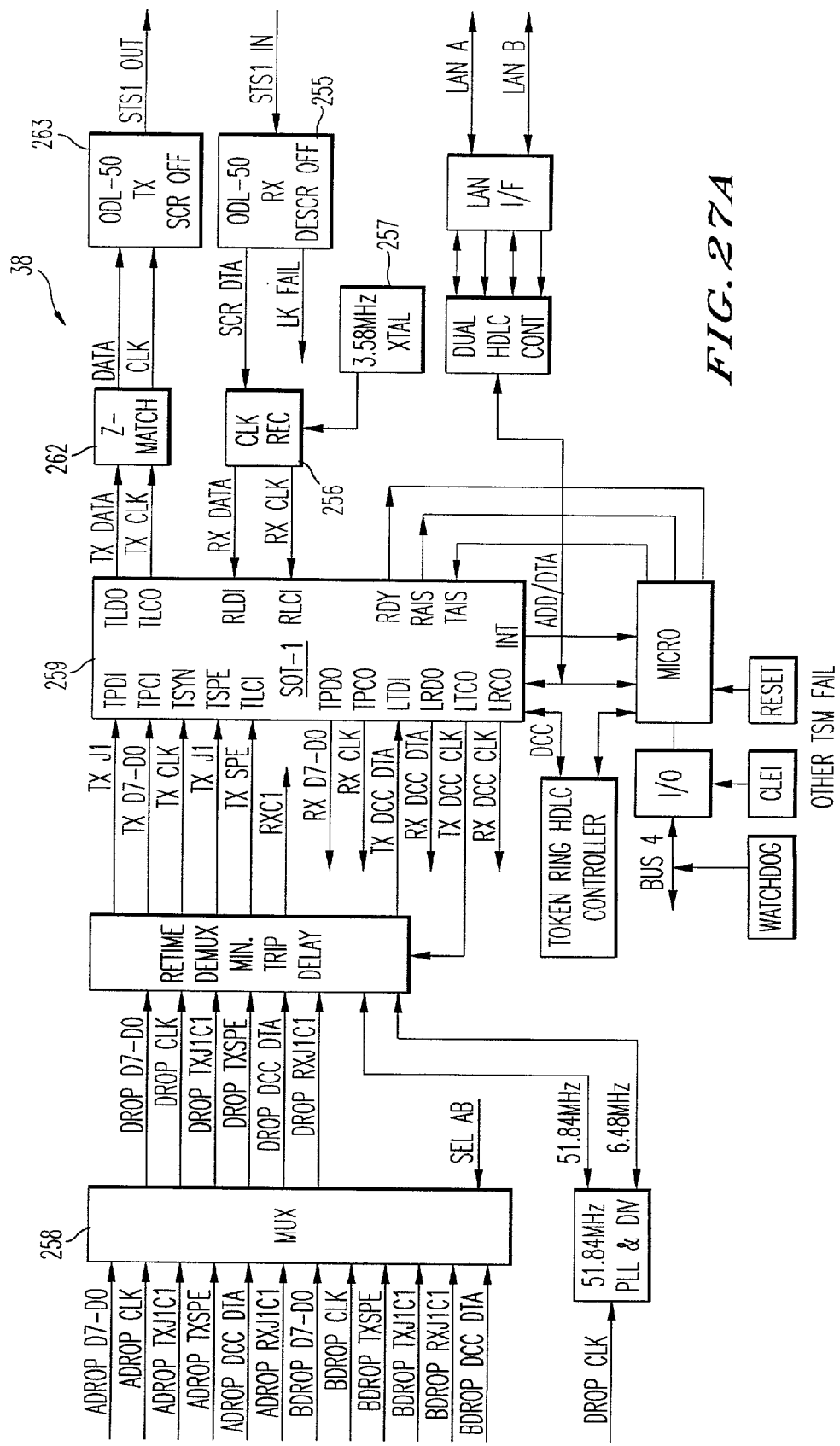
FIG. 27 is a schematic block diagram of a ASRG card constructed in accordance with an embodiment of the present invention.
Figure 27B:
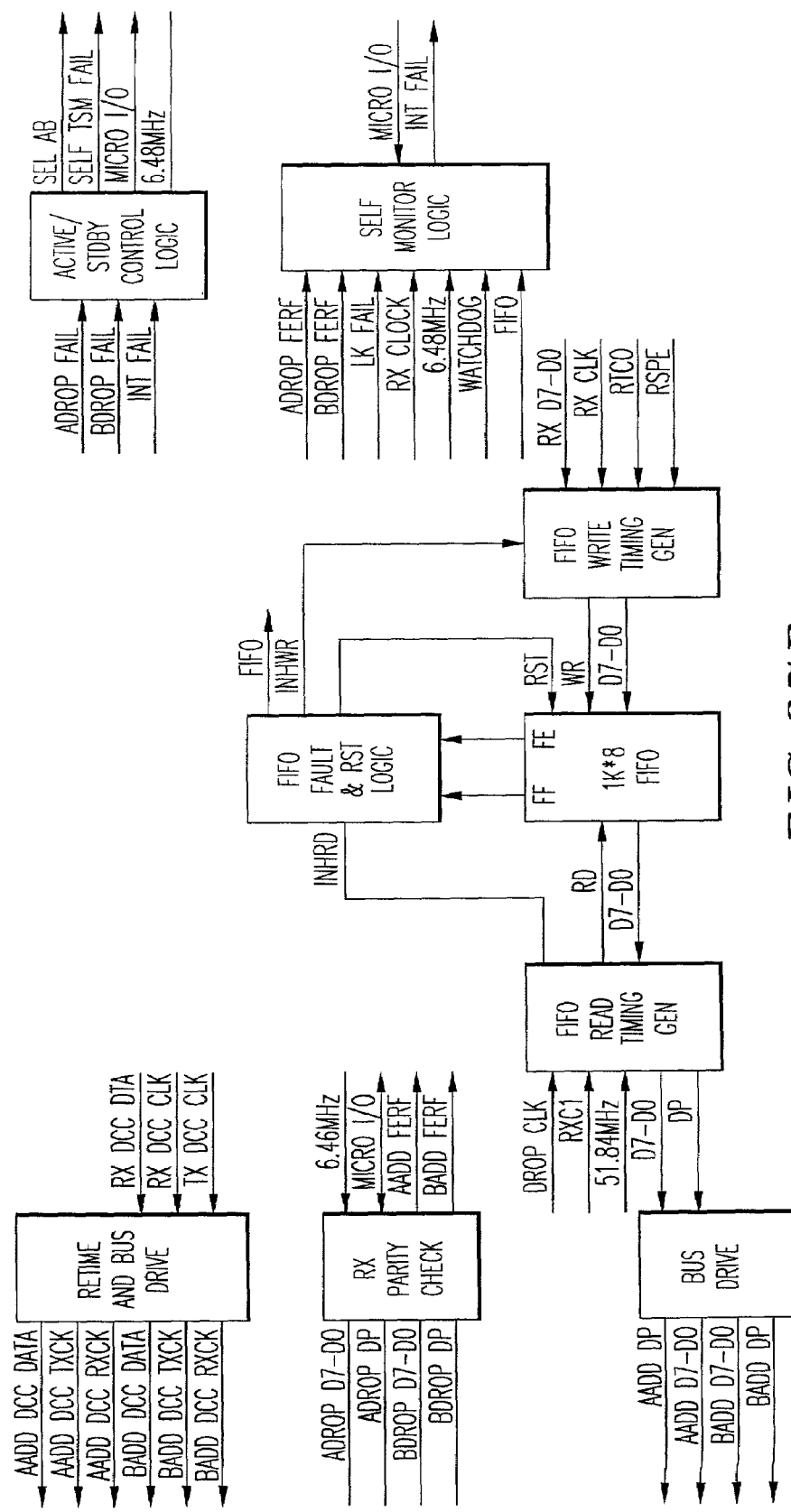

The ASRG card 38 or 39 is placed in the PCM path between the Signaling Control Processor card 54 and the Channel Shelf Processor 57 as illustrated in FIG. 25. FIG. 26 shows ASRG card bussing and isolation multiplexers. In FIG. 25, the heavy lines between the SCP cards and the ASRG cards indicate a 9-bit-wide bus. A functional block diagram of the ASRG card is shown in FIG. 27.

Channel Shelf Processors 57 assign timeslots on a per call basis under control of the NEP card. These timeslots are assigned onto the ring so that no two active timeslots overlap. Accomplishing this is possible because each CSP has a complete Time/Space switch function, and the NEP card coordinates assignment of timeslots by each CSP via the 576 Kb/s CSP/NEP LAN/ring extensions embedded in the ring between shelves. The ring extension from the channel shelves is terminated by an SOT-1 integrated circuit and fed to a token ring controller for low level protocol processing. Extracted messages are repackaged by the local microprocessor and sent to the NEP card via the channel shelf LAN. Messages from the NEP card to the channel shelf take a corresponding path in the opposite direction.

In the receive ASRG card path, each ASRG card receives STS-1 inputs from the channel shelf ring at an optical discrimination circuit 255. The optical signals are converted to electrical signals and are-then fed to a clock recovery circuit 256. The clock recovery circuit recovers NRZ-coded data and clock and is synchronized by a crystal oscillator timing circuit 257.

The STS recovered data is then fed to a SONET Overhead Terminator (SOT) 259 which finds frame synch and extracts the payload in byte format. The payload output from overhead terminator 259 is fed into an elastic store to compensate for the difference between the transmit and receive multiframe sync, due to variable ring delays. The data output of the elastic store has parity generated and appended and then clocked out to SCP cards 54, A and B, over bus 4.

In the transmit ASRG card path, the payload data from SCP cards 54 A and B is broadcast to the ASRG card via bus 4 (FIG. 7). The ASRG card input multiplexer 258 selects the appropriate data input and checks parity of this data. This data is then fed to SOMET overhead terminator 259 along with the appropriate transmit synchronization signal.

The SONET terminator adds the SONET overhead and scrambles the data, then the clock and data is passed through an impedance matching circuit 262 to an optical link transmitter 263 at 51.84 Mhz. The optical transmitter also provides additional scrambling of the data and then the optical data is driven on to the ring toward the CSPs. The CSPs can then add/drop subscriber information based on the ring datacomm channel.

The software features of the ASRG include:
ASRG Software Download,
ASRG Hardware CLEI,
ASRG Software CLEI,
Performance Monitoring of STS-1 line side,
Accumulation of STS-1 error history,
Internal performance monitoring,
Bus 4 performance monitoring,
Fault diagnostics/loopbacks,
Software watchdog,
Redundancy switch control,
Backplane LAN communication, and
Termination of the 576 Kb/Sec. LAN/ring extension control path.

Channel Shelf

Figure 28:
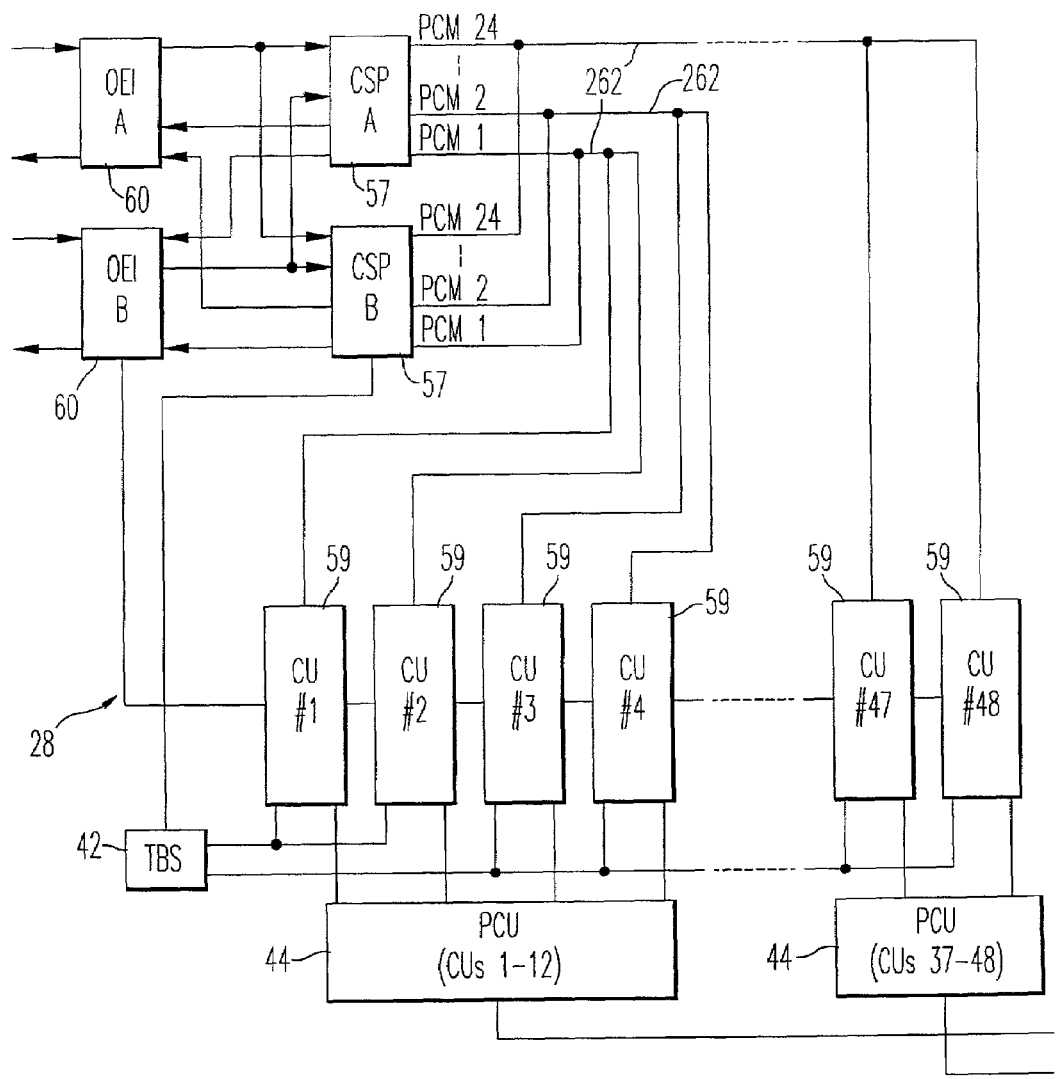
FIG. 28 is a schematic block diagram of a channel shelf constructed in accordance with an embodiment of the present invention.

The Series 5-compatible channel bank is for use exclusively in the TR-303 digital loop carrier system of the present invention. It provides the interface to the common equipment bank of the present invention for most Pulsecom and AT&T Series 5 channel units, as well as a new generation of channel units designed specifically for the system of the present invention. FIG. 28 shows a block diagram of the channel shelf 28, which was also shown (in less detail) in FIGS. 2, 3, 4, 6, 7 and 25.

Channel shelf 28 has two rows of channel units 59, each row having a capacity of 24 "AUA" size units. Each "AUA" size channel unit can serve a subscriber with a bandwidth requirement up to 768 kb/s. Subscribers with bandwidth requirements greater than 768 kb/s, up to a maximum bandwidth of 1728 kb/s, can be served by double-width channel units, occupying two channel shelf slots. The double-width channel units are plugged into the even-numbered slots of the channel shelf.

Each shelf also houses two power modules, a redundant pair of channel shelf processors (CSP) 57, a redundant pair of Optical to Electrical Interface units (OEI) 60, and a Test Bus to Segmenter (TBS) module 42, providing the channel shelf processor and common shelf interface. Total channel bank capacity is therefore 48 channel units (CUs), two CSPs, two OEIs, four power modules (PCU) 44 and one TBS module. The bank is designed to re-use PSC-5 channel cards. Fusing for the shelf power is provided on an associated assembly that also provides management for the OEI and ring fibers. Message lines 260 couple signals between the OEIs and CUs for series 5 timing and message line interface (old and new). Data signal lines 262 for PCM include individual TPCM and RPCM lines for each pair of CUs.

The bank interfaces to the common equipment through OEIs 60 and CSPs 57. The CSP acts as the bank controller and also provides the multiplexing between the 48 card slot PCM busses and the STS-1 rate link to the common shelf. In addition it supports the message line to the cards for control. The CSP within the channel bank accepts modified transmit and receive OC-1 (MOC-1) optical signals containing up to 672 DS0 channels (and optionally a redundant MOC-1 signal) from the ASRG card in the common shelf. As illustrated in FIG. 7, OEI A on a shelf receives from ASRG A card if it is the first shelf in the ring, or from OEI A of the prior shelf and outputs to the next shelf OEI A, or to ASRG card A if it is the last shelf. OEI B receives from ASRG card B if it is the last shelf, or from the next subsequent shelf and outputs to OEI B on the next prior shelf, or to ASRG card B if it is the first shelf.

In the channel unit transmit direction, the time slots present in the MOC-1 signal are routed to individual channel units on DS0 boundaries by the CSP. In the channel unit receive direction, time slots on DS0 boundaries are combined into the MOC-1 signal by the CSP for transmission to the ASRG card in the common bank.

Any combination of channel units constructed in accordance with the present invention (VT1.5 maximum bandwidth) and Series 5 channel units is allowable, up to the 48-unit capacity of the bank. If the bank is to be filled with Series 5 dual DS0 channel units this results in a 96-channel capacity. If the bank is filled with quad-DS0 channel units, this results in a 192-channel capacity. In the minimum configuration, with 24 dual channel cards (48 channels), both CSP 57 modules are required, fed by two redundant links from the two ASRG cards in the common shelf.

When quad channel units are used (96 channels), two CSPs are used, configured redundantly. Each CSP is fed by one link from the ASRG card in the common shelf. Channel units using significant power, like dual ISDN units, and the CSP use on-board power converters from the −48 Volts supply.

Optical to Electrical Interface (OEI) Card

As discussed above, each channel shelf comprises two non-redundant OEIs 60 which provide optical interfaces to the Channel Shelf Processors (CSP). The OEI modules receive 51.84 MHz rate optical inputs from the common shelf ASRG cards, and convert the optical signals to the scrambled STS-1 rate stream for processing by the CSP.

The OEIs are physically placed within a channel shelf. The architectural placement of the OEI modules within the system of the present invention was illustrated with the ASRG card in FIG. 25. It can be seen in that figure that the OEI modules are non-redundant, and that in the event that an OEI module fails, the complete OEI/ASRG card group needs to be switched to protection. In this protection mode, the path is reconfigured to a working connection by use of the other OEI and ASRG card loopbacks. As shown in FIG. 25, although the OEIs themselves are not redundant, the rings are redundant, and each ring can be used to complete communication to those normally served by the other ring in the event of a failure somewhere in the ring.

Figure 29:
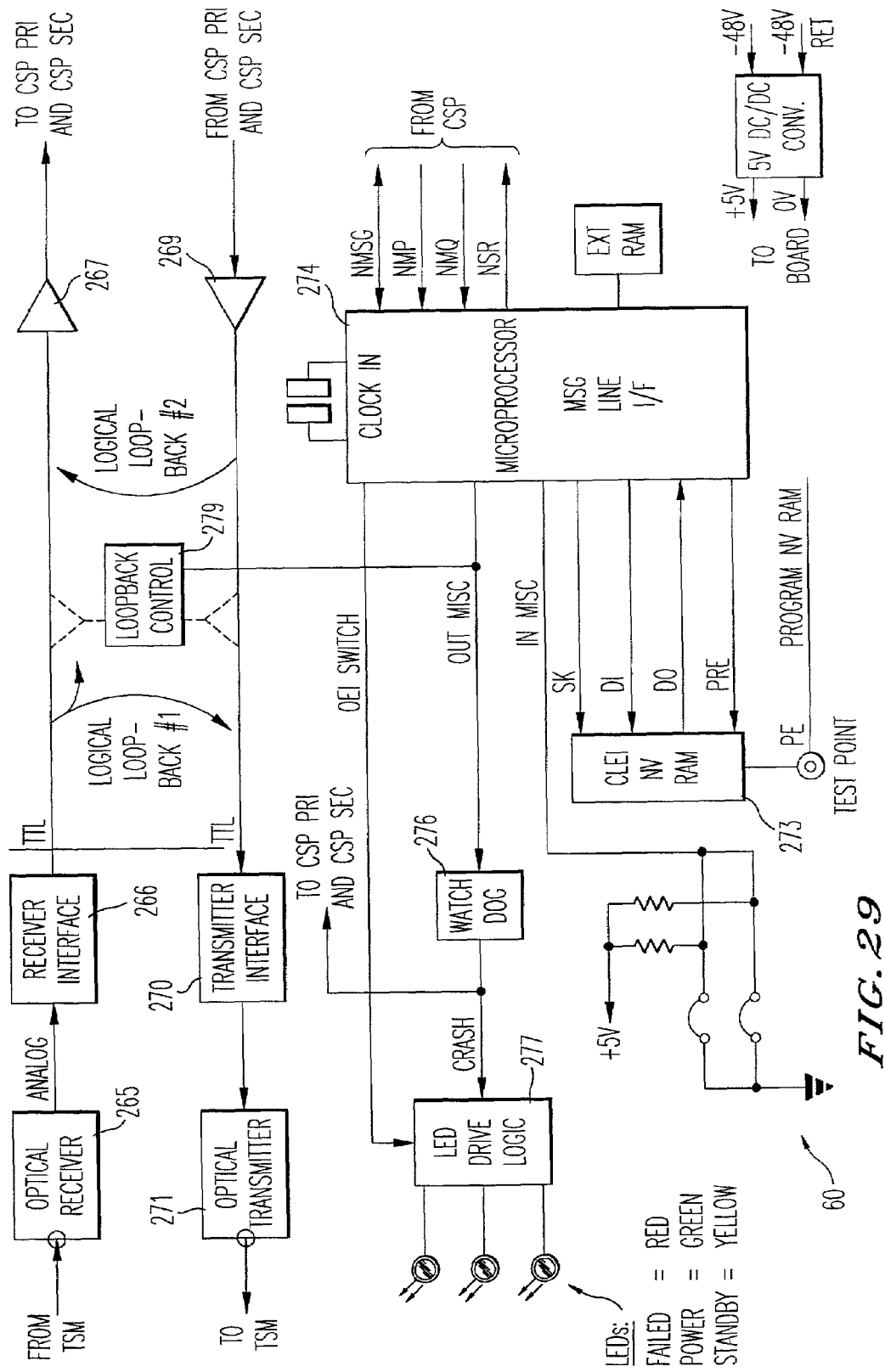
FIG. 29 is a schematic block diagram of an optical-electrical interface unit constructed in accordance with an embodiment of the present invention.

A block diagram of the OEI is shown in FIG. 29. The optical signal is received by a fiber optic receiver 265, such as an AT&T ODL-50 which has an ST-type fiber connection, and a receiver interface 266. The output of the optical receiver interface is transistor-transistor logic (TTL). The signal is buffered and then driven-by a bus driver 267 across the channel shelf backplane to the CSP for further processing.

In the receive direction, the CSP drives the channel shelf backplane with the scrambled TTL STS-1 SONET framer output. This information is received by a terminating buffer receiver 269 on the OEI and is input to an optical transmitter interface drive circuit 270 and to an optical transmitter 271 such as an AT&T ODL-50. The LED transmitter operates at a wavelength of 875 nm.

The fiber connection of the optical transmitter is also an ST-type connector. The transmitter is capable of driving a wide range of optical cable types, which allows the system to offer more cost effective cable options based on the subscriber requirements.

The OEI CLEI code is held in a 64*16 EEPROM 273. The timing signals necessary to read the CLEI information are supplied from an on-board 68HC05 microcontroller 274. This microcontroller also communicates with the CSP over the new message line interface of the present invention. This allows the CSP to read the CLEI code information by sending a message over the message line to OEI microcontroller 274.

A 68HC05 microcontroller output port is pulsed once per program cycle. These pulses are differentiated and used to reset an external timeout circuit 276. If the software crashes, the timeout signal activates a drive logic circuit 277 which turns on an OEI fail light and resets the microcontroller. If the microcontroller successfully initializes, the fail light is turned off.

Microcontroller 274 is a masked version of the 8051, running at a frequency of 4.0 Mhz. The microcontroller masked program is a general purpose program which allows the same masked processor to be used in different applications. Two such applications are for the CFU and the OEI. The microcontroller has the ability to execute code from different pages in RON, each page containing application-specific code. A 2 bit "Application Code" is read by the microcontroller at boot to give the page information.

A loopback control causes a line loopback to loop the signal received from the ASRG card back towards the ASRG card. During this loopback, the data path is not broken towards the CSP. Loopback control 279 is controlled by the CSP over the PSC-5 message line. In terminal loopback, the data received from the CSP is looped back to the CSP. During this loopback, the data path is broken towards the ASRG card. This loopback is controlled by the CSP over the PSC-5 message line.

Test Bus Segmenter

Figure 30:
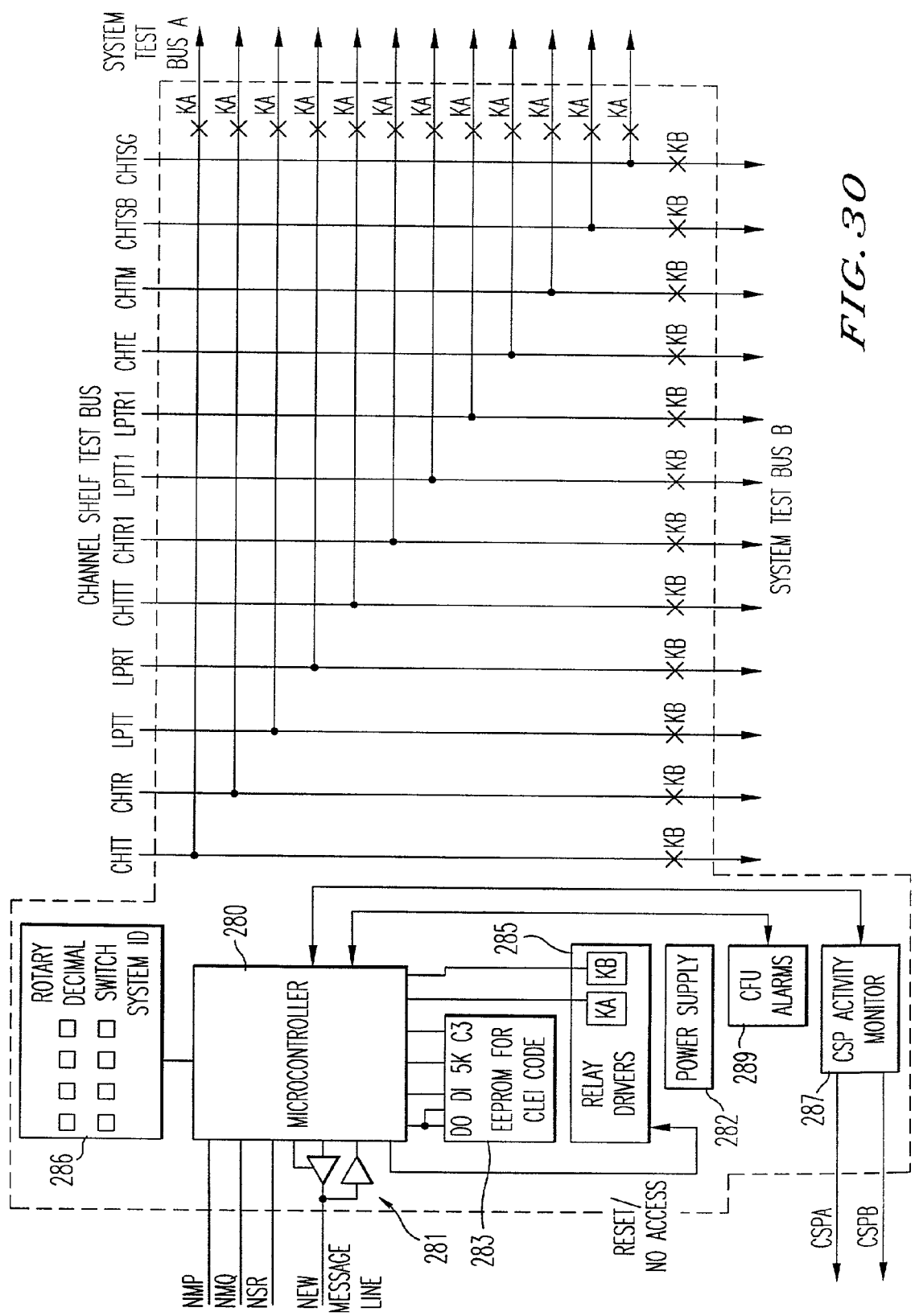
FIG. 30 is a schematic block diagram of a test bus segmenter (TBS) constructed in accordance with an embodiment of the present invention.

There is a single Channel Shelf Test Bus within each channel shelf providing access to all the circuits on that shelf. The Test Bus Segmenter (TBS) 42 contains relays KA and KB which connect the Channel Shelf Test Bus to one of the two System Test Busses under the control of a remote test system. A block diagram of the TBS is shown in FIG. 30. The TBS has its own power supply 282.

The TBS communicates with the CSP via an on-board microcontroller 280 and the New Message Line interface 281. This interface provides a serial one-wire half-duplex asynchronous communications channel operating at 62.5 Kilobits per second. An EEPROM 283 is provided for CLEI code and inventory purposes. The TBS unit interfaces with the 12-wire channel Shelf Test Bus and both System Test Busses. The TBS has the capability to check Read and Write functions for all the registers, to monitor checksum on the software code, and to check all the accessible circuitry on the card.

On initial power-up, microcontroller 280 goes through power-up diagnostics and forces NSR low in order to report its status and existence to the CSP. NSR provides the means by which the TBS informs the CSP that it requires service. Using the NMP and NMQ lines, the CSP activates an appropriate one of relay drivers 285 to energize a relay KA or KB, closing contact sets KA or KB, and polls the cards on the corresponding Channel Shelf and uniquely accesses each one. The CSP polls the cards for status changes and existence in the slot by checking the NSR lines and determines that the TBS is physically present. Then using the NMP and NMQ signals, the CSP enables the New Message line and assigns an address to the card. The card address is stored in a memory location. The TBS also includes a rotary decimal switch system ID unit which permits the BOC to select identification for test rail and also includes a CSP activity monitor 287 and CFU Alarms unit 289, both of which communicate bidirectionally with controller 280.

Channel Shelf Processor (CSP)

Figure 31:
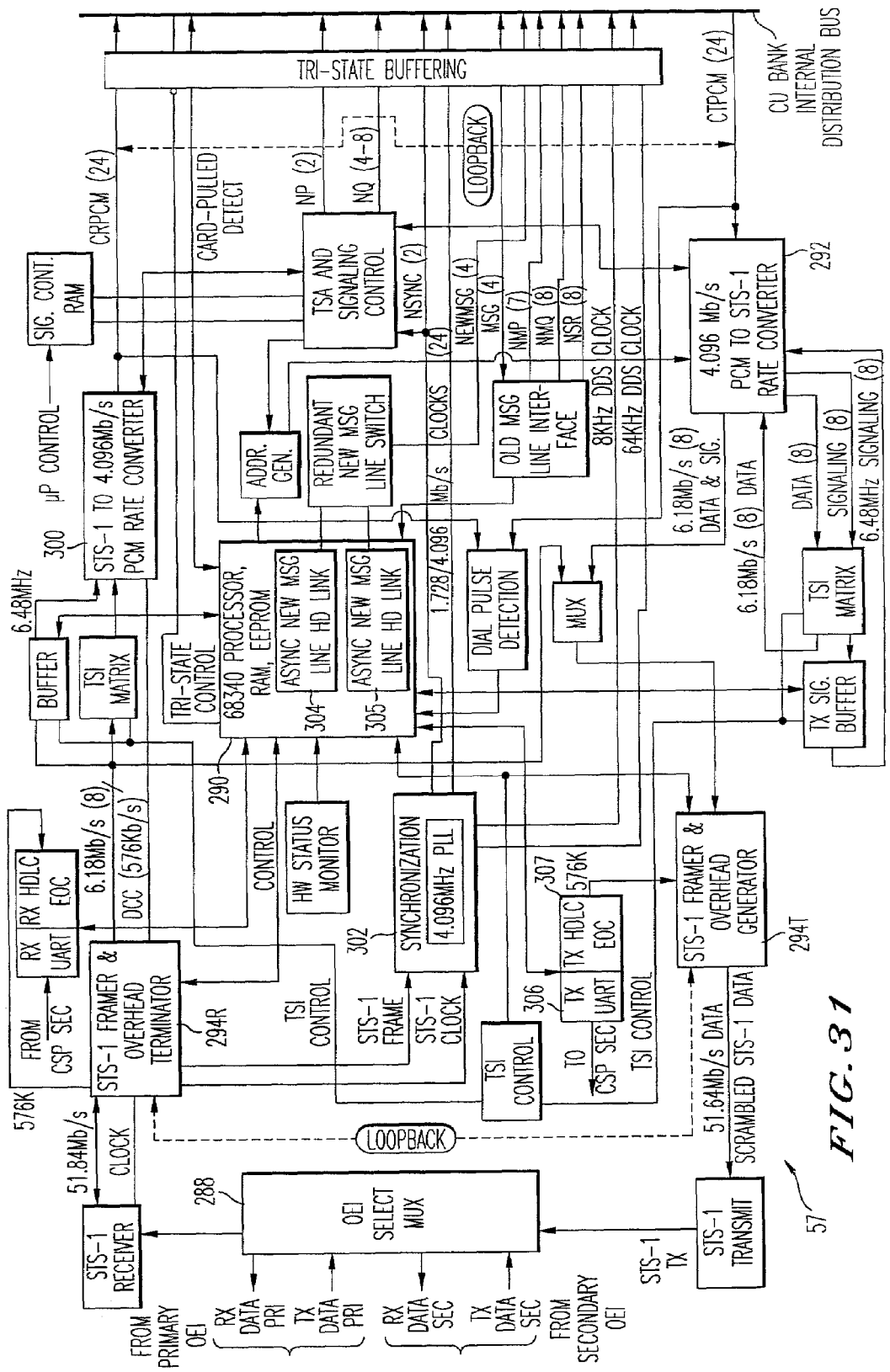
FIG. 31 is a schematic block diagram of a channel shelf processor (CSP) constructed in accordance with an embodiment of the present invention.

The CSP 57 is a common equipment module which plugs into the channel shelf and provides the interface between the common shelf and a shelf of channel units in a CU bank of the present invention. As previously discussed, there are two CSPs in each channel shelf, CSP A and CSP B. The CSP B acts as a hot standby for CSP A, in the event of CSP A failure. In the following description "CSP" is assumed to refer to CSP A unless otherwise stated. A block diagram of the CSP is shown in FIG. 31.

The CSP accepts modified transmit and receive STS-1 rate streams containing up to 672 DS0 channels each. These streams are received by OEI Select Mux circuit 288 from two OEI modules 60 and form a virtual connection between the CSP and the ASRG cards 38, 39 located in the common equipment shelf 26.

In the channel unit VF receive direction, the timeslots present in the STS-1 signal are routed to individual channel units on DS0 boundaries by the CSP. In the channel unit VF transmit direction, timeslots on DS0 boundaries are combined into the STS-1 stream by the CSP, for transmission to the ASRG card via the OEI.

For synchronous services wherein the channel unit digital service payload is synchronized to, the system, or it is an analog channel, signaling bits embedded out of band in the STS-1 from the ASRG card are extracted and routed to the channel units in the upper byte of the 4.096 Mhz backplane PCM stream. CU-generated signaling is extracted from the 4.096 Mhz stream and inserted into the STS-1 stream. The PCM streams are identical in function to those used on PSC-5, and all the status bit use, as well as signaling bit use, is supported. In cases where the services are asynchronous, the backplane is clocked at 1.728 Mhz, and the signaling is passed through to the channel unit without removing it from the virtual tributary.

The CSP serves all 48 slots in the channel shelf, and each slot supports any bandwidth service up to 12 DS0s with no slot restrictions. Services requiring a bandwidth greater than 12 DS0s up to a maximum of 27 DS0s can also be supported from the even slots in the shelf, with the restriction that no other channel unit is served in the odd slot adjacent to that slot.

CU 4.096 Mhz/1.728 Mhz VF Transmit Direction

There are 24 transmit-PCM streams, with each PCM stream being shared by the odd and even slots. For example, slots 1 and 2 share PCM stream #1. Each slot can supply up to 12 DS0s or one channel unit can supply any bandwidth from 13 DS0s to 24 DS0s, provided the adjacent slot does not have a different channel unit installed. For many channel units, such as dual or quad POTS, this bandwidth is only partially utilized. Asynchronous services run at 1.728 Mhz and outputs 27 DS0s from the even numbered slot.

In CU VF Transmit Direction Digit Collection, the CSP buffers samples of the ABCD signaling bits and the F bit in the receive direction, and interrupts microprocessor 290 at a rate suitable for digit collection. On each interrupt, microprocessor 290 reads the signaling bits, the PCM number and the channel number. Interrupts are preferably only generated on active timeslots. The microprocessor uses the detection of ON HOOK and OFF HOOK to inform the NEP that a Call Initiate or Call Tear Down sequence should begin. The CSP microprocessor also interprets the F bit in order to attach correct meaning to the signaling changes on ABCD. The CSP collects dialed dial pulse digits and hook flashes and passes the information to the NEP via the datacomm channel.

In CU VF Transmit Direction Rate Conversion And CU Strobe Generation, the 4.096 Mhz/1.728 Mhz PCM timeslots from the CUs are applied to a rate convertor 292 which inserts them, including ABCD signaling if applicable, Into 28 VT1.5 frames. The CUs of the present invention time their time slot access based on NP and NQ pulses generated by the CSP. The NQ pulse width conveys multiframe timing in the case of synchronous channel units. In the case of asynchronous channel units, the NQ pulse informs the channel unit when to put out the V5 byte. The CUs of the present invention utilize a single NP/NQ pair per CU slot, asserting DS0 timeslots when strobed. Older PSC-5 CUs utilize separate NP/NQ pairs.

For CU VF transmit direction DS0 timeslot assignment and signaling buffering, the output of the rate converter are data and signaling busses, each 8 bits wide running at 6.48 Mhz. These busses are passed through a 672*672 dynamic timeslot assignment switch which is controlled on a per call basis by the Network Element Processor (NEP) via the SCP to the CSP. At the output, the signaling bytes corresponding to synchronous services have to be buffered for a maximum of 125 microseconds before they can be inserted into the 6.48 Mhz STS-1 framer (SOT-1) transmit bus. In the case of an asynchronous service, data and signaling are read from the same byte of the timeslot assignment buffer.

In the CU VF Transmit Direction STS-1 Frame Assembler, the 6.48 Mhz transmit bus containing data and signaling bytes for all subscribers is input to an STS-1 framer 294. This bus contains the payload for up to 28 VT1.5 frames from the rate converter and this payload is assembled into a simplified SONET STS-1 structure. The VT1.5 multiframe alignment is fixed to the same value as the H4 byte offset value received from the common equipment shelf 26. The output of STS-1 framer 294 is a serial clock and data stream at a rate of 51.84 Mhz.

In normal mode, the STS-1 576 Khz DCC is used to carry the CU VF Transmit Direction datacomm channel used for CSP to NEP communications. This datacomm channel is a HDLC protocol. The data bytes originate from microprocessor 290 and are fed to an external HDLC level 2 protocol handler. A data clock synchronous with the STS-1 $D_4$ to $D_{12}$ bytes parting is generated, to clock the HDLC data serially out of the HDLC controller.

For CU VF Transmit Direction Data Encoding, the STS-1 interface adds A2, A1 framing and calculates BIP parity on the input payload data. Then the data are scrambled to ensure sufficient "ones" density to recover the clock at the other end. All overhead generation and scrambling is per TA-NWT-253. The data are then driven via a bus driver to the Optical Electrical Interface module (OEI). If the ASRG card detects the occurrence of BIP parity errors, LOS, or LOF, this results in a switchover to the redundant CSP.

In the CU 4.096 Mhz/1.728 Mhz VF receive direction, the CSP receiver 298 receives the scrambled data from the OEI module. The scrambled data drives a phase locked loop within STS-1 framer 294R which is used to recover the 51.84 Mhz clock from the received STS-1 data. Additionally, the data are descrambled to the polynomial $X^7+X^6+1$. The data stream is then clocked into the STS-1 receive framer 299 where it is descrambled completely. Next, framing and parity are detected from the Sonet STS-1 section overhead (A1, A2) bytes and BIP-8 (B1) overhead bytes respectively. The framing overhead is used to generate a 3 mS STS-1 multiframe pulse and a 6.48 Mhz byte clock. The STS-1 payload is clocked out of the framer chip on byte boundaries into the DS0 Time Slot Assignment function.

In the event of an optical link failure between the CSP and the ASRG, the CSP performs freeze frame and trunk conditioning to all applicable channel units as well as DS0 idle code insertion towards the drop. The CSP also transmits an Alarm Indication Signal (AIS) upstream toward the ASRG card.

For CU VF Receive Direction DS0 Timeslot Slot Assignment And Signaling Buffering, the parallel 6.48 MHz payload data received from the STS-1 framer is clocked into the DS0 Timeslot assignment function, and under microprocessor control, is dynamically assigned to appropriate output timeslots during the call setup and tear down process. Signaling can not be switched through the timeslot assignment since the relationship between STS-1 subscriber data and corresponding signaling is frame sensitive, whereas the timeslot assignment function is insensitive to frame number. The signaling is therefore buffered for a maximum of 125 microseconds before it is read out to match the corresponding switched DS0 information. The switched DS0 data and signaling are then input to the PCM rate converter 300.

In CU VF Receive Direction Rate Conversion and Channel Unit Strobe Generation, basically up to 28 VT1.5s are extracted from the STS-1 structure (51.84 MHz) received from the OEI module. The VT1.5 multiframe alignment is derived using the SONET path overhead H4 bytes. This multiframe timing is used to produce the PSC-5 compatible NSYNC 4.096 MHz backplane sync signal, and to produce a phase locked 4.096 Mhz clock. For 4.096 MHz synchronous PCM operation, the time slot assignment strobes NP and NQ are modulated on a per subscriber basis by information passed over the datacomm channel from the Signaling processor card to the CSP communications link. The subscriber NP/NQ pulse modulation information is updated when DS1 relative frame alignment changes or the DS0 cross connect delay changes. For 1.728 Mhz asynchronous PCM operation, the NQ pulse is not modulated. Instead, it carries V5 byte sync information for that particular VT/subscriber. The assertion of the appropriate NP/NQ line by the strobe generator informs the channel unit when to sample data from the PCM bus.

For CU VF Receive Direction Digit Insertion, the CSP translates messages received from the datacomm channel into dial pulse digits. These digits are then written in the form of ON HOOK/OFF HOOK signaling codes to the signaling buffer. The dialed digits are read out of the signaling buffer in real time and inserted into the PCM stream towards the channel unit by the rate converter.

Bit timing is derived by phase locking the backplane timing to the clock recovered from the received STS-1 scrambled data. The CSP is loop timed from the common equipment shelf. Frame timing is derived from the STS-1 framer using a 4.096 MHz phase-locked loop 302. 8 KHz and 64 KHz clocks for DDS, ISDN, and other data services are also derived from this master timing. Additionally, the CSP produces a 1.728 MHz clock (VT1.5 rate) which is derived from the 51.84 MHz line timing. This clock is used to support asynchronous services.

CSP microprocessor 290 is a Motorola MC68340 running with a 16.67 MHz crystal. The core also contains 256 K bytes of page erasable ROM and 256 k bytes of RAM. The processor core handles 5 communications channels. Two 68340 on-chip UARTs 304 and 305 handle the two 62.5 KHz asynchronous 9 bit, half duplex new message line channels (NMSG1 and NMSG2). The UART clock is derived from an external 4 MHz resonator circuit. An external memory mapped protocol handler chip supplies an asynchronous UART 306 and a synchronous HDLC level 2 controller 307.

The UART is a full duplex async 64 KHz communications link between the primary and backup CSP. The HDLC controller handles the level 2 protocol on the CSP to SCP/NEP datacomm channel, embedded in the STS-1 $D_4$–$D_{12}$ bytes. The CSP is configured to pass the 576 KHz DCC to the HDLC controller. The fifth communications channel that the microprocessor core has to handle is the PSC-5 compatible message line.

Processor 290 interprets messages received over the datacomm channel, via the HDLC controller, and assembles messages to send over the datacomm channel. Messages include: memory administration messages which require translation to program the PCM strobes of the programmable strobe generator for support of the PSC-5/SLC5 channel units; update of multiframe boundaries to the programmable strobe generator; and messages from the CUs for test, loopback, provisioning, alarms, ISDN overhead, and such which are translated, if required, and ported to the MSG line interface. The CSP also services NSR requests from the CUs. Processor 290 also monitors nodes within the CSP, parity between the ASRG card and the CSP for faults and performs periodic internal diagnostics.

Messages from the NEP/SCP via the datacomm channel are translated into dial pulse ON HOOK/OFF HOOK signaling towards the drop. Messages are sent from the CSP to the NEP over the datacomm channel to initiate a Call Setup sequence, after the CSP detects a change in signaling from ON HOOK to OFF HOOK sent from a CU. Messages are received from the datacomm channel to control the CSP dynamic timeslot assignment required in concentrated TR303 or TR8 mode.

The programmable strobe generator provides NP and NQ time-slot-select strobes for use with the PSC-5/SLC-5 channel units. Strobe timing is based on the STS-1 (3 mS) multiframe timing reference and time slot selection is fully programmable. Multiframe timing for NQ pulse width modulation required to multiframe-time the CUs is settable per channel by the processor. For asynchronous digital DS1 rate extension, the NQ line to the channel unit slot carries VT1.5 frame timing for the V5 byte location, which allows the DS0 #1 of the asynchronous service to be located by the channel unit.

The message line interface is the communications interface between the CSP and the channel units. The message line interface emulates the functionality of the Series 5 ADU, including the original message line interface and the enhanced message based interface. For support of the original message line interface, MSG line and an NSR NMP and NMQ timing are provide for a shelf of 48 channel units under the control of the CSP. For support of the new message line interface, an additional signal, NEWMSG, provides half-duplex asynchronous multidrop transmission.

DS1 Extension/ISDN Primary Rate Cards

The DEU (DS1 extension unit) is a channel unit plug-in replacement to provide a DS1 extension or primary rate ISDN service in a channel bank of the present invention. The DEU plugs into any channel unit slot in the common equipment bank. It provides a synchronous or an asynchronous digital extension. Two types are provided, one with DSX-1 interface, and one with T1 and power feed.

The Pulsecom DEU provides a DS1 rate interface at the RT (remote terminal) of the TR-TSY-000303-compatible IDLC system of the present invention, and at the RT and COT (central office terminal) of the TR-TSY-000303-compatible UDLC system of the present invention.

On the customer's or subscriber's side, the DEU provides a DS1 interface for CPE (customer premises equipment) such as multiplexer, digital PBX, D4 channel bank, D4 digital data bank, or ISDN terminal. On the network side, the DEU provides a DS1 interface to typical digital network elements such as DCS (digital crossconnect system), an ADTS (automated digital terminal system), a channel bank (such as a D4 channel bank or another PSC-5 system), ISDN switch, or a foreign exchange digital switch.

The standard DEU provides for DS1 clear channel capability using B8ZS (192-bit transport) with ESF which permits its application in terminating and transporting ISDN primary rate service. The ESF or TR-8 data link is terminated at the DEU in synchronous mode. In async mode, the DS1 is passed through transparently onto the VT1.5 embedded in the PCM stream. The data link is monitored but not altered.

The functions of the unit include but are not limited to the following:
  ESF, SF (D4), or SLC-96 framing format
  ZBS, B8ZS, or ZBTSI ones-density fulfillment. The DEU uses CSP byte-oriented signaling and generates its own multiframe.
  Robbed bit signaling or CSC (common signaling channel)
  T1 alarm detection and generation: yellow alarm (ESF and b2=0) and AIS (unframed all ones).
  T1 error detection: CRC, BPV, frame errors, and loss of signal.
  Internal channel bank error detection: parity errors and loss of internal clock.
  Detection of FELB (far end loop back) activation (1100) and deactivation (1110)
  Local and remote loop-back
  Provides rate conversion between 1.544 Mb/s DS1 facility and channel bank internal VT1.5 PCM rate.
  Provides signaling buffering, freeze and trunk processing signals to channel units.
  Transmit 1.544 MHz clock locked to internal clock.
  T1 tip or ring ground detection.
  Supports power-on plug-in replacement.
  Does not support equipment redundancy.
  Digital facility-access provided for fault locating and monitoring on front panel.
  Self diagnostics of board synchronization signals, data busses, and other critical paths; historical records
  Error history: CV (coding violations), OOF (out of frame), ES (errored seconds), SES (severely errored seconds), UAS (unavailable seconds), and DM (degraded minutes).
  Interfaces to CSP over internal new message link maintained.
  Remove inventory support.
  All options remotely configurable.
  Two separate cards made with interfaces to DSX-1 and T1 cable interface with power feed.

The DEU is remotely or locally provisioned and stores its provisioning in an internal non-volatile memory. Options include:
  Signal Format: SF with ZBS or B8ZS,
    ESF with ZBS or B8ZS
    ESF with ZBS or B8ZS
  Transmit Pre-Equalization: Up to 132 feet
    133 to 265 feet
    266 to 398 feet
    399 to 532 feet
    533 to 655 feet The DEU allows for valid conversions of signal formats and ones-density options between subscriber and network sides of the RDT. When the T1 interface is provisioned, programmable LBO is provided.

Figure 32:
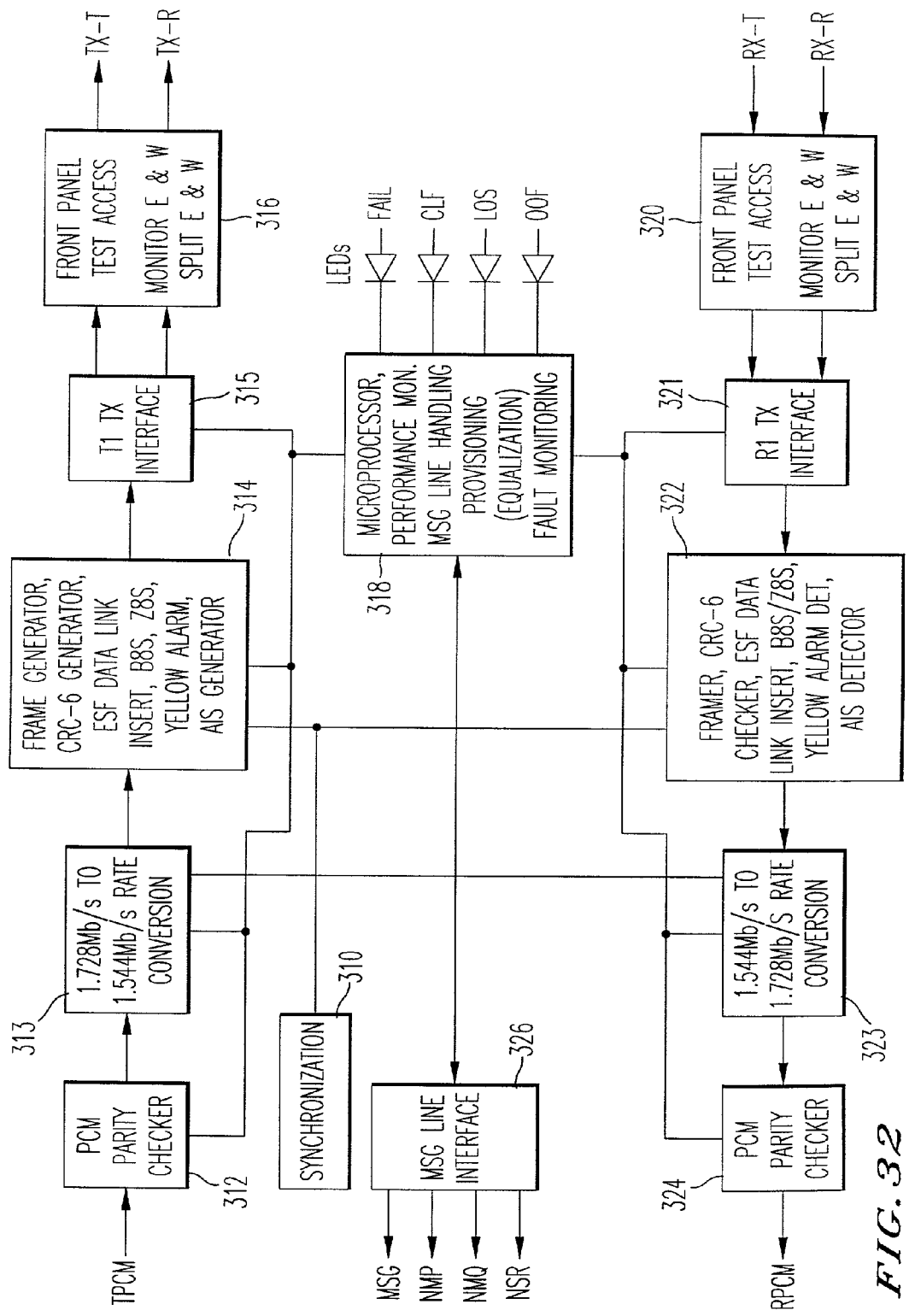
FIG. 32 is a schematic block diagram of a DS1 extension unit constructed in accordance with an embodiment of the present invention.

A block diagram of the DEU is shown in FIG. 32. A synchronization unit 310 provides synchronization with CPE as a stratum 4 node derived from an internal PSC-6000 clock, which is free running if references are lost. Synchronization of subtended digital network elements is achieved by loop timing from the RDT transmissions.

In the transmit direction (toward the DS1 interface), TPCM input is received by a parity checker 312 which checks parity and passes the signals to a rate conversion unit 313 in which the DEU converts an internal 1.728 Mb/s VT1.5 format from the CSP to the 24-channel 1.544 Mb/s DS1 rate. After rate conversion, a generator unit 314 inserts signaling, framing and new data link (ndl) bits where applicable. The unit automatically determines the framing format of the system, either ESF or SF, and an interface circuit 315 provides the proper interface. The output to the DS1 is Tx, T and R, and also provides test access at a front panel 316. These components are under the control of a microprocessor 318.

In the receive direction, inputs Rx T and R are received and processed by units 320–324, also under the control of microprocessor 318. The DEU converts the incoming DS1 signal to an internal 1.728 Mb/s VT1.5 format for presentation to the CSP. It also extracts received signaling bits and microprocessor 318 monitors the received signal for bipolar violations, loss of frame, and loss of signal. This line status information is reported to the bank controller. When the RT is acting as an intermediate DS1 node (i.e., no grooming at the RT), the DEU generates downstream alarms as defined in Section 3.7.4.6 of TR-TSY-000303. The DEU can perform bank and group loop-backs under command of the bank controller, allowing the bank controller to provide sectionalized failure information.

A message line interface unit 326 in the DEU communicates with the CSP via the new message line. The CSP reads the DEU CLEI code upon power-up and then provides configuration information. It then monitors the status of the DEU periodically. The DEU alerts the bank controller immediately upon detection of an error condition. The DEU provides east and west monitor and full split capability via front panel jacks.

ISDN primary rate is transported via the DS1 extension, since it is transported as a byte-synchronous VT1.5 payload. There is, however, a special requirement to provide DLC system access to each primary rate ESF EOC and to provide mediation as described in TR-754, Issue 1, Section 6.3 and TA-784 to the IDLC EOC. The ISDN primary rate CU is therefore a synchronous DS1 extension with the capability to transport the ESF EOC back to the NEP via the message interface. The datacomm processing function on the common shelf performs translation between the PRA EOC and the IDLC EOC.

Quad POTS Channel Unit

The QPOTS-RT (quad POTS channel unit—remote terminal) provides dual single-party MTS (message telephone service) by interfacing four voice-frequency current-feed subscriber loops between the digital loop carrier system and four end subscribers.

The QPOTS-RT offers LS (loop start) service and plugs into a channel shelf located at the RT. It works in conjunction with a QPOTS-COT (quad channel unit—central office terminal), an AUA38 or AUA31 (POTS) unit, or with an AUA39 or AUA32 SPOTS (special plain old telephone service) unit operating in LS mode only, located at the COT. It also works in conjunction with a PWP10 or WP10D POTS unit in the CO, or with the WP36 SPOTS unit, if LS mode only is required.

The QPOTS-RT has a nominal tip-to-ring impedance of 900 ohms in series with 2.16 microfarads, and operates with a subscriber loop ranging from 0 ohms to 900 ohms (excluding telephone set), and source current of 20 mA to 30 mA depending on loop resistance. Transmit and receive insertion losses are nominally 1 dB, with maximum losses of 5 dB during OHT (on hook transmission) conditions. Additionally, the CU programmably powers down as much circuitry as possible in idle mode to minimize power. This channel unit has the following features:

Supports four subscriber loops on a single card.

Meets or exceeds appropriate transmission, supervision, and signaling criteria of TR-TSY-000057 and TR-TSY-000303.

Front panel test points for direct access to tip and ring of all channels.

Four LEDs indicate which channel is busy.

Rotary and DTMF (dual-tone multi-frequency) compatible.

Compatible with subscriber key set systems.

Figure 33:
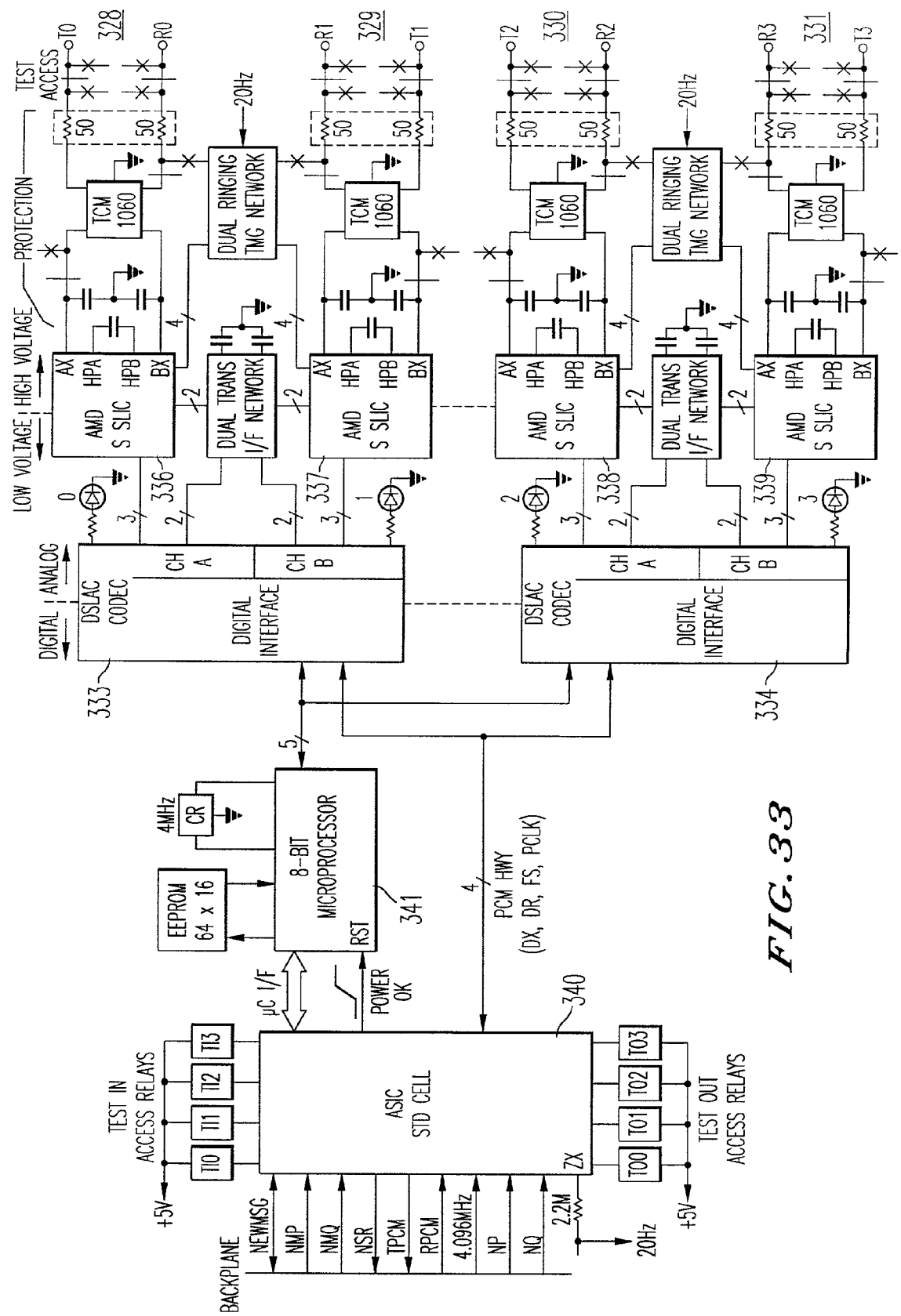
FIG. 33 is a schematic block diagram of a quad-POTS channel unit constructed in accordance with an embodiment of the present invention.

A schematic block diagram of the channel unit is shown in FIG. 33. The QPOTS-RT, in conjunction with the system of the present invention, interfaces four independent 2-wire voice channels 328, 329, 330 and 331 with the digital line. The timing to access each separate channel is provided by the bank common equipment. Each voice channel provides a nominal 1.0 dB insertion loss in both transmit and receive directions and requires no adjustment. Because all four channels are electrically identical, the following description will concentrate on a single channel and apply equivalently to all.

Incoming VF signals on tip and ring are passed to the transmit section of one of combos 333, 334 via a solid-state SLIC (subscriber line interface circuit) 336, 337, 338 and 339. Each combo is a combination of a codec plus a filter, and has an analog side as well as a digital gate array side. The combo uses the filter to limit the incoming VF range to a nominal 300 Hz to 3400 Hz and then performs an A-D conversion before passing it to the digital interface portion of the combo gate array as 8-bit PCM. In the embodiment shown, each incoming channel has one SLIC, and each combo handles two channels from the SLICs.

The signaling portion of each combo gate array generates the necessary supervisory signaling codes (to be sent to the COT) and passes them on to the digital interface portion of the gate array. The CU generates signaling codes as specified in TR-TSY-000303, Issue 1, Revision 2, Table 12-2b.

Once every 125 microseconds, the digital interface portion of a gate array in a combo 333, 334 in the QPOTS-RT forwards the 8-bit PCM word, followed by seven bits of signaling information and 1 parity (odd) bit through the ASICs standard cell 340 onto the TPCM (transmit PCM) bus in the correct time slot. The correct time slot is preassigned into the CU for each individual channel as each CU has its own PCM bus and the dynamic assignment is done at the ASRG card and CSP. The CU does not require programmable assignment to the PCM bus unless it has to operate in an environment with shared PCM busses. Internal counters locate the slot based on the 4.096 MHz clock and NP and NQ signals.

The digital interface portion of the gate array also generates signaling used for channel bank internal supervision and supports the link to the common equipment via the MSG interface.

In the Receive (RX) Path, the VF and signaling information being transmitted by the COT channel unit is sent along the digital line in the form of PCM. The RT common equipment directs the incoming PCM onto the RPCM (receive PCM) bus where, at the appropriate time corresponding to the position in the channel bank, the channel unit accepts the RPCM.

Every 125 microseconds, the digital interface portion of the gate array accepts the RPCM word and decodes it into VF and signaling information. The correct time slot is pre-assigned into the CU. Internal counters locate the slot based on the 4.096 MHz clock and NP and NQ signals. The signaling information (7 bits A, B, C, D, E, F, G codes and 1 parity [odd] bit) is used for channel unit and line supervision. The CU detects signaling codes as specified in TR-TSY-000303, Issue 1, Revision 2, Table 12-2a.

Next, the VF PCM (8 bits) is passed to the receive section of the combo 333, 334. The combo carries out a D-A conversion, and passes the resultant analog VF through a low pass filter (which limits it to a nominal 3400 Hz) to tip and ring via the appropriate one of SLIC chips 336–339.

The digital interface gate array interfaces the common equipment with the QPOTS-RT by transmitting and receiving data on the bi-directional new message line. This data includes channel unit identification, power-up, power-down, and channel test.

A microprocessor 341 supervises activity of the QPOTS-RT and performs the following functions:
Initializing CODEC
Interpreting message line messages
Fault detection
Signaling supervision
CLEI EEPROM access
Controlling test access relays
Provisioning In the following description, where reference is made to codes sent to or received from a COT, the codes are also applicable to sending to or receiving from an integrated terminal. When a subscriber initiates a call, a SLIC chip 336–339 senses the subscriber going off-hook and sends a loop current detect condition to microprocessor 341 which inserts the off-hook code on to the PCM bus for transmission towards the COT. The COT receives the code and closes the CO loop. Dialing consists of either DTMF tones being sent over the voice path towards the COT, or dial pulsing using alternating idle and off-hook codes to open and close the COT channel unit loop relay. If the subscriber terminates the call the RT sends the idle code toward the COT. The COT channel unit opens the CO loop which terminates the call.

The CO originates a call by applying ringing on the ring lead of the COT channel unit. Ringing is detected and the ringing code is sent towards the RT. The ringing code is detected by microprocessor 341 and the ringing relay is activated, causing the ringing voltage to be sent to the subscriber. The SLIC chip 336–339 associated with one of channels 328–331 leading to that subscriber senses the subscriber going off-hook and sends a ring trip detect condition to microprocessor 341. The ringing relay is deactivated and the off-hook code sent towards the COT. The COT channel unit closes the loop relay, CO ringing is tripped, and the line is seized.

The CO terminates the call by opening the loop to the COT channel unit. The channel unit sends a forward disconnect code towards the RT, and the QPOTS-RT interrupts the subscriber loop current for 1.5 seconds.

For a channel test, on receiving the test code (TR-8 mode) from the COT, the gate array 333 or 334 in conjunction with microprocessor 341 in the QPOTS-RT drives NSR low which alerts the CSP and the test subsystem in the common shelf. The common equipment polls the QPOTS-RT microprocessor via the message line controlled by the CSP and recognizes the test request in one of the registers. Once the CTUs (channel test units) have initialized, the common equipment tells the digital interface portion of the gate array to energize the test relay. The channel test relay connects the line-side tip to CHTT and ring to CHTR, and connects the drop-side tip to LPTT and ring to LPTR. The channel test code is removed and the common equipment allows the gate array, in conjunction with the microprocessor, to return NSR to the normal high state. The channel unit remains in this condition until the tests are complete and the common equipment tells the digital interface gate array to release the relay.

In TR-TSY-303 mode, the test command is received in the EOC by the common equipment and the QPOTS-RT is sent the relay control message directly.

Digital Loon Carrier Fault Conditions

The Tx and Rx voice paths pass VF while the subscriber is on-hook, permitting on-hook transmission. Exceptions to this may occur during system fault or reduced power conditions at which time the combo is powered down and transmission ceases. The on-hook transmission capability is programmable as follows:

No on-hook transmission

Part-time on-hook transmission during the silent interval between the first and second power ringing signals of a terminating call as specified in TR-TSY-000030, Section 3.3.1.1.

Full time on-hook transmission; requires a nailed-up time slot.

The ISDN primary rate channel unit, PRA (primary rate adaptor) is identical to the Synchronous DS1 Extension Unit. The ISDN primary rate signal is transported as a byte-synchronous VT1.5 payload. There is, however a special requirement to provide DLC system access to each primary rate ESF EOC and to provide mediation as described in TR-754, Issue 1, Section 6.3 and TA-784 to the IDLC EOC. The ISDN primary rate CU is therefore a synchronous DS1 extension enhanced to transport the ESF EOC back to the common shelf processor via messages through the message line, the CSP, the CSP-to-ASRG datacomm channel, and then on the internal LAN. The common shelf processor then performs translation between the PRA EOC and the IDLC EOC.

Virtual Tributary Mapper Apparatus and Method

The following is a description of the functionality, timing and electrical characteristics of a preferred embodiment of the virtual tributary mapper circuit of the present invention. The virtual tributary mapper circuit (e.g, on VTG card 53 depicted in FIG. 7) is preferably implemented as an application-specific integrated circuit (ASIC), and shall hereinafter be referred to as the VTM ASIC or ASIC. Other devices and methodologies for producing electronic circuits, however, can be used. The description of the VTM ASIC is in accordance with the following general outline:

GENERAL OUTLINE

1. Introduction
   1.1 Overview
   1.2 Conventions
   1.3 VTM Asic VT and DS1 Mappings
      1.3.1 Floating Byte Sync VT to Locked Byte Sync VT
      1.3.2 Floating Async VT to Locked Byte Sync VT
      1.3.3 Floating Async VT to Floating Async VT
      1.3.4 DS1 to Locked Byte Sync VT
      1.3.5 DS1 to Floating Async VT
      1.3.6 DS1 to Floating Byte Sync VT
   1.4 Synchronization Flow
   1.5 Maintenance Flow
   1.6 Loopbacks
      1.6.1 Local Equipment Loopback
      1.6.2 DS1 Local Loopback
      1.6.3 VT Local Loopback
2. ASIC Description
   2.1 Receive Bus Interface
      2.1.1 Equipment Loopback
      2.1.2 Parity Monitoring
      2.1.3 STS-1 Selection
      2.1.4 STS-1 Tracking
      2.1.5 H4 Tracking
   2.2 VT Path Termination Module
      2.2.1 VT Pointer Interpretation
      2.2.2 VT Performance Monitoring
      2.2.3 P1P0 Filtering
   2.3 DS1 Transmit Interface
      2.3.1 VT Demapper
      2.3.2 Signaling Elastic Store
      2.3.3 Desynchronizer
      2.3.4 DS1 Mapper
      2.3.5 SLC-96 Interface
   2.4 Transmit Bus Interface
      2.4.1 Parity Generation
      2.4.2 EPM Parity Monitor
      2.4.3 STS-1 Selection
      2.4.4 STS-1 Tracking
      2.4.5 H4 Generation
   2.5 VT Path Generation Module
      2.5.1 V5 Byte Generation
      2.5.2 VT Path AIS Insertion
      2.5.3 VT Pointer Generation
   2.6 DS1 Receive Interface
      2.6.1 DS1 to Locked VT Mapping Mode
      2.6.2 Floating Byte Sync VT to Locked VT Mapping Mode
      2.6.3 DS1 to Floating Byte Sync VT Mapping Mode
      2.6.4 DS1 to Floating Async VT Mapping Mode
      2.6.5 Maintenance Signals Insertion
   2.7 VT Interface
   2.8 Microprocessor Interface
      2.8.1 R/W Register Control
      2.8.2 O Bit Access
      2.8.3 Timing between the Slice and Bus Interfaces
   2.9 DSP Interface
3. ASIC Interface
   3.1 Pinout
      3.1.1 TelecomBus Interface
      3.1.2 Microprocessor Interface
      3.1.3 DSP Interface
      3.1.4 Miscellaneous Interfaces
      3.1.5 VT Interface
      3.1.6 DS1 Interface
      3.1.7 Test Interface
      3.1.8 Power Supply
   3.2 Interface Timing
      3.2.1 Receive Bus Interface
      3.2.2 Transmit Bus Interface
      3.2.3 VT Transmit and Receive Interfaces
      3.2.4 DS1 Interface
      3.2.5 Microprocessor Interface
      3.2.6 DSP Interfaces
      3.2.7 Test Interface
         3.2.7.1. JTAG Boundary Scan
         3.2.7.2. Full Scan
         3.2.7.3 RAM Test
   3.3 AC Electrical Characteristics -continued 3.3.1 Clock Inputs
   3.3.2 Input Signals
   3.3.3 Output Signals 1. Introduction The following description of the VTM ASIC of the present invention assumes some familiarity with the following related documents:

Digital Hierarchy Optical Interface Rates and Formats Specifications. ANSI T1.105-1991.

Synchronous Optical Network (SONET) Transport Systems; Common Generic Criteria. Bellcore Technical Reference TR-NWT-000253, Issue 2, December 1991.

IDLC System Generic Requirements, Objectives, and Interface: Feature Set C- SONET Interface. Bellcore Technical Reference TR-TSY-000303, Supplement 2, Issue 1, October 1989.

Unidirectional, Dual-Fed, Path Protection Switched, Self-Healing Ring Implementation. Bellcore Technical Reference TR-TSY-000496 Issue 2, Supplement 1, September 1991.

FIG. 7 depicts a specific embodiment of an RDT in an IDLC system as described above. The RDT 24 comprises a common equipment shelf (CES) 26 and a number of channel shelves 28. Each channel shelf (CHS) 28 comprises a number of channel units 59 for interfacing with subscriber units 61. Each channel unit supports a particular type of subscriber service such as fiber optics, an integrated services digital network (ISDN), and plain old telephone service (POTS). The CES 26 provides the features that are central to the RDT 24, as described in more detail below.

Each OC-3 optical interface card 50 interfaces with an OC-3 feeder for converting optical signals therefrom into electrical signals and vice versa, as well as demultiplexing OC-N signals to STS-1 signals for further processing by the CES 26. Two identical OC-3 optical interface cards are provided for channels A and B, respectively. The OC-3 optical interface cards 50 also perform STS-1 SPE pointer processing, and Section, Line and Path overhead termination functions such as alarm detection, performance monitoring and controlling the access of other modules to Data Communications Channels (DCC) and Alarm and Order Wire (AOW) fields.

With continued reference to FIG. 7, demultiplexed STS-1 streams from the OC-3 optical interface cards are provided on Bus 1 to STS-3 Multiplexer (STSM) cards 51. The STSM cards 51 provide STS-1 space switching and the capability to add and drop STS-1 streams to and from High Speed Extension Cards (HSEXT) 67. The STSM cards provide a parallel 3xSTS-1 data interface on Bus 2 to the VTG/Quad DS1 (VTG) cards indicated generally at 53. The STSM cards also perform diagnostic loopbacks to diagnose and isolate faults on both the OC-3 optical interface card side and the VTG card side of the STSM cards 51.

There are preferably seven VTG cards 53 and one standby VTG card 53. The SCP cards 54 convert the Locked Byte-Sync VT format to a unique Locked Byte-Sync format. To accomplish this, the signaling bits contained in the VTs are reformatted so that all the signaling bits for a given subscriber appear in the same byte. The SCP cards also perform DS0 Unicode and Yellow Alarm processing on a per-subscriber basis and translate signaling between TR-TSY-303 mode and TR-TSY-8 mode as required, on a per-subscriber basis. After the VT1.5s have been processed and reformatted by an SCP card 54, the data is passed to an Access Shelf Ring Gateway (ASRG) card 38 or 39, which adds the STS-1 Path and Transport Overhead and then converts the 51.84 MHz data stream to an optical signal. This optical signal is then broadcast to all channel shelves on an optical token ring indicated generally at 58. The ring includes the two separate paths 41 and 42 on which signals pass in opposite A and B directions, respectively.

The optical signals -are converted back to electrical signals in the CHS 28 by Optical Electrical Interface (OEI) cards 60. Two OEI cards are associated with each CHS, one each for the A and B portions of the ring 58. These signals are then fed to a Channel Shelf Processor (CSP) card 57. The CSP card 57 recovers the STS-1 clock and data and then performs STS-1 pointer processing to locate the STS-1 SPE. The CSP then performs rate conversion on the VT payload and passes the VT DS0 Byte-synchronously to the synchronous channel units 59. In the case of asynchronous DS1 services, the CSP card 57 passes the VT transparently, without timing modification, to the channel units 59. Other functions of the CSP cards 57 include dial pulse digit collection and insertion, DS0 grooming and Dynamic Timeslot Assignment, ISDN-D channel multiplexing, and alarm processing.

The control of the entire system depicted in FIG. 7 is maintained by one 1:1 redundant processor group comprising two cards. These cards are one of two redundant Network Element Processor (NEP) cards 62 and one of two redundant Signaling Control Processor (SCP) cards 54. Network element control, OSI (open system interconnect) protocol processing, signaling processing and database functions are contained in the NEP/SCP processor card pair. The NEP and the SCP card pair communicate with each other via a memory read/write interface. Each SCP card also contains a redundant local area network (LAN) interface, shown by the dotted lines, to enable it to communicate with the redundant NEP/SCP group, as well as with other cards in the CES 26. The communication is also extended to the channel units 59 via embedded data channels in the STS-1 rate signals, allowing communication with both the CES 26 and the channel unit shelves 28. All other cards in the system (with the exception of older CUs) preferably have on-board microprocessors which deal with real-time processing. This keeps the real-time processing required by the main processors to a minimum. The call-processing function is the major function which requires real-time processing by the NEP/SCP processor group.

While the following function is not located in the primary signal path depicted in FIG. 7, it is contained in the CES 26. Twenty-eight DS1 feeders or extensions are available from the CES. These DS1s can be SLC-96, SF or ESF (Superframe or Extended Superframe) and can be mapped into asynchronous or byte-synchronous SONET floating or locked mode VT1.5 formats. As feeders, the DS1s can be TR-TSY-8 or TR-TSY-303 formatted. The 8 VTG cards 53 each have four duplex DSX-1 interfaces, arranged in a 1:7 equipment protection scheme. In the case of a VTG module failure, the complete module (4*DS1) is switched off the bus and the eighth VTG module is switched onto the bus. The DS1 feeders can be transported to the RDT 24 on a SONET path and terminated on a VTG card 53.

1.1. Overview

The VTM ASIC is designed to provide various digital signal and VT mappings to and from the locked payload used in the RDT 24 architecture disclosed in the above-mentioned U.S. patent application Ser. No. 08/031,395. In the embodiment described herein, each VTG card 53 has a pair of VTM ASICs to terminate four VT 1.5 payloads wherein one ASIC is used as a feeder interface and other ASIC is used as a channel interface. The VTM ASICs can terminate the four VT payloads (interpreting VT pointers), map VTs into DS1, DS1 into VTs, and VTs into VTs, and generate payloads in both the channel direction and the feeder direction.

Figure 34:
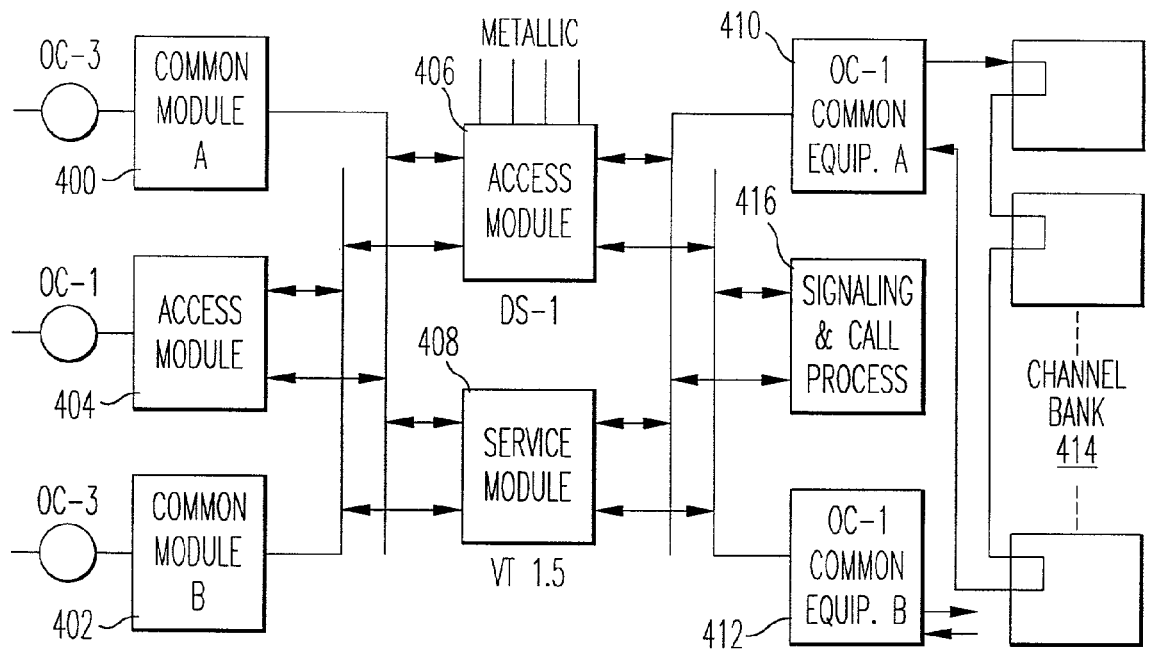
FIG. 34 is a schematic block diagram of a dual Telecom-Bus architecture showing the data flow for digital loop carrier (DLC) applications.

The RDT 24 utilizes the IEEE P1396 TelecomBus architecture to provide data transfer and access between the modules that constitute the RDT. FIG. 34 shows the data flow in a typical dual TelecomBus architecture for DLC (Digital Loop Carrier) applications. Common modules 400 and 402 provide interfaces between OC-3 channels and buses which interface with an OC-1 access module 404, as well as a DS1 access module 406 for metallic lines, and a service module 408 for VT1.5s. On the channel side, the access and service modules also provide interfaces to OC-1 A and B common equipment, designated as 410 and 412, respectively, which are coupled by SONET loops to channel units in a channel bank indicated generally at 414. The channel units in the channel bank 414 communicate with individual units of subscriber equipment such as telephone instruments. The OC-1 A and B common equipment 410 and 412 also communicate with signaling and call processing equipment 416.

Figure 35B:
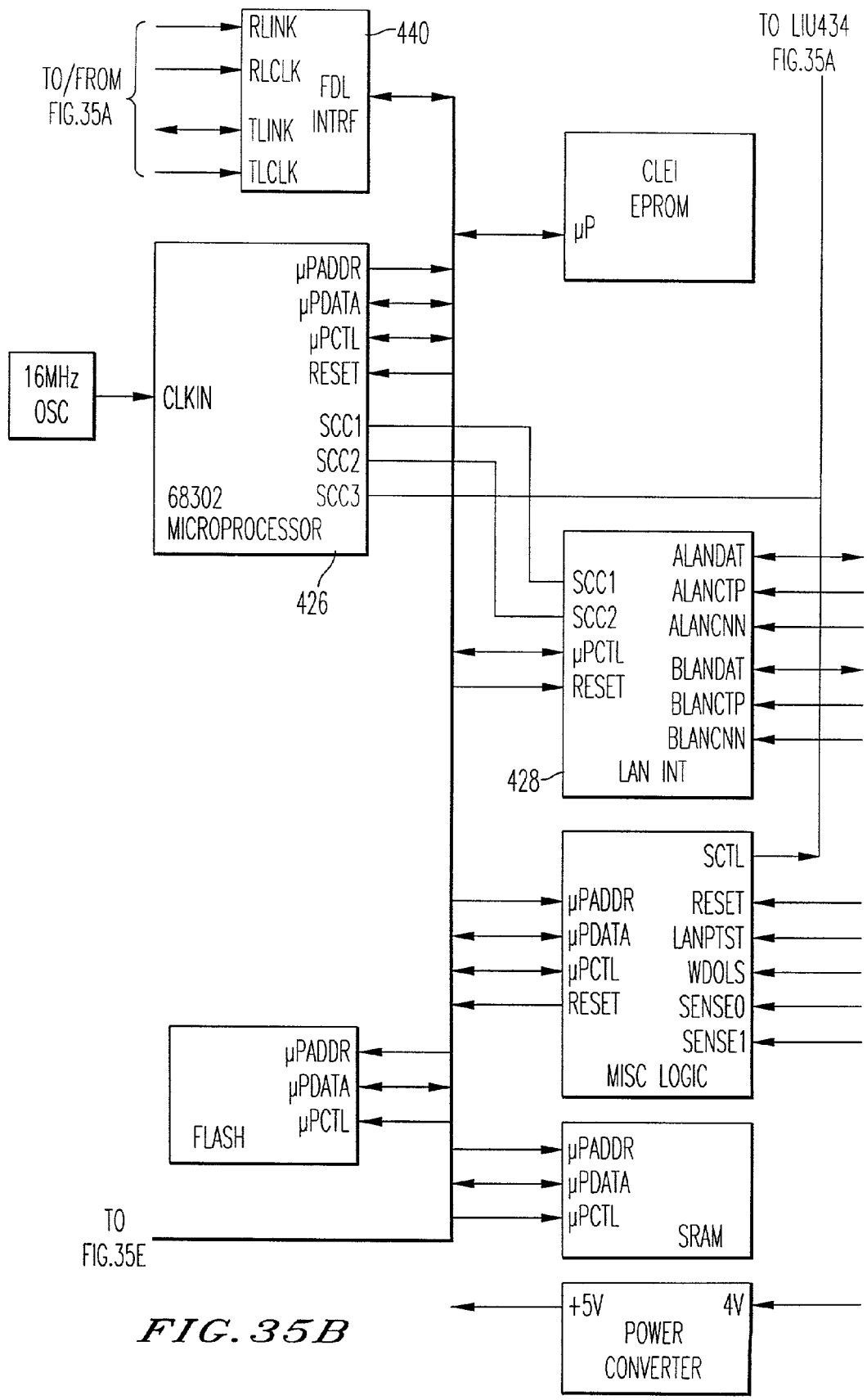
FIG. 35 is a schematic block diagram of two virtual tributary mapper (VTM) circuits constructed in accordance with the present invention and used on a virtual tributary group (VTG) card in an RDT or other network element of an IDLC system.
Figure 35C:
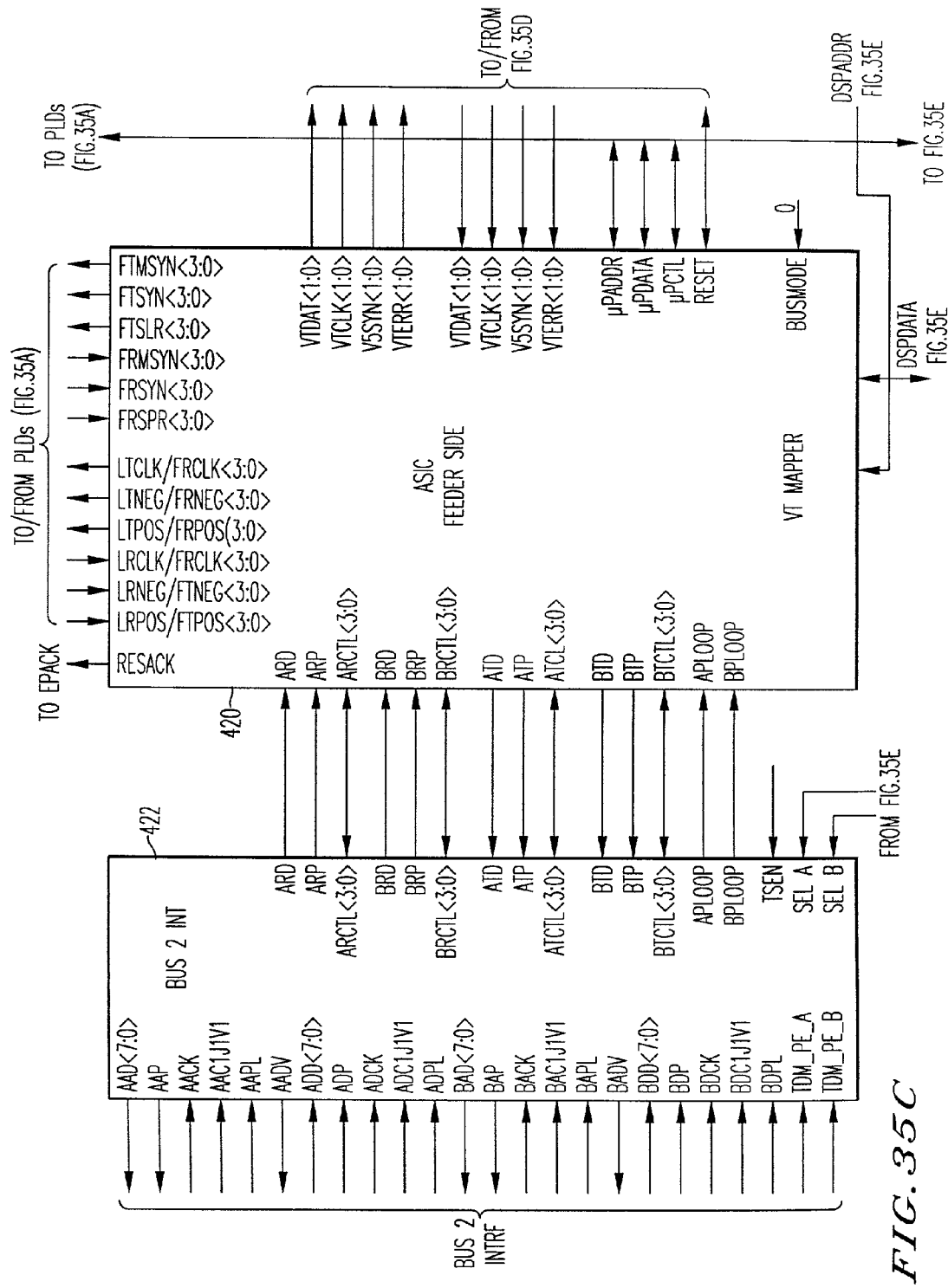
Figure 35E:
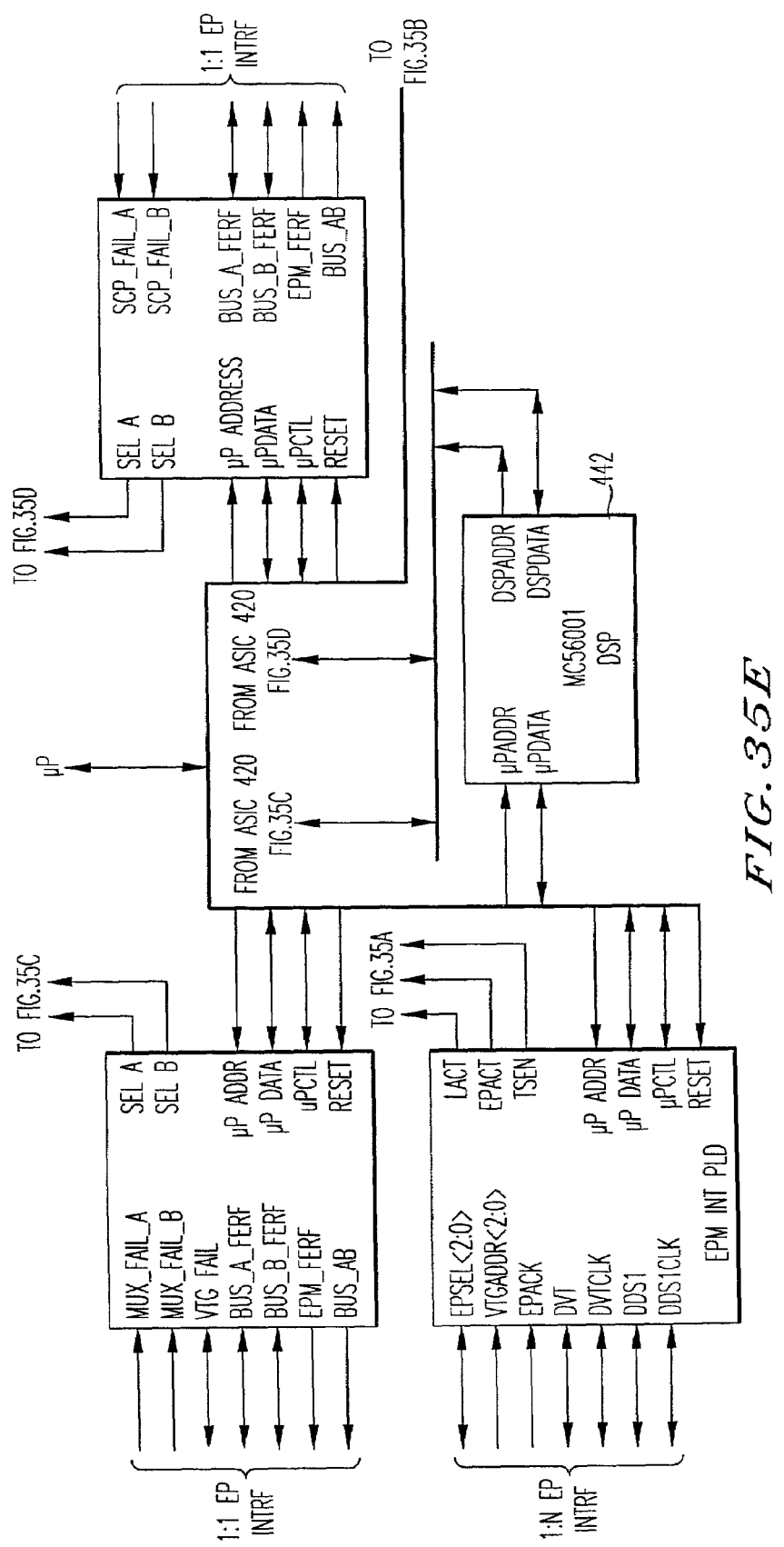

FIG. 35 depicts a typical application for the VTM ASICs as they are used on a VTG (Virtual Tributary Group) card 53. Each card 53 comprises two ASICs, both of which are generally designated as 420. The left ASIC depicted in FIG. 35 is a feeder side ASIC. The right ASIC in FIG. 35 is a channel side ASIC. The feeder side ASIC receives VT signals from the Bus 2 via the Bus 2 interface 422 or from the channel side ASIC, and DS1 signals from the DS1 interface 430. Similarly, the channel side ASIC receives VT signals from the Bus 3 via the Bus 3 interface 424 or from the feeder side ASIC, and DS1 signals from the DS1 interface 430. The VTM ASICs 420 can each monitor A and B side bus interfaces for equipment protection, select one side, and terminate the four VT payloads. Each ASIC loops the outputs into the inputs at its bus interface when provisioned to do so. Provisioning or control of an ASIC 420 and communication with the other ASIC is provided by a microprocessor 426 on the card 53. The microprocessor 426 also communicates with the SCP/NEP pair via a LAN interface 428 to coordinate VTG card 53 functions with other components of the system depicted in FIG. 7.

Since each VTG card 53 can process four DS1 or VT1.5s, four DS1 interface blocks 430 and four hybrids 432 couple respective ones of the four DS1 signals to and from four line interface units (LIUs) 434, which feed signals to and from four respective DS1 mode control programmable logic devices (PLDs) 436. The PLDs 436 operate as routers for DS1 signals by determining which of the ASICs sends or receives signals. For example, the PLDs provide DS1 to the feeder side ASIC if they are destined for delivery to a central office, and to the channel side ASIC if they are destined for delivery to a subscriber unit. Four DS1 framers 438 provide framing in the DS1 mode. The framers 438 can also be incorporated into each ASIC. A field data link (FDL) interface circuit 440 extracts and inserts the field data link (FDL) in DS1 mode. The two 1:1 EP interfaces and miscellaneous logic are interface latches that are accessed by the microprocessor 426. The CLEI PROM, SRAM, and FLASH are all memory devices used by the microprocessor for program and information storage. The power converter is used to supply the module with 5 volt power. The EPM interface PLD and EP bus interface are a controller for the DS1 protection and drop relays.

Figure 36:
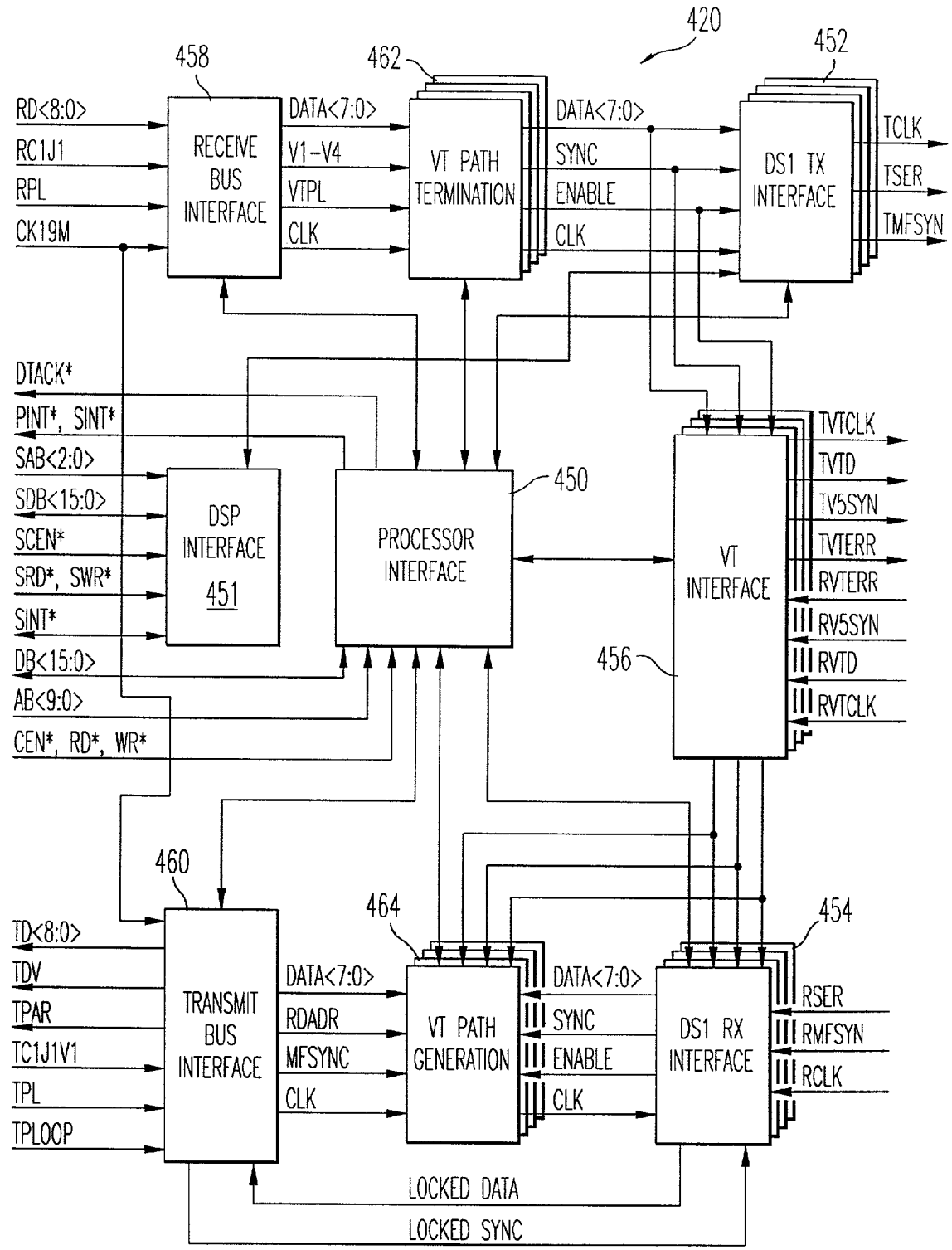
FIG. 36 is a functional block diagram of a VTM circuit constructed in accordance with the present invention.

FIG. 36 is a functional block diagram of a VTM ASIC 420. An ASIC comprises a processor interface 450 for interfacing with the microprocessor 426, four DS1 Transmit Interfaces 452, and four DS1 receive interfaces 454. The interfaces 452 and 454 communicate with DS1 mode control PLDs 436.

With continued reference to FIG. 36, the Receive Bus Interface 458 and the Transmit Bus Interface 460 are provided on each ASIC for receiving four selected VTs from or sending the selected VTs to the Bus 2 or the Bus 3, depending on whether the ASIC is on the feeder side or the channel side of the VTG card 53. The VT pointers are terminated for the four selected VTs in an STS-1 payload by the receive VT Path Termination Module 462. Additionally, VT performance, status and alarm signals are monitored using this module. Conversely, the VT Path Generation Module 464 places either a DS1 which has been mapped to a VT or a VT received from either Bus 2 or 3 into an STS-1 envelope. The VT payload envelope is sent to the DS1 Transmit Interface 452, as well as the corresponding VT interface blocks 456. The VT Interface 456 outputs the VT data and control signals as serial VTs, which may be used by the other VTM ASIC. The mappings of the received DS1 or VT signals into the VTs are performed using a full pointer processor including a pointer interpretation, an elastic store and a pointer generation per VT, as described in more detail below. This allows any VT (Floating or Locked) to be mapped (and de-mapped) from or to a DS1 or serial VT. The VTM ASIC can also map selected Floating VTs into embedded Floating VTs to be contained within the locked (Channel side) payload. Multiframe timing is-indicated by an H4 byte in the path overhead. The pointer translation timing (from one bus interface to the other bus interface) bypasses the Floating-to-Locked converter for Floating VT payload generation.

The VTM ASIC smooths any phase changes due to pointer adjustments and provides a Locked payload to the downstream or channel side interface using a single frame (125 microsecond (μsec)) controlled slip buffer.

The VTM ASIC comprises complete data and control path diagnostics to provide—continuous functional hardware verification during operation. The ASIC comprises a microprocessor interface 450 for reporting status and alarms to the microprocessor 426, as well as for general provisioning. The ASIC also comprises a DSP Interface 451 to provide access to the DSP 442 by the ASIC for data processing of the desynchronizer (FIG. 54), among other functions, as described in further detail below. The DSP 442 provides digital filtering for an internal digital phase locked loop (DPLL) in the ASIC. The DPLL is used to synthesize the output DS1 clock.

1.2 Conventions

Figure 37:
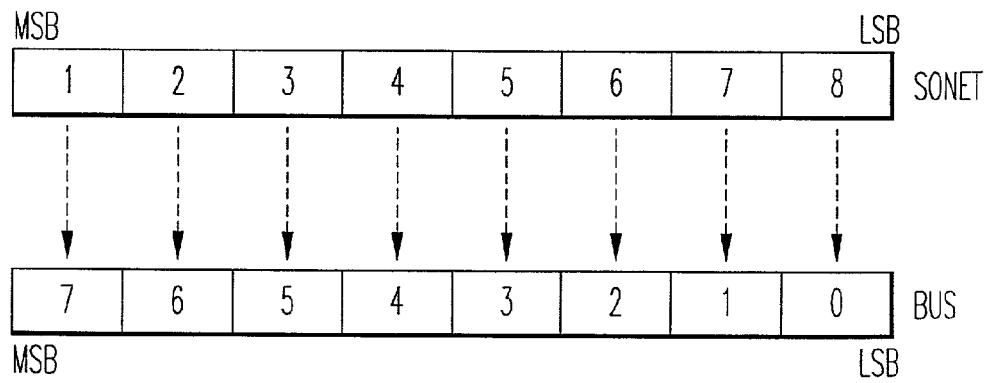
FIG. 37 is a diagram showing mapping between SONET bit numbering and the TelecomBus interface of the VTG module.

The bit mapping between the SONET bit numbering given in ANSI T1.105 and the TelecomBus interface of the VTG module is shown in FIG. 37. The VTM ASIC design uses the Bus bit numbering. This description is written using the Bus bit numbering. The SONET bit numbers are also given in certain parts of the specification inside parentheses. When serial data flow is used, MSB is transmitted first (i.e., the VT payload transfer from one VTM ASIC to another).

1.3 VTM ASIC VT and DS1 Mappings

Two VTM ASICs are used to provide the VT and DS1 mappings on a VTG card 53. One VTM ASIC is connected to the Bus 2 side and receives and transmits Floating VT1.5s, and the other is connected to the Bus 3 side and receives and transmits Locked VT payloads. The VTG card is as shown in FIG. 35. The same VTM ASIC is used for both the feeder and channel sides, allowing the same type mappings to be available in both directions. In addition to the mappings described below, a Floating Async VT-to-Floating Byte Sync VT mapping can also be performed by the ASIC.

1.3.1 Floating Byte Sync VT to Locked Byte Sync VT

When mapping from a Floating Byte Sync VT to a Locked Byte Sync VT, the VTM ASIC reads the Floating Byte Sync VT from the Bus 2 interface. The VT pointers are interpreted and the Floating Byte Sync VT payload is passed through a slip buffer, converted to the VT1.5 Locked Byte Sync format, and transmitted to the Bus 3 interface. The frame and signaling information of the received VT is preserved with the transmitted VT1.5. The received VT signaling (S) bits are passed to the VT1.5 according to phase adjustments determined by the H4 byte. Transmit VT S bits are aligned with the demand C1J1V1 from the Signaling Control Processor (SCP). The H4 is monitored to detect a loss of multiframe alignment.

In the reverse mapping, the VTM ASIC reads the Locked Byte Sync VT from the Bus 3 interface. Framing information is added to the Locked Byte Sync VT relative to the H4 multiframe alignment, passed through to an elastic store, and converted to the VT1.5 Floating Byte Sync format. VT pointer generation is performed for the VT relative to the Bus 2 synchronization signals, and then the VT is transmitted to the Bus 2 interface.

1.3.2 Floating Async VT to Locked Byte Sync VT

When mapping from a Floating Async VT to a Locked Byte Sync VT, the VTM ASIC reads the Floating Async VT from the Bus 2 interface. The VT pointers are interpreted, and the received VT is converted into to an asynchronous DS1 and routed to the framer. The framer extracts framing information from the DS1 signal, thereby converting it into a synchronous DS1, and routes it to the VTM ASIC. The synchronous DS1 is passed through a slip buffer, converted to the VT1.5 Locked Byte Sync format, and transmitted to the Bus 3 interface. Framing is preserved within the transmitted VT1.5. Signaling is preserved by extracting the S bits from the robbed bit positions of the DS1 signal. The received DS1 S bits are passed to the VT1.5 according to phase adjustments determined by the H4 byte. Transmit DS1 S bits are aligned with the demand C1J1V1 from the Receive Bus Interface. The H4 is monitored to detect a loss of multiframe alignment.

In the reverse mapping, the VTM ASIC reads the Locked Byte Sync VT from the Bus 3 interface. The received VT is converted into to an intermediate synchronous DS1 format and routed to the framer. The framer inserts framing information into the intermediate synchronous DS1 formatted signal, thereby converting it into a synchronous DS1, and routes it to the VTM ASIC. The synchronous DS1 is passed through an elastic store and converted to the VT1.5 Floating Async-format. The line rate signal is converted to the system rate using the bit stuffing mechanism of the Floating Async VT. The VTM ASIC inserts a fixed VT payload pointer value, and then transmits the VT to the Bus 2 interface.

1.3.3 Floating Async VT to Floating Async VT

When mapping from a Floating Async VT to a Floating Async VT, the VTM ASIC reads the Floating Async VT from the Bus 2 interface. The VT pointers are interpreted and regenerated according to the timing required for the Bus 3 interface. The Floating Async VT is then transmitted to the Bus 3 interface.

In the reverse mapping, the VTM ASIC reads the Floating Async VT from the Bus 3 interface. The VT pointers are interpreted and regenerated according to the timing required for the Bus 2 interface. The Floating Async VT is then transmitted to the Bus 2 interface.

1.3.4 DS1 to Locked Byte Sync VT

When mapping from a DS1 to a Locked Byte Sync VT, the VTM ASIC reads the serial DS1 signal from the LIU/Framer. The framer extracts framing information from the DS1 signal, thereby converting it into a synchronous DS1, and routes it to the VTM ASIC. The synchronous DS1 is passed through a slip buffer, converted to the VT1.5 Locked Byte Sync format, and transmitted to the Bus 3 interface. Framing is preserved within the transmitted VT1.5. Signaling is preserved by extracting the S bits from the robbed bit positions of the DS1 signal. The received DS1 S bits are passed to the VT1.5 according to phase adjustments determined by the H4 byte. Transmit DS1 S bits are aligned with the demand C1J1V1 from the Receive Bus Interface. The H4 is monitored to detect a loss of multiframe alignment.

In the reverse mapping, the VTM ASIC reads the Locked Byte Sync VT from the Bus 3 interface. The received VT is converted into to an intermediate DS1 format and routed to the LIU/Framer.

1.3.5 DS1 to Floating Async VT

When mapping from a DS1 to a Floating Async VT, the VTM ASIC reads the serial DS1 signal from the LIU/Framer. The asynchronous DS1 is passed through an elastic store and converted to the VT1.5 Floating Async format. The line rate signal is converted to the system rate using the bit stuffing mechanism of the Floating Async VT. The VTM ASIC inserts a fixed VT payload pointer value, and then transmits the VT to the Bus interface.

In the reverse mapping, the VTM ASIC reads the Floating Async VT from the Bus interface. The VT pointers are interpreted, the received VT is converted into to an asynchronous DS1, and then routed to the LIU/Framer.

1.3.6 DS1 to Floating Byte Sync VT

When mapping from a DS1 to a Floating Byte Sync VT, the VTM ASIC reads the serial DS1 signal from the LIU/Framer. The framer extracts frame information from the DS1, thereby converting it into a synchronous DS1, and routes it to the VTM ASIC. The synchronous DS1 is passed through an elastic store and converted to the VT1.5 Floating Byte Sync format. VT pointer generation is performed for the VT, relative to the Bus 2 synchronization signals. The Floating Byte Sync VT is then transmitted to the Bus 2 interface. Signaling is preserved by extracting S bits from the robbed bit positions of the DS1 signal. The received DS1 S bits are passed to the VT1.5, along with the same DS1 multiframe alignment, and the multiframe phase is inserted into the P1 P0 bit positions.

In the reverse mapping, the VTM ASIC reads the Floating Byte Sync VT from the Bus 2 interface. The VT pointers are interpreted, the received VT is converted into to a synchronous DS1, and then routed to the LIU/Framer.

1.4 Synchronization Flow

VTM ASIC receive frame timing is driven by the STSM card 51. The C1J1 line reflects the STS-1 frame start and SPE start, and multiframe timing is extracted from the received H4 byte. The add frame timing can be sourced from three different sources as explained in four categories below. The second and third schemes can be mixed to provide mapping into different STS-1s in the same OC-3 payload. Note that the bus interface can add or drop up to four VTs, tracking only one STS-1 payload. The mappings into different STS-1s are generally limited to a group of four VTs.

1. The add bus C1J1V1 signals are generated by the STSM card 51 based on the synchronization signals received from system SYNC cards 64, as shown in FIG. 38. This synchronization scheme is used for a terminal multiplexer configuration which allows the RDT to terminate 28 VT payloads, or generate 28 VT payloads.
2. The add bus C1J1 is derived from drop C1J1 and the add V1 is generated from drop H4 byte, as shown in FIG. 39. This configuration provides the VT mapping from VTG cards 53 and STS-1 mapping from HS Extension cards 67 for outgoing OC-3.
3. The add bus C1 is derived from drop C1, the J1 is derived from HS Extension and STS-MUX tracks on the H4 byte received from HS Extension cards 67 and generates the add V1 signal, as shown in FIG. 40. This configuration provides the VT mapping from VTG cards 53 and/or HS Extension cards 67.
4. The add bus C1J1V1 signals are selected from the connections coming from the SYNC cards 64, as shown in FIG. 41. The SYNC cards 64, depicted in FIG. 7 provide synchronization or internal timing in the RDT 24 by selecting one of several fundamental timing references, such as the receive clock from a VTG card 53 or one of two OC-3 clocks, as a source. This configuration provides full VT mapping from any source into the OC-3.

1.5 Maintenance Flow

Figure 42:
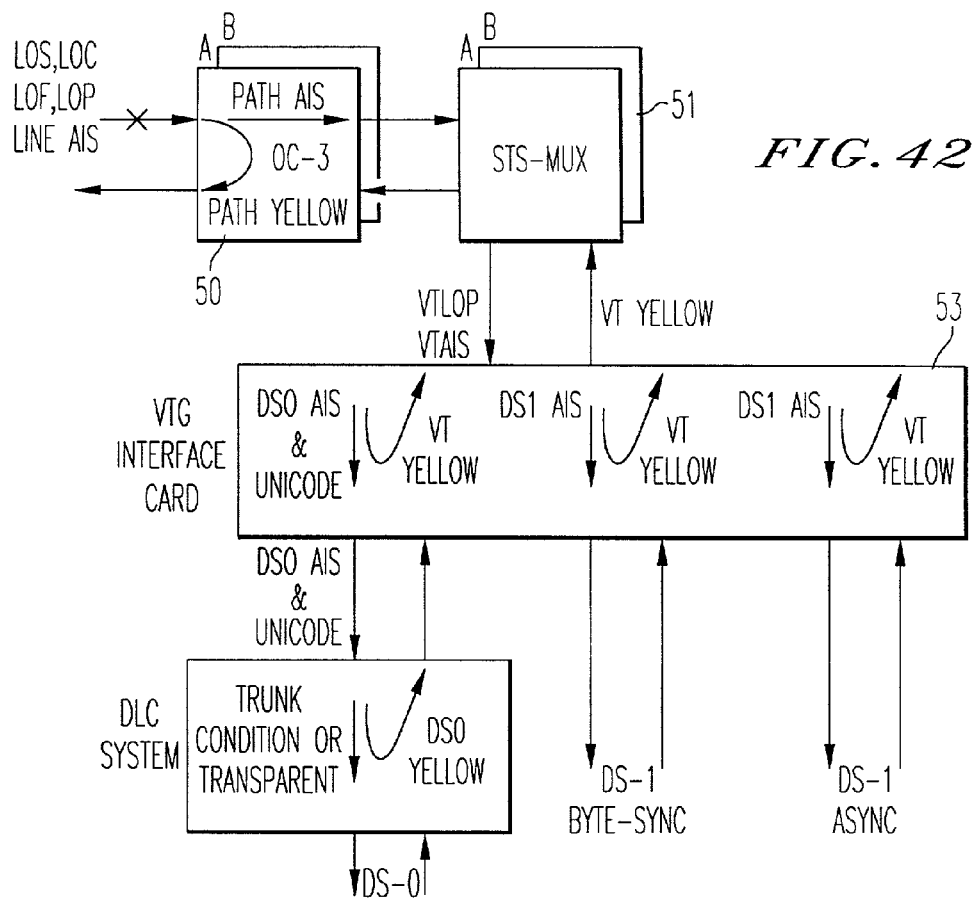
FIG. 42 is a functional block diagram of system maintenance flow from upstream to downstream in accordance with the present invention.

Maintenance flow from upstream to downstream, i.e., toward the channel side and subscriber units, is shown in FIG. 42. On entering a failure state, the high speed interface generates a full STS path alarm indication signal (AIS) which is interpreted as VT AISs by VTM ASICs. The VTG interface translates the VT AIS, VT loss of pointer, and P1P0 loss conditions into the DS0 AIS and UNICODE for the locked payload mappings, and VT AIS for asynchronous VT mappings. The ASIC can also insert the AIS conditions if provisioned to do so for equipment failure, equipment loop and H4 loss conditions. The VTM ASIC inserts a VT Path Yellow bit if provisioned to do so.

The DS1 to VT and VT to DS1 mappings from Floating VT force a DS1 AIS output upon detection of a VT AIS condition, and a VT Yellow is reflected, if provisioned to do so, for this tributary for byte synchronous DS1 interfaces.

Figure 43:
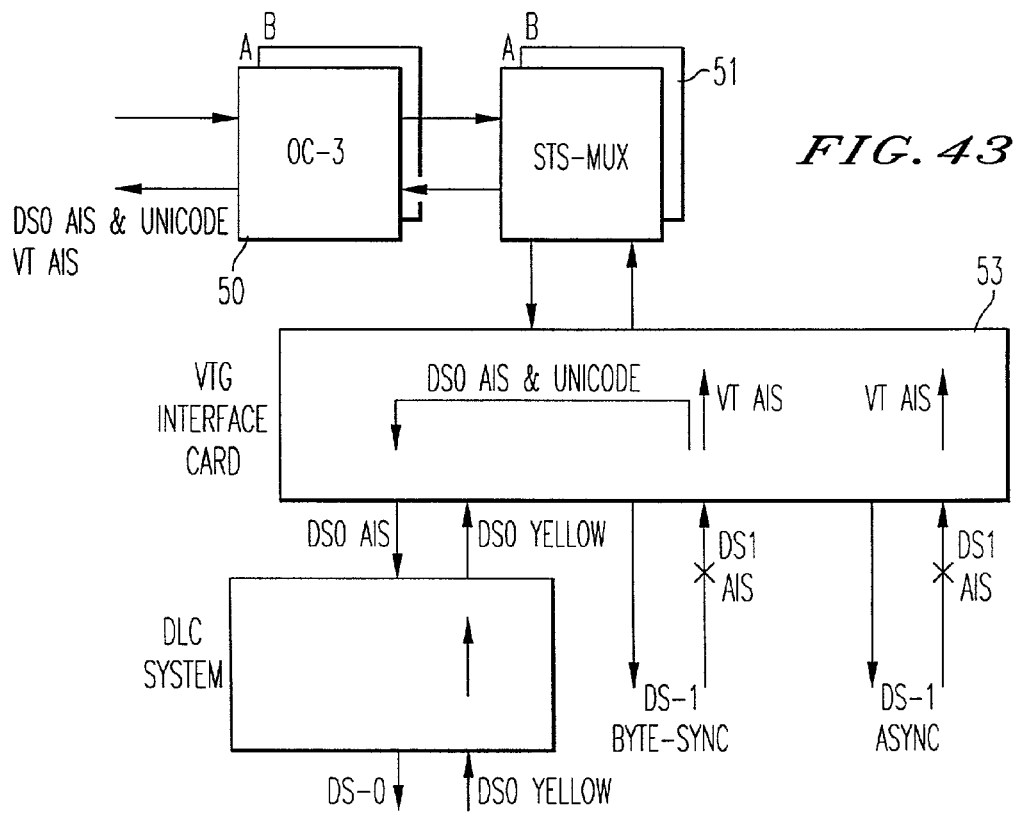
FIG. 43 is a functional block diagram of system maintenance flow from downstream to upstream in accordance with the present invention.
Figure 44:
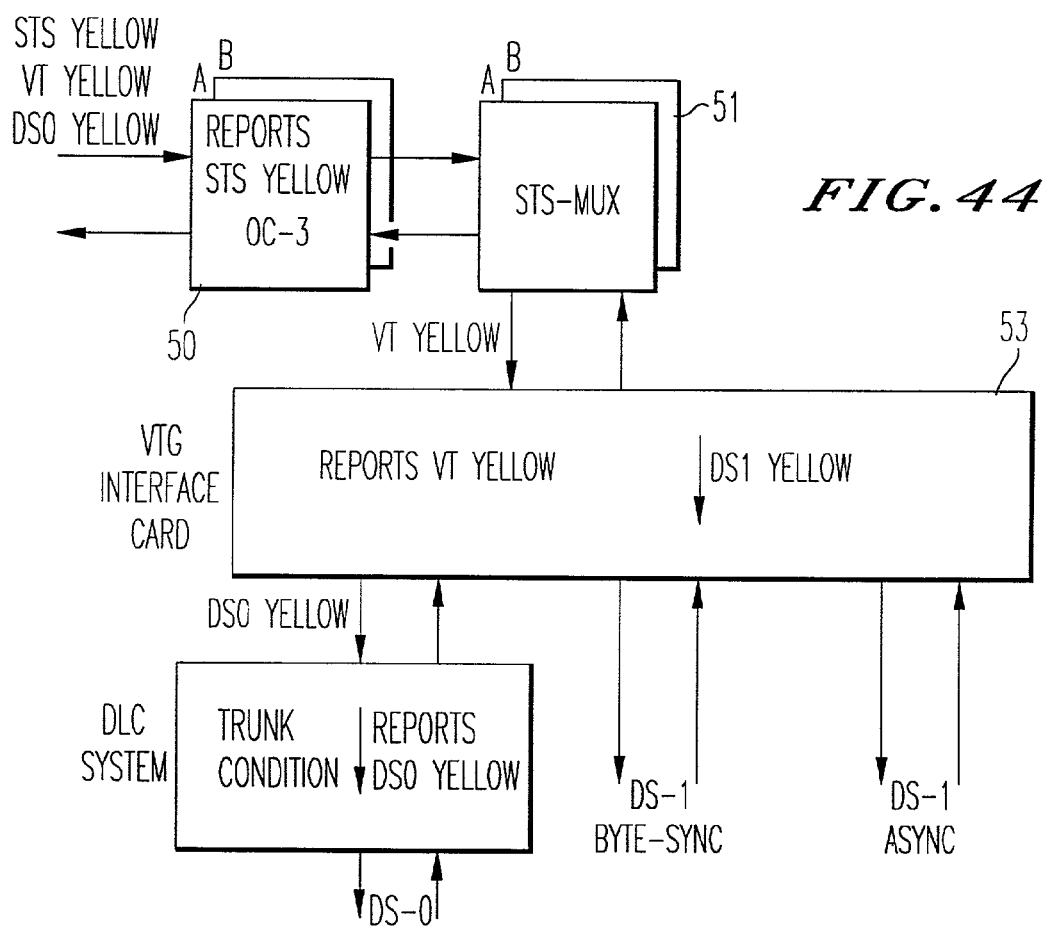
FIG. 44 is a functional block diagram of system maintenance flow for yellow reporting in accordance with the present invention.
Figure 45A:
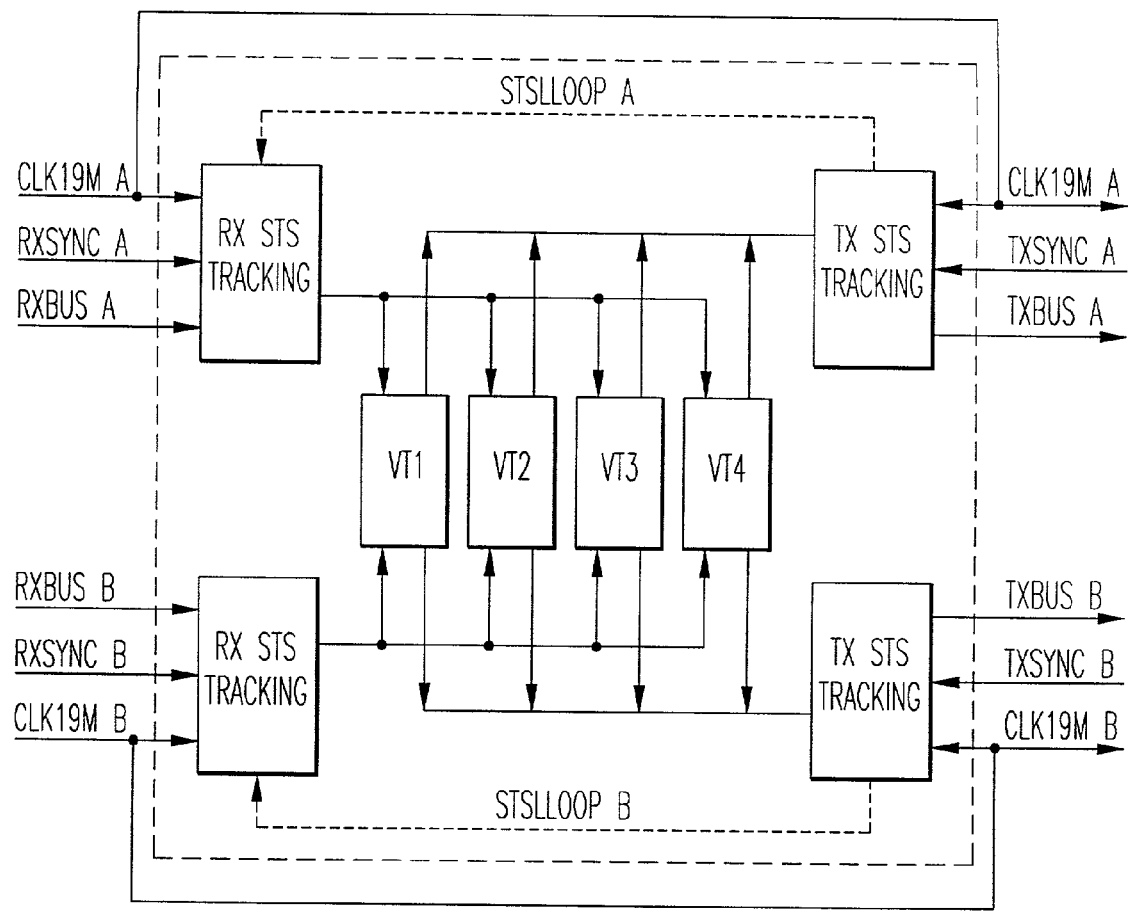
FIGS. 45A, 45B, 45C and 45D are schematic block diagrams of available loopback modes associated with the present invention.
Figure 45B:
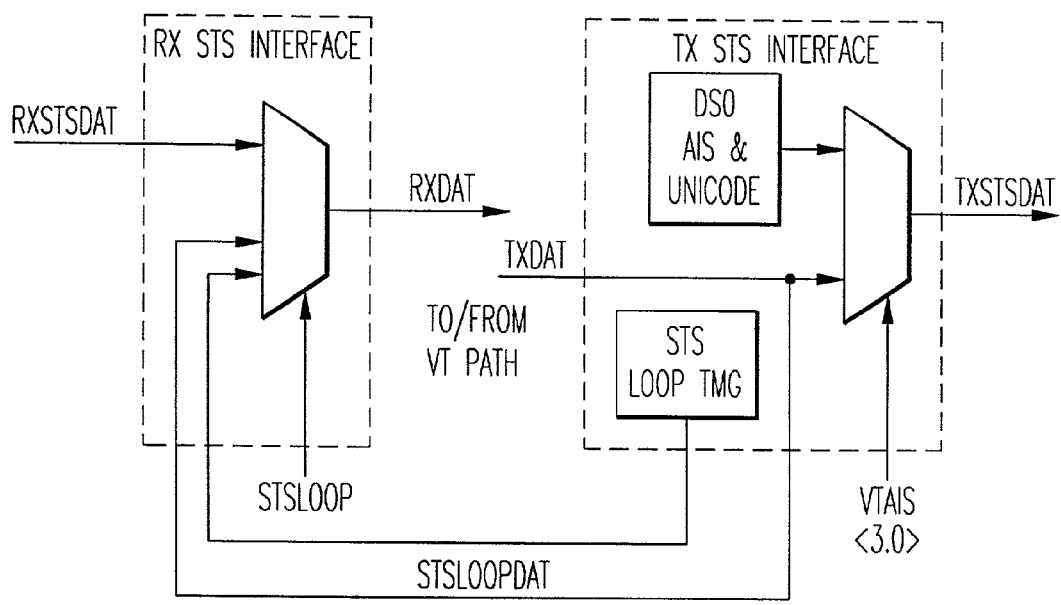
Figure 45C:
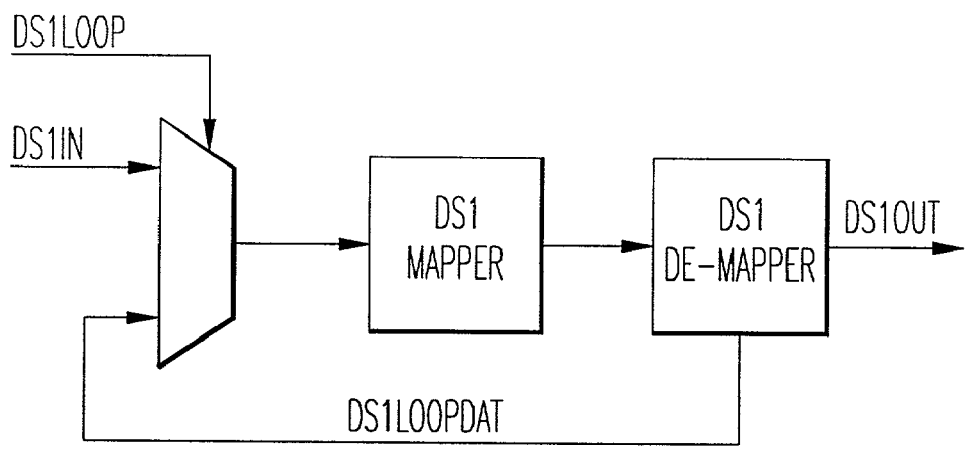
Figure 45D:
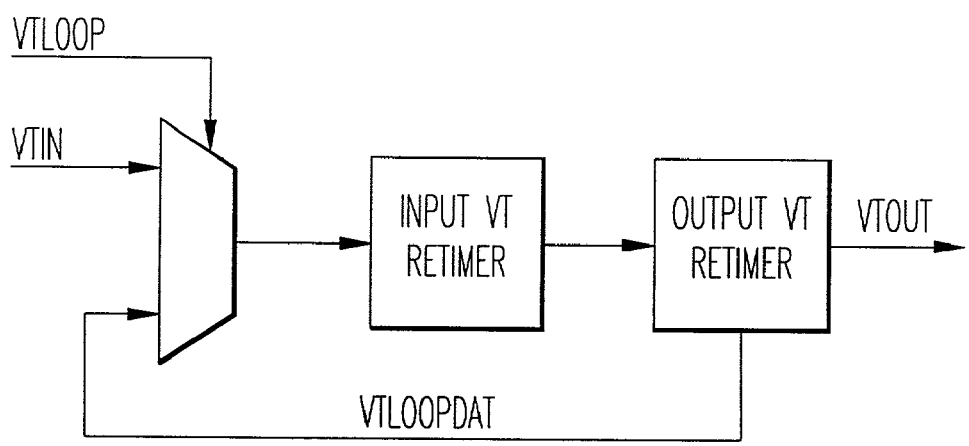

Maintenance flow from downstream to upstream is shown in FIG. 43. The VTM ASIC inserts VT AIS for the upstream when a VT AIS or VT LOP is detected in the downstream side. The DS0 AIS and UNICODE are transparent to the VTM ASIC. If provisioned to do so, the yellow bits are reported for each layer where they are terminated. FIG. 44 shows that STS Yellow is reported at the STS Path Termination point, VT Yellow is reported at the VT Path Termination point, and DS1 Yellow is inserted into the frame bits of the outgoing DS1 if there is a demapping. The DS0 Yellow is reported in the DLC system.

1.6 Loopbacks

The VTM ASIC provides local and remote loopbacks for the Bus Interfaces 458 and 460 (FIG. 36), as well as for low speed VT and DS1. FIGS. 45A–45D show the various loopback modes. The loopbacks at the bus interface can be performed independently for each side. The inactive side bus can be used as a test facility to verify mapping and demapping of selected DS1s. This allows online testing capability.

1.6.1 Local Equipment Loopback

The local equipment loopback (FIGS. 45A and 45B) is performed by looping the transmit STS-1 payload carrying four VT payloads mapped in the ASIC into the Receive Bus Interface 458 of FIG. 36. The control is separated for A and B sides. When a side is looped, the transmit synchronization signals are generated from a free-running STS frame counter. The data and synchronization signals are looped together. The AIS is inserted on the outgoing signal if provisioned to do so. This loop can also be used to test a single VT while the others are still carrying the active traffic.

For remote equipment loopback, the receive data inputs of the ASIC are looped into the data outputs separately for the A and B sides. This loopback can be performed preferably only if both add and drop C1J1 synchronization signals are derived from the OC-3 interface, and the transmit multiframe timing is locked into the receive H4 byte. The AIS insertions on the VT and DS1 paths are performed, if provisioned to do so, in the framer or in the opposite bus ASIC.

1.6.2 DS1 Local Loopback

For DS1 local loopback (FIG. 45C), the transmit DS1 is looped back into the receive path along with multiframe synchronization and clock signals. The DS1 AIS insertion on the outgoing data is performed, if provisioned to do so, either in the ASIC or in the framer. Each DS1 can be looped separately.

1.6.3 VT Local Loopback

In VT local loopback (FIG. 45D), the VT payload, which is passed to the opposite ASIC, can be looped back into the transmit path of the ASIC, along with V5 multiframe synchronization and VT strobe signals. The VT AIS insertion on the outgoing data is performed, if provisioned to do so, in the opposite ASIC. Each VT can be looped separately.

2. ASIC Description

Figure 46A:
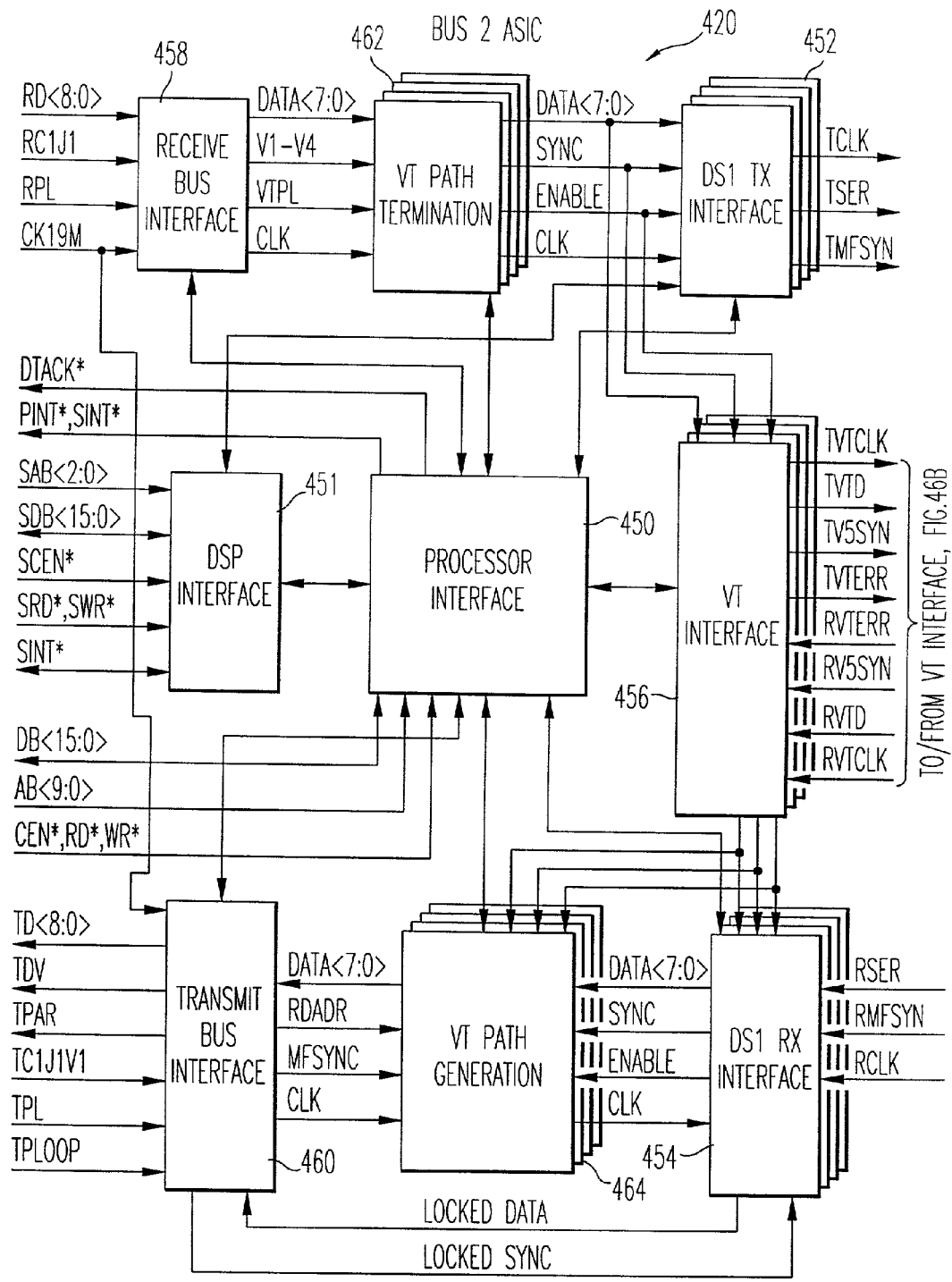
FIG. 46 is a functional block diagram of a feeder side circuit and a channel side circuit coupled together on a VTG card in accordance with the present invention.
Figure 46B:
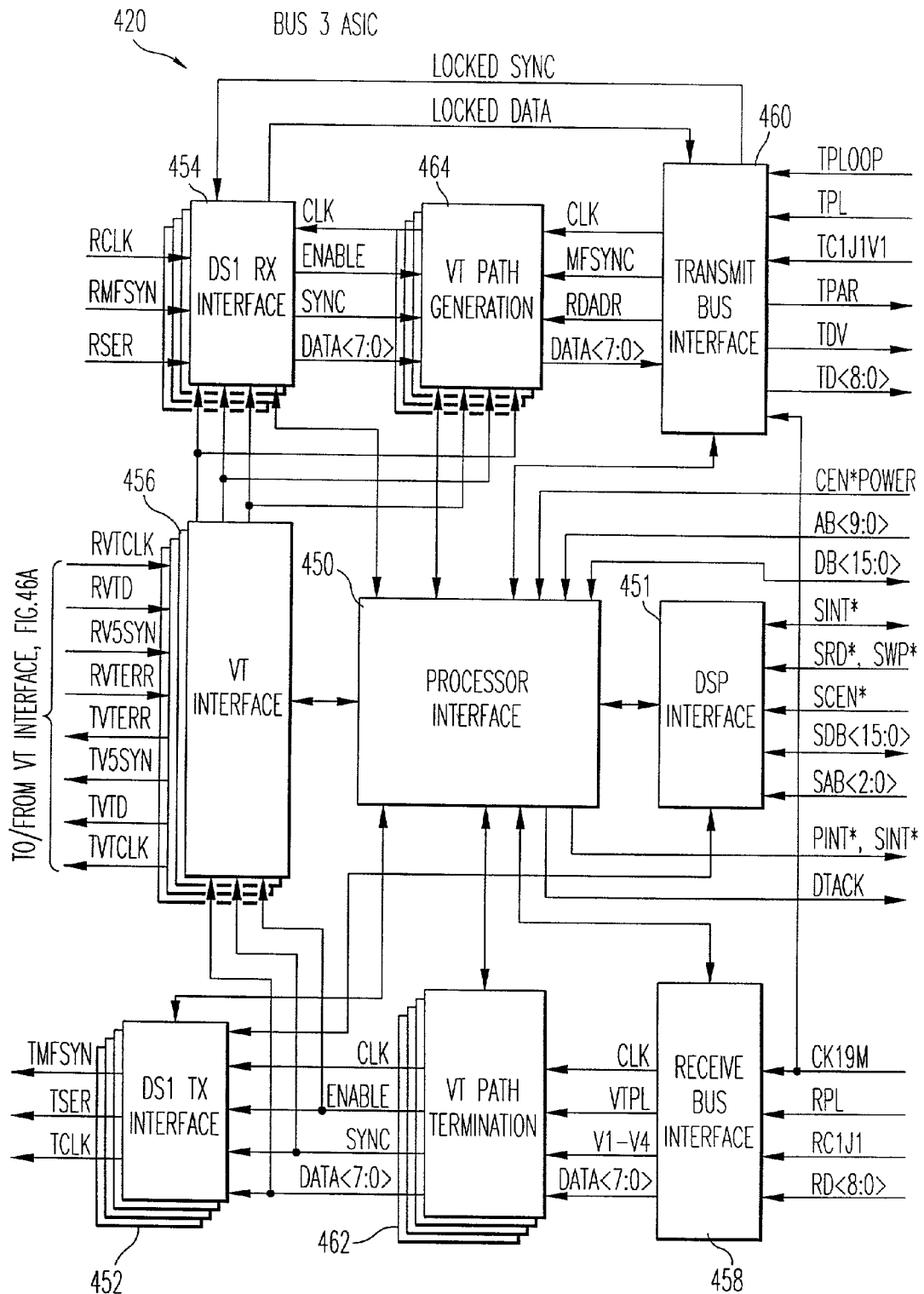

FIG. 46 is a block diagram of the feeder side VTM ASIC and the channel side VTM ASIC. This drawing depicts the nine major functional blocks of each ASIC that were described briefly in connection with FIG. 36, that is, the Receive Bus Interface 458, Transmit Bus Interface 460, VT Path Termination Module 462, VT Path Generation Module 464, the DS1 Transmit Interface 452, the DS1 Receive Interface 454, the VT Interface 456, the DSP Interface 451, and the Microprocessor Interface 450. These functional blocks are each described in further detail in the following sections.

The VTG card 53 interfaces to Bus 2 and Bus 3 using two VTM ASICs. The VTM ASIC components associated with the feeder side and channel side ASICs are configured in mirror images of each other. For example, the Receive Bus Interface in the upper left-hand corner of FIG. 46 is essentially identical to the Receive Bus Interface in the lower right-hand corner of FIG. 46, except that these Receive Bus Interfaces are coupled to Bus 2 and Bus 3, respectively. Thus, the feeder side ASIC receives its control and data signals from Bus 2, and the channel side ASIC receives its control and data signals from Bus 3.

Similarly, Bus 2 and Bus 3 are mirror images of each other. For protection purposes, both buses are composed of redundant bidirectional buses, that is, Bus 2A, Bus 2B, Bus 3A and Bus 3B. Each of the bidirectional buses is itself composed of a transmit and a receive bus. Thus, both Bus 2 and Bus 3 contain four individual buses, a transmit bus A (add Bus 2A and drop Bus 3A), a transmit bus B (add Bus 2B and drop Bus 3B), a receive bus A (drop Bus 2A and add Bus 3A), and a receive bus B (drop Bus 2B and add Bus 3B). Since all drop buses flow from the OC-3 feeder to the channel shelves, and all add buses flow from the channel shelves to the OC-3 feeder, an add bus on the Bus 2 ASIC corresponds to a drop bus on the Bus 3 ASIC, and vise-versa.

2.1 Receive Bus Interface 458

Figure 47:
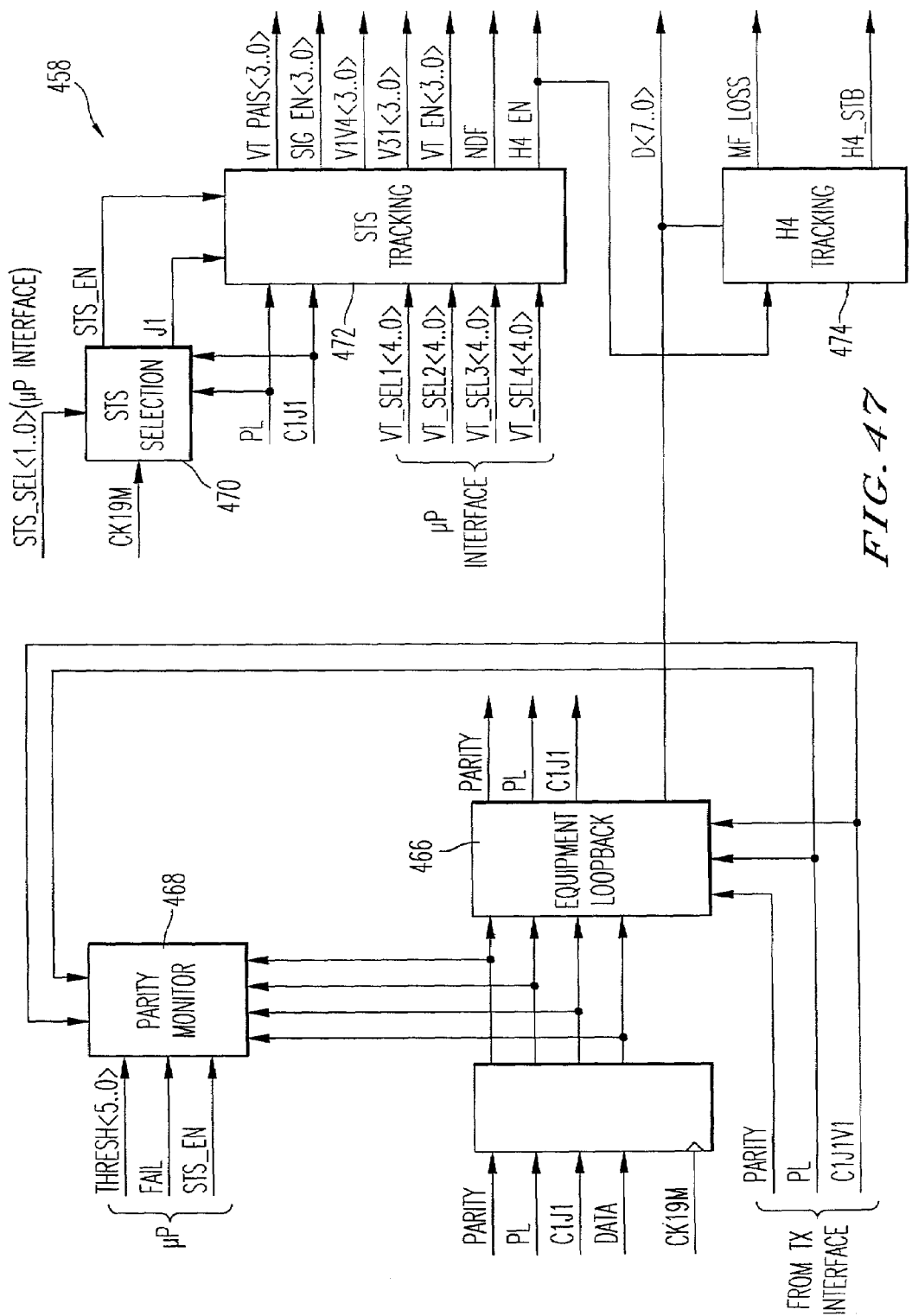
FIG. 47 is a functional block diagram of a Receive Bus Interface of a VTM circuit constructed in accordance with the present invention.

The Receive Bus Interface 458 receives control signals and a 19.44 MHz STS-3 8-bit data stream from drop Bus 2 or add Bus 3. There is a separate Receive Bus Interface for both Bus A and Bus B, and the bus selection is performed at the VT Path Termination Module 462 of the VTM ASIC. The Receive Bus Interface provides timing for the four selected VT1.5s of the selected STS-1, equipment loopback, H4 multiframe tracking, VT AIS detection and new data flag detection. It performs the equipment protection control function of monitoring parity, accumulating the parity errors and storing the accumulated errors. The functional blocks of the Receive Bus Interface 458 are Equipment Loopback Block 466, Parity Monitoring Block 468, STS-1 Selection Block 470, STS-1 Tracking Block 472, and H4 Tracking Block 474, as shown in FIG. 47.

2.1.1 Equipment Loopback Block 466

The VTM ASIC parallel data outputs of the Transmit Bus Interface 460 can be mapped into the parallel data inputs of the Receive Bus Interface when it is provisioned to do so. The equipment loopback function is added for testability. The ASIC generates VT Path AIS with a good parity for the data which is output from Transmit Bus Interface. Loopback control is provided separately for the A and B sides to provide testing of the inactive VTs on one side, while the selected VTs are active on the other side.

2.1.2 Parity Monitoring Block 468

The 8-bit data, C1J1 synchronization signal and PL payload indicator of the receive bus (drop Bus 2 or add Bus 3) and the C1J1V1 synchronization signal and PL payload indicator of the transmit bus (add Bus 2 or drop Bus 3) are received along with a parity bit for each side and retimed. Odd parity is checked during every time slot received of the selected STS-1, and errors are accumulated. The parity accumulators are not accessible, but when a provisioned threshold value is exceeded, a Bus failure signal is created with an active interrupt. The threshold values are set independently for both the A and B side monitors. The counter is loaded with the threshold value whenever a new threshold value is provisioned, and the accumulators can be cleared by provisioning the threshold to zero for initialization.

2.1.3 STS-1 Selection Block 470

The STS-1 Selection Block 470 uses the incoming synchronization signals and control bits as provisioned to provide an enable during the STS-1 used on the VTM ASIC. Each VTM ASIC selects one of the three STS-1s from the incoming 19.44 MHz STS-3 8-bit data stream.

2.1.4 STS-1 Tracking Block 472

Using the STS-1 enable signal from the STS-1 Selection Block 470 and synchronization signals, the STS-1 Tracking Block 472 generates the payload timing signals from STS-1 row and column counters. Four VTs are selected per provisioning and VT enable signals are generated to extract these VTs from the data stream. Other strobes from this block provided for each selected VT include a signaling byte enable, a V1 through V4 strobe, and a positive stuff opportunity strobe. These VT strobes are used in the STS-1 Tracking block for detection of NDF (new data flag) and VT AIS (alarm indication signal) on a per VT basis. In addition to tracking the provisioned VTs, an H4 strobe is generated to enable the H4 Tracking Block 474.

The selected STS-1 payload timing is generated using a row and column counter to sequence through the 783 positions of the SPE ( 9 rows×87 columns ). The counter is reset by J1 from the STS-1 Selection Block 470 and enabled by the payload (PL) signal. Decodes of this count and the H4 sequence provide the strobes and enables for the provisioned VTs. If three consecutive multiframes of all "1" patterns are seen in the V1 and V2 bytes of a VT, an AIS signal is asserted on a per VT basis. The VT AIS condition is removed when a single multiframe is received that does not have all ones in the V1 and V2 bytes.

2.1.5 H4 Tracking Block 474

In the Floating VT mode of operation, the H4 Tracking Block uses the 2-bit H4 coding sequence. The H4 byte is filtered to eliminate bit errors and isolate stuck errors. A loss of multiframe signal is generated if four H4 values are not received in sequence. A new multiframe alignment is declared and loss of multiframe is removed, if declared, if four consecutive frames have the same valid H4 sequence.

In the Locked VT mode of operation, the H4 Tracking Block utilizes the full 8-bit H4 coding sequence, and loss of multiframe detection is disabled. H4 is generated from a counter synchronized with the received H4 byte. A locked H4 pulse is generated to synchronize the P1P0 filtering block of the VT Path Termination Module 462. The V1 through V4 signals are decoded using the two least significant bits of H4 and the V1 part of the received C1J1V1 signal is ignored.

2.2 VT Path Termination Module 462

The VT Path Termination Module 462 consists of four identical circuits to provide access into four different VT payloads. Each of these circuits provides the pointer interpretation algorithm for the received VT pointers, the detection for the VT Path Overhead Byte (VS), and the monitoring of VT path status, alarms and performance. The VT Path Termination Module 462 operates in two different modes: (1) the VT Path Terminating Equipment (PTE) mode; and (2) the VT pointer translation mode.

In the VT PTE mode, the VT pointers and V5 byte are terminated completely, and the DS1 is demapped from the VT SPE and passed on to the DS1 Transmit Interface 452.

In the VT pointer translation mode, the VT pointers are terminated, the V5 byte is monitored, and the VT SPE is passed on to the VT interface. This allows a Floating VT to be mapped into a Floating VT without changing the content of the VT SPE.

Figure 48:
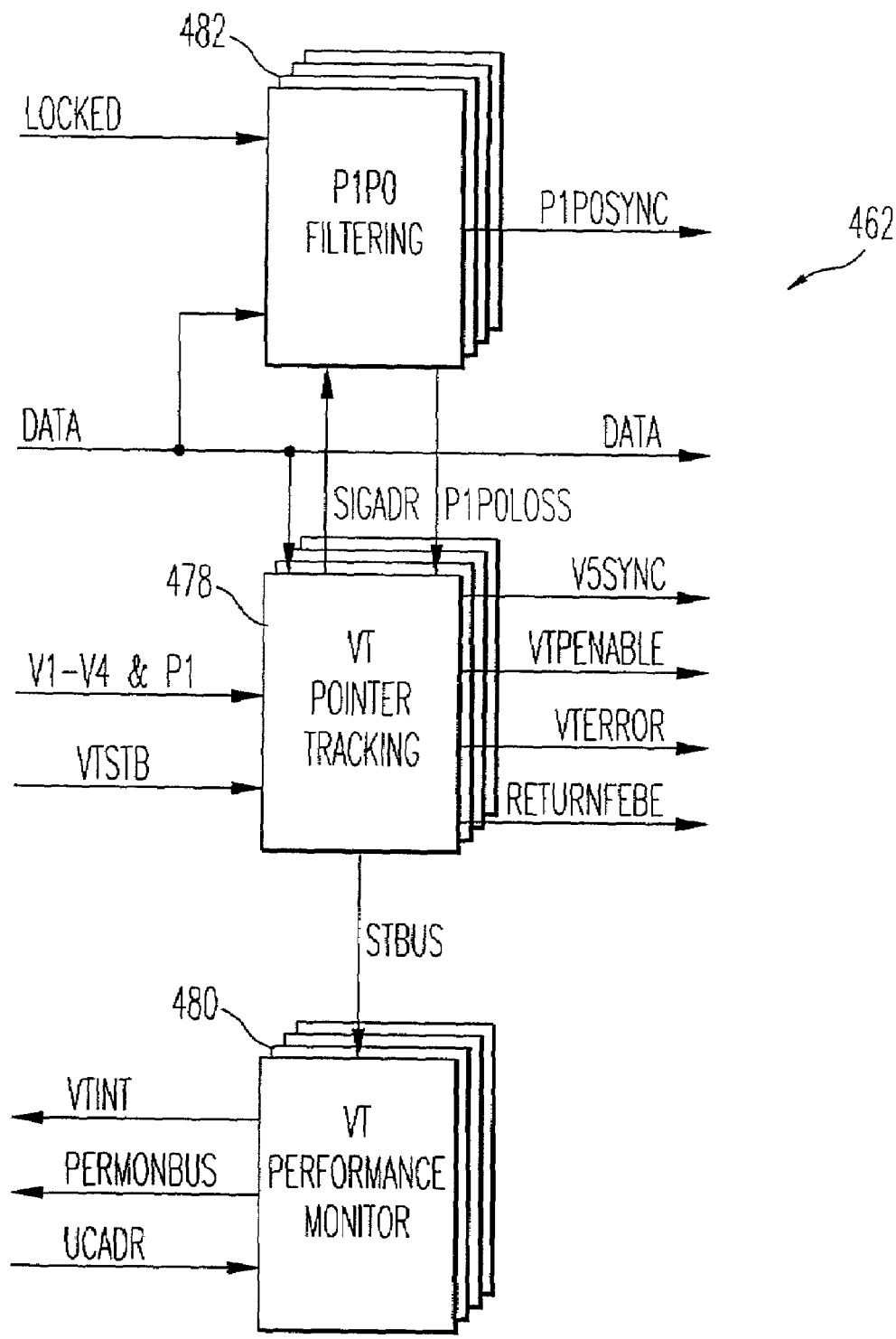
FIG. 48 is a functional block diagram of a VT Path Termination Module used with the VTM circuit in accordance with the present invention.

The functional blocks of the VT Path Termination Module 462 are VT Pointer Interpretation or Tracking Block 478, VT Performance Monitoring Block 480, and P1P0 Filtering Block 482, as shown in FIG. 48.

2.2.1 VT Pointer Interpretation Block 478

Figure 49:
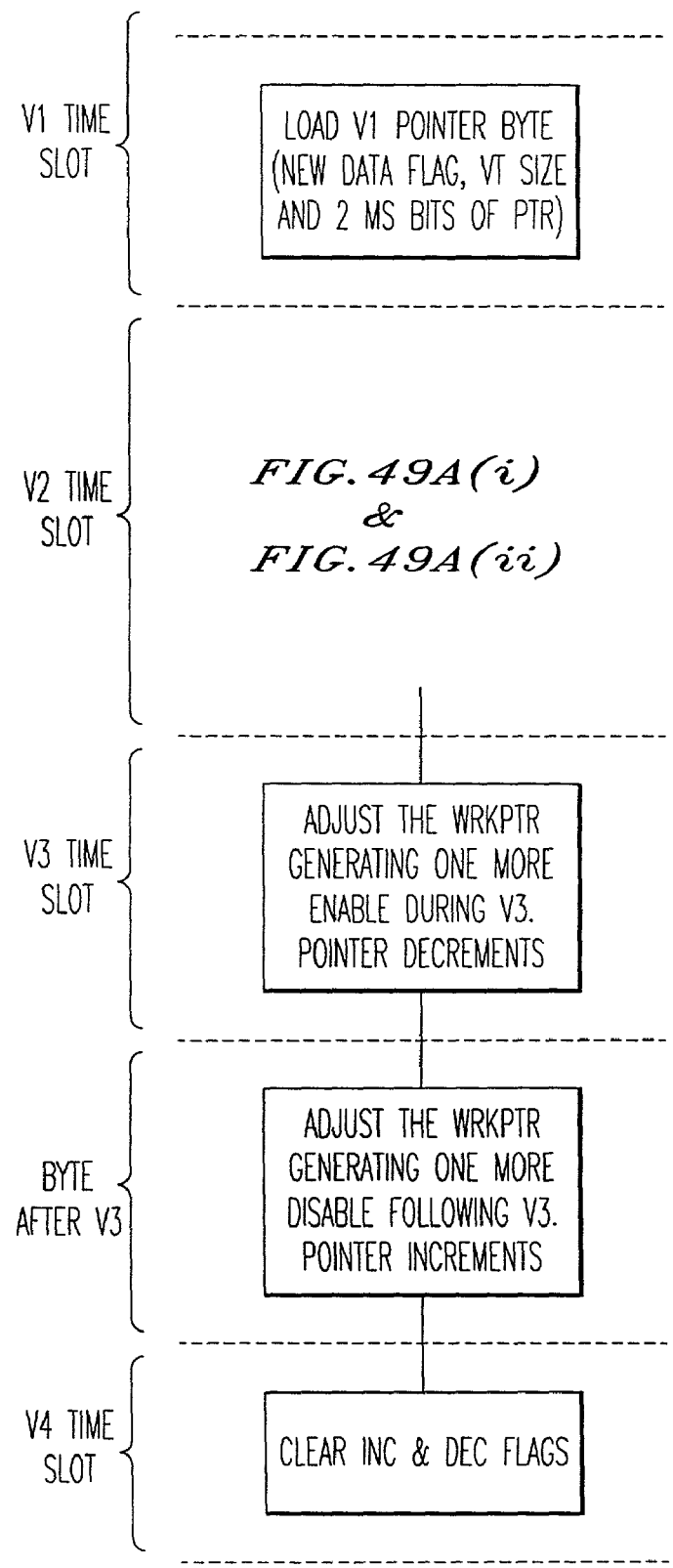
FIGS. 49, 49A(i), 49(A)(ii) and 49B are a flow chart and state diagram iliustrating a VT pointer interpretation algorithm in accordance with the present invention.
Figure 49B:
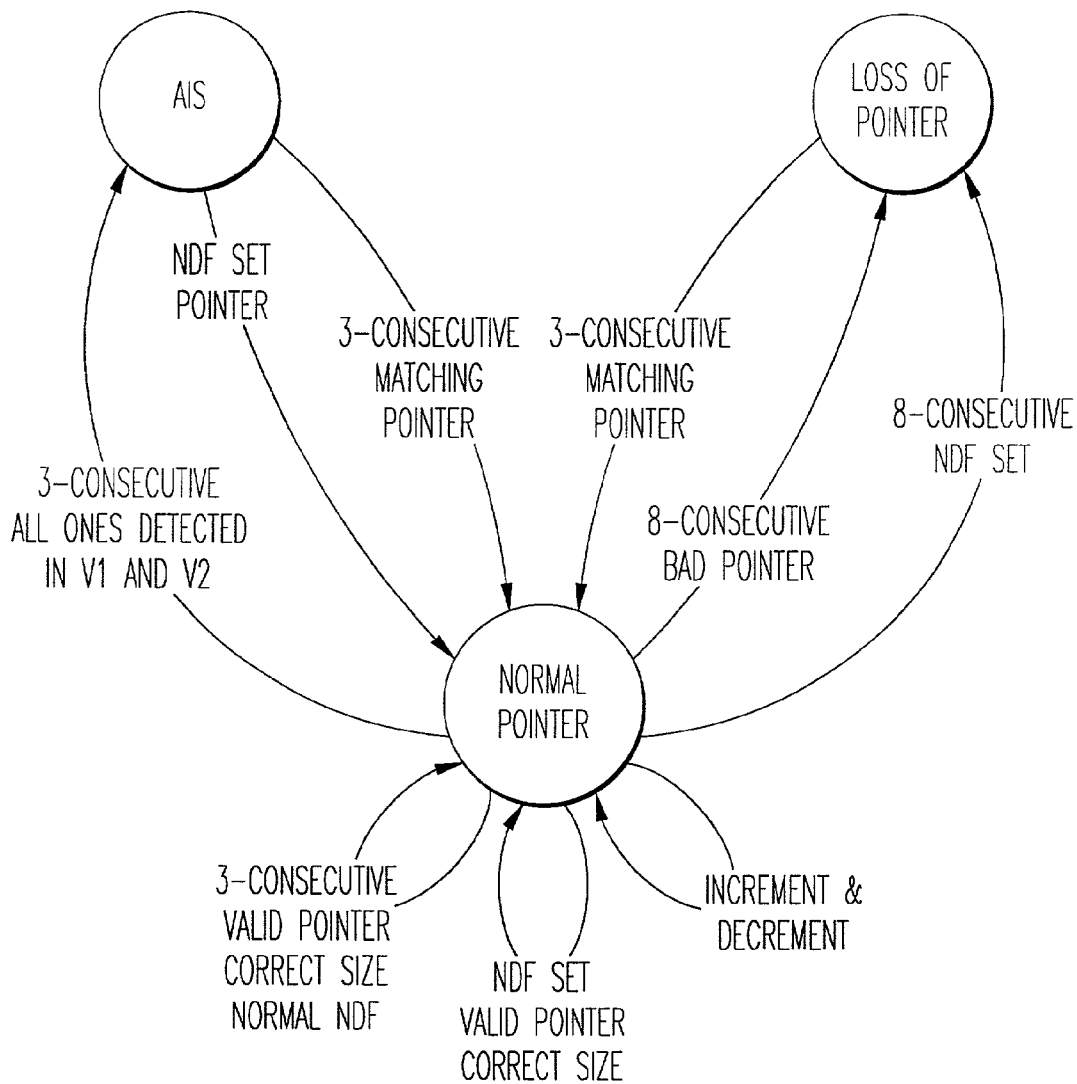
Figure 50:
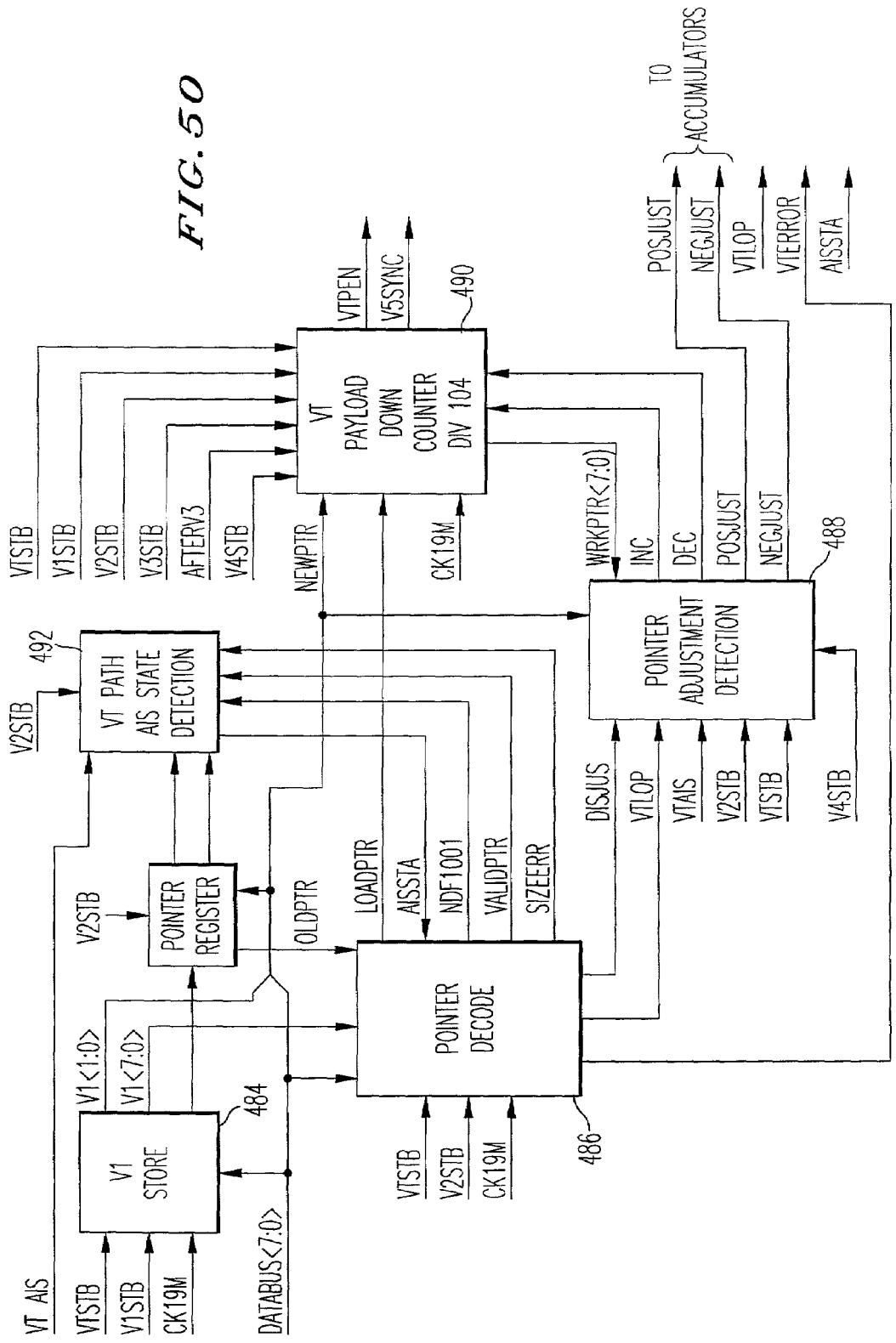
FIG. 50 is a functional block diagram depicting processing steps of a pointer interpretation algorithm for the VT Path Termination Module of a VTM circuit constructed in accordance with the present invention.

The VTM ASIC interprets the VT payload pointers as explained in the above-referenced Bellcore Technical Reference TR-NWT-000253, Issue 2, December 1991. The VT pointer. interpretation algorithm flow chart and state diagram are is shown in FIGS. 49 and 49B, and the main blocks of the pointer interpretation algorithm are shown in FIG. 50.

The V1 byte (V1 store 484) contains the New Data Flag (NDF) bits, VT size bits and the two most significant bits of the VT pointer. The NDF is in the four most significant bits, and it allows an arbitrary change of the pointer value or pointer size, due to a change in the payload (Pointer Decode Block 486). The normal operation is indicated with 0110 in the NDF bits. This is called a normal NDF. The NDF bits are set to 1001 to indicate an abnormal new alignment for the envelope. The NDF is detected as set if at least three bits match with the NDF (1001) pattern.

For illustrative purposes, the VTM ASIC processes VT1.5s. A VT1.5 is indicated as 11 in the size bits (Pointer Decode Block 486). The received VT size is used to validate the pointer value, and exit from VT loss of pointer and VT Path AIS conditions. The VTM ASIC does not interpret the concatenation indicator.

The VT payload pointer justifications are detected by looking at the I and D bits of the VT pointers (Pointer Adjustment Detection Block 488). The indication of whether or not a stuff opportunity has been taken is provided by the I and D bits of the pointer in the same VT superframe. The new received pointer value is compared with the pointer value indicated by the VT payload counter 490, and the decision is made by a match of 8 or more of the 10 I or D bits being inverted. The counter is disabled during one extra time slot (during the positive stuff opportunity byte) to reflect a pointer increment, if the VT payload pointer I bits are inverted. The counter is enabled for one extra time slot (during the negative stuff opportunity byte, V3) to reflect a pointer decrement, if the VT payload pointer D bits are inverted.

The VTM ASIC enters a VT loss of pointer (LOP) state (VT Path AIS State Detection Block 492) if a valid pointer is not detected in eight consecutive VT superframes, or if eight consecutive NDFs are detected as set to 1001. Incoming VT Path AIS does not result in entering the VT LOP state.

The VTM ASIC exits a VT LOP state when a valid pointer with a normal NDF is detected in three consecutive VT superframes.

VT Path AIS is detected by an all ones pattern in bytes V1 and V2 in three consecutive VT superframes. Upon detecting VT Path AIS, the VTM ASIC enters the VT Path AIS state.

The removal of VT Path AIS is detected by the VTM ASIC when a valid VT pointer is observed with a valid VT size and NDF is set to 1001, or when a valid VT pointer with a valid VT size and a normal NDF is observed in three consecutive VT superframes. The detection of the removal of VT Path AIS causes the VTM ASIC to exit the VT Path AIS state.

The pointer increment and decrement detections are converted into a single 19 MHz pulse and sent into the VT Performance Monitoring Block 480 for the accumulation of the pointer justifications.

An indication is generated at the V5 byte location in the VT SPE.

2.2.2 VT Performance Monitoring Block 480

The VT Performance Monitoring Block 480 terminates the VT Path Overhead Byte (V5), accumulates errors and pointer justifications, and stores the VT path performance information. The V5 byte is the first byte of the VT SPE, and it provides error checking, signal label and path status information for VT paths.

The BIP-2 or Byte Interleaved Parity bits in the V5 byte are used for error performance monitoring. The BIP-2 in bit 7 (SONET bit-1) is calculated on the odd numbered bits 1, 3, 5, and 7 (SONET bits 1-3-5-7). The BIP-2 in bit 6 (SONET bit-2) is calculated on the even numbered bits 0, 2, 4, and 6 (SONET bits 2-4-6-8) in all bytes of the previous VT SPE. The VTM ASIC calculates the BIP-2 bit interleaved parity for the previous multiframe, compares it with the received BIP-2 values, and declares a BIP-2 error for each BIP-2 that does not match its calculated BIP-2. The VTM ASIC accumulates the VT Path BIP-2 errors. A return Far End Block Error or FEBE is generated whenever BIP-2 errors are detected. The return FEBE is transmitted to the VT Path Generation Module 464. The errors are not generated or accumulated if a VT loss of pointer or a VT AIS state exists.

The bit 5 (SONET bit 3) of the V5 byte is used as the reflection of the BIP-2 errors to the originating terminal for the VT path terminating performance. The ASIC detects and accumulates the VT Path FEBEs. The errors are not accumulated if a VT loss of pointer or a VT AIS state exists.

The bit 4 of the V5 byte is a reflected Far End Receive Failure or FERF indication signifying the detection of VT Path AIS or VT Loss of Pointer at the far end receiver. The ASIC filters the FERF indication for three consecutive multiframes with an active interrupt on change.

The bits 3 through 1 (SONET bits 5 through 7) of the V5 byte represent the VT signal label. The VT signal label is used to identify the content of the VT payload. Unequipped, byte-synchronous and asynchronous payload are indicated with loci different logic states. The VTM ASIC provides filtering of the VT signal label for five consecutive frames with an active interrupt on change.

Bit 0 (SONET bit 8) of the V5 byte is used for path yellow indication. The VT Path Yellow is detected by a "1" being present for ten consecutive VT superframes. This causes a VT Path Yellow state. The removal of VT Path Yellow is detected by a zero being present for ten consecutive VT superframes. This causes the removal of the VT Path Yellow state.

The VT ASIC accumulates pointer increments and decrements for VT path performance, and stores the VT path status information and alarms. An interrupt is activated whenever an alarm bit is activated. All of the accumulators roll over when they reach the maximum count. The minimum time in which this can occur is 1.024 seconds.

The VT Loss of Pointer, VT Path AIS, VT Path Yellow, VT FERF, and loss of P1P0 also cause an active interrupt to be generated.

2.2.3 P1P0 Filtering Block 482

Figure 51:
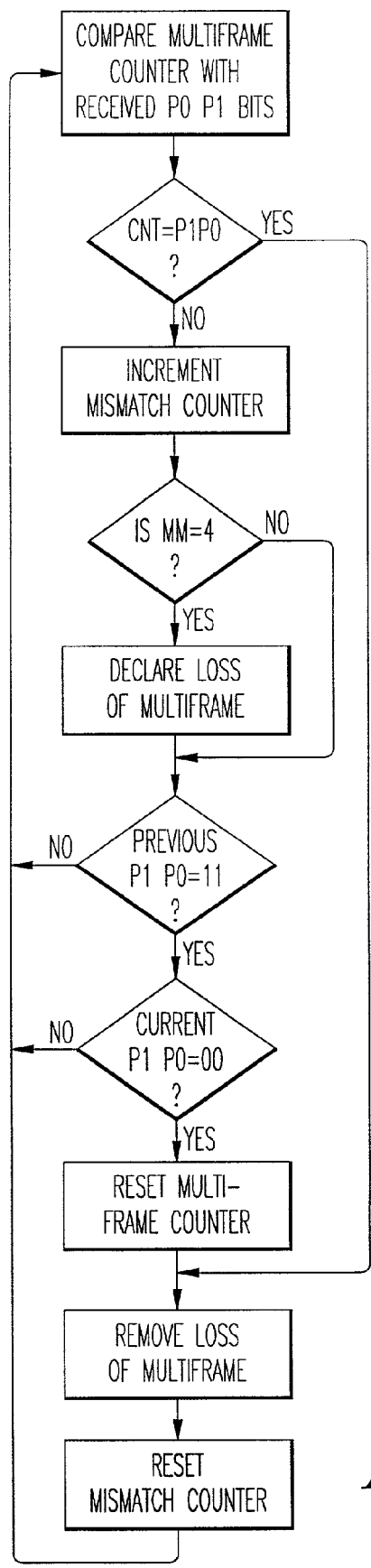
FIG. 51 is a flow chart illustrating a sequence of steps in a P1P0 filtering algorithm for the VT Path Termination Module in accordance with the present invention.

In the floating mode of operation, the P1P0 bits of the VT SPE are filtered, and a 5-bit counter is synchronized with the received P1P0 bits. A loss of P1P0 signal is generated when it is not received in sequence. The loss of P1P0 interrupt can be disabled so the error condition is not created for asynchronous tributaries. The algorithm for P1P0 filtering is shown in FIG. 51.

In the locked mode of operation, the locked H4 synchronization signal coming from the Receive Bus Interface 458 is passed directly to the DS1 Transmit Interface 452.

2.3. DS1 Transmit Interface 452

Figure 52:
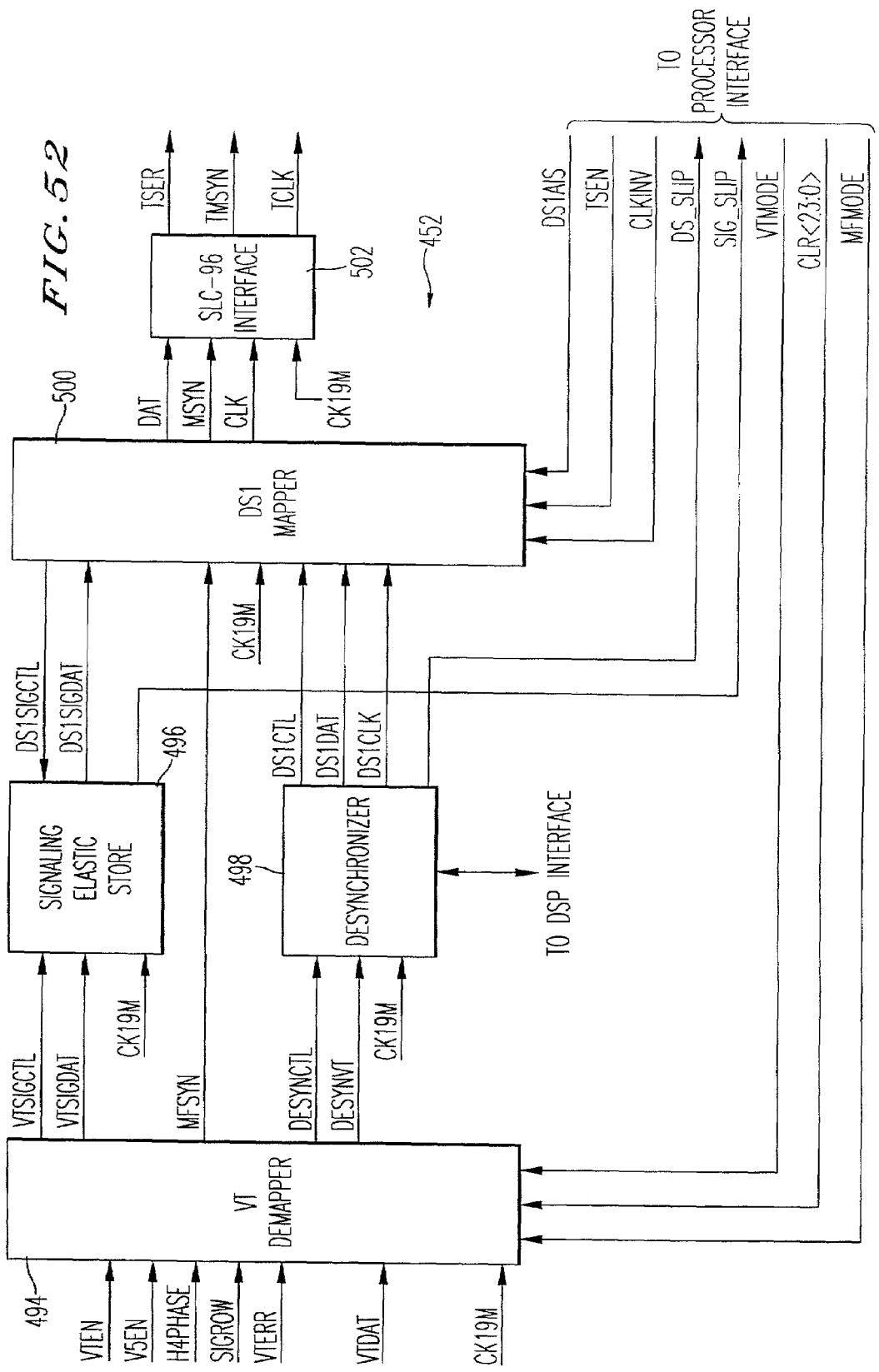
FIG. 52 is a functional block diagram of a DS1 Transmit Interface constructed and used in accordance with the VTM circuit of the present invention.

The DS1 Transmit Interface 452 uses four identical circuits to demap the DS1 signal from the VT payload. The DS1 Transmit Interface 452 can demap from a Locked or Floating VT payload. An elastic store provides the rate conversion between the VT and DS1 rate as well as the control for the desynchronizer. This Interface 452 utilizes a digital phase locked loop (DPLL) with a bit leak algorithm for both synchronous and asynchronous payloads, and provides signaling mapping from outslot signaling to the robbed bit signaling of a DS1. All of the filtering for the DPLL is preferably implemented using the external DSP 442. The functional blocks of the DS1 Transmit Interface are the VT Demapper Block 494, the Signaling Elastic Store 496, Desynchronizer 498, the DS1 Mapper Block 500, and the SLC-96 Interface 502, as shown in FIG. 52.

2.3.1 VT Demapper Block 494

The VT Demapper Block 494 extracts the DS1 data from the VT payload. There are three modes of operation for the VT Demapper. They are Floating Async VT, Floating Byte Sync VT, and Locked Byte Sync VT.

In the Floating Async VT mode, the VT SPE is received along with the V5 synchronization signal and a VT clock. The VS sync signal is used to determine the location of the DS1 in the VT SPE. All of the DS1 information bytes are written to the Desynchronizer 498. Bit destuffing is performed to remove the stuff bits from VT SPE. Majority vote is used for destuffing decisions in the VT Demapper Block 494 to provide protection for single bit errors in the C bits.

The VTM ASIC 420 provides access to the O bits on a per multiframe basis via the microprocessor interface 450. A status register per VT is reserved to store the 8 O bits per multiframe. An active interrupt is generated once every 500 µsec to provide read and write access to the O bits.

In the Floating Byte Sync VT mode, the VT SPE is received along with the V5 synchronization signal, the VT clock, and a P1P0 synchronization signal. The V5 sync signal is used to determine the location of the DS1 in the VT SPE, and the P1P0 sync is used to initialize the multiframe counter which controls the transfer of signaling information to the signaling elastic store. The twenty-four DS0 bytes along with the Framing bit of the DS1 are written to the Desynchronizer 498. The VTM ASIC stores the signaling bits from VT SPE into the Signaling Elastic Store 496.

The P1P0 sync signal is also used to create the multiframe synchronization (sync) pulse or signal for the output DS1. The multiframe sync signal occurs once every twenty-four frames in the ESF framing mode, and once every twelve frames in the SF or SLC-96 framing mode. The framing mode is provisionable. The multiframe sync signal indicates the multiframe boundary of the F bits.

The Locked Byte Sync VT mode operates the same as the Floating Byte Sync VT to DS1 mode. An exception is that the locked H4 signaling multiframe indicator is used in place of the P1P0 sync signal.

2.3.2 Signaling Elastic Store 496

The Signaling Elastic Store is a RAM used to the store the DS1 signaling bits demapped from the VT SPE until they are inserted into their robbed bit positions in the DS1 signal.

2.3.3 Desynchronizer 498

The Desynchronizer 498 is used in all VT to DS1 demapping modes within the VTM ASIC 420. The purpose of this block is to extract a tributary DS1 signal, along with its encoded timing (clock) from a VT payload. The three supported modes of desynchronization are (1) Floating Asynchronous VT to DS1 (async mode); (2) Floating Byte-Synchronous VT to DS1 (byte-sync mode); and (3) Locked Byte-Synchronous VT to DS1 (locked mode). These modes place different requirements upon the Desynchronizer.

In byte-sync mode, it is assumed that the tributary DS1 signal (at the mapping end) is operating in a synchronous (plesiochronous) manner with the SONET network element (NE). This implies that timing traceability to a given stratum level exists at both the tributary NE and the SONET NE. Because of this common reference, the only frequency difference between the two bridged nodes exists as wander (short term variations in frequency due to drift, etc.). In this operating mode, pointer adjustments (byte stuffs) occur at the mapping end only due to these effects, and not due to tributary frequency difference.

The Desynchronizer 498 is responsible in this mode for removing the effects of pointer adjustments (byte stuffs) from the extracted DS1 signal and its synthesized clock.

Each VT pointer adjustment would result in an instantaneous phase shift of 8 Unit Intervals (UI) if no phase smoothing circuitry were deployed. Additionally, pointer adjustments can result from the higher layer (STS level) transport pointer processing, frequency wander, etc. This activity, however, contributes to VT pointer activity at an attenuated level (i.e., 28 STS pointer adjustments are equivalent to one VT adjustment). Finally, in byte-sync mode, STS and VT overhead gaps contribute to phase jitter in the constituent payload. The Desynchronizer operates to remove the above effects from the de-mapped DS1.

In addition to the above mentioned sources of phase error, Floating Asynchronous Mappings (async mode) perform frequency justification (bit stuffing) to adjust the tributary (DS1) frequency to the SONET NE frequency. This again is done to prevent excessive pointer activity in the synchronous network, but also introduces additional phase error (jitter) in the process.

Figure 53:
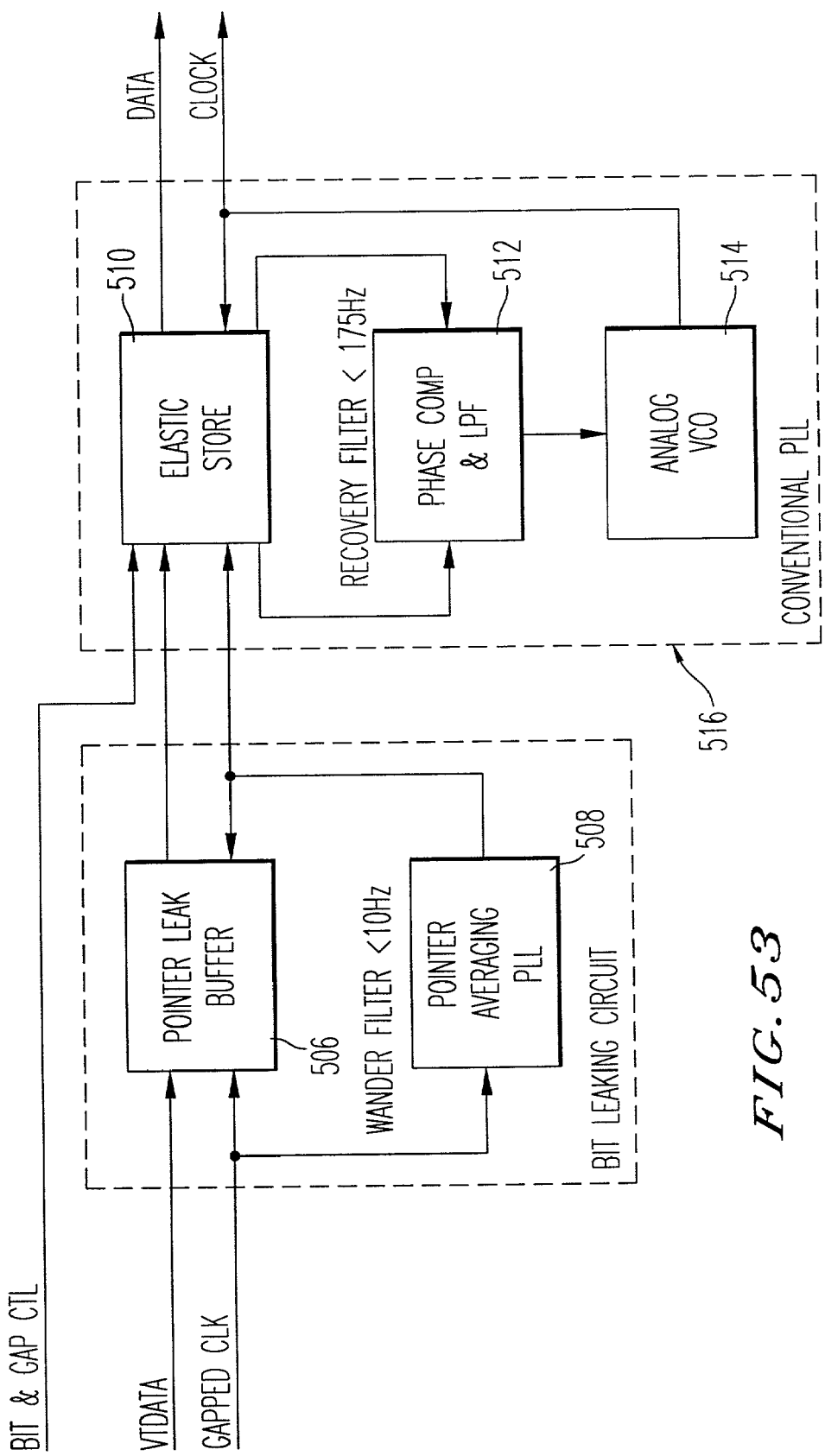
FIG. 53 is a functional block diagram of a conventional SONET desynchronizer.

To handle these different types of phase errors, most SONET desynchronizers are implemented in two separate stages as can be seen in FIG. 53. This implementation consists of a digital PLL- based pointer leak buffer 506, followed by a conventional desynchronizing PLL (516) (justification buffer). These implementations divide the desynchronization task into two smaller tasks.

The pointer leak buffer 506 is used to convert step function jitter caused by pointer adjustments into low frequency wander in the demapped signal (tributary). This is usually accomplished by means of an N-byte elastic store 510, where the write (input) rate is controlled relative to pointer activity and the read (output) rate is controlled by an averaging PLL 508 with a very low frequency transfer function (i.e., an integrator). Data is accumulated in this buffer 506 when pointer justification occurs. Data is "leaked" out of the buffer 506 slowly, a bit at a time, to maintain an average deficit in the store. This maps the instantaneous frequency change into a slow frequency change (wander) in the demapped signal.

The size of the buffer (N) 506 is calculated to allow the absorption of N/2 consecutive unidirectional (positive or negative) pointer adjustments. This condition generally only occurs as a "domino effect" when several tandem SONET NEs are at their byte stuff threshold, and an event causes them all to stuff at the same time.

The second stage of this type of circuit is a conventional PLL 516 which removes the higher frequency jitter that results from bit unstuffing of the payload, as well as the other previously mentioned effects (i.e., gap jitter, etc.). This circuit usually consists of an elastic store 510 sized for frequency justification and gap absorption, and a faster tracking filter 512 (approx. 160 Hz). This stage is significantly more active in the async modes than in sync modes because of the need to track wide frequency variation (+/−130 parts per million or ppm) in async mappings.

Figure 54:
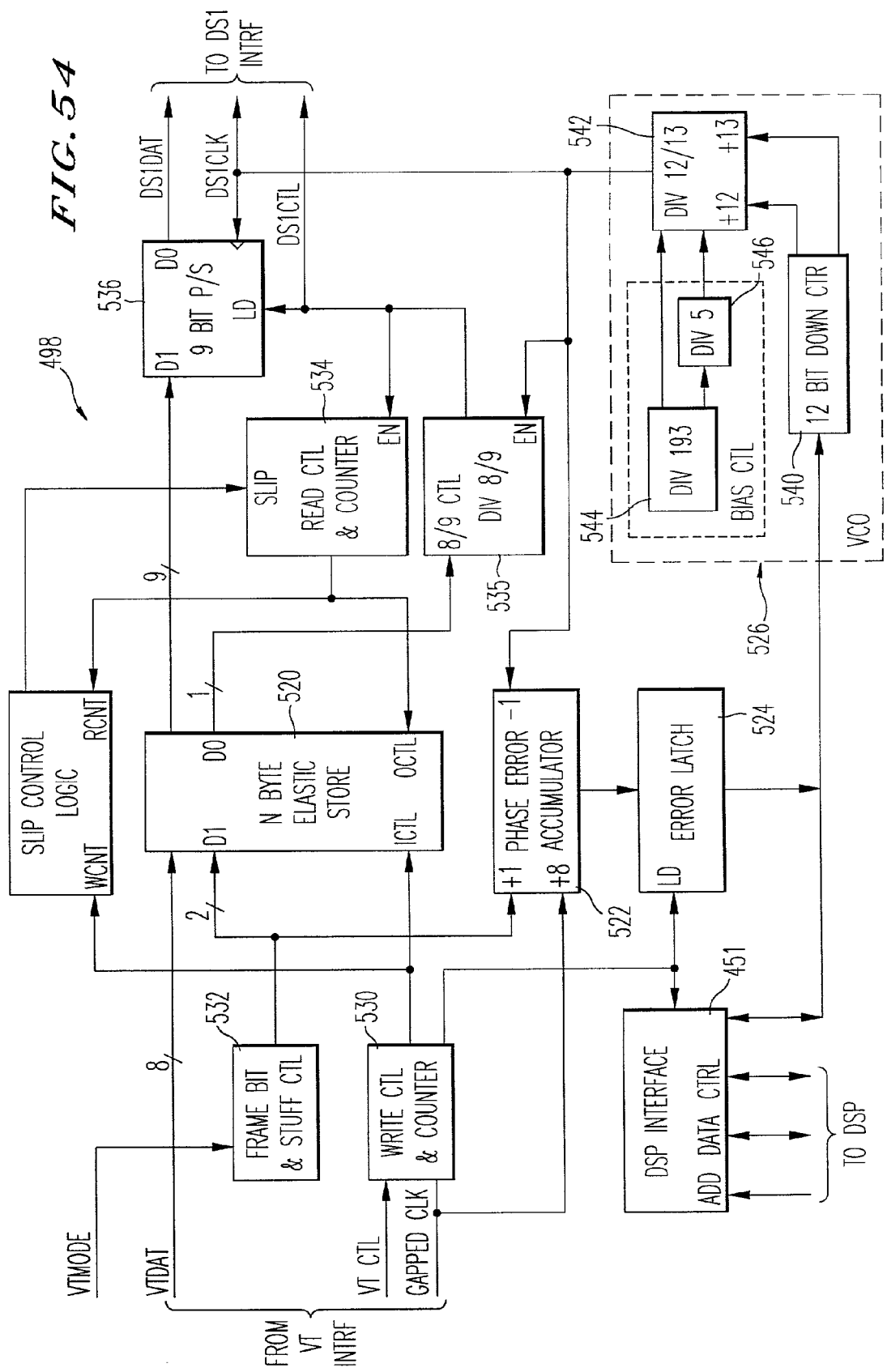
FIG. 54 is a schematic block diagram of a desynchronizer constructed and used in accordance with the VTM circuit of the present invention.

With reference to FIG. 54, the VTM ASIC Desynchronizer 498 of the present invention comprises a single multiport data store 520, a combined averaging phase detector comprising accumulator 522 and error latch 524, a synthetic clock generator (digital VCO) 526, and an external DSP-based adaptive filter via the DSP Interface 451.

By capitalizing on the power of an external DSP 442 (FIG. 35) to perform the filtering function, the remaining two functions are combined on-chip resulting in a gate-efficient, all-digital design. This furthermore provides the flexibility of tracking continuously changing network specifications with DSP filter software changes only (i.e., no new silicon). Four of these filters can be supported simultaneously by a single DSP.

In the VTM ASIC, the Desynchronizer 498 is an integral part of the DS1 Transmit Interface 452, as shown in FIG. 52. Operationally, the selected VT (1 of 4) arrives at the VT Demapper Block 494 as a series of bytes (VT_DAT) accompanied by several VT control signals. These include: VT_EN (gapped VT payload marker), V5_SYN (the V5 byte marker), and VT_ERR (VT error indication signal). These signals are used to control the write side of the elastic store 520. The elastic store write counter 530 is driven by the gapped VT enable strobe VTCTL. This signal is also fed to the accumulator 522 as an "ADD 8" control strobe.

The Frame & Stuff_Ctl block 532 is used to filter stuff control bits (i.e., "C" bits) and provide a combined frame/stuff control indicator bit (b9). In Byte-Sync mode, the DS1 frame bit is extracted from the VT signaling byte and written into the ninth bit position (b8) of the desynchronizer elastic store 520. The tenth bit position (b9) serves two purposes: first, it is used as an "ADD 1" control to the accumulator 522; and second, it is passed through the store to indicate the DS1 frame position to the read side 534 of the store 520.

In Async mode, the ninth bit (b8) written to the elastic store 520 is the combined bit stuff opportunity/193rd data bit. Again, the tenth bit (b9) is used as an "ADD 1" control to the accumulator 522, and as an "extra bit" indicator to the read side of the elastic store 520.

At the DS1 (read) side of the desynchronizer elastic store 520, a synthesized DS1 bit clock is provided by the VCO block 526 to the accumulator 522 as a "SUBTRACT 1" control. The clock is also sent to a divide by 8 or 9 circuit 535, which provides the read counter byte enable, and the 8/9 parallel to serial converter 536 load pulse. The 8/9 decision is made based upon the tenth bit (b9, the frame/stuff control indicator) as it passes through the store 520. If this bit is a logic one, a divide by 9 occurs on the next div 8/9 counter cycle. This has the effect of imparting an extra bit into the DS1 stream by allowing an extra bit to shift out of the 8/9 parallel to serial converter 536 (i.e., a 1 bit delayed load pulse occurs). This does not cause an output frequency change; in fact, it is required to happen once per frame. In Sync mode, the extra bit is the frame bit and is marked by the tenth bit (b9) containing a one.

Figure 55A:
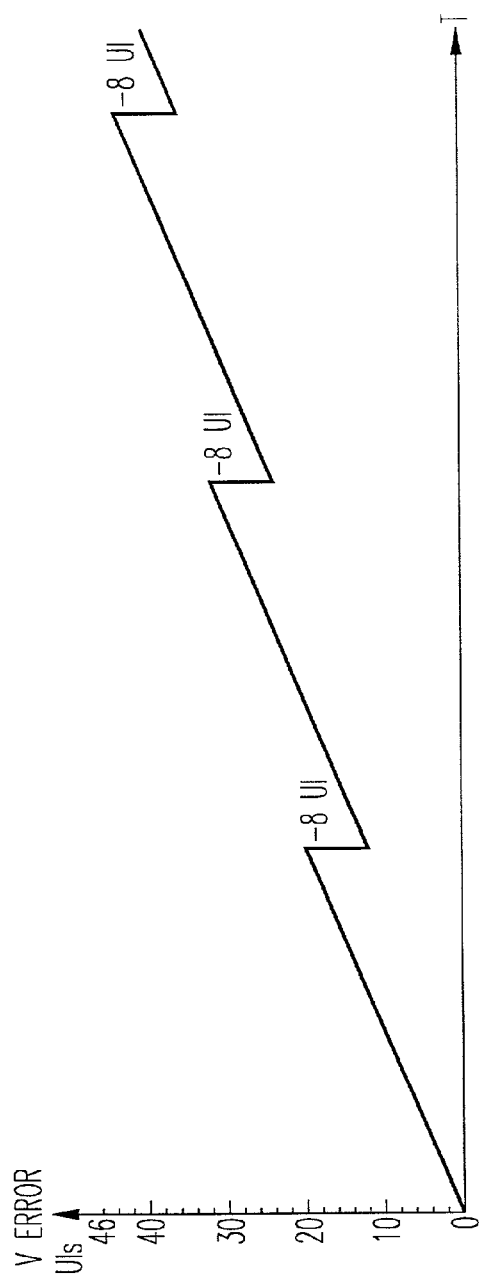
FIGS. 55A and 55B are graphs illustrating the effects of pointer adjustments on the phase error accumulator depicted in FIG. 54.
Figure 55B:
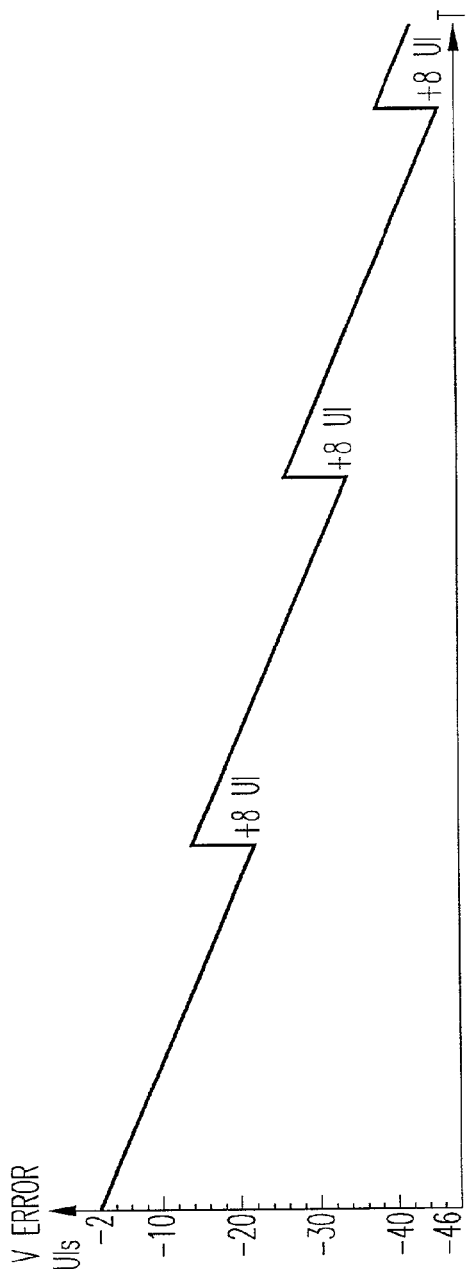

The accumulator block 522 operates as a phase comparator for the Desynchronizer 498 by providing a "write minus read" phase error as a signed magnitude to the DSP Interface 451. The accumulator contents are stored into a holding latch 524 once per frame, which is controlled by the VT side 530. This has the effect of averaging out the STS and VT gap jitter from the error signals. The residual error represents the phase difference between the VT and DS1 streams. The accumulator is incremented (by the VT side) at the byte rate and decremented (by the DS1 side) at the bit rate. This provides bit Unit Interval (UI) error resolution, with respect to the VT clock, to the filter. If a pointer justification occurs, the error "jumps" by +/−8 UI, which allows the external DSP filter to differentiate between byte stuff and bit stuff effects. This is advantageous in treating network wander and tributary jitter/frequency justification with different filter responses, as shown in FIGS. 55A and 55B.

Figure 56:
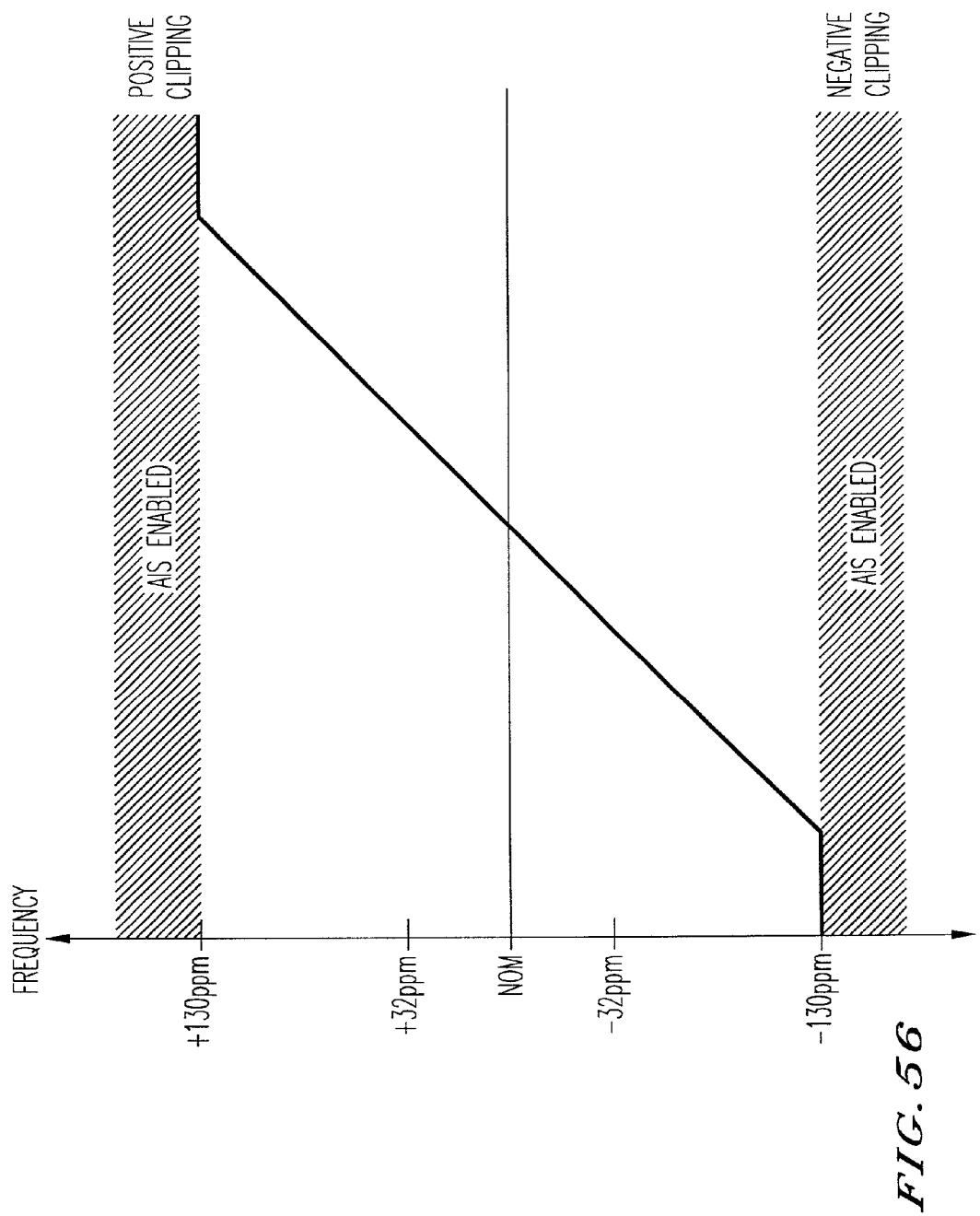
FIG. 56 is a graph illustrating frequency limiting induced by the desynchronizer depicted in FIG. 54.

The accumulator 522 operates in a linear manner and allows persistence of errors even in the presence of elastic store slips. This is accomplished by having separate slip control logic 538 and setting limiting thresholds at the accumulator. If the frequency error reaches a certain level, the elastic store 520 slips, but the accumulator remains at the saturation threshold until frequency corrections occur to reduce the error. Note that "soft" limits are set in the DSP filter to prevent excessive frequency correction (i.e., the DSP "clips" at a limit frequency of +/−130 ppm, and enable outgoing DS1 AIS). This prevents violation of network specifications for out of range conditions, as shown in FIG. 56. DS1 AIS masks effects of elastic store slips which may occur during frequency limiting.

The slip control logic 538 detects elastic store read/write pointer collisions. A collision window is opened around the write pointer, and if the read pointer enters into this window a slip occurs. The effect of the slip is to displace the read pointer by 50% of the store depth from the write pointer. The slip event is then reported to the microprocessor 426.

Slips represent an abnormal condition (i.e., loss of frequency reference) in the network and are accumulated as performance monitoring information.

The VCO block 526 is used in the Desynchronizer 498 to provide a digitally synthesized clock for the demapped DS1 signal. A nominal center frequency (f0=1.544 MHz) is maintained when the VCO control value in counter 540 is 1215 (assuming the sign is positive). This frequency is established by dividing the 19.44 MHz NE clock by 12 and 13 using divider 542 (expressed hereinafter as div12 and div13, respectively) in intervals distributed over 125 µS by a "BIAS" counter chain (consisting of a divide by 193 counter 544 and a divide by 5 counter 546 operating in parallel). The actual division ratio is calculated as follows:

19.44 MHz/1.544 MHz=12.59.

This translates to 114*div13+79*div12 or a ratio of 114:79 (in 125 µS). The digital clock synthesizer 526 is designed so that the magnitude essentially always preloads the value 1215 into a downcounter 540, even if control from the external DSP 442 is overridden (as in the locked mode) so that a nominal 1.544 MHz clock is synthesized. Without the two forced div13 to div12 conversions, the divide ratio is actually 116:77, or 12.60 (2432/193=12.60, which corresponds to 1.54273 MHz).

Since 0.59 is approximately 0.6, the MSB of the divide by 5 counter 546 is used to invert the LSB of the divide by 193 counter 544, which results in an evenly distributed 3 out of 5 (0.6) control for the div 12/13 counter 542. This ratio is further modified by opening up to 3 additional control opportunities for forcing div13 to div12 operations throughout the frame. Nominally, two of these are taken as additional divide by 12 s (i.e., 114:79). If a positive frequency delta is required, the third opportunity is taken as a divide by 12 (i.e., 113:80). If a negative delta is required, one of the two div12 opportunities is taken as an additional div 13 (i.e., 115:78).

In order to realize a circuit to achieve an appropriate ratio of div13/div12 operations, a divide by 5 counter 546 is clocked at the system clock speed (19.44 MHz) such that a fixed ratio of three div13 operations and two div12 operations occur per 5-count cycle. There are 38 of these 5-count cycles per 193-bit frame (193/5=38.6). The last 3 bits of the frame are derived from two div13 operations and one div12 operation to contribute the-remaining 0.6 portion. Therefore, to with no compensation from the external DSP 442, the average frequency for the DS1 clock is:

1/(2432 bits*1/19.44 MHz)/193 bits/frame=1.54273 MHz

In order to modify the average frequency under control of the phase compensation fed from the external DSP, one or more of the div13 operations are forced to be div12 operations in a manner similar to that described above. The adjustment can occur during any time throughout the frame since the downcounter 540 free runs with respect to either the 193-bit DS1 frame boundary or the DSP update procedure of the control word. The number of div13 operations which are converted to div12 operations depends on the signed magnitude fed to the Digital Clock Synthesizer 542 from the DSP. Without any compensation from the DSP, there are 2432 19.44 MHz clocks per DS1 frame, so that the average frequency of the DS1 clock is 1.54273 MHz.

To maintain nominal frequency operation and assuming the DSP writes a positive control value such that the sign bit is logic 0, the DSP writes a control value of 1215 to the Clock Synthesis block 526. This control value is loaded into a downcounter upon an underflow event. This control value preloads the downcounter 540 upon subsequent underflows until the word is overwritten by the DSP. (The new preload takes effect upon the following underflow.) When the downcounter 540 underflows, the event causes one of the div13 operations to be forced to a div12 operation in the Clock Synthesis block 526. For example, if the downcounter 540 is preloaded with a value of 1215, two underflows occurs during a 125-microsecond frame, and the total number of 19.44 MHz cycles is 2430 since:

38×2 div12+38×3 div13+1 div12+2 div13−2=2430 cycles

This corresponds to a nominal frequency of:

1/(2430*1/19.44 MHz)/193=1.5440 MHz

To achieve a negative frequency delta, a value of between 1215 and 2430 is written into the Clock Synthesis Downcounter Preload block 540. A value of 2430 preferably causes only a single div13 operation to be forced to a div12 operation over a 125-microsecond frame and the total number of 19.44 MHz cycles is 2431 since:

38×24 div12+38×39 div13+1 div12+2 div13−1=2431 cycles or a frequency of 1.543365 MHz.

For negatively-signed control values, the frequency justification scheme is slightly different. In this case, a single div13-to-div12 conversion occurs per frame due to the sign bit. This operation happens at a fixed location relative to the bit clock, not the data frame. For nominal operation, a negatively-signed magnitude of 2430 is loaded into the downcounter to provide one div13-to-div12 conversion due to underflow, and one div13-to-div12 conversion due to the negative sign bit. This results in a nominal frequency:

38×24 div12+38×39 div13+1 div12+2 div13−2=2430 cycles, 1.544 MHz.

To achieve a positive frequency delta, a value of between 1215 and 2430 is written into the Clock Synthesis Downcounter Preload block 540. A value of 1215 causes two underflows (just as in the case of a positive magnitude) and therefore two div13-to-div12 conversions and an additional conversion due to the sign bit for a total of three div13-to-div12 conversions. This results in the fastest frequency:

38×24 div12+38×39 div13+2 div12+1 div13−2=2429 cycles or a frequency of 1/(2429*1/19.44 MHz)/193=1.544635 MHz.

Figure 57A:
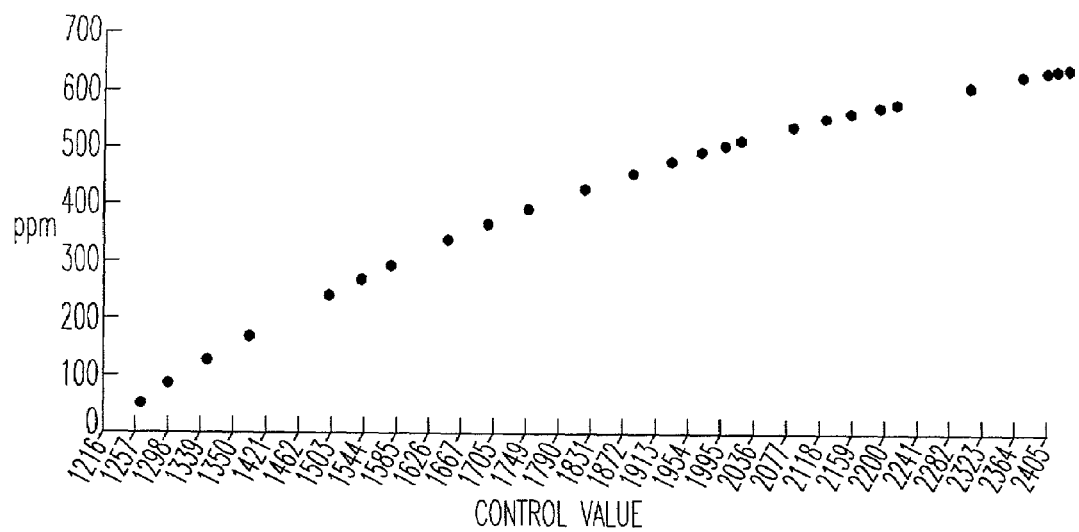
FIGS. 57A and 57B are graphs illustrating voltage control oscillator characteristics of the VTM circuit desynchronizer of FIG. 54.
Figure 57B:
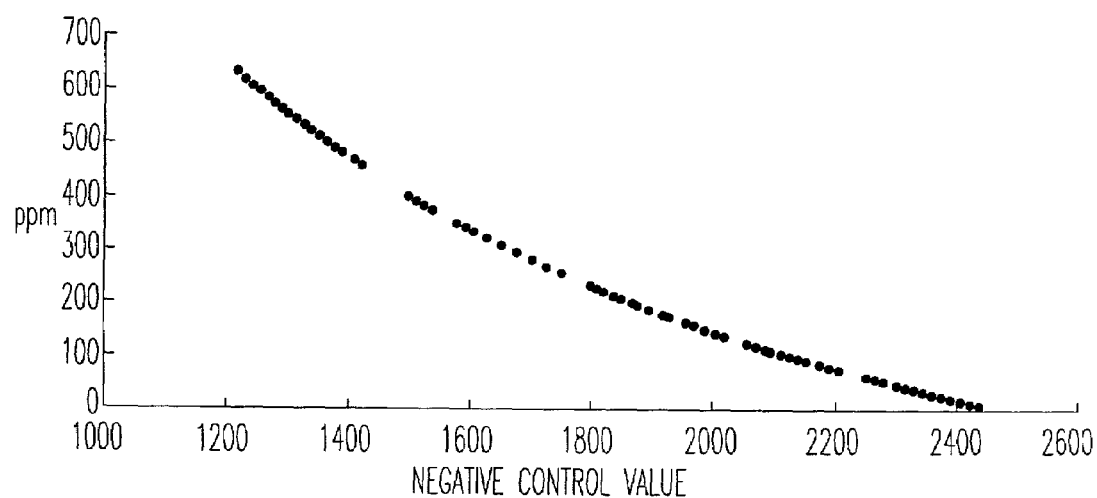

This sets the maximum and minimum frequency delta to +/−635 Hz, which would result from applying the delta every frame. The "control voltage" downcounter 540 provides resolution to the frequency range. This counter is a 12 bit (11 bits plus sign) downcounter written by the DSP and clocked once per system clock. The VCO transfer function is quasi-linear with the preload value corresponding to the center (nominal) frequency depending upon the sign of the magnitude, as illustrated by the Desynchronizer VCO characteristics depicted in FIGS. 57A and 57B.

The VCO 526 is controlled directly by the DSP Interface 451 and its control value can be changed at any time (up to once per frame).

The digital implementation of the VCO naturally results in a certain amount of intrinsic jitter. This is step function jitter with the dominant frequency component at 19.44 MHz. The peak to peak amplitude of this jitter is 0.079 Unit Intervals (UI), with respect to the 1.544 MHz DS1 clock. Jitter of this category falls under Jitter Generation specifications in the above-referenced Bellcore Technical References TR-253 and TR-499. TR-253 has a strict requirement for Jitter Generation in Mode II equipment (i.e., synchronous network interfaces). Byte sync DS1 falls into this category. The requirement is: <0.01 UI RMS when observed through a first order high-pass filter with the lower corner (−3dB) at 10 Hz (no upper corner is specified). The VTM ASIC VCO (as mentioned above) produces 0.079 UI peak to peak, or 0.028 UI RMS (assuming the jitter is sinusoidal). The additional high frequency jitter attenuation can be provided by any of a number of commercial DS1 line interface units. Standard DS1 magnetics (i.e., transformers) can provide the high frequency rolloff to meet this requirement. In either case, the advantages of an all digital implementation outweigh the minimal effects of this intrinsic jitter.

Figure 58:
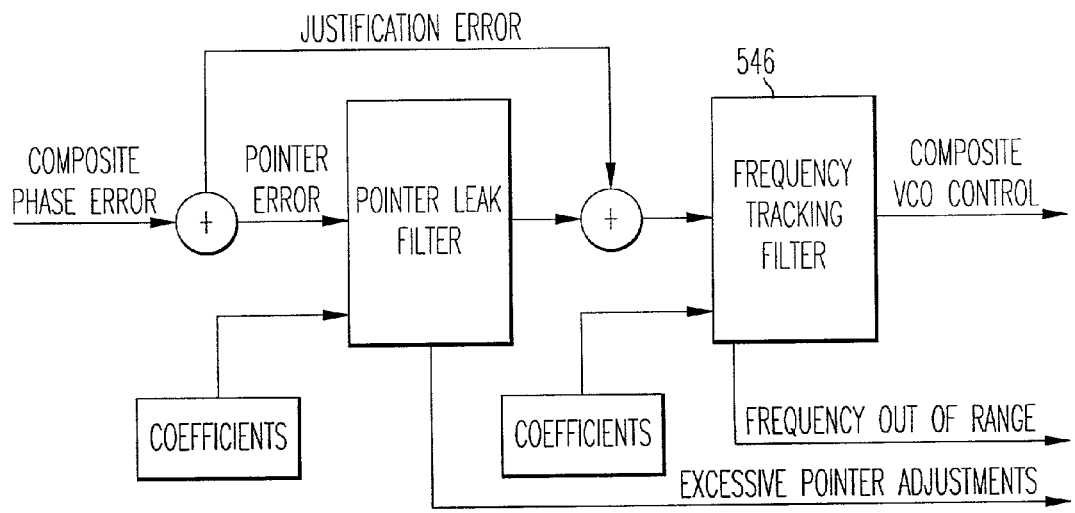
FIG. 58 is a functional block diagram of a VTM circuit desynchronizer filter constructed in accordance with the present invention.

The DSP filter block 546 (FIG. 58) is where the Desynchronizer 498 behavior is defined. The frequency tracking characteristics are controlled in the filter block 546 through filter coefficients 547 and control parameters. Loop filter characteristics such as capture, damping, filter gain, etc. are all programmable in the DSP implementation. Several options exist for the structural implementation of the filter. One approach is a tracking error discriminator, followed by two separate filters in cascade, as shown in FIG. 58. This is, however, not the only solution. Parallel filters can also be used.

The Desynchronizer error data is presented to the DSP via interrupt every 125 μS. This interrupt is derived from the selected NE reference clock which prevents quantization error (i.e., the coefficient rate is traceable to the SONET reference). The four VT error latches 520 are loaded with the same signal that causes the interrupt, synchronizing them with the DSP. A single interrupt service routine reads the four error latches and writes the four VCOs 526 every 125 μS.

The DSP overhead for this-access is minimal and present essentially no difficulty in real time.

The DSP Interface 451 of the VTM ASIC provides sixteen bit access to the external DSP device. Additionally, the DSP Interface 451 can be tied to the Microprocessor Interface 450 to allow a reduced cost implementation where a single processor handles both device maintenance and filter functions.

2.3.4 DS1 Manner Block 500

The DS1 Mapper Block 500 (FIG. 52) operates in two different modes, that is, async DS1 and sync DS1. In the async DS1 mode, the DS1 data is read from the desynchronizer elastic store 520, and fed to a programmable shift register to provide parallel to serial conversion. The shift register is loaded with 8 or 9 bits of data, depending on the frame/stuff control indicator bit (b9) of the desynchronizer elastic store 520, which indicates when a stuff bit is included with the 8 bits of data. The data is then shifted out using the clock from the digital VCO 526 in the Desynchronizer 498.

In the sync DS1 mode, the DS1 data is read from the desynchronizer elastic store 520, and fed to a programmable shift register to provide parallel to serial conversion. The shift register is loaded with 8 or 9 bits of data, depending on the frame/stuff control indicator bit (b9) of the desynchronizer elastic store 520, which indicates when a frame bit is included with the 8 bits of data. The signaling data is read from the Signaling Elastic Store 496, and inserted into the DS1 if robbed bit signaling is enabled. The enabling of robbed bit signaling is provisioned on a per DS0 basis.

2.3.5 SLC-96 Interface 502

The SLC-96 Interface 502 (FIG. 52) inserts SLC-96 mode framing bits into the Transmit DS1 data stream. The SLC-96 mode DS1 frame organization consists of 24 eight-bit DS0 channels, preceded by the framing bit for a total of 193 bit per frame. The framing bit is used in three ways:

1. Terminal Framing: The framing bit identifies the location of the first DS0 channel in a DS1 frame. This is done by toggling the framing bits of successive odd-numbered frames in the pattern 1,0,1,0, . . .

2. Signaling Framing: The framing bit identifies the sixth and twelfth frames of every 12-frame multiframe to identify the A and B signaling bits. This is achieved by setting the framing bits of successive even-numbered frames according to the pattern 0,0,0,1,1,1. The sixth DS1 frame is identified as a zero to one Fs bit transition. Similarly, the twelfth DS1 frame is identified as a one to zero transition.

3. Data Link Framing: The framing bit identifies the frames where the framing bit is used to form a serial data link. It is accomplished by first transmitting the signaling framing pattern two multiframes, and then, during the next four multiframes, replacing the Fs bits with data link information bits. Thus, a SLC-96 superframe is composed of six consecutive multiframes (72 frames).

The SLC-96 facility datalink pattern which is transmitted from the VTM ASIC is given in FIG. 59. The C1–C11, M1–M3, A1,A2, and S1–S4 bits to be transmitted are provisionable.

2.4 Transmit Bus Interface 460

Figure 60:
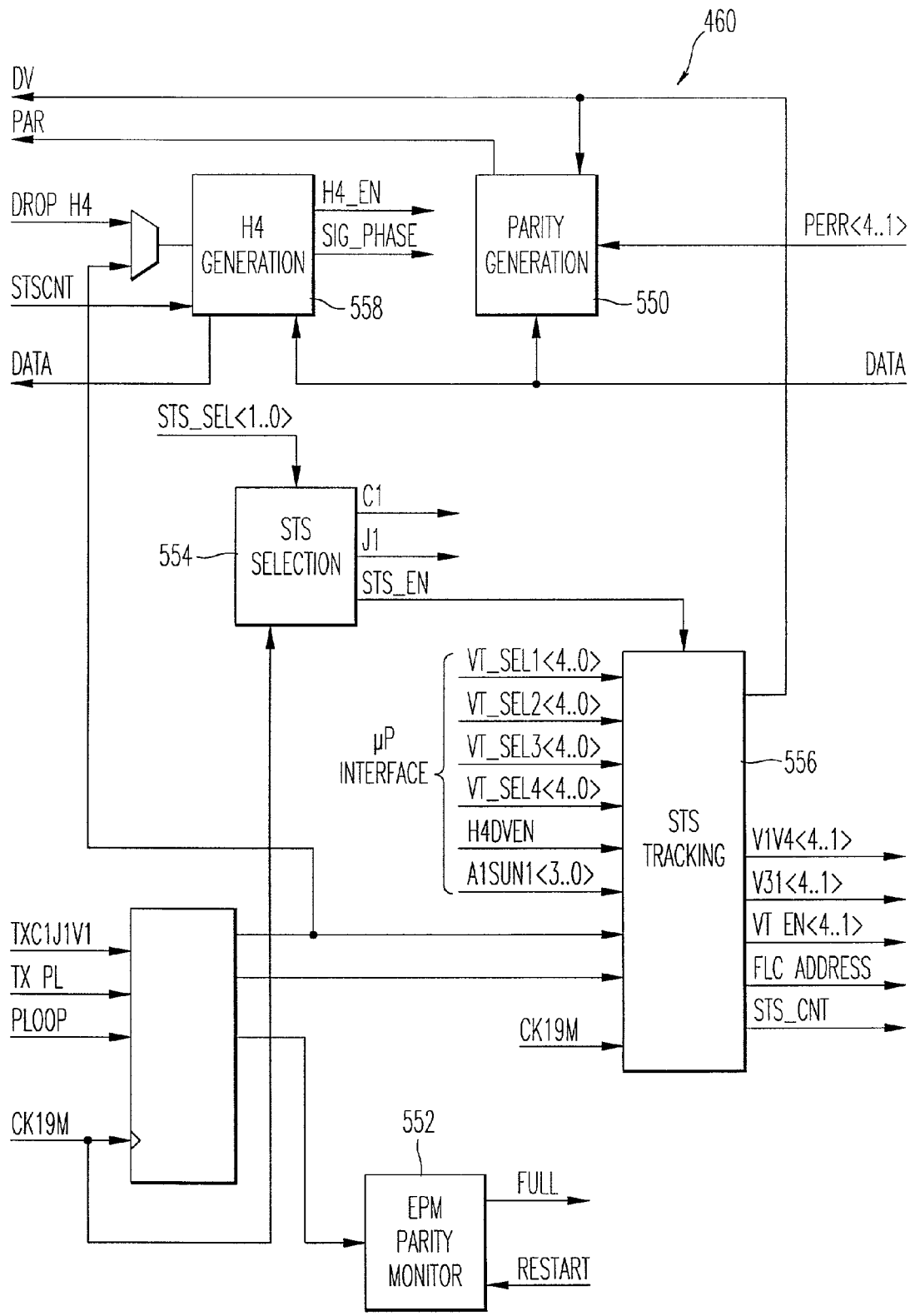
FIG. 60 is a functional block diagram of a Transmit Bus Interface of a VTM circuit constructed in accordance with the present invention.

The Transmit Bus Interface 460 receives control signals and provides a 19.44 MHz STS-3 8-bit data stream to add Bus 2 or drop Bus 3. There is a separate Transmit Bus Interface for both Bus A and Bus B, with VTs being sent out over the active bus, and AIS with good parity being sent out over the inactive bus. The Transmit Bus Interface provides timing for the four selected VTs of the selected STS-1, H4 byte generation, and the equipment protection control functions of generating parity and monitoring reflected parity. The functional blocks of the Transmit Bus Interface are Parity Generation Block 550, EPM Parity Monitoring Block 552, STS-1 Selection Block 554, STS-1 Tracking Block 556, and H4 Generation Block 558, as shown in FIG. 60.

2.4.1 Parity Generation Block 550

The C1J1V1 synchronization signal, and the PL payload indicator are received and retimed. The data, data valid, and parity are output relative to these signals. The parity is an odd parity calculated over the transmit data path and data valid strobe. Parity errors can be injected on a per VT basis as provisioned.

2.4.2 EPM Parity Monitor Block 552

The EPM Parity Monitor Block 552 tracks all of the provisioned VTs in the selected STS-1, and monitors their reflected parity. Reflected parity is the parity calculated by the STSM card 51 on Bus 2 or the SCP 54 on Bus3 over the data, data valid, and parity signals output from the Transmit Bus Interface 460, and then reflected back to the VTM ASIC. The EPM Parity Monitor has a programmable delay for the VT tracking counter to compensate for the reflected parity loop delay. The programmable delay may be three, six, nine, or twelve 19.44 MHz clock cycles. When a parity error is detected, the VT number which generated the parity error (1–28) is stored in a FIFO. This FIFO is accessible through the Microprocessor Interface 450 with a full indicator and restart control. The VT number(s) having parity errors indicate which VTM is not operating properly. Any number from one to all twenty eight of the VTs in the selected STS-1 can be monitored. The polarity of a reflected parity error can be provisioned to be interpreted as an active 1 or 0. An active interrupt is generated when the FIFO is full.

2.4.3 STS-1 Selection Block 554

STS-1 selection provides an enable during one STS-1 as provisioned to extract data from the interleaved 19.44 MHz data stream. C1 and J1 strobes for the selected STS-1 are generated from the incoming sync signals.

2.4.4 STS-1 Tracking Block 556

The STS-1 Tracking Block 556 uses row and column counting to identify the positions of the SPE for the selected STS-1. The counters are synchronized to the received J1 sync and enabled by the PL indicator. The row and column positions are decoded to provide VT and STS-1 timing signals. Four VT1.5s are selected from the 28 VT1.5s in the SPE, as provisioned, and tracked using the row and column counts. For each of the four selected VT1.5s, an enable, V1 through V4 strobe, and positive stuff opportunity strobe are generated. These VT timing signals are used with an address to demand data from the VT Path Generation Module 464. The STS-1 Tracking Block 556 also generates a data valid (DV) signal to be sent with the data and an H4 indicator for the H4 Generation Block 558. The Data Valid signal indicates when each of the four selected VTs are valid. The Data Valid signal can also be active during the H4 byte of the selected STS-1 if provisioned for H4 byte generation.

2.4.5 H4 Generation Block 558

Figure 61:
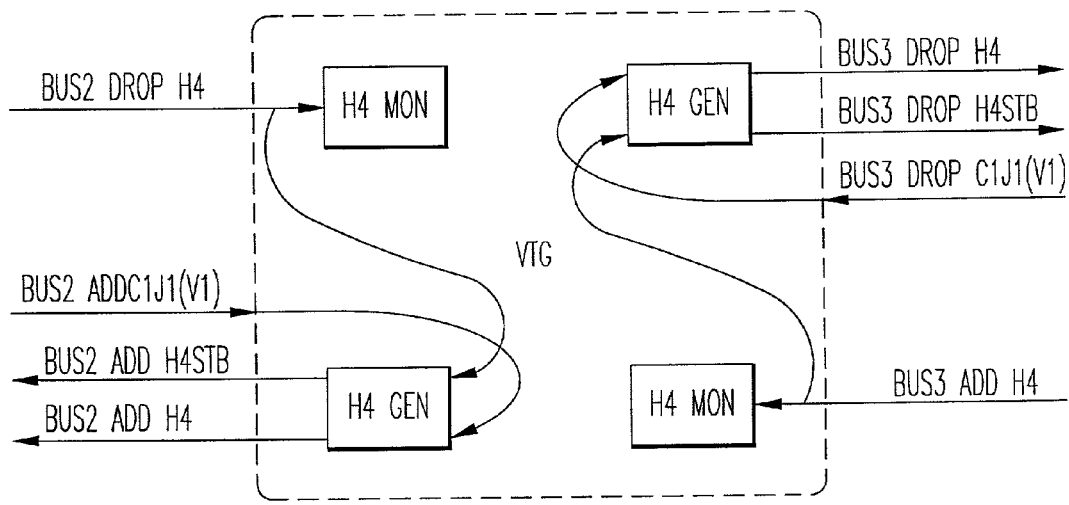
FIG. 61 is a diagram illustrating the selection of transmit VT multiframe timing from either of two sources in accordance with the present invention.

H4 is generated to identify the multiframe alignment of the signaling for the VT1.5s, and inserted in the selected STS-1 of the transmit data stream if the ASIC is provisioned for H4 generation. The H4 Generation Block 558, shown as 558' and 558" in FIG. 61, can be provisioned to select the transmit VT multiframe timing from two different sources. One source (mode 1) is the receive Bus H4 sync. The second source (mode 2) is the transmit Bus demand sync (C1J1V1). For the locked mode (Bus 3 operation), multiframe signaling alignment is essentially always aligned with the demand sync (C1J1V1). For the Floating mode (Bus 2 operation), either the demand sync (C1J1V1) or the incoming H4 of the selected STS-1 can be used for multiframe sync. For the floating mode, the demand sync provides multiframe alignment with the high speed extension of the STSM card 51, and alignment with H4 of the data stream o provides alignment with the OC-3 interface card 50. In addition to inserting the H4 sequence in the data stream, the H4 Generation Block 558 generates strobes to control the flow of signaling data from a multiframe buffer.

2.5 VT Path Generation Block 464

The VT Path Generation Block 464 generates the V5 byte, inserts it into the VT SPE, and performs the pointer translation from the VT pointer value received in one Bus or DS1 to another VT pointer value determined by the synchronization signals of another bus. The VT Path Generation Block is bypassed if this VT is mapped into the locked STS-1 frame. Two pointer generation circuits are utilized to generate the VT pointers independently for each Bus (A and B).

2.5.1 V5 Byte Generation

The VTM ASIC generates and inserts the V5 byte for the Floating VTs mapped from the DS1 interface. For Floating VT to Floating VT mappings, V5 byte insertion is disabled.

The BIP-2 parity is calculated over the previous frame and inserted into the most significant two bit positions of V5 byte. The payload pointers and positive stuff locations are excluded from parity calculation. The BIP-2 parity bits can provisionably be inverted. Both bits are inverted at the same time to create 2-bit parity error.

The FEBE is related to the detected BIP-2 errors at the VT Path Termination Block. Since both receive and transmit frame alignments are different, an up down counter has been added to collect the FEBEs. A received error increments the counter by one. It is decremented by one when a FEBE bit is inserted in the V5 byte location.

The FERF and Yellow are used to alert upstream terminals of detected failure conditions. The VTM ASIC is capable of generating a FERF from three sources: (1) a fixed (logic 0) value; (2) hardware failure detection; or (3) provisioning. Hardware FERF is reflected in 125 μsec upon the detection of VT loss of pointer or VT Path AIS conditions. Yellow bit is inserted via provisioning only.

The VT path label is provisionable via the Microprocessor Interface 450.

2.5.2 VT Path AIS Insertion

The VT Path AIS is inserted as all ones in the entire VT envelope including V1 through V4 VT pointer bytes. VT Path AIS is generated in 500 μsec upon entering a failure state. VT Path AIS is initiated when VTM ASIC enters the VT Path AIS. or VT Loss of Pointer state.

DS1 to VT mappings require VT Path AIS insertion related to the DS1 facility failures in 500 μsec. A provisioning bit has been added for that purpose.

Deactivation of the outgoing VT Path AIS occurs within 500 μsec of exiting the failure state. When the VT Path AIS is removed, the pointer contains a valid pointer with an NDF set to 1001 and size set to 11, followed by normal pointer operations.

2.5.3 VT Pointer Generation Module 600

A VT Pointer Generation Module 600 (FIG. 62) isolates the received DS1 or VT frame timing from the transmit Bus frame timing. Both sides of the VT Pointer Generation Module 600 utilize the same 19 MHz clock and have the VT frame format. The VT frame and STS frame gaps are absorbed in this circuit, and received VT pointer adjustments are reflected linearly to the read side to generate the VT pointer adjustments.

Figure 62:
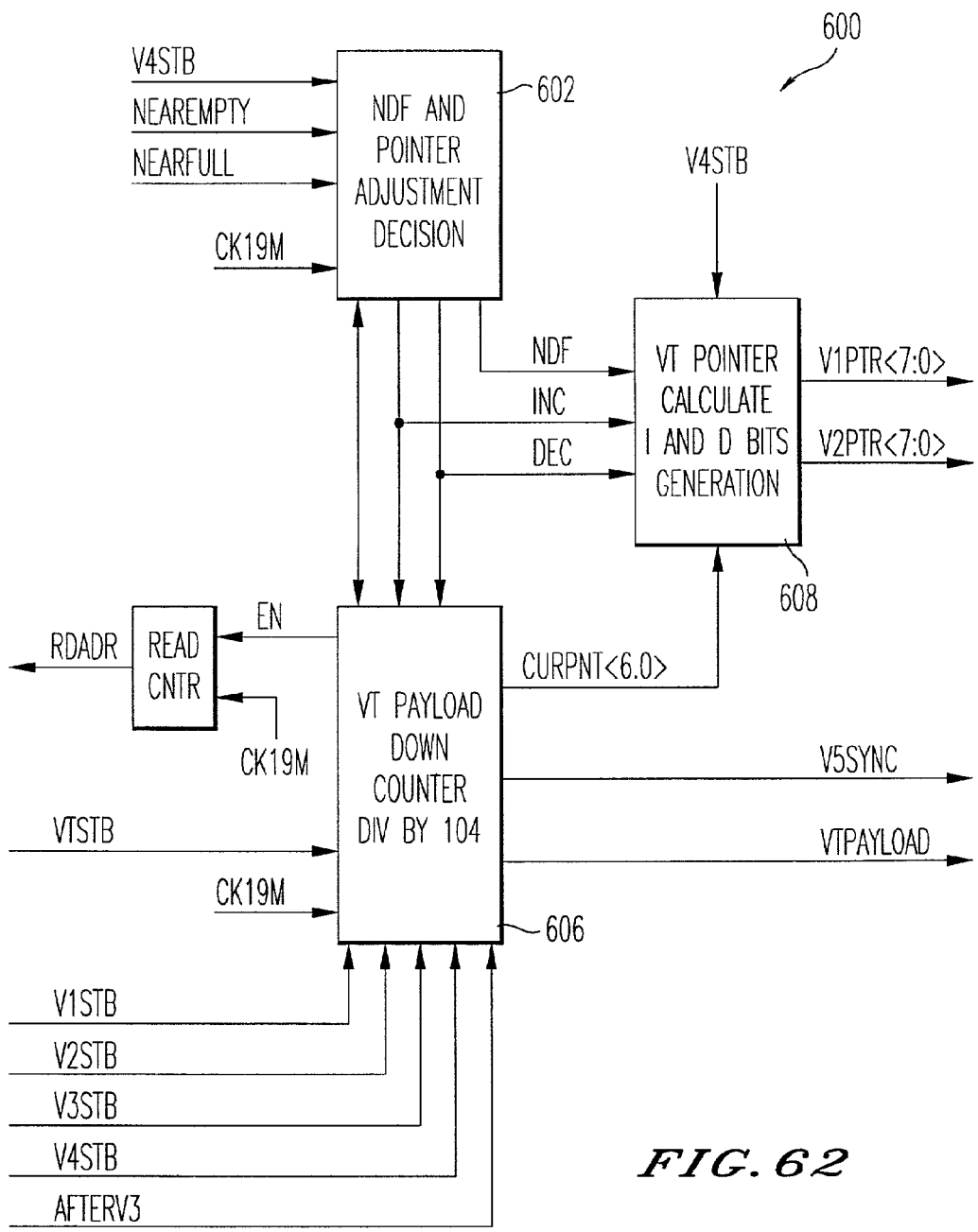
FIG. 62 is a functional- block diagram of a VT Path Generation Module constructed in accordance with and used in connection with the VTG circuit of the present invention.
Figure 63A:
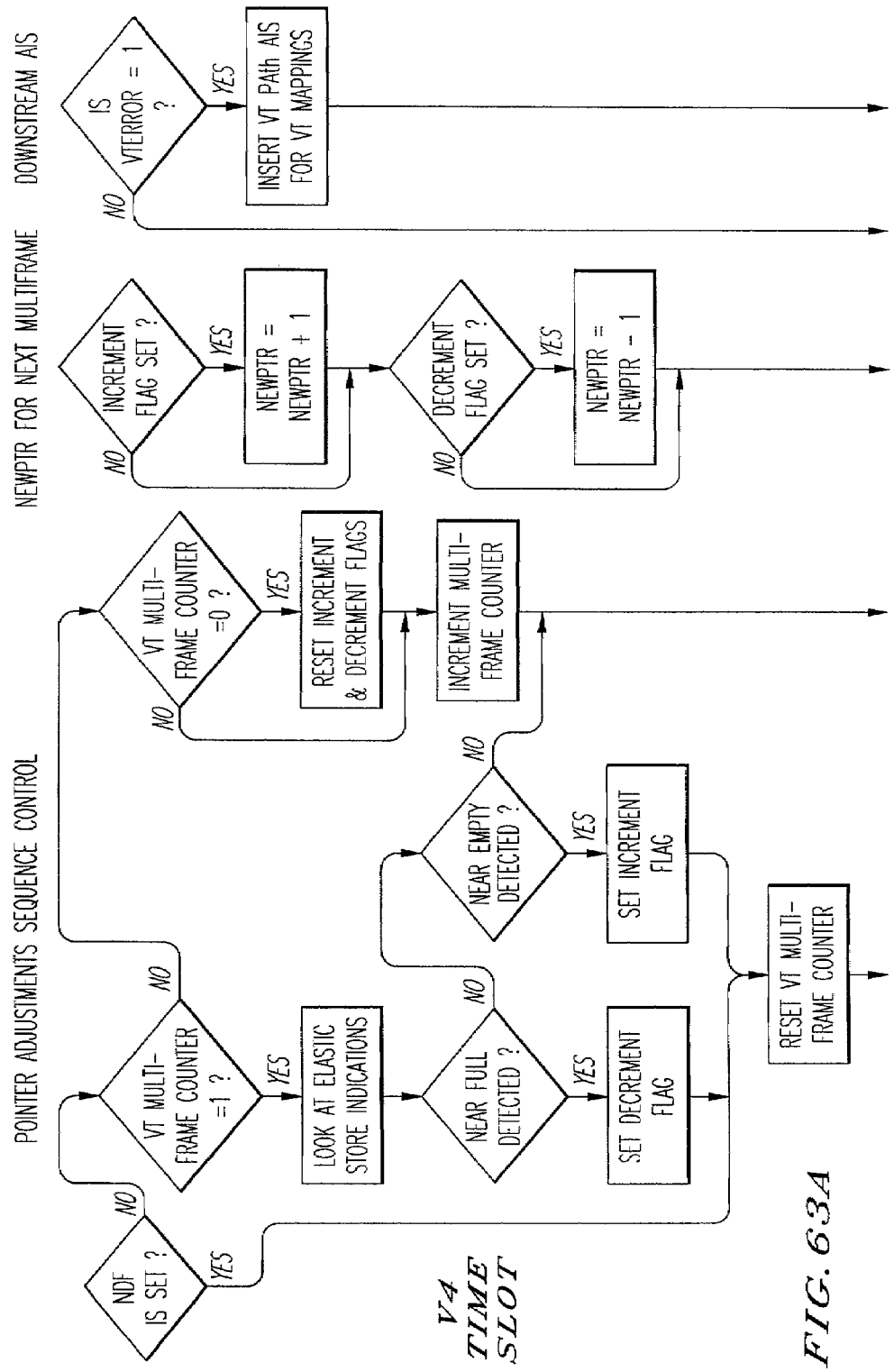
FIG. 63 is a flow chart illustrating a sequence of steps in a VT pointer generation algorithm in accordance with the present invention.
Figure 63B:
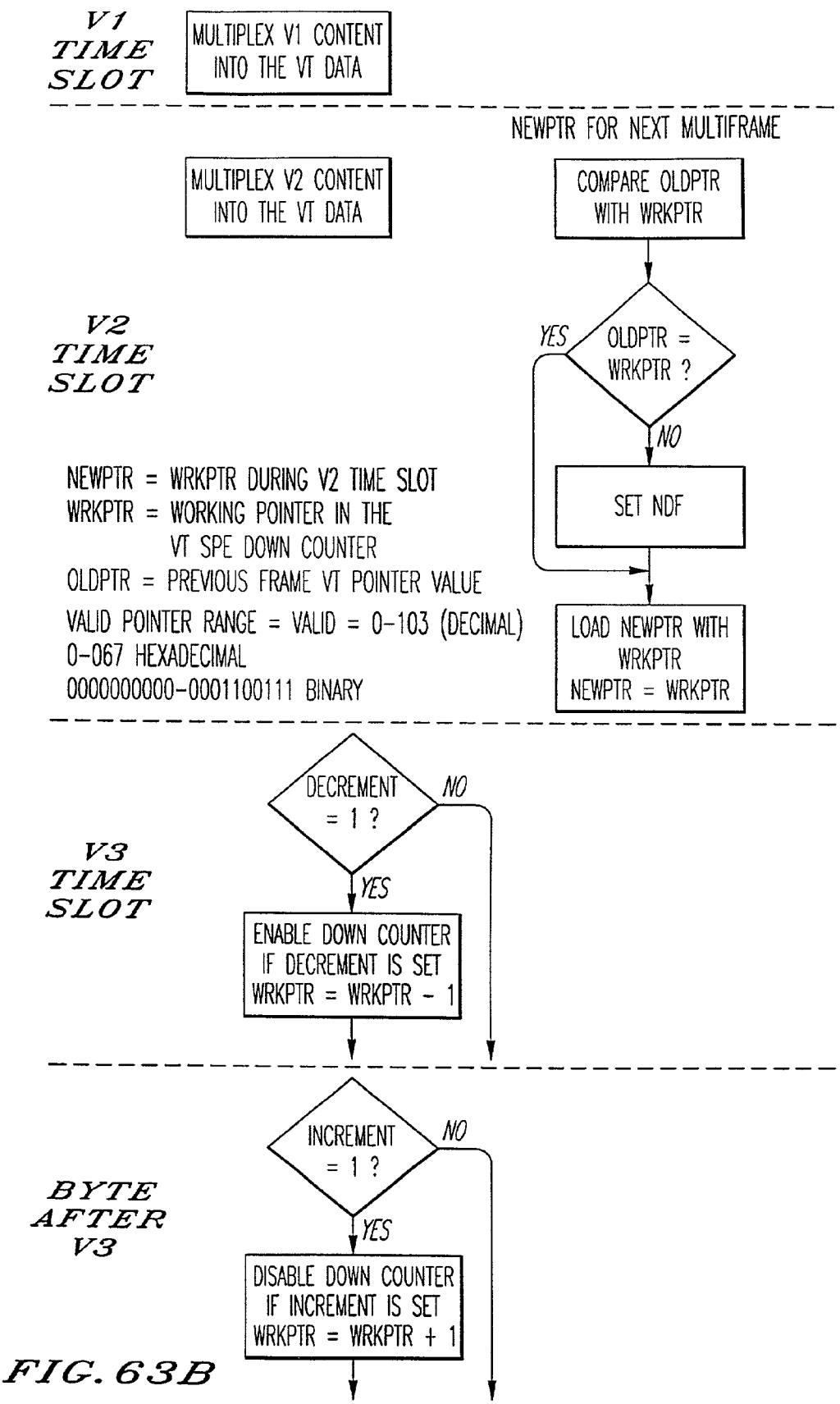

The VTM ASIC generates the VT payload pointers as explained in the Bellcore Technical Reference TR-NWT-000253, Issue 2, December 1991. The functional blocks of the VT Pointer Generation Module 600 are shown in FIG. 62, and the algorithm flow chart is shown in FIG. 63.

During normal operation, the pointer defines the first location of the VT SPE in the VT1.5 envelope capacity, and essentially always inserts NDF with the normal NDF value 0110. The size bits are set to 11, which indicates the size of the VT1.5.

A four multiframe sequence counter 606 counts the multiframe intervals for the NDF and pointer adjustments as explained below. Only one pointer adjustment is preferably allowed in 500 μsec.

1. If the alignment of the envelope changes because of a new synchronization received at the VT Pointer Generation Module 600, or the change of the J1 synchronization signal at the Transmit Bus Interface, the new pointer value is sent, accompanied by the NDF set to 1001 (NDF and pointer adjustment decision block 602),. The set NDF essentially only appears in the first frame that contains the new value. No subsequent increment or decrement operations are allowed for three frames following this operation.

2. If a positive stuff is required, the OLDPTR value is sent with the I-bits inverted (I and D Bits Generation Block 608), and the subsequent positive stuff opportunity is filled with all 0's. The pointer value at the following frame NEWPTR is incremented by one. No subsequent increment or decrement operation is allowed for three multiframes following this operation.

3. If a negative stuff is required, the OLDPTR value is sent with the D-bits inverted (Block 608), and the subsequent negative stuff opportunity is overwritten with a VT SPE data byte. The pointer value at the following frame NEWPTR is decremented by one. No subsequent increment or decrement operation is allowed for three multiframes following this operation.

2.6 DS1 Receive Interface 454

Figure 64:
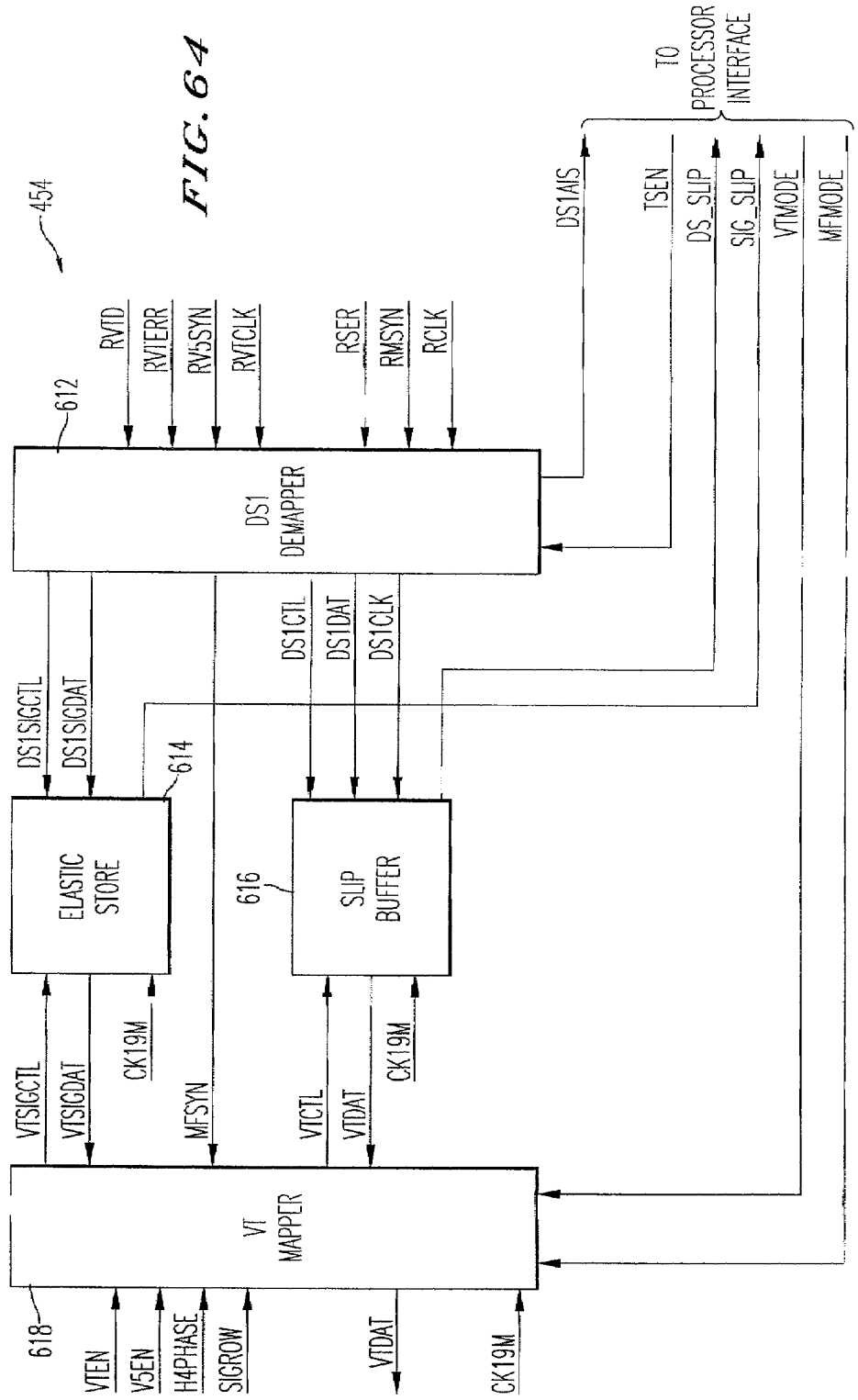
FIG. 64 is a functional block diagram of a DS1 Receive Interface constructed in accordance with and used with the VTM circuit of the present invention.

The DS1 Receive Interface 454 provides the mapping of DS1 signals into the VT SPE through the use of an elastic stores or a slip buffer. The functional blocks of the DS1 Receive Interface are the DS1 Demapper Block 612, Elastic Store 614, Slip Buffer 616, and VT Mapper Block 618, as shown in FIG. 64. The VT frame is essentially always synchronized with the J1 synchronization signal and VT clock coming from the Transmit Bus Interface Block 460. The Interface Receive DS1 has four mapping modes: (1) DS1 to Locked VT; (2) Floating Byte Sync VT to Locked VT; (3) DS1 to Floating Byte Sync VT; and (4) DS1 to Async VT.

2.6.1 DS1 to Locked VT Mapping Mode

In the DS1 to Locked VT mapping mode, the DS1 Demapper Block 612 extracts the ABCD robbed bit signaling bits from their DS0 channels, extracts the framing bits from the DS1 signal, demultiplexes the DS1 signal into its component DS0 channels, and passes all of this information to the slip buffer 616. The slip buffer is composed of three separate buffers: a data buffer, a frame buffer, and a signaling buffer. Each handles the indicated information extracted from the DS1. The DS1 Demapper Block 612 also terminates the SLC-96 Facility Data Link if provisioned to do so.

The data buffer is organized in 8-bit words to accommodate the 8-bit DS0 channels. Each DS0 channel is written into a location indicated by its channel number (1–24). This allows the data buffer to slip a whole DS1 frame related to the rate difference between the DS1 line frequency and system clock frequency. The one frame slip causes one byte of data from each DS0 channel to either be lost, or repeated, depending on whether there is a positive or negative frequency difference.

The frame buffer is organized in two bit registers to accommodate the frame bit and multiframe sync indicator. The signaling buffer is organized in 4-bit registers to facilitate the out slot signaling mapping of the DS1 signaling bits. Each frame and signaling bit has a specific location in their respective buffers. This allows the frame and signaling buffers to slip a whole DS1 multiframe related to the rate difference between the DS1 line frequency and system clock frequency. The multiframe slip causes one set of the ABCD signaling bits from each DS0, and a complete set of framing bits, to either be lost, or repeated, depending on whether there is a positive or negative frequency difference.

Due to the different slip rates of the data buffer, and the signaling and frame buffers, there are twenty-four slips in the data buffer for every slip in the signaling and frame buffers.

The VT mapper reads the DS0 data, frame bits, and signaling bits from the slip buffer 616, and maps them into the Locked VT relative to the sync signals from the Transmit Bus Interface. The VT Path Generation Module 464 is bypassed because there are no VT Path Overhead bits or VT Path Pointers in a Locked VT.

2.6.2 Floating Byte Sync VT to Locked VT Mapping Mode

The Floating Byte Sync VT to Locked VT mapping mode operates the same as the DS1 to Locked VT mapping mode with one exception. That is, the DS1 Demapper Block 612 receives a byte synchronous VT from the VT interface, and extracts the DS1 components from the VT writing them into the slip buffer 616.

2.6.3 DS1 to Floating Byte Sync VT Mapping Mode

In the DS1 to Floating Byte Sync VT mapping mode, the DS1 Demapper block 612 operates essentially the same way as it does in the DS1 to Locked VT mapping mode. However, the slip buffers are not allowed to slip. As the slip buffers start to fill up, or empty, a negative or positive byte stuff request is made to the VT Path Generation Module 464. This prevents the slip buffers from reaching the full or empty state, and causing a slip.

The VT mapper 618 reads the DS0 data, frame bits, and signaling bits from the slip buffer, and maps them into the Floating Byte Sync VT SPE relative to the sync signals from the VT Path Generation Module, and passes the VT SPE to the VT Path Generation Module.

2.6.4 DS1 to Floating Async VT Mapping Mode

In the DS1 to Floating Async VT mapping mode, the DS1 Demapper performs a serial to parallel conversion on the DS1 signal, and passes it to the elastic store 614. The frame counter in the DS1 Demapper free runs to control the serial to 8/9 bit parallel conversion to allow for the 193 bit. As the elastic store 614 begins to fill up, or empty, a negative or positive bit stuff request is made to the DS1 Demapper Block 612, which performs one extra or one less 9 bit parallel conversion to accommodate the rate difference between the DS1 line clock and system clocks. The VT payload is synchronized with the frame and multiframe synchronization signals passed through the elastic store 614. The VT Mapper 618 inserts the stuff bits, stuff control bits, and overhead bits into the VT SPE. The overhead bits inserted into the VT SPE are provisionable.

2.6.5 Maintenance Signals Insertion

The locked mapping requires the maintenance signals to be inserted in the DS0 level. The signaling bits are overwritten with 0010, and the channels are overwritten with all ones, if an AIS condition exists.

The signaling bits are overwritten with 0111, if the yellow bit of the VT control register is set. This yellow bit information is inserted into the V5 byte in the floating mappings or rolled into the DS0 yellow in the locked mappings.

2.7 VT Interface 456

This block provides the parallel to serial and serial to parallel conversion of the VT connections between the ASICs. The VT payload is converted into serial bit stream and output along with its serial clock, error indicator and V5 synchronization signal.

A loopback function per VT is provided in this block to provide limited cross-connect functionality at the VT level.

The serial VT data, clock, synchronization and error signal are looped back before the serial conversion if provisioned to do so.

2.8 Microprocessor Interface 450

The Microprocessor Interface 450 allows either 8 or 16 bit read/write access to the memory map shown in Appendix B. The interface derives its timing from the microprocessor clock and control signals made available to the ASIC. Microprocessor Interface timing is independent of the internal timing of the ASIC. The Interface 450 is generic such that it accommodates different processor types and clock frequencies. All required handshaking between the ASIC 420 and the microprocessor 426 are performed in order to indicate successful Bus operations. This Interface preferably contains the control, status and alarm registers required to correctly provision the VTM ASIC. Alarm summary and interrupt generation logic relating to specific conditions within the ASIC are also included in this Interface.

2.8.1 R/W Register Control

Individual registers can be accessed via the Microprocessor Interface 450. Microprocessor read and write accesses to the registers can be performed autonomously to the state of the ASIC. Register values are initialized to a specific state as defined by the specific application requirements. These initialization values remain until the register is written via a valid write cycle. When a register is read by the microprocessor 426, the register contents are preserved except for alarm registers. These registers are cleared after a valid read cycle has occurred to the specified address. Additional functional and test specific functions can be added to the memory map as required.

Regarding interrupt processing, the VTM ASIC has the ability to initiate an interrupt request to the microprocessor whenever a specific alarm condition is detected. When an alarm is detected within the ASIC, the Microprocessor Interface 450 activates the interrupt signal to the microprocessor 426. At that time, the microprocessor acknowledges the interrupt by reading the VTM ASIC alarm registers to determine the cause of the interrupt. The alarm registers are designed such that once they are written, they can only be cleared by a read from the microprocessor at that specific address. This allows alarms to be set and possibly accumulate within the register until the interrupt processing cycle is complete. At this time, the microprocessor reads the register, and the register contents are cleared. The control for this sequence is derived from the microprocessor clock and control signals.

2.8.2 O Bit Access

The Microprocessor Interface 450 updates O bits whenever the 500 μsec V1 strobe is received. The 500 μsec window is shared between the Microprocessor Interface 450 and the Mapper/Demapper logic (FIG. 52) such that the registers can be updated and read at different times within this window.

2.8.3 Timing between the Slice and Bus Interfaces

Each slice is capable of selecting the clock from either the A side or the B side. A latch has been included into the design for every signal transferred from the Bus interface into the DS1 and VT slices or vice versa. These latches shall provide half a clock period hold time for every signal transferred between the blocks.

2.9 DSP Interface

A 16-bit DSP Interface 451 has been added to provide a digital signal processor access to the ASIC for data processing of the Desynchronizer 498. The DSP provides the control of the Digital VCO 526 related to the result of the filter algorithms. The VTM ASIC provides the bit and byte stuffing information into the DSP 442 (FIG. 35) from the Desynchronizer 498. The DSP Interface provides an access into a single read and a single write register per DS1 Demapper a Block 612 in the ASIC. An 8 KHz interrupt signal is also generated internally to provide the synchronization between the internal frame and an external device.

3. ASIC Interface

The VTM ASIC is preferably implemented as a gate array using 240 pin PQFP package. The device can operate in an ambient temperature range of −40 to +85 C and over a supply voltage range of VDD=5±0.25 V.

3.1 Pinout

The VTM ASIC pin distribution is as follows:

| | |
|---|---|
| Inputs | 102 |
| Outputs | 69 |
| Bidirectionals | 33 |
| Power Pins | 36 |
| Total | 240 |

Functional definitions of the signal identifications shown in FIG. 35 are as follows:

3.1.1 TelecomBus Interface

| | |
|---|---|
| CK19A | A side 19.44 MHz Clock Input: OC-3 byte rate clock is used to multiplex and demultiplex the VT payload into or from the OC-3 payload. ASIC inputs all of the A side TelecomBus signals using the rising edge of CK19A. All of the A side TelecomBus signals are output using the rising edge of this clock. The DS1 and VT signals are also output using the rising edge of this clock if it is selected from the B side TelecomBus. |
| CK19B | B side 19.44 MHz Clock Input: OC-3 byte rate clock is used to multiplex and demultiplex the VT payload into or from the OC-3 payload. ASIC inputs all of the B side TelecomBus signals using the rising edge of CK19B. All of the B side TelecomBus signals are output using the rising edge of this clock. The DS1 and VT signals are also output using the rising edge of this clock if it is selected from the B side TelecomBus. |
| ARD<8> | Receive Data Input, A side, bit 8: The most significant bit and parity bit of the 19.44 MHz input data bus. This data bit is clocked in using the rising edge of CK19A. The content of this bit indicates the odd parity calculated on the ARD<7:0>, ARC1J1, ARPL, ATC1J1V1, and ATPL inputs. |
| ARD<7:0> | Receive Data Input Bus, A side: The input data bus carrying the payload information for a full OC-3 envelope in the byte boundaries. Bit 7 is the most significant bit (MSB) and bit 0 is the least significant bit (LSB) of this bus. ARD<7:0> is clocked in using the rising edge of CK19A. |
| ARPL | Receive Payload Indicator Input, A side: Active high level indicates the payload locations, and low level indicates the overhead locations of the received OC-3 frame. It is clocked in with the rising edge of the CK19A. |
| ARC1J1 | Receive Composite Synchronization Input, A side: This signal is used to locate the start of the OC-3 SONET frame indicated by a C1 pulse and the start of the three STS-1 payload frame indicated by three J1 pulses. These signals are separated using ARPL payload indicator input signals. Each is clocked in with the rising edge of CK19A. |

| | |
|---|---|
| BRD<8> | Receive Data Input, B side, bit 8: The MSB and parity bit of the 19.44 MHz input data bus. This data bit is clocked in using the rising edge of CK19B. The content of this bit indicates the odd parity calculated on the BRD<7:0>, BRC1J1, BRPL, BTC1J1V1, and BTPL inputs. |
| BRD<7:0> | Receive Data Input Bus, B side: The input data bus carrying the payload information for a full OC-3 envelope in the byte boundaries. Bit 7 is the MSB and bit 0 is the least significant bit of this bus. BRD<7:0> is clocked in using the rising edge of the CK19B. |
| BRPL | Receive Payload Indicator Input, B side: Active high level indicates the payload locations, and low level indicates the overhead locations of the received OC-3 frame. It is clocked in with the rising edge of CK19B. |
| BRC1J1 | Receive Composite Synchronization Input, B side: This signal is used to locate the start of the receive OC-3 SONET frame indicated by C1 pulse and the start of the three receive STS-1 payload frame indicated by three J1 pulses. These signals are separated using ARPL payload indicator input signals. It is clocked in with the rising edge of CK19B. |
| ATPAR | Transmit Data Output, A side, MSB and Parity bit: The parity bit of the 19.44 MHz output data bus. This data bit is clocked out using the rising edge of the CK19A. The content of this bit indicates the odd parity calculated on the ATD<7:0> and ATDV outputs. |
| ATD<7:0> | Transmit Data Output Bus, A side: The output data bus carrying the payload information for the VTs to be mapped into the transmit OC-3 frame. Bit 7 is the MSB and bit 0 is the LSB of this bus. ATD<7:0> is clocked in using the rising edge of the CK19A. |
| ATPL | Transmit Payload Indicator Input A side: Active high level indicates the payload locations, and low level indicates the overhead locations of the transmit OC-3 frame which contains the added VTs. It is clocked out with the rising edge of the CK19A. |
| ATC1J1V1 | Transmit Composite Synchronization Input, A side: This signal is used to locate the start of the transmit OC-3 SONET frame indicated by C1 pulse and the start of the three transmit STS-1 payload frame indicated by three J1 pulses. These signals are separated using ATPL payload indicator input signals. It is clocked in with the rising edge of the CK19A. |
| ATDV | Transmit Data Valid Output, A side: This output indicates the selected VT payload time slots where the VTM ASIC updates in the transmit OC-3 frame. It is clocked out with the rising edge of the CK19A. |
| APLOOP | Parity Loopback Input, A side: The reflected parity bit of the output data bus. The parity errors detected on the ATPAR output are reflected back to the ASIC. The delay of the reflected parity should be specified as 3, 6 or 9 clock periods of CK19A. It is clocked in using the rising edge of CK19A. |
| BTPAR | Transmit Data Output, B side, MSB and Parity bit: The parity bit of the 19.44 MHz output data bus. This data bit is clocked out using the rising edge of CK19B. The content of this bit indicates the odd parity calculated on the BTD<7:0> and BTDV outputs. |
| BTD<7:0> | Transmit Data Output Bus, B side: The output data bus carrying the payload information for the VTS to be mapped into the transmit OC-3 frame. Bit 7 is the MSB and bit 0 is the least significant bit of this bus. BTD<7:0> is clocked in using the rising edge of CK19B. |
| BTPL | Transmit Payload Indicator Input B side: Active high level indicates the payload locations, and low level indicates the overhead locations of the transmit OC-3 frame which contains the added VTs. It is clocked out with the rising edge of CK19B. |
| BTC1J1V1 | Transmit Composite Synchronization Input, B side: This signal is used to locate the start of the transmit OC-3 SONET frame indicated by C1 pulse and the start of the three transmit STS-1 payload frames indicated by three J1 pulses. These signals are separated using BTPL payload indicator input signals. It is clocked in with the rising edge of CK19B. |
| BTDV | Transmit Data Valid Output, B side: This output indicates the selected VT payload time slots where. the VTM ASIC updates in the transmit OC-3 frame. It is clocked out with the rising edge of CK19B. |
| BPLOOP | Parity Loopback Input, B side: The reflected parity bit of the output data bus. The parity errors detected on the BTPAR output are reflected back to the ASIC. The delay of the reflected parity should be specified as 3, 6 or 9 clock period of the CK19B. It is clocked in using the rising edge of CK19B. |

3.1.2 Microprocessor Interface

| | |
|---|---|
| CLKMP | Microprocessor Clock Input: The local oscillator clock of the processor interface is received in the ASIC to provide clock activity detection on the 19.44 14Hz clock. |
| AB<9:0> | Address Bus Input: The 10-bit microprocessor address bus provides the addresses for the read and write access on the internal registers of the ASIC. The addresses are decoded to provide access to the internal registers when CEN* is active low. Bit 9 is the MSB, and bit 0 is the LSB. |
| MSBADR | Processor Interface Identification Pin: This input is used to identify one of the two ASICs on the board. A logic 1 enables the interface if AB<9> is logic 1, and logic 0 enables the interface if AB<9> is logic 0. |
| DB<15:0> | Data bus, bidirectional: This 16-bit bidirectional bus provides the content of the registers. The output enable signals for the tristate drivers of the data bus are generated when RD* and CEN* are active low. Bit 15 is the MSB, and bit 0 is the LSB. |
| RD* | Read Strobe Input: This active low input indicates microprocessor read sequence. |
| WR* | Write Strobe Input: This active low input indicates microprocessor write sequence. |
| DTACK* | Data Acknowledge Output: Open drain active low output pin holds the processor interface until the completion of the internal data transfer of the ASIC. |
| CEN* | Chip Enable Input: Active low input pin to enable microprocessor access into the device. The data bus is selected as an input bus into the ASIC when it is not activated. |
| INT1* | Primary Interrupt Output: The active low interrupt signal to indicate the alarm conditions of the equipment protection algorithm into the processor. |
| INT2* | Secondary Interrupt Output: The active low interrupt signal to indicate the alarm conditions on the data path. |
| MODE8 | 8-bit Processor Bus Mode Input: The microprocessor interface provides access for the 8-bit microprocessors into all of the internal registers when this pin is connected into the logic 1 level. |

3.1.3 DSP Interface

| | |
|---|---|
| SAB<3:0> | Address Bus Input: The 4-bit DSP address bus provides the read and write access up to 8 internal registers of the ASIC. The addresses are decoded to provide the access on the internal registers when SCEN* is active low. Bit 3 is the MSB, and bit 0 is the LSB. |
| SMSB | DSP Interface Identification Pin: This input is used to identify one of the two ASICs on the board. A logic 1 enables the interface if SAB<3> is logic 1, and a logic 0 enables the interface if SAB<3> is logic 0. |

| | |
|---|---|
| SDB<15:0> | Data bus, bidirectional: This 16-bit bidirectional bus provides the content of the registers. The output enable signals for the tristate drivers of the data bus are generated when SRD* and SCEN* is active low. Bit 15 is the MSB, and bit 0 is the LSB. |
| SRD*Read | Strobe Input: This active low input indicates DSP read sequence. |
| SWR*Write | Strobe Input: This active low input indicates DSP write sequence. |
| SCEN* | Chip Enable Input: Active low input pin to enable the DSP access into the device. The data bus is selected as an input bus into the ASIC when it is not activated. |
| SINT* | Interrupt bidirectional: Active low output pin to provide the read and write timing between the DSP and the ASIC. It is also used as an input to transfer the timing information from one ASIC to another. The output enable signal for the tristate driver is generated when SMSB signal is active low. |
| SMOD8 | 8-bit DSP Bus Mode Input: The DSP interface provides access for the 8-bit processors into all of the internal DSP registers when this pin is connected into the logic 1 level. |

3.1.4 Miscellaneous Interfaces

| | |
|---|---|
| PWRUP* | Power-up Reset Input: This signal is connected to the asynchronous reset inputs of all of the flip-flops in the ASIC and is used to initialize the ASIC during power-on condition. It is generated by the power monitor circuit on the PBA. |
| BUSMODE | Bus Mode Input: This pin provides tracking for the fully coded H4 sequence for Locked STS mappings. A logic 0 level of this input indicates the Floating VT mappings into the STS-1 payload. A logic 1 level of this input indicates the Locked VT mappings into the STS-1 payload. This signal is static and is not clocked in. |
| ABSEL | AB Select Control Input: It controls the multiplexer to generate the 500 μsec timer interrupt signal for the microprocessor interface. It also selects the active transmit data path if BUSMODE input indicates locked mapping. The inactive transmit data path contains DS0 AIS and UNICODE. |
| ACKLS | CK19A Clock Loss: The CK19A is monitored using MPCLK and a clock loss is indicated with a logic 1 level on this output. It is output with the rising edge of MPCLK. |
| BCKLS | CK19B Clock Loss: The CK19B is monitored using MPCLK and a clock loss is indicated with a logic 1 level on this output. It is output with the rising edge of MPCLK. |

3.1.5 VT Interface

| | |
|---|---|
| TVTDn | Transmit VT Data Serial Output, Link n (n = 1, 2, 3, 4): The serial data output pin carrying the VT payload information for a selected VT from an STS-1 envelope. Each VT payload byte is converted into a 9-bit serial stream containing a parity bit and 8 data bits. The parity bit is transmitted first and LSB is transmitted last. This output is clocked out using the rising edge of CK19A or CK19B. This output remains unchanged for at least four 19 MHz clock periods for every bit. |
| TV5SYNn | Transmit VS Synchronization Signal Output, Link n (n = 1, 2, 3, 4): This output indicates the start of the VT superframe for the VT #n. It is active high only during the transmission of the bits at the first location of a VT superframe at the TVTDn output. It is clocked out with the rising edge of CK19A or CK19B. |
| TVTERRn | Transmit VT Error Output, Link n (n = 1, 2, 3, 4): This output indicates detected VT AIS or VT Loss of Pointer conditions for the VT #n. An active high indicates the error condition and it is clocked out using the rising edge of CK19A or CK19B. |
| TVTCLKn | Transmit VT Clock Output, Link n (n = 1, 2, 3, 4): The serial VT clock indicating the bit positions of every VT payload byte transmitted from the TVTDn outputs. It is not activated during the payload pointer and positive stuff locations. It is clocked out with the rising edge of CK19A or CK19B and is active high at the last two clock periods of the four clock-wide VT bit time slot to allow enough setup and hold time while it is used to recover the VT payload. |
| RVTCLKn | Receive VT Clock Input, Link n (n = 1, 2, 3, 4): This input indicates the time slot where any VT data bit can be extracted from the RVTDn serial data, RV5SYNn, and RVTERRn inputs. It is over-sampled with the rising edge of the CK19A or CK19B and an edge detection is performed to generate one 19 MHz clock-wide internal serial VT strobes. |
| RVTDn | Receive VT Data Input, Link n (n = 1, 2, 3, 4): The serial data input pin carrying the VT payload information for a selected VT from an STS-1 envelope. Each 9-bit serial data stream is converted into a VT payload byte containing a parity bit and 8-bit data. The parity bit is received first and LSB is received last. This input is clocked in using the rising edge of CK19A or CK19B when the RVTCLKn input is active high. This input remains unchanged for at least four 19 MHz clock periods for every bit. |
| RV5SYNn | Receive V5 Synchronization Signal Input, Link n (n = 1, 2, 3, 4): This input indicates the start of the VT superframe for the VT #n. It is active high only during the reception of the bits at the first location of a VT superframe at the RVTDn input. It is clocked in with the rising edge of CK19A or CK19B when the RVTCLKn input is active high. |
| RVTERRn | Receive VT Error Input, Link n (n = 1, 2, 3, 4): This input indicates detected VT AIS or VT Loss of Pointer conditions for the VT #n. An active high indicates the error condition and it is clocked in using the rising edge of CK19A or CK19B when the RVTCLKn input is active high. |

3.1.6 DS1 Interface

| | |
|---|---|
| RSERn | Receive Serial Data Input, Link n (n = 1, 2, 3, 4): NRZ format binary data input carrying the serial DS1 data. It is clocked in using the rising edge of the RCLKn clock. |
| RMSYNn | Receive Multiframe Synchronization Input, Link n (n = 1, 2, 3, 4): Multiframe indicator signal is used to extract the frame and SF or ESF signaling multiframe information of the received DS1 signal. In the ESF mode, this line contains an active high pulse at the beginning of every 24 frames, and, in the SF mode, it contains an active high pulse at the beginning of every 12 frames. It is clocked in using the rising edge of the RCLKn clock. |
| RCLKn | Receive Clock Input, Link n (n = 1, 2, 3, 4): 1.544 MHz DS1 line clock. It is used to generate DS1 timing of the ASIC. The rising edge of RCLKn is used to latch RSERn and RMSYNn signals. |
| SYN8K | Synchronization Reference 8 KHz: The receive 8 KHz frame synchronization reference of the received DS1 input. Only one of the four DS1 frame references selected by software is output using the rising edge of its 1.544 MHz RCLK. |
| TSERn | Transmit Serial Data Output, Link n (n = 1, 2, 3, 4): NRZ format binary data output carrying the serial DS1 data. It is clocked out using the rising edge of the CK19A or CK19B clock. |
| TMSYNn | Transmit Multiframe Synchronization Output, Link n (n = 1, 2, 3, 4): Multiframe indicator signal indicating the start of the ESF signaling multiframe of the transmitted DS1 signal. This line contains an active high pulse at the beginning of every 24 frames. It is clocked out using the rising edge of the CK19A or CK19B clock. |
| TCLKn | Transmit Clock Output, Link n (n = 1, 2, 3, 4): 1.544 MHz DS1 line clock. This output is used to indicate DS1 timing of the ASIC. It is output with |

-continued

| | |
|---|---|
| | the rising edge of the CK19M and its logic level can be inverted with software control to provide the setup and hold time margin to the outside devices around the rising or falling edge. The other interface signals TSERn and TMSYNn signals can be captured on the PBA using TCLKn. It is clocked out using the rising edge of CK19A or CK19B. |
| TREFCK | Transmit Reference Clock: 1.544 MHz transmit DS1 reference clock. One of the four TCLKn selected by software is output to this pin. It is retimed with the rising edge of CK19A or CK19B before it is output. |
| | 3.1.7 Test Interface |
| TSTSEL<5:0> | Test Mode Select Input: This input is used to generate the mux select signals in the ASIC to provide access from the test pins instead of the internal signals into the functional blocks. These pins are also used for RAM testing to select a different group of the RAM each time in the same address space. Bit 5 is the MSB, and bit 0 is the LSB. |
| RAMTST | RAM Test Mode Select or Enable: This input pin is provided for the testability of the RAMs. When this input is active high, all of the internal RAMS are accessed for testability and written and read out by the microprocessor interface instead of functional blocks. This pin is connected to the logic 0 level on the PBA. |
| NDTREE | Nand Tree Output: Parametric test output provides the output of the last NAND gate of the input cells for testability. |
| TSTIN<3:0> | Test Data Input Bus: Test data input bus used to activate the internal strobe signals through the test muxes. Bit 3 is the MSB, and bit 0 is the LSB. |
| TSTOUT<11:0> | Test Data Output Bus: Test data output bus provides observability on the internal signals. Bit 11 is the MSB, and bit 0 is the LSB. |
| SCLK | Full Scan Clock Input |
| SE | Full Scan Test Enable Input |
| SCANTST | Full Scan Test Mode Select: Enables the scan clock to be applied to the clock input on every flip-flop. |
| TDI | JTAG Boundary Scan Test Data Input |
| TDO | JTAG Boundary Scan Test Data Output |
| TPRST* | JTAG Boundary Scan Test Reset Input |
| TCK | JTAG Boundary Scan Test Clock Input |
| TMS | JTAG Boundary Scan Test Mode Select Input |
| | 3.1.8 Power Supply |
| VDDn | Voltage Reference +5 Volt (n = 1, 2, . . . , 16): 16 pins are used for positive voltage reference into the ASIC. |
| VSSn | Voltage Reference Ground Volt (n = 1, 2 . . . , 20): 20 pins are used for positive voltage reference into the ASIC. |

3.2 Interface Timing 3.2.1 Receive Bus Interface

Figure 65:
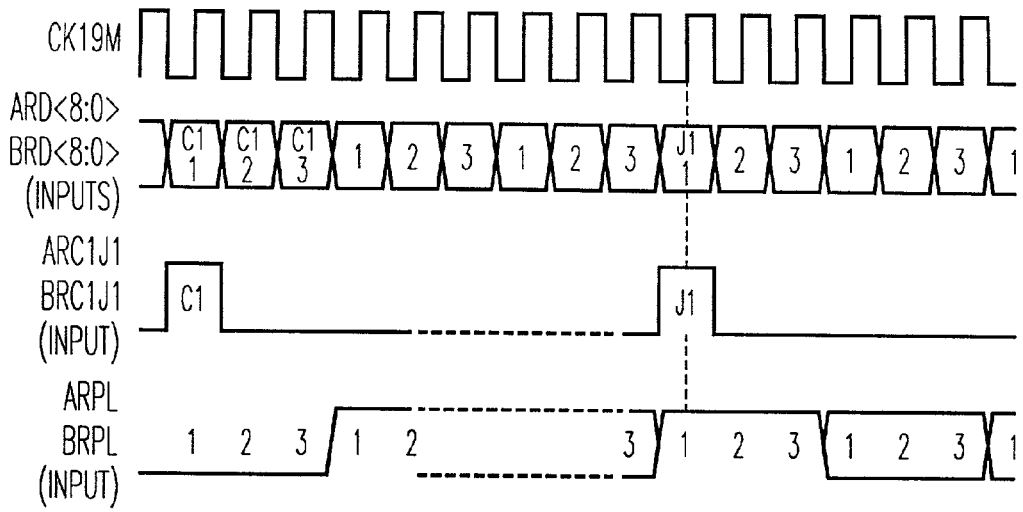
FIG. 65 illustrates the relationship of the control, data and clock signals associated with the Receive Bus Interface of a VTM circuit in accordance with the present invention.

At the Receive Bus Interface 458 of FIG. 36 for buses A and B, the 9-bit data ARD<8:0> and BRD<8:0> are received, respectively, along with the C1J1 synchronization signal and PL payload indicator for both A and B sides. The most significant bit of the data bus is the odd parity bit calculated over the data, sync and payload indicator signals of the Receive Bus Interface and sync, and payload indicator signals of the Transmit Bus Interface 460. All of the signals are preferably clocked in using a 19 MHz Bus clock. FIG. 65 shows the relations between the signals and clock.

Figure 66:
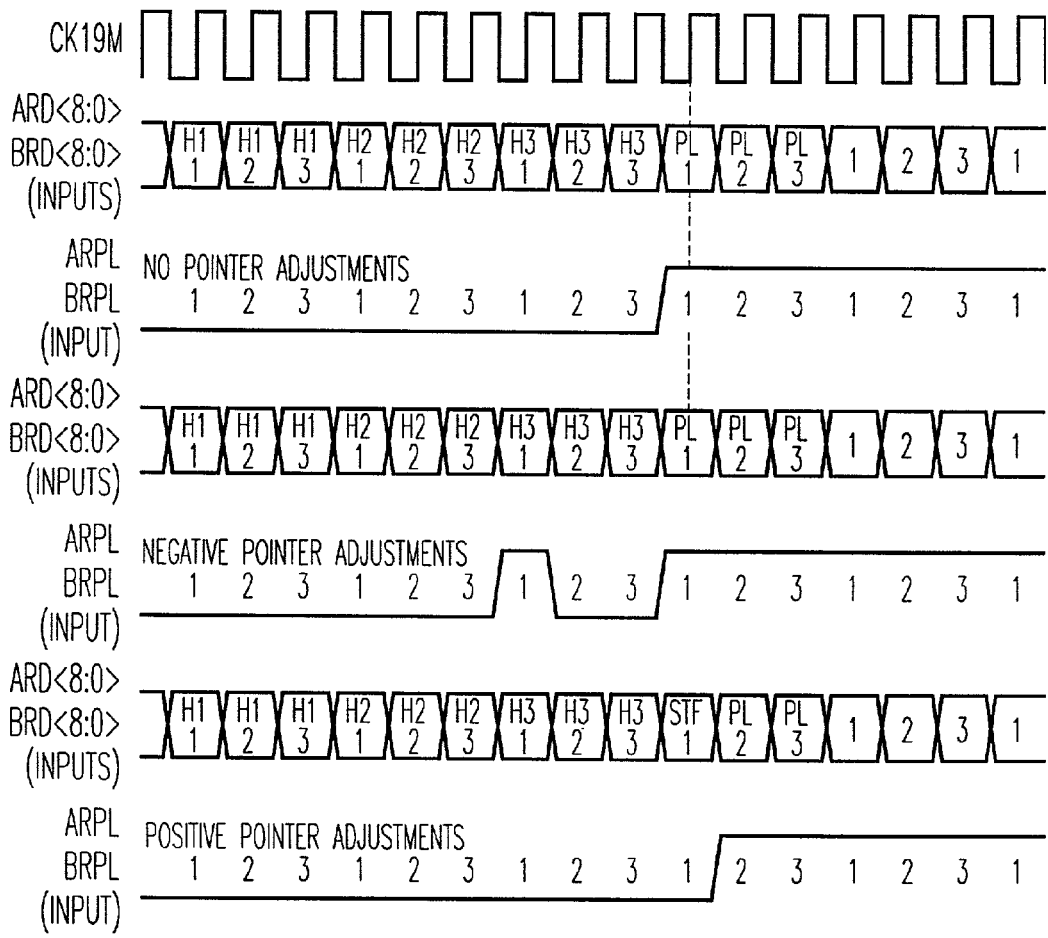
FIG. 66 illustrates Receive Bus Interface pointer adjustments in accordance with the present invention.

The ARPL and BRPL signals indicate the payload locations. They are active for all bytes except line and section overhead locations. These signals can be inactive for one more or one less clock cycle during row 4 of the SONET frame related to the positive and negative pointer adjustments as shown in FIG. 66.

ARC1J1 and BRC1J1 are the composite synchronization signals of the Receive Bus Interface. A single pulse indicates the C1 byte time slot of the transport overhead. Three J1 pulses indicate the start of three STS-1 Payload. The C1 and J1 portions of the composite synchronization signals are separated using the ARPL and BRPL payload indicator signals. The payload indicator is low during C1 and high during J1 byte location.

All of the Receive Bus Interface signals are preferably received after being retimed on the PBA with the falling edge of the 19 MHz clock CK19M. These signals are clocked in using the rising edge of CK19M.

3.2.2 Transmit Bus Interface

Figure 67:
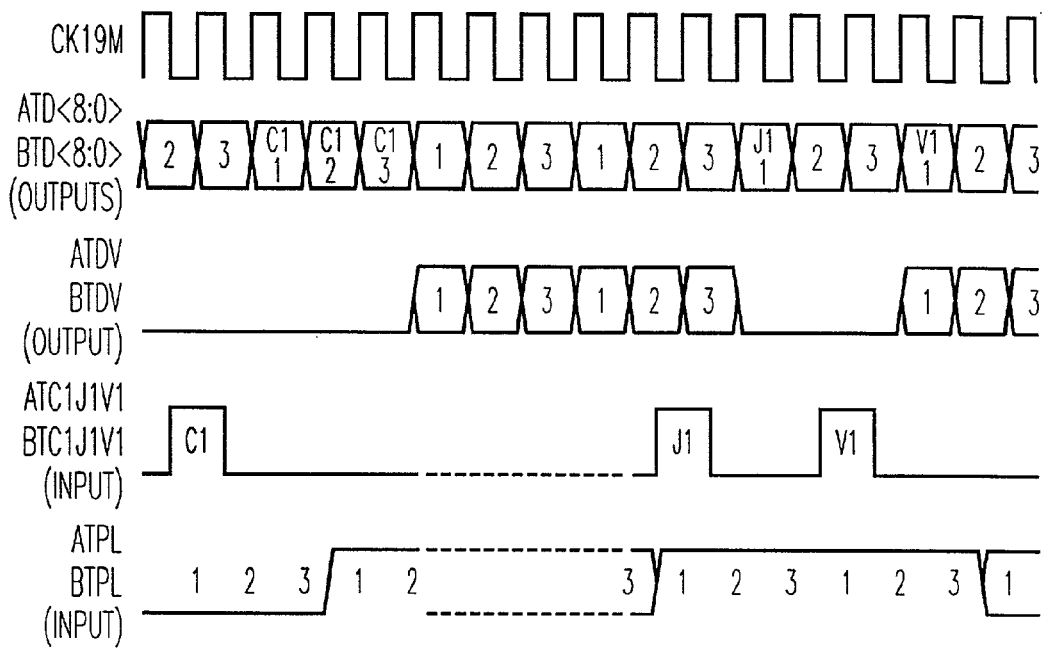
FIG. 67 illustrates the relationship of the control, data and clock signals associated with the Transmit Bus Interface of a VTM circuit in accordance with the present invention.

At the Transmit Bus Interface 460 of FIG. 36 for buses A and B, the 9-bit data ATD<8:0> and BTD<8:0> are transmitted, respectively, as synchronized with received C1J1 synchronization signal and PL payload indicator for both A and B sides. A data valid signal is also output to indicate the VT payload locations inserted by this ASIC. The most significant bit of the data bus is the odd parity bit calculated over the data, and data valid signals. FIG. 67 shows the relation between the signals and clock. The output signals are aligned with the input signals received two clock pulses earlier.

Figure 68:
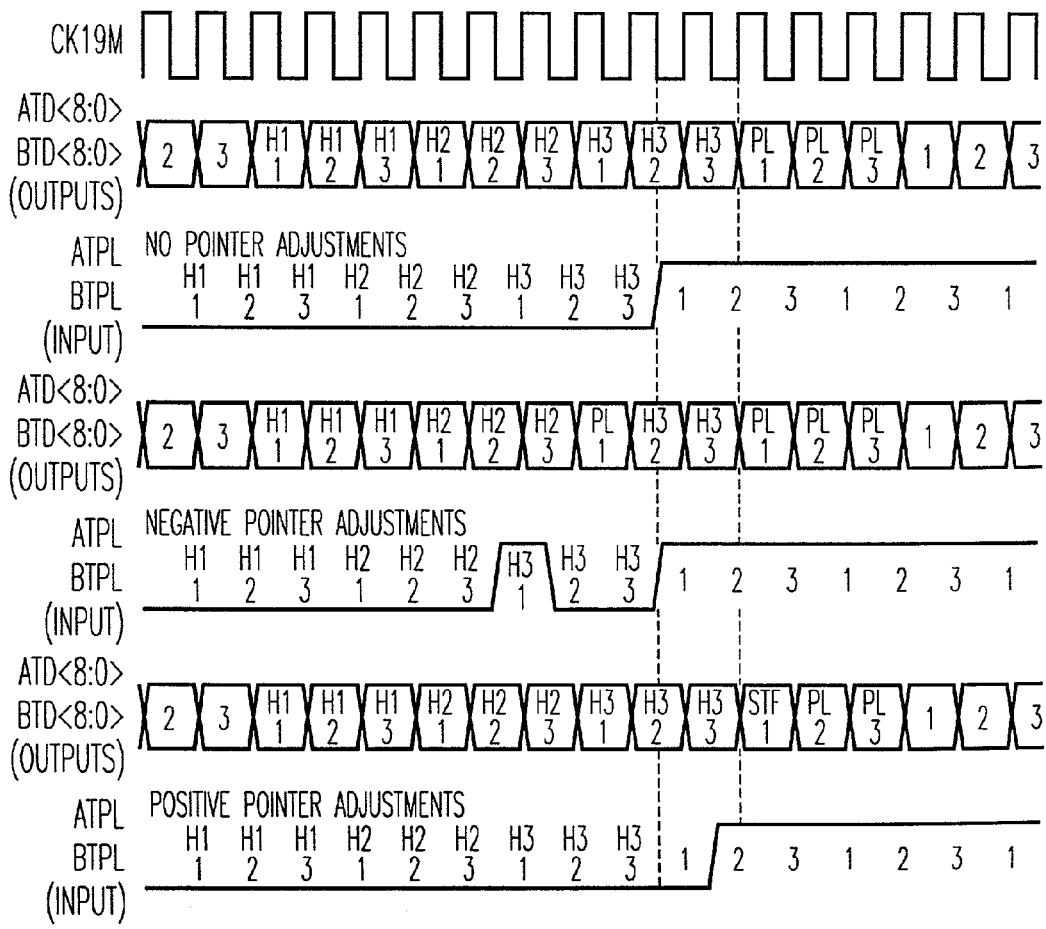
FIG. 68 illustrates Transmit Bus Interface pointer adjustments in accordance with the present invention.

The ATPL and ETPL signals indicate the payload locations. They are active for all bytes except line and section overhead locations. These signals may be inactive for one more or one less clock cycle during the row 4 of the SONET frame related to the positive and negative pointer adjustments as shown in FIG. 68. ATC1J1 and BTC1J1 are the composite synchronization signals of the Receive Bus Interface. A single pulse indicates the C1 byte time slot of the transport overhead. Three J1 pulses indicate the start of three STS-1 Payload. The C1 and J1 portions of the composite synchronization signals are separated using the ATPL and BTPL payload indicator signals. The payload indicator is low during C1 and high during J1 byte location.

The Transmit Bus Interface signals ATC1J1, BTC1C1, ATPL, and BTPL are received after being retimed on the PBA with the falling edge of the 19 MHz clock CK19M. These signals are clocked in using the rising edge of the CK19M. The data valid signals ATDV and BTDV, and the data bus ATD<8:0> and BTD<8:0> are output with the rising edge of the clock.

3.2.3 VT Interface

Figure 69:
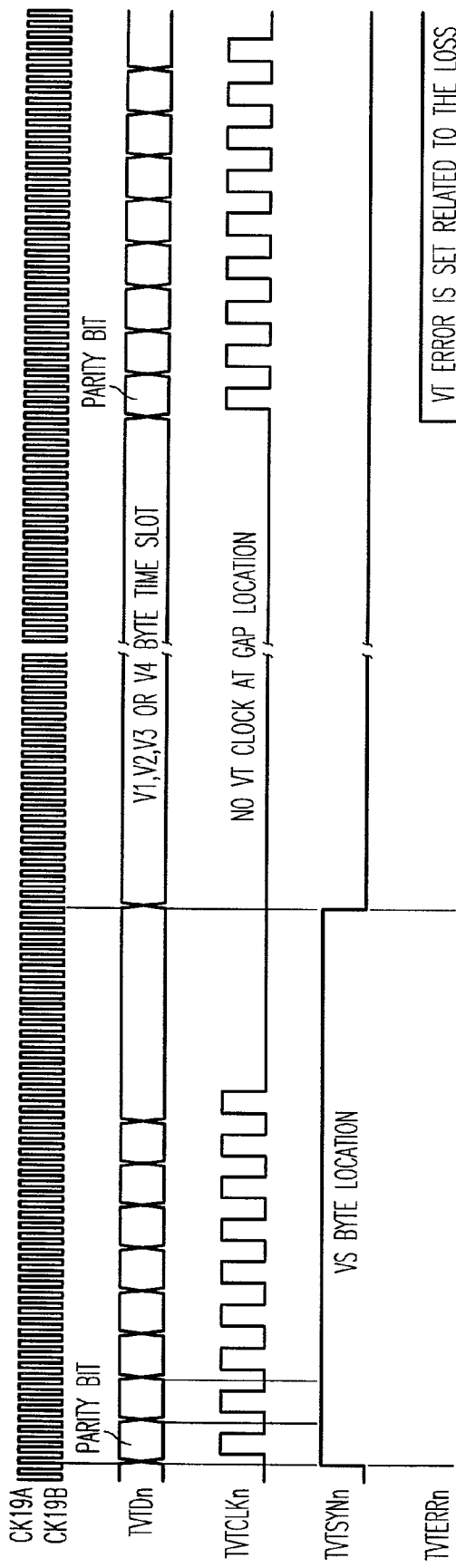
FIGS. 69 and 70 illustrate VT Interface output and input signals, respectively, in a VTM circuit in accordance with the present invention.

The VT Interface 456 of FIG. 36 provides serial VT data, clock and control lines between the ASICs. The VT serial data TVTDn (n=0,1,2,3), V5 synchronization signal TV5SYNn, and VT error indicator TVTERRn are transmitted from the ASIC using the rising edge of the selected 19 MHz clock signal when the serial VT strobe TVTCLKn is active high. The TVTDn signals contain the VT payload bytes of the selected VT in a serial form including 8-bit data and a parity bit. The VT clock is not generated during the V1, V2, V3, V4 and positive stuff gaps. The ASIC processes and latches the VT payload data using the VT strobes and 19 MHz clock signal, generates the serial VT clock as nine pulses in every VT byte period, and shifts the VT data and its parity out using the parallel to serial converter clocked with 19 MHz and enabled with the serial VT clock. The VT error is activated depending on the VT AIS and VT loss of pointer detection of a particular VT. The timing for the VT Interface output signals is shown in FIG. 69.

Figure 70:
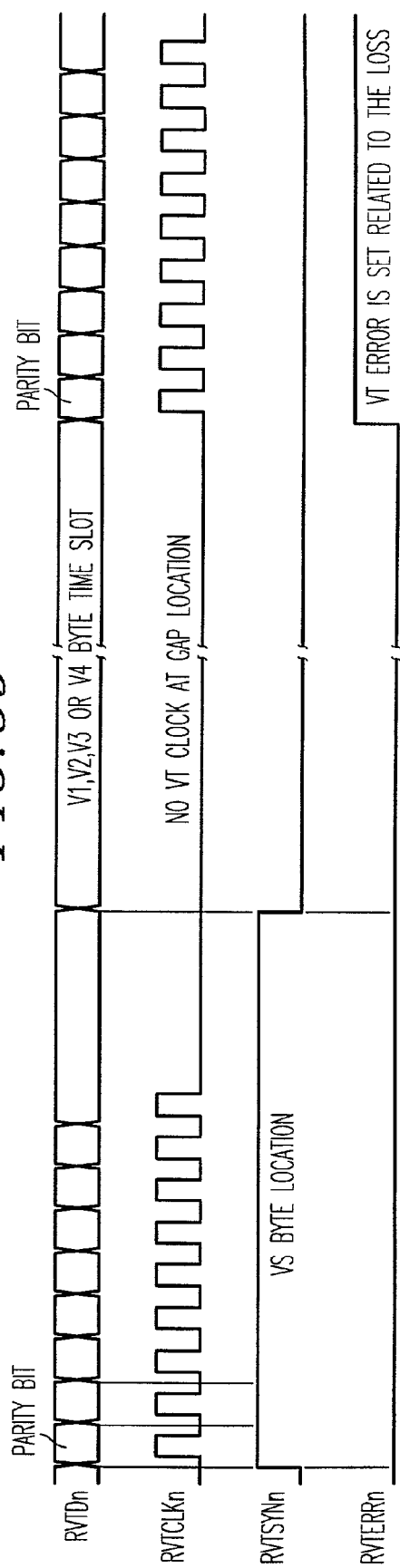

VT serial clock RVTCLKn is clocked in using the rising edge of the CK19A or CK19B, and one clock wide serial VT strobe is generated. This strobe is used along with 19.44 MHz clock to perform the serial to parallel conversion on the serial VT data RVTDn (n=0,1,2,3), and to latch the V5 synchronization signal RV5SYNn, and VT error indicator RVTERRn. The RVTDn signals contain the VT payload bytes of the selected VT in a serial form including 8-bit data and a parity bit. The VT clock is not received during the V1, V2, V3, V4 and positive stuff gaps. VT error detection activates the VT Path AIS in the floating mode mappings. The timing for the VT Interface input signals is shown in FIG. 70.

3.2.4 DS1 Transmit and Receive Interfaces

Figure 71:
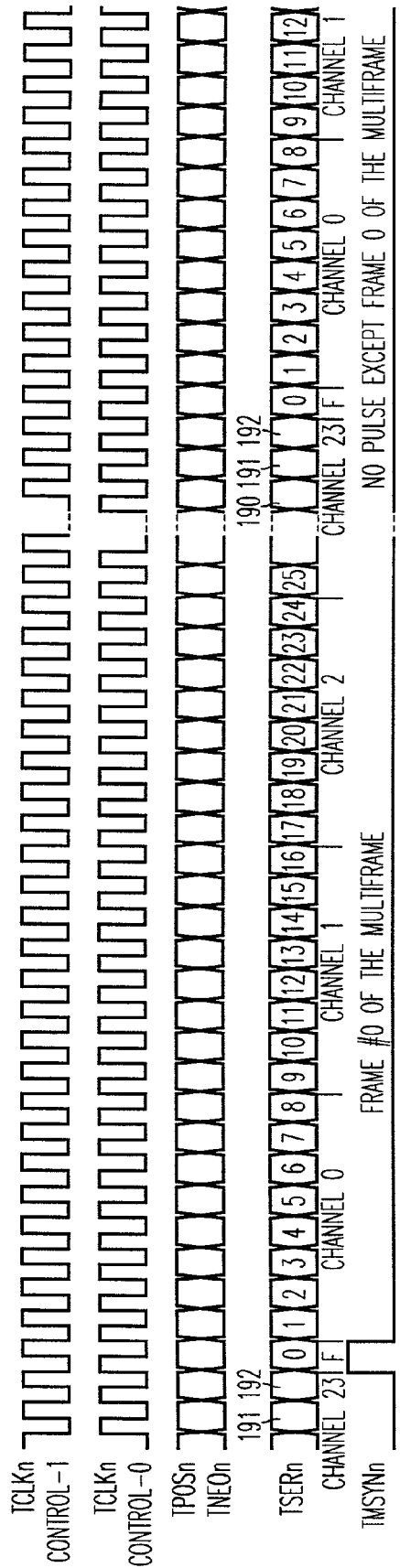
FIGS. 71 and 72 illustrate DS1 Interface output and input signals, respectively, in a VTM circuit in accordance with the present invention.

The DS1 Transmit Interface 452 (FIG. 52) provides serial DS1 data, clock and control lines in the ASIC 420 and the DS1 Demapper Block 612. The DS1 serial NRZ data TSERn (n=0,1,2,3), and the DS1 multiframe synchronization signal TMSYNn are transmitted from the ASIC using the serial DS1 clock TCLKn with the rising edge of the 19.44 MHz clock. The to TCLKn clock is output as inverted or as non-inverted depending on the control bit of the processor interface. An exclusive OR gate is added to invert the output clock if the control bit is set to logic 1. A logic 1 level of the control bit outputs the same clock used in the ASIC. This control has been added to provide the interface for different framer ICs. The TMSYNn signal indicates the frame bit position of the TSERn output once in every 24 frames. The timing drawings for the DS1 output signals are shown in FIG. 71.

Figure 72:
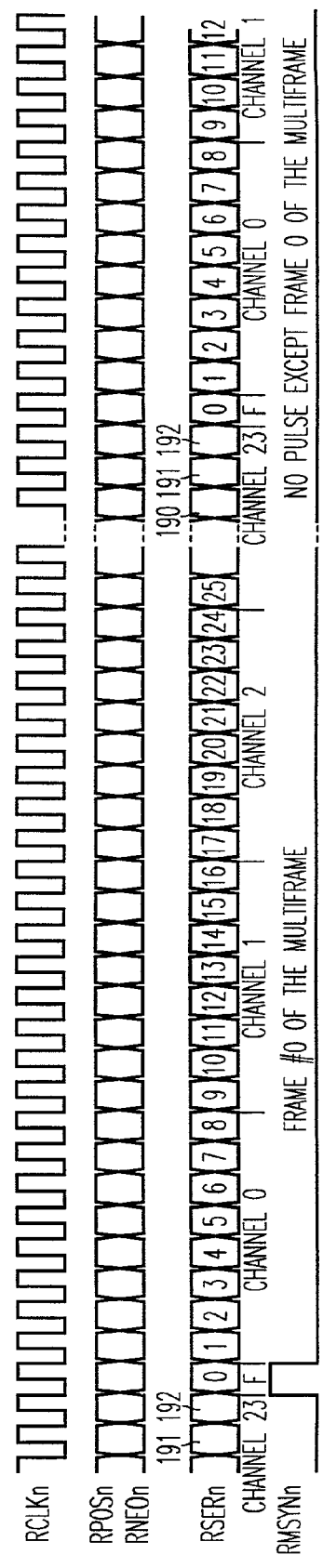

With regard to the DS1 Receive Interface 454 (FIG. 64), the DS1 serial NRZ data RSERn (n=0,1,2,3), and the DS1 multiframe synchronization signal RMSYNn are received using the rising edge of the serial DS1 clock input RCLKn. The zero hold time is specified for this interface and delay lines implemented with gates provide the required hold time for the inputs. The RMSYNn signal indicates the frame bit position of the RSERn output once in every 24 frames. The timing drawings for the DS1 input signals are shown in FIG. 72.

3.2.5 Microprocessor Interface

The Microprocessor Interface 450 (FIG. 36) activates the DTACK* line when the internal transfer is complete. The read operation from the ASIC does not require synchronization with any clock. The register contents, however, are not to be modified during the read cycle, and updating of the performance monitoring counters is temporarily prevented. The clear operation on the alarms and status bits are performed as synchronized with their clocks following the deactivation of the CEN* input. The DTACK* generation is performed using the CLKMP local clock.

Two interrupt outputs are provided to the microprocessor. The primary interrupt preferably used for equipment protection alarms and threshold detections. The secondary interrupt is preferably used for VT and DS1 alarms and threshold crossings.

The VTM ASIC Microprocessor Interface 450 provides the address, data and control signals for the software access into the ASIC. The CEN* active low input is used with the MSBADR signal and the most significant address bit A9 to generate the internal chip select for the device. The ASIC does not respond if the logic level of the A9 address bit does not match with the MSBADR identification pin logic level.

Figure 73A:
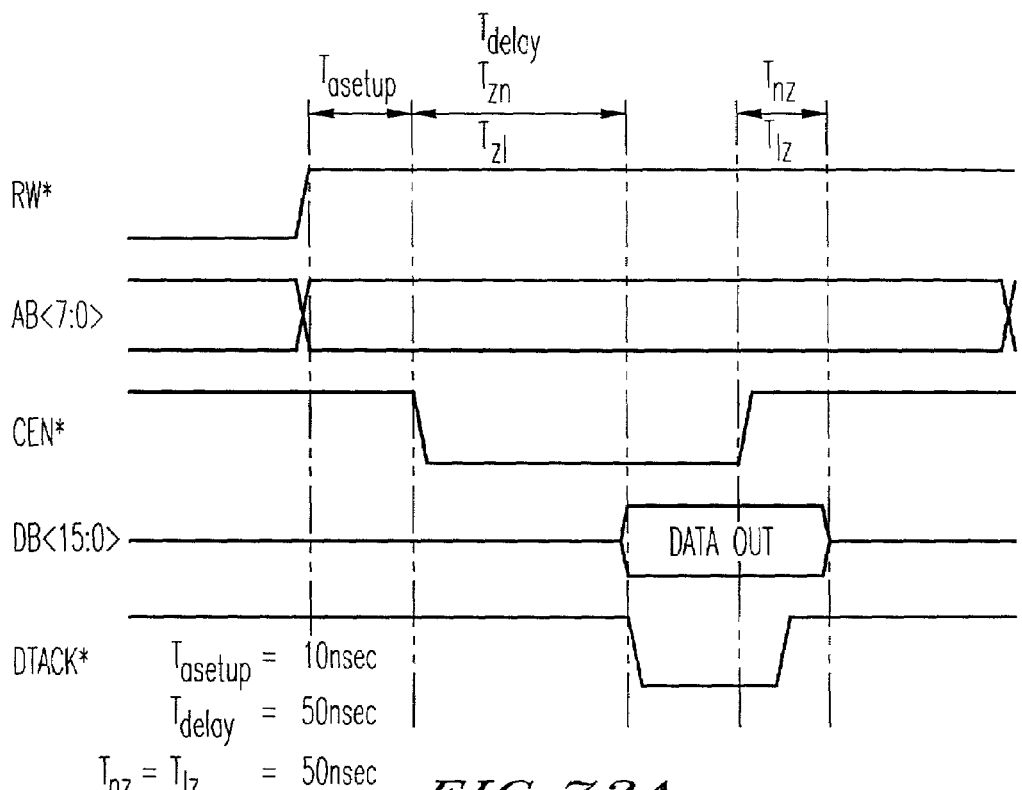
FIG. 73 illustrates the timing of the VTM circuit microprocessor interface in accordance with the present invention.
Figure 73B:
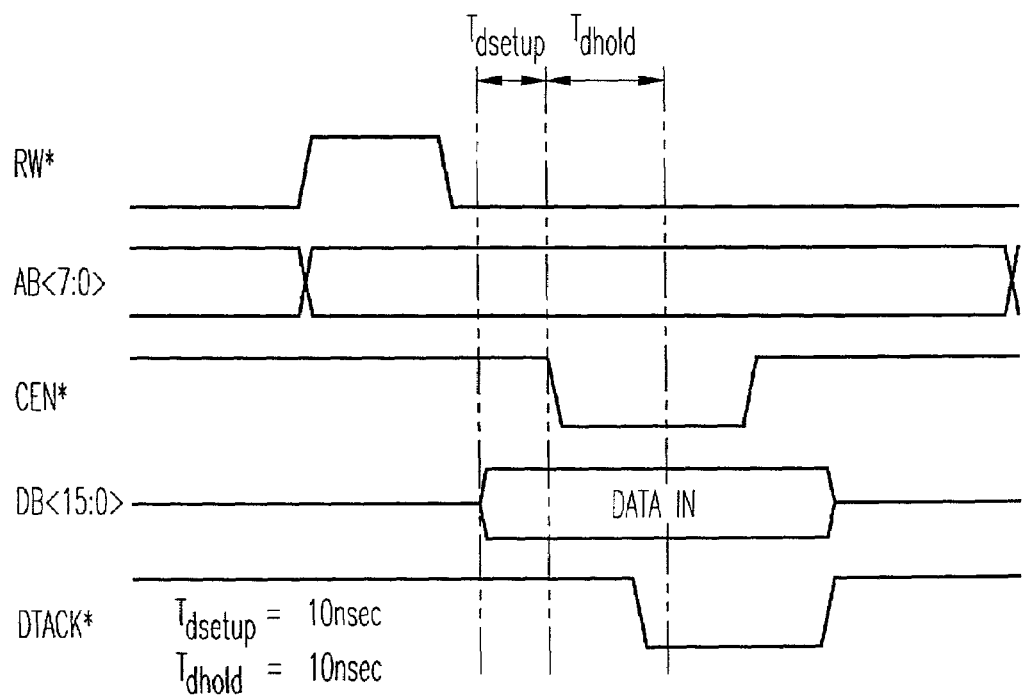

The A7–A0 address inputs provide the access for up to 256, 8 bit registers. The RD* signal indicates the read sequence and WR* signal indicates the write sequence. They are both active low signals. The data bus D15–D0 provide the read and write data to the device. All of the data is preferably transferred into the internal registers as synchronized with the CK19M clock input during the write cycle. The diagnostic register, mask register, interrupt connect register and global control register are updated as synchronized with the microprocessor clock. The timing is as shown in FIG. 73.

3.2.6 DSP Interface

The VTM ASIC DSP interface 451 (FIG. 36) provides the address, data and control signals for the DSP software access into the ASIC. The SCEN* active low input is used to enable the DSP interface of the ASIC.

The SA2–SA0 address inputs provide the access for up to 8, 16 bit registers. The SCEN* active low input is used with the SMSB signal and the most significant address bit SA3 to generate the internal chip select for the device. The ASIC does not respond if the logic level of the SA3 address bit does not match the SMSB identification pin logic level. The SRD* signal indicates the read sequence. The SWR* signal indicates the write sequence and is active low during the write cycle. The data bus SD15–SD0 provides the read and write data to the device. All of the data are transferred into the internal registers synchronized with the CK19M clock input during the write cycle. The timing is similar to the Microprocessor Interface timing shown in FIG. 73. The DSP Interface does not contain a DTACK* signal, but SINT* is activated periodically to provide the read and write access to the ASIC. The SINT* pin can also be used as an input to transfer the timing of one ASIC into another. Each ASIC contains a single register for read and another for read-write for each DS1 for a total of eight registers.

3.2.7 Test Interface

3.2.7.1 JTAG Boundary Scan

A TAP (test access port) containing four input signals (TDI, TMS, TPRST*, TCK) and an output (TDO) signal is provided for boundary scan. The TAP may be utilized for full scan testing provided adequate support of vendor tools is available.

3.2.7.2 Full Scan

Three input pins are provided for full scan testing (SCK, SE, SCANTST). The scan inputs and outputs are carried through primary inputs and outputs.

There are four scan chains in the ASIC which utilize the primary input and outputs as scan inputs and outputs. These are as follows:

| | | | | |
|---|---|---|---|---|
| Slice scan chain | - input: | RSER4 | output: | TSER1 |
| A side scan chain | - input: | ARD<0> | output: | ATD<0> |
| B side scan chain | - input: | BRD<0> | output: | BTD<0> |
| Microprocessor Intf. | - input: | CENL | output: | BCKLS |

3.2.7.3 RAM Test

Ram Test is provided through the Microprocessor Interface 450. RAM test mode is enabled through RAMTST pin. Each group of RAMS is also enabled using TSTSEL<5:0> input pins. TSTSEL<0> shall enable the RAM test for VT slice #1. Similarly, TSTSEL<1> enables VT slice #2, TSTSEL<2> enables VT slice #3, and TSTSEL<3> enables VT slice #4. The RAMs located on the Transmit Bus Interfaces are enabled using TSTSEL<4> for B side and TSTSEL<5> for A side.

3.3 AC Electrical Characteristics

3.3.1 Clock Inputs

The clock signals CK19A, CK19B, CLKMP and RCLK are described above in section 3.1.

3.3.2 Input Signals

The input pins of the bus interface are preferably implemented using the TTL input buffers because of the BTL bus interface IC's. These signals, described above in section 3.1, are preferably completely asynchronous to their reference clocks. The period of the signal is longer than the reference clock period to be captured. Only one of the reference clocks is generally used, and the clock selection is performed by microprocessor 426.

3.3.3 Output Signals

The output signals are described above in section 3.1.

While certain advantageous embodiments have been chosen to illustrate the invention, it will be understood by those skilled in the art that various changes and modifications can be made therein without departing from the scope of the invention as defined in the appended claims.

APPENDIX A

GLOSSARY OF TELEPHONE SYSTEM ACRONYMS AND ABBREVIATIONS

A

| | |
|---|---|
| ACO | Alarm Cut-Off |
| ADM | Add-Drop Multiplexer |
| ADTS | Automated Digital Terminal System |
| ADU | Alarm Display Unit |
| AIS | Alarm Indication Signal |
| AIU | Analog Interface Unit |
| ALIT | Automatic Loop Insulation Testing |
| AMI | Alternate Mark Inversion |
| ANSI | American National Standards Institute |
| AOW | Alarm & Order Wire |
| AOW | Alarm and Orderwire (Module) |
| AP | Application Processor |
| APM | Autonomous Protection Module |
| APS | Automatic Protection Switching |
| ASIC | Application-Specific Integrated Circuit |
| ASK | Amplitude-shift keyed |
| ASN | Abstract Syntax Notation |
| AUXS | Auxiliary Shelf |

B

| | |
|---|---|
| B8ZS | Bipolar with 8-Zero Substitution |
| BCP | Bank Control Processor |
| BER | Bit (or Boundary) Error Rate |
| BIP | Byte Interleaved Parity |
| BITS | Building Integrated Timing Supply |
| BOC | Bell Operating company |
| BPV | Bipolar Violations |
| BRA | Bite Rate Adapter or Bit Rate Access |
| BRI | Basic Rate Interface |

C

| | |
|---|---|
| CAD | Craft Access Device |
| CAS | Craft Access System |
| CAT | Craft Access Terminal |
| CES | Common Equipment Shelf |
| CEV | Controlled Environment Vault |
| CF | Coin First |
| CFU | Channel Fuse Unit |
| CHS | Channel Shelf |
| CID | Craft Interface Device |
| CLASS | Custom Local Area Signaling Service |
| CLEI | Common Language Equipment Identification (Bellcore) |
| CLF | Carrier Line Failure |
| CMIDU | Common Management Interface Data Unit |
| CNI | Calling Number Identification |
| CO | Central Office |
| CODEC | Coder/Decoder |
| Combo | Combination Codec and PCM filter |
| COP | AT&T provisioning OS |
| COT | Central office Terminal |
| CPE | Customer Premises Equipment |
| CPI | Calling Party Identification |
| CRC | Cyclic Redundancy Code |
| CSA | Customer (or Carrier) Service Area |
| CSC | Common Signaling Channel |
| CSMA | Collision Sense Multiple Access |
| CSP | Communication Strobe Card or Channel Shelf Processor |
| CTU | Channel Test Unit |
| CU | Channel Unit |
| CV | Coding Violation |

D

| | |
|---|---|
| DCC | Data Communications Channel |
| DCS | Digital Crossconnect System |
| DCU | Digital Connectivity Unit |
| DDS | Digital Data Service |
| DEU | DS1 Extension Unit |
| DID | Direct Inward Dial |
| DLC | Digital Loop Carrier |
| DM | Degraded Minutes |
| DS0 | Digital Signal (Level) 0 |
| DS-1 | Digital Signal (Level) 1 |
| DSX-1 | Digital Signal Crossconnect (Level) 1 |
| DTAU | Digital Test Access Unit |
| DTMF | Dual Tone Multi-Frequency |
| DTS | Digital Transmission System (Inc.) |
| DV | Data Valid |

E

| | |
|---|---|
| E1 | European 32-channel PCM format |
| EOC | Embedded Operations Channel |
| ES | Errored Seconds |
| ESF | Extended Superframe Format |
| ESF/ndl | Extended Superframe Format with new data link |
| ESPOTS | Extended Special Plain Old Telephone Service |

F

| | |
|---|---|
| FAD | Fault (or Facility) Access Digroup |
| FCU | Fan control Unit |
| FDDI | Fiber Distributed Data Interface |
| FDL | Facility Data Link |
| FE | Far End |
| FEBE | Far End Block Error |
| FELB | Far End Loop Back |
| FELOF | Far End Loss Of customer data |
| FELP | Far End LooP back |
| FERF | Far End Receive Failure |
| FIFO | First In First Out |
| FITL | Fiber In The Loop |
| FPGA | Field Programmable Gate Array |
| F/O | Finer Optic |

G

| | |
|---|---|
| GS | Ground start |

H

| | |
|---|---|
| HDL | High Level Data Link |
| HDLC | High-level Data Link Control |
| HS | High speed |

I

| | |
|---|---|
| IDLC | Integrated Digital Loop Carrier |
| IDT | Integrated Digital Terminal |
| IMP | Integrated Multiprotocol Processor |
| INC | Incoming |
| IPL | Initial Program Load |
| ISDN | Integrated Services Digital Network |
| ISO | International Standardization Organization |
| ITS | Integrated Test System |

J

K

L

| | |
|---|---|
| LAN | Local Area Network |
| LAPx | Link Access Procedure on x (A, B, C, D) channel |

APPENDIX A-continued

GLOSSARY OF TELEPHONE SYSTEM ACRONYMS AND ABBREVIATIONS

| | |
|---|---|
| LATA | Local Access and Transport Area |
| LBO | Line Build Out |
| LCCU | Low Cost Channel Unit |
| LDS | Local Digital Switch |
| LEC | Local Exchange Carrier |
| LFU | Line Fuse Unit |
| LIU | Line Interface Unit |
| LMOS | Loop Maintenance Operation System |
| LOF | Loss of Frame |
| LOP | Loss of Parity (or Pointer) |
| LOS | Loss of Signal |
| LPTR | Loop Test - Ring |
| LPTT | Loop Test - Tip |
| LS | Loop start |
| LSPM | Low Speed Protection Module |
| LSSGR | LATA Switching System Generic Requirements |
| LULT | Line Unit Line Terminating (ISDN BRI) |
| LUNT | Line Unit Network Terminating (ISDN BRI) |
| M | |
| M13 | DS1 to DS3 Multiplex |
| MAC | Management and Control |
| MAU | Maintenance Unit |
| MC | Maintenance Center |
| MIB | Management Information Base |
| MJ | Major (Alarm) |
| MLT | Mechanized Loop Test |
| MMU | Memory Management Unit |
| MN | Minor (Alarm) |
| MSB | Most Significant Bit |
| MSDT | Multi-Subscriber Distant Terminal |
| MSG | Message line interface |
| MTAU | Metallic Test Access Unit |
| MTS | Message Telephone Service |
| MTTR | Mean Time To Repair |
| MUX | Multiplexer |
| N | |
| NE | Near End (or Network Element) |
| NEBS | Network Equipment - Building System |
| NELB | Near End Loop Back |
| NELOF | Near End Loopback Of customer Data |
| NELP | Near End LooPback |
| NEP | Network Element Processor |
| NM | Network Management |
| NMA | Network Maintenance Alarm or Monitoring & Analysis System |
| NRZ | Non-Return to Zero logic |
| NSR | New Service Request (PSC-5 backplane signal) |
| O | |
| OC | Optical Card |
| OC-12 | Optical Channel (Level) 12 |
| OC-3 | Optical Channel (Level) 3 |
| OCU | Office Channel Unit |
| OEI | Optical to Electrical Interface |
| OHT | On-hook Transmission |
| OIC | Optical Interface Card |
| OIM | Operations Interface Module |
| OOF | Out Of Frame |
| OPR | Optical Power Received |
| OPS/INE | Operations System/Intelligent Network Element |
| OPT | Optical Power Transmitted |
| OS | Operating (or Operations) System |
| OSI | Open System Interconnect |
| OSS | Operations Support System |
| OTDR | Optical Time-Domain Reflectometer |
| OTGR | Operations Technology Generic Requirements |
| OTS | Office Timing Supply |
| OVC | Output Verify Circuit |
| OW | Order Wire |
| O/E | Optical-to-Electrical conversion |
| P | |
| PAL | |
| PBX | Private Branch Exchange |

| | |
|---|---|
| PCM | Pulse code modulation |
| PCS | Portable Communication System |
| PCU | Power Converter or Control Unit |
| PGTC | Pair Gain Test Controller |
| PLAR | Private Line Automatic Ringdown |
| PLL | Phase Locked Loop |
| PLM | Phase Lock Multiplier |
| PM | Performance Monitoring |
| PMN | Power Minor Alarm |
| POC | Pulse Operations Channel |
| POTS | Plain Old Telephone Service |
| PPS | Path Protection Switched |
| PRA | Primary Rate Adapter (or Access) |
| PRI | Primary Rate Interface (ISDN) |
| PSC | Pulsecom |
| PSN | Public Switched Network |
| Q | |
| QBRICU | Quad Basic Rate Interface Channel Unit |
| QCU | Quad Channel Unit |
| QDS1 | Quad DS-1 |
| R | |
| RBOC | Regional Bell Operating Company |
| RDT | Remote Digital Terminal |
| RMU | Remote Measurement Unit |
| RSU | Remote Switch Unit |
| RT(U) | Remote Terminal (Unit) |
| S | |
| SARTS | Switched Access Remote Access System |
| SCP | Signaling I/O Control Processor (FPGA) |
| SD | Signal Degraded |
| SDEU | Synchronous DS1 Extension Unit |
| SECC | Secondary Error Correction Channel (DDS services) |
| SES | Severely Errored Seconds |
| SF | Super Frame (or Signal Failed) |
| SHR | Self-Healing Ring |
| SLC | Subscriber Loop Carrier (TM of AT&T) |
| SLIC | Subscriber Loop Interface Circuit |
| SMDS | Switched Multimegabit Data Service |
| SMT | Surface Mount Technology |
| SOH | Sonet OverHead |
| SONET | Synchronous Optical Network |
| SOP | SONET Overhead Processor (card) |
| SPE | Synchronous Payload Envelope |
| SPOTS | Special Plain Old Telephone Service |
| SS | Supervisory System or System Services |
| STS1 | Synchronous Transport Signal unit |
| STSM | STS-1 Multiplexer |
| STSX | Synchronous Transport Signal Extended |
| T | |
| T1 | Line-power DS1 to repeaters (1.544 Mbits/s) |
| T3 | Standard transmission format at 45 Mbits/s |
| TAD | Test Access Device (or Digroup) |
| TAN | Test Access Network |
| TAP | Test Access Path |
| TBD | To Be Determined |
| TBOS | Telemetry Byte-Oriented Serial (alarm reporting link) |
| TBSU | Test Bus Segmentation Unit |
| TCA | Threshold Crossing Alert |
| TCXO | Temperature Controlled Crystal Oscillator |
| TDM | Time division multiplex |
| TIRKS | Test Inventory Record Keeping System |
| T-I/F | ISDN *T* Interface |
| TL1 | Transaction Language 1 |
| TMC | Time management Channel |
| TRU | Transmit-receive Unit |
| TSC | Test System Controller |
| TSG | Timing Signal Generator |
| TSI | Time Slot Interchange (or Interpolation) |
| U | |
| U | ISDN *U* interface |
| UART | Universal Asynchronous Receiver/Transmitter |

APPENDIX A-continued

GLOSSARY OF TELEPHONE SYSTEM ACRONYMS AND ABBREVIATIONS

| | |
|---|---|
| UAS | Un-Available Seconds |
| UDLC | Universal Digital Loop Carrier |
| UDT | Universal Digital Terminal |
| UE | Underground Enclosure |
| UVG | Universal Voice Grade |
| V | |
| VCO | Voltage Controlled Oscillator |
| VF | Voice frequency |
| VRDT | Virtual Remote Digital Terminal |
| VT | Virtual Tributary (Sonet term) |
| VTG | Virtual Tributary Group (4 VT 1.5 s) |
| W | |
| WTR | Wait To Restore |
| X | |
| XCT | Extended Test Controller |
| Y | |
| Z | |
| ZBS | Zero Byte Supression |

4.8.4. Registers

All of the processor registers are listed below starting from address FF. The odd addresses are not utilized and they are reserved for the internal RAM testing.

4.8.4.1. Register FE—Diagnostic Register

It provides the test software access into the ASIC without affecting the configuration of the ASIC. The microcontroller interface can be tested writing and reading back of this register.

4.8.4.2. Register FC—Interrupt Enable Register

The interrupt enable register, containing a mask bit per alarm register and a mask bit per interrupt vector outputs of the ASIC, allows to enable and disable the interrupts. The logic 1 level shall enable the interrupt. The register bits shall be set to 0 following Power_up

| Bit | Function | Type | Default |
|---|---|---|---|
| Bit 15 | Mask of Alarm Reg. 13 | R/W | 0 |
| Bit 14 | Mask of Alarm Reg. 12 | R/W | 0 |
| Bit 13 | Mask of Alarm Reg. 11 | R/W | 0 |
| Bit 12 | Mask of Alarm Reg. 10 | R/W | 0 |
| Bit 11 | Mask of Alarm Reg. 9 | R/W | 0 |
| Bit 10 | Mask of Alarm Reg. 8 | R/W | 0 |
| Bit 9 | Mask of Alarm Reg. 7 | R/W | 0 |
| Bit 8 | Mask of Alarm Reg. 6 | R/W | 0 |
| Bit 7 | Mask of Alarm Reg. 5 | R/W | 0 |
| Bit 6 | Mask of Alarm Reg. 4 | R/W | 0 |
| Bit 5 | Mask of Alarm Reg. 3 | R/W | 0 |
| Bit 4 | Mask of Alarm Reg. 2 | R/W | 0 |
| Bit 3 | Mask of Alarm Reg. 1 | R/W | 0 |
| Bit 2 | Mask of Alarm Reg. 0 | R/W | 0 |
| Bit 1 | Mask of Secondary Int. | R/W | 0 |
| Bit 0 | Mask of Primary Int. | R/W | 0 |

4.8.4.3. Register FA—Interrupt Connect Register

The interrupt connect register allows to connect any alarm register interrupt to the primary or secondary interrupt lines of the ASIC. A logic 1 level shall connect the register to the primary, and a logic 0 shall connect the register to the secondary interrupt vector. The register bits are set to 0 following Power_up assigning all of the interrupts into the secondary interrupt.

| Bit | Function | Type | Default |
|---|---|---|---|
| Bit 15 | Connect Alm Reg. 13 | R/W | 0 |
| Bit 14 | Connect Alm Reg. 12 | R/W | 0 |
| Bit 13 | Connect Alm Reg. 11 | R/W | 0 |
| Bit 12 | Connect Alm Reg. 10 | R/W | 0 |
| Bit 11 | Connect Alarm Reg. 9 | R/W | 0 |
| Bit 10 | Connect Alarm Reg. 8 | R/W | 0 |
| Bit 9 | Connect Alarm Reg. 7 | R/W | 0 |
| Bit 8 | Connect Alarm Reg. 6 | R/W | 0 |
| Bit 7 | Connect Alarm Reg. 5 | R/W | 0 |
| Bit 6 | Connect Alarm Reg. 4 | R/W | 0 |
| Bit 5 | Connect Alarm Reg. 3 | R/W | 0 |
| Bit 4 | Connect Alarm Reg. 2 | R/W | 0 |
| Bit 3 | Connect Alarm Reg. 1 | R/W | 0 |
| Bit 2 | Connect Alarm Reg. 0 | R/W | 0 |
| Bit 1–0 | Unused | R | 0 |

4.8.4.4. Register F8—Interrupt Status Register

The interrupt register flags the processor on an activity in one of the alarm registers which was indicated by primary or secondary interrupt vectors. A logic 1 level shall reflect an activity in an alarm register regardless of the effect of the mask.

| Bit | Function | Type | Default |
|---|---|---|---|
| Bit 15 | Interrupt Alm Reg. 13 | R | X |
| Bit 14 | Interrupt Alm Reg. 12 | R | X |
| Bit 13 | Interrupt Alm Reg. 11 | R | X |
| Bit 12 | Interrupt Alm Reg. 10 | R | X |
| Bit 11 | Interrupt Alm Reg. 9 | R | X |
| Bit 10 | Interrupt Alm Reg. 8 | R | X |
| Bit 9 | Interrupt Alm Reg. 7 | R | X |
| Bit 8 | Interrupt Alm Reg. 6 | R | X |
| Bit 7 | Interrupt Alm Reg. 5 | R | X |
| Bit 6 | Interrupt Alm Reg. 4 | R | X |
| Bit 5 | Interrupt Alm Reg. 3 | R | X |
| Bit 4 | Interrupt Alm Reg. 2 | R | X |
| Bit 3 | Interrupt Alm Reg. 1 | R | X |
| Bit 2 | Interrupt Alm Reg. 0 | R | X |
| Bit 1 | Secondary Interrupt | R | X |
| Bit 0 | Primary Interrupt | R | X |

4.8.4.5. Register F6—ASIC Revision Code & Configuration

The least significant 8 bit reflects the revision code of VTM ASIC which is currently defined as 02H.

The configuration pins of the ASIC are also included in the same register. Any change of the ABSEL or BUSMODE input pin is reflected into this register immediately.

| Bit | Function | Type | Default |
|---|---|---|---|
| Bit 15–10 | Unused | R | 0 |
| Bit 9 | Busmode Pin (Config) | R | X |
| Bit 8 | Absel Pin (Config) | R | X |
| Bit 7–0 | ASIC Revision Code | R | 02H |

4.8.4.6. Register F4—Global Control Register

ABSLICE: Provides the selection of a VT from A or B side. A logic 0 level shall indicate the mapping from A side, and logic 1 from B side.

SYNSEL: Controls the multiplexer to select an 8 kHz synchronization signal generated by one the four DS1 receive interface.

0 0 DS1 receive interface #0,
0 1 DS1 receive interface #1,
1 0 DS1 receive interface #2,
1 1 DS1 receive interface #3.

TREFSEL: Controls the multiplexer to select a 1.544 MHz reference clock generated by one of the four DS1 transmit interface.
0 0 DS1 transmit interface #0,
0 1 DS1 transmit interface #1,
1 0 DS1 transmit interface #2,
1 1 DS1 transmit interface #3.

DISPLOSS: Provides the mechanism to turn off the interrupts caused by P1P0 signaling multiframe indicator while dealing with asynchronous payload. A logic 1 level shall mask the interrupt caused by VT P1P0 loss bit of the VT alarm register.

SYNEN: Controls the tristate driver of the 8 kHz synchronization reference output SYN8K. A logic 0 shall force this output into tristate mode.

REFEN: Controls the tristate driver of the 1.544 MHz reference clock output TREFCK. A logic 0 shall force this output into tristate mode.

GASYN: Global Asynchronous VT flag. This should be set to logic 1 when at least one of the VT slices is carrying asynchronous VT payload. This will allow the OBINT bit of the Alarm Register F0 to be activated once every 500 usec.

| Bit | Function | Type | Default |
|---|---|---|---|
| Bit 15 | Unused | R/W | 0 |
| Bit 14 | GASYN | R/W | 0 |
| Bit 13 | REFEN | R/W | 0 |
| Bit 12 | SYNEN | R/W | 0 |
| Bit 11 | DISPLOSS-VT #4 | R/W | 0 |
| Bit 10 | DISPLOSS-VT #3 | R/W | 0 |
| Bit 9 | DISPLOSS-VT #2 | R/W | 0 |
| Bit 8 | DISPLOSS-VT #1 | R/W | 0 |
| Bit 7–6 | TREFSEL | R/W | 0 |
| Bit 5–4 | SYNSEL | R/W | 0 |
| Bit 3 | ABSLICE-#4 | R/W | 0 |
| Bit 2 | ABSLICE-#3 | R/W | 0 |
| Bit 1 | ABSLICE-#2 | R/W | 0 |
| Bit 0 | ABSLICE-#1 | R/W | 0 |

The register bits are set to 0 following Power_up.

4.8.4.7. Register F2—Alarm Register 0

ALOSS: Clock loss detection of the CK19A clock input. The detection is performed using microcontroller clock MPCLK. A logic 1 shall indicate the error condition.

BLOSS: Clock loss detection of the CK19B clock input. The detection is performed using microcontroller clock MPCLK. A logic 1 shall indicate the error condition.

HWERR: The internal parity check mechanism of the ASIC which will flag the bad parts during normal operation. A logic 1 shall indicate the error condition.

| Bit | Function | Type | Default |
|---|---|---|---|
| Bit 15–12 | Unused | R | 0 |
| Bit 11 | HWERR-TX B side | CL on RD | 0 |
| Bit 10 | HWERR-TX A side | CL on RD | 0 |
| Bit 9 | HWERR-Demap #4 | CL on RD | 0 |
| Bit 8 | HWERR-Map #4 | CL on RD | 0 |
| Bit 7 | HWERR-Demap #3 | CL on RD | 0 |
| Bit 6 | HWERR-Map #3 | CL on RD | 0 |
| Bit 5 | HWERR-Demap #2 | CL on RD | 0 |
| Bit 4 | HWERR-Map #2 | CL on RD | 0 |
| Bit 3 | HWERR-Demap #1 | CL on RD | 0 |
| Bit 2 | HWERR-Map #1 | CL on RD | 0 |
| Bit 1 | BLOSS | CL on RD | 0 |
| Bit 0 | ALOSS | CL on RD | 0 |

The register bits are set to 0 following Power_up and when they are read by software.

4.8.4.8. Register F0—Alarm Register 1

SLMPINT: SLC-96 mode Mapper interrupt indicates the request for software read access into the ASIC, so a new 72 frame datalink information can be collected. A logic 1 indicates that the read buffer is full. This interrupt is enabled only if SLCEN bit (bit 11) of the mapper control register is set to logic 1.

SLDMINT: SLC-96 mode Demapper interrupt indicates the request for software write access into the ASIC, so a new 72 frame datalink information can be transmitted. A logic 1 indicates that the write buffer is empty. This interrupt is only enabled if SLCEN bit (bit 11) of the mapper control register is set to logic 1.

OBINT: O bit interrupt. It is generated once every 500 usec. A logic 1 indicates that the new O bits can be read and written. This interrupt is only enabled if GASYN bit (bit 14) of the global control register F4 is set to logic 1.

| Bit | Function | Type | Default |
|---|---|---|---|
| Bit 15–9 | Unused | R | 0 |
| Bit 8 | OBINT | CL on RD | 0 |
| Bit 7 | SLDMINT-DS1 #4 | CL on RD | 0 |
| Bit 6 | SLDMINT-DS1 #3 | CL on RD | 0 |
| Bit 5 | SLDMINT-DS1 #2 | CL on RD | 0 |
| Bit 4 | SLDMINT-DS1 #1 | CL on RD | 0 |
| Bit 3 | SLMPINT-DS1 #4 | CL on RD | 0 |
| Bit 2 | SLMPINT-DS1 #3 | CL on RD | 0 |
| Bit 1 | SLMPINT-DS1 #2 | CL on RD | 0 |
| Bit 0 | SLMPINT-DS1 #1 | CL on RD | 0 |

The register bits 0–8 are set to 0 following Power_up and when they are read by software.

4.8.4.9. Register EE—Alarm Register 2

H4_LOSS: The H4 tracking circuit generates an H4 loss signal based on the algorithm mentioned in the ASIC spec. A logic 1 shall indicate the error condition.

| Bit | Function | Type | Default |
|---|---|---|---|
| Bit 15–1 | Unused | R | 0 |
| Bit 0 | A Side H4_LOSS | CL on RD | 0 |

The register bit 0 is set to 0 following Power_up and when it is read by software.

4.8.4.10. Register EC—Alarm Register 3

A VT AIS register is included to monitor a VT AIS condition on both active and inactive receive bus interfaces to prevent switching into the inactive side while AIS is active. A logic 1 level alarm signal is generated detecting all ones in the V1 and V2 VT pointer bytes. The VT AIS indication shall be removed with a single 0 detected in the pointer bytes.

| Bit | Function | Type | Default |
|---|---|---|---|
| Bit 15–4 | Unused | R | 0 |
| Bit 3 | VT AIS-VT #4 | CL on RD | 0 |
| Bit 2 | VT AIS-VT #3 | CL on RD | 0 |
| Bit 1 | VT AIS-VT #2 | CL on RD | 0 |
| Bit 0 | VT AIS-VT #1 | CL on RD | 0 |

The register bits 0–3 are set to 0 following Power_up and when they are read by software.

4.8.4.11. Register EA—Alarm Register 4

PE_INT: Bus failure is detected looking into the receive bus parity error and decrementing a counter whose threshold is set by software. A transfer from count 1 to 0 shall set this register into the logic 1 level.

| Bit | Function | Type | Default |
|---|---|---|---|
| Bit 15–1 | Unused | R | 0 |
| Bit 0 | A Side PE_INT | CL on RD | 0 |

The register bit 0 is set to 0 following Power_up and when it is read by software.

4.8.4.12. Register E8—Alarm Register 5

RP_RAMF: Reflected Parity Fifo full is generated whenever the 16 bit fifo is filled with the address of the tributaries containing parity errors. A logic 1 shall indicate the full condition of the FIFO.

| Bit | Function | Type | Default |
|---|---|---|---|
| Bit 15–1 | Unused | R | 0 |
| Bit 0 | A Side RP_RAMF | CL on RD | 0 |

The register bit 0 is set to 0 following Power_up and when it is read by software.

4.8.4.13. Register E6—Alarm Register 6

Same as Register EE—Alarm Register 2, but it indicates the condition on B side.

4.8.4.14. Register E4—Alarm Register 7

Same as Register EC—Alarm Register 3, but it indicates the condition on B side.

4.8.4.15. Register E2—Alarm Register 8

Same as Register EA—Alarm Register 4, but it indicates the condition on B side.

4.8.4.16. Register E0—Alarm Register 9

Same as Register E8—Alarm Register 5, but it indicates the condition on B side.

4.8.4.17. Register DE—Alarm Register 10

RVTPER: The parity detected in the serial VT interface. A logic 1 shall indicate an odd parity error.

VTAIS: VT path AIS detected under the pointer interpretation rules. A logic 1 shall indicate the AIS condition.

VTLOP: VT loss of pointer detected under the pointer interpretation rules. A logic 1 shall indicate the LOP condition.

PLOSS: P1P0 signaling multiframe loss. A logic 1 shall indicate the error condition.

YELLOW: VT path overhead V5 byte yellow bit. A set yellow bit shall set the register following ten multiframe filtering.

FERF: VT path overhead V5 byte ferf bit. A set ferf bit shall set the register following ten multiframe filtering.

LBLCHA: Any change VT path overhead V5 byte label bits shall set this register following five multiframe filtering. A logic 1 shall indicate that the LBL bits are new.

LABEL: Vt path overhead V5 byte label bits. These three bits are filtered for five multiframes.

| Bit | Function | Type | Default |
|---|---|---|---|
| Bit 15–10 | Unused | R | 0 |
| Bit 9 | RVTPER-VT #1 | CL on RD | 0 |
| Bit 8 | VTAIS-VT #1 | CL on RD | 0 |
| Bit 7 | VTLOP-VT #1 | CL on RD | 0 |
| Bit 6 | PLOSS-VT #1 | CL on RD | 0 |
| Bit 5 | YELLOW-VT #1 | CL on RD | 0 |
| Bit 4 | FERF-VT #1 | CL on RD | 0 |
| Bit 3 | LBLCHA-VT #1 | CL on RD | 0 |
| Bit 2–0 | LABEL-VT #1 | RD | X |

The register bits 3–9 are set to 0 following Power_up and when they are read by software.

4.8.4.18. Register DC—Alarm Register 11

Same as Register DE—Alarm Register 10, but it indicates the conditions on VT #2.

4.8.4.19. Register DA—Alarm Register 12

Same as Register DE—Alarm Register 10, but it indicates the conditions on VT #3.

4.8.4.20. Register D8—Alarm Register 13

Same as Register DE—Alarm Register 10, but it indicates the conditions on VT #4.

4.8.4.21. Register D6—RX Bus, VT Connect Register

VT1SEL: VT #1 Address in the STS-1. The addressing scheme is given below:

0 0 0 0 0 No condition
0 0 0 0 1 Tributary #1
0 0 0 1 0 Tributary #2
0 0 0 1 1 Tributary #3
0 0 1 0 0 Tributary #4
0 0 1 0 1 Tributary #5
0 0 1 1 0 Tributary #6
0 0 1 1 1 Tributary #7
0 1 0 0 0 Tributary #8
0 1 0 0 1 Tributary #9
0 1 0 1 0 Tributary #10
0 1 0 1 1 Tributary #11
0 1 1 0 0 Tributary #12
0 1 1 0 1 Tributary #13
0 1 1 1 0 Tributary #14
0 1 1 1 1 Tributary #15
1 0 0 0 0 Tributary #16
1 0 0 0 1 Tributary #17
1 0 0 1 0 Tributary #18
1 0 0 1 1 Tributary #19
1 0 1 0 0 Tributary #20
1 0 1 0 1 Tributary #21
1 0 1 1 0 Tributary #22
1 0 1 1 1 Tributary #23
1 1 0 0 0 Tributary #24
1 1 0 0 1 Tributary #25
1 1 0 1 0 Tributary #26
1 1 0 1 1 Tributary #27
1 1 1 0 1 Tributary #28
1 1 1 0 1 No condition
1 1 1 1 0 No condition
1 1 1 1 1 No condition VT2SEL: VT #2 Address in the STS-1.

| Bit | Function | Type | Default |
|---|---|---|---|
| Bit 15–10 | Unused | R | 0 |
| Bit 9–5 | VT1SEL | R/W | 00H |
| Bit 4–0 | VT2SEL | R/W | 00H |

The register bits shall be set to 0 following Power_up.

4.8.4.22. Register D4—RX Bus, VT Connect register
VT3SEL: VT #3 Address in the STS-1.
VT4SEL: VT #4 Address in the STS-1.

| Bit | Function | Type | Default |
|---|---|---|---|
| Bit 15–10 | Unused | R | 0 |
| Bit 9–5 | VT3SEL | R/W | 00H |
| Bit 4–0 | VT4SEL | R/W | 00H |

The register bits shall be set to 0 following Power_up.

4.8.4.23. Register D2—RX Bus, A Side Control Register
PTH_TH: Parity threshold is loaded in the 5 bit parity down counter which will indicate the bus failure condition. The counter is decremented by one with each parity error until it reaches to zero.
LCL_LPBK: Local loopback connects the transit bus output data and sync signals into the receive interface instead of the ones received from the ASIC pins. A logic 1 level shall indicate the loop condition.
STS_SEL: Provides the tracking on one of the three STS-1 payload. The selection scheme is given below:
0 0 STS-1 #1
0 1 STS-1 #2
1 0 STS-1 #3
1 1 Unused

| Bit | Function | Type | Default |
|---|---|---|---|
| Bit 15–8 | Unused | R | 0 |
| Bit 7–3 | PTH_TH-A side | R/W | 00H |
| Bit 2 | LCL_LPBK-A side | R/W | 0 |
| Bit 1–0 | STS_SEL-A side | R/W | 00B |

The register bits shall be set to 0 following Power_up.

4.8.4.24. Register D0—RX Bus, B Side Control Register
Same as Register D2, but it provides the control signals on B side.

4.8.4.25. Register CE—Reflected Parity Check Control
The reflected parity error check can be enabled or disabled per VT. A logic 1 level shall enable the reflected parity error on a particular VT. This register contains the controls for VT #15–28. The register bits shall be set to 0 following Power_up.

| Bit | Function | Type | Default |
|---|---|---|---|
| Bit 15–14 | Unused | R | 0 |
| Bit 13 | Enable check VT #28 | R/W | 0 |
| Bit 12 | Enable check VT #27 | R/W | 0 |
| Bit 11 | Enable check VT #26 | R/W | 0 |
| Bit 10 | Enable check VT #25 | R/W | 0 |
| Bit 9 | Enable check VT #24 | R/W | 0 |
| Bit 8 | Enable check VT #23 | R/W | 0 |
| Bit 7 | Enable check VT #22 | R/W | 0 |
| Bit 6 | Enable check VT #21 | R/W | 0 |
| Bit 5 | Enable check VT #20 | R/W | 0 |
| Bit 4 | Enable check VT #19 | R/W | 0 |
| Bit 3 | Enable check VT #18 | R/W | 0 |
| Bit 2 | Enable check VT #17 | R/W | 0 |
| Bit 1 | Enable check VT #16 | R/W | 0 |
| Bit 0 | Enable check VT #15 | R/W | 0 |

4.8.4.26. Register CC—Reflected Parity Check Control
Same as register CE, but it contains the controls for VT #1–14. The register bits shall be set to 0 following Power_up.

| Bit | Function | Type | Default |
|---|---|---|---|
| Bit 15–14 | Unused | R | 0 |
| Bit 13 | Enable check VT #14 | R/W | 0 |
| Bit 12 | Enable check VT #13 | R/W | 0 |
| Bit 11 | Enable check VT #12 | R/W | 0 |
| Bit 10 | Enable check VT #11 | R/W | 0 |
| Bit 9 | Enable check VT #10 | R/W | 0 |
| Bit 8 | Enable check VT #9 | R/W | 0 |
| Bit 7 | Enable check VT #8 | R/W | 0 |
| Bit 6 | Enable check VT #7 | R/W | 0 |
| Bit 5 | Enable check VT #6 | R/W | 0 |
| Bit 4 | Enable check VT #5 | R/W | 0 |
| Bit 3 | Enable check VT #4 | R/W | 0 |
| Bit 2 | Enable check VT #3 | R/W | 0 |
| Bit 1 | Enable check VT #2 | R/W | 0 |
| Bit 0 | Enable check VT #1 | R/W | 0 |

4.8.4.27. Register CA—TX Bus, VT Connect Register
Same as register D6, but it provides the connection for transmit bus.

4.8.4.28. Register C8—TX Bus, VT Connect Register
Same as register D4, but it provides the connection for transmit bus.

4.8.4.29. Register C6—TX Bus, A Side Control Register
FRCNT_EN: Enable test frame counter. The test frame counter generates the transmit bus synchronization signals from a free running counter as J1 is in fixed position (following C1). A logic 1 shall switch the control signals from this counter instead of the ones received in the bus interface.
RP_POLARITY: Reflected parity error polarity can be altered with this control bit.
H4_SRC: H4 synchronization select enables the interface to synchronize either with the H4 sync detected in the receive interface or C1J1V1 signal of the transmit bus interface. A logic 1 level shall connect the receive H4 multiframe and a logic 0 level shall connect the transmit V1 multiframe synchronization into the transmit bus interface.
H4_SEQ: The H4 sequence can be generated as long as 3 msec, or short 500 usec. A logic 1 level shall enable the long sequence to be generated.
H4_INS: H4 byte is generated and inserted into the VT path overhead under the control of this register. A logic 1 shall insert the H4 byte into the STS-1 payload.
STS_SEL: Provides the tracking on one of three STS-1 payload. The selection scheme is given below:
0 0 STS-1 #1
0 1 STS-1 #2
1 0 STS-1 #3
1 1 Unused DLY_CTL: Delays the outputs of the tributary counter to match with the delays on the reflected parity path. The reflected parity error should be returned in the same STS-1 boundary which it was transmitted. The selection scheme is given below:
0 0 3 clock delay
0 1 6 clock delay
1 0 9 clock delay
1 1 12 clock delay PE_INS: Creates parity errors on the outgoing data when it is set to logic 1.

VT_AIS: Inserts VT AIS per VT when it is set to logic 1. This feature has been added to be able to insert AIS on the outgoing data when the normal data is looped into the receive side.

| Bit | Function | Type | Default |
|---|---|---|---|
| Bit 15–14 | Unused | R | 0 |
| Bit 13 | FRCNT_EN-A side | R/W | 0 |
| Bit 12 | RP_POLARITY-A side | R/W | 0 |
| Bit 11 | H4_SRC-A side | R/W | 0 |
| Bit 10 | H4_SEQ-A side | R/W | 0 |
| Bit 9 | H4_INS-A side | R/W | 0 |
| Bit 8–7 | STS_SEL-A side | R/W | 0 |
| Bit 6–5 | DLY_CTL-A side | R/W | 0 |
| Bit 4 | PE_INS-A side | R/W | 0 |
| Bit 3 | LoopAIS VT #4-A side | R/W | 0 |
| Bit 2 | LoopAIS VT #3-A side | R/W | 0 |
| Bit 1 | LoopAIS VT #2-A side | R/W | 0 |
| Bit 0 | LoopAIS VT #1-A side | R/W | 0 |

The register bits shall be set to 0 following Power_up.

4.8.4.30. Register C4—TX Bus, B Side Control Register

Same as Register C6, but it provides the control signals on B side.

4.8.4.31. Register BE-A0—A Side Reflected Parity Registers

The tributary address of the reflected parity area are stored in a fifo. This fifo is directly accessible by the microcontroller interface to read. Software access should be provided only when a fifo full interrupt is received.

The RAM shall not be cleared upon Power_up.

| Bit | Function | Type | Default |
|---|---|---|---|
| Bit 15–5 | Unused | R | 0 |
| Bit 4–0 | VT Address-A side | R | X |

4.8.4.32. Register 9E-80—b Side Reflected Parity Registers

Same as Registers BE-A0, but it contains the tributary addresses for B side.

4.8.4.33. Register 7E—Mapper Control DS1 #4

ESSEL: It provides the selection control for one of the two elastic store on the DS1 data path.
It is used in the ASIC with the combination of the BUSMODE input signal, and ASYRX register bit which controls different mappings in the ASIC. ESSEL shall be effective for DS1 to byte synchronous floating VT mapping.
A logic 1 shall enable the Dual Bank RAM whose slips are in the frame boundaries.
A logic 0 shall enable the 16-byte elastic store generating VT pointer adjustments related to the offset of the received DS1 clock.

ASYRX: It enable the ASIC to map the DS1 into the floating asynchronous VT with bit stuffing. A logic 1 shall indicate asynchronous mapping.

LOOPDS1: Loops the transmit DS1 data, clock and multiframe synchronization signals into the receive interface.

SLCEN: It enable the ASIC to drop and add the SLC-96 frame data link. A logic 1 shall indicate the operation in the 72 frames SLC-96 mode.

CLRCHA: It provides robbed bit or clear channel signaling control per DS0. A logic 1 shall indicate the robbed bit signaling. Ch 17–24 are controlled by this register.

| Bit | Function | Type | Default |
|---|---|---|---|
| Bit 15–12 | Unused | R | 0 |
| Bit 11 | SLCEN | R/W | 0 |
| Bit 10 | LOOPDS1 | R/W | 0 |
| Bit 9 | ASYRX | R/W | 0 |
| Bit 8 | ESSEL | R/W | 0 |
| Bit 7 | CLRCHA-DS0 Ch24 | R/W | 0 |
| Bit 6 | CLRCHA-DS0 Ch23 | R/W | 0 |
| Bit 5 | CLRCHA-DS0 Ch22 | R/W | 0 |
| Bit 4 | CLRCHA-DS0 Ch21 | R/W | 0 |
| Bit 3 | CLRCHA-DS0 Ch20 | R/W | 0 |
| Bit 2 | CLRCHA-DS0 Ch19 | R/W | 0 |
| Bit 1 | CLRCHA-DS0 Ch18 | R/W | 0 |
| Bit 0 | CLRCHA-DS0 Ch17 | R/W | 0 |

The register bits shall be set to 0 following Power_up.

4.8.4.34. Register 7C—Mapper Control DS1 #4

It provides clear channel control bits for DS0 channels 1–16 for the DS1 #4.

| Bit | Function | Type | Default |
|---|---|---|---|
| Bit 15 | CLRCHA-DS0 Ch16 | R/W | 0 |
| Bit 14 | CLRCHA-DS0 Ch15 | R/W | 0 |
| Bit 13 | CLRCHA-DS0 Ch14 | R/W | 0 |
| Bit 12 | CLRCHA-DS0 Ch13 | R/W | 0 |
| Bit 11 | CLRCHA-DS0 Ch12 | R/W | 0 |
| Bit 10 | CLRCHA-DS0 Ch11 | R/W | 0 |
| Bit 9 | CLRCHA-DS0 Ch10 | R/W | 0 |
| Bit 8 | CLRCHA-DS0 Ch9 | R/W | 0 |
| Bit 7 | CLRCHA-DS0 Ch8 | R/W | 0 |
| Bit 6 | CLRCHA-DS0 Ch7 | R/W | 0 |
| Bit 5 | CLRCHA-DS0 Ch6 | R/W | 0 |
| Bit 4 | CLRCHA-DS0 Ch5 | R/W | 0 |
| Bit 3 | CLRCHA-DS0 Ch4 | R/W | 0 |
| Bit 2 | CLRCHA-DS0 Ch3 | R/W | 0 |
| Bit 1 | CLRCHA-DS0 Ch2 | R/W | 0 |
| Bit 0 | CLRCHA-DS0 Ch1 | R/W | 0 |

The register bits shall be set to 0 following Power_up.

4.8.4.35. Register 7A—SLC-96 Datalink Receive #4

SFLOSS: SLC-96 superframe loss. A logic 1 shall indicate that the datalink bits may not be correct.

M1 bit: SLC-96 frame bit received in the multiframe #5, frame 4. Each multiframe contains 12 frames and there are 6 multiframe in the 72 frame SLC-96 superframe.

M2 bit: SLC-96 frame bit received in the multiframe #5, frame 6.

M3 bit: SLC-96 frame bit received in the multiframe #5, frame 8.

A1 bit: SLC-96 frame bit received in the multiframe #5, frame 10.

A2 bit: SLC-96 frame bit received in the multiframe #5, frame 12.

S1 bit: SLC-96 frame bit received in the multiframe #6, frame 2.
S2 bit: SLC-96 frame bit received in the multiframe #6, frame 4.
S3 bit: SLC-96 frame bit received in the multiframe #6, frame 6.
S4 bit: SLC-96 frame bit received in the multiframe #6, frame 8.

| Bit | Function | Type | Default |
| --- | --- | --- | --- |
| Bit 15 | SFLOSS | CL on RD | 0 |
| Bit 14–9 | Unused | R | 0 |
| Bit 8 | M1 Bit | R | 0 |
| Bit 7 | M2 Bit | R | 0 |
| Bit 6 | M3 Bit | R | 0 |
| Bit 5 | A1 Bit | R | 0 |
| Bit 4 | A2 Bit | R | 0 |
| Bit 3 | S1 Bit | R | 0 |
| Bit 2 | S2 Bit | R | 0 |
| Bit 1 | S3 Bit | R | 0 |
| Bit 0 | S4 Bit | R | 0 |

The register bits shall be set to 0 following Power_up.

4.8.4.36. Register 78—SLC-96 Datalink Receive #4

C1 bit: SLC-96 frame bit received in the multiframe #2, frame 12.
C2 bit: SLC-96 frame bit received in the multiframe #3, frame 2.
C3 bit: SLC-96 frame bit received in the multiframe #3, frame 4.
C4 bit: SLC-96 frame bit received in the multiframe #3, frame 6.
C5 bit: SLC-96 frame bit received in the multiframe #3, frame 8.
C6 bit: SLC-96 frame bit received in the multiframe #3, frame 10.
C7 bit: SLC-96 frame bit received in the multiframe #3, frame 12.
C8 bit: SLC-96 frame bit received in the multiframe #4, frame 2.
C9 bit: SLC-96 frame bit received in the multiframe #4, frame 4.
C10 bit: SLC-96 frame bit received in the multiframe #4, frame 6.
C11 bit: SLC-96 frame bit received in the multiframe #4, frame 8.

| Bit | Function | Type | Default |
| --- | --- | --- | --- |
| Bit 15–11 | Unused | R | 0 |
| Bit 10 | C1 Bit | R | 0 |
| Bit 9 | C2 Bit | R | 0 |
| Bit 8 | C3 Bit | R | 0 |
| Bit 7 | C4 Bit | R | 0 |
| Bit 6 | C5 Bit | R | 0 |
| Bit 5 | C6 Bit | R | 0 |
| Bit 4 | C7 Bit | R | 0 |
| Bit 3 | C8 Bit | R | 0 |
| Bit 2 | C9 Bit | R | 0 |
| Bit 1 | C10 Bit | R | 0 |
| Bit 0 | C11 Bit | R | 0 |

The register bits shall be set to 0 following Power_up.

4.8.4.37. register 76—Mapper Control VT #4

LABEL: This register provides the LABEL bits of the V5 path overhead byte to be transmitted from the ASIC.

FERF: The content of this register is inserted into the V5 byte FERF bit position if hardware override option is not used.

FERFSEL: It provides the FERF selection from hardware or software source. A logic 1 shall enable the automatic FERF insertion by hardware.

YELLOW: The content of this register is inserted into the V5 byte YELLOW bit position.

SWAIS: It controls the insertion of VT path AIS in floating mode or UNICODE in the locked mode. A logic 1 shall generate the AIS.

DISAIS: It disables the automatic AIS insertion under hardware control. A logic 1 shall disable the AIS.

INVBIP2: The calculated BIP-2 parity bits are inverted to create the BIP-2 errors at the other end. A logic 1 shall invert both parity bits.

ASYNVT: Enables the ASIC to map the VT interface instead of the DS1. A logic 1 shall select the VT path between two ASICs.

LOOPVT: Provides the loopback in the serial VT interface. A logic 1 shall loop the serial VT outputs into the serial VT inputs.

TR8MD: This feature has been added to freeze the P1 P0 bits on 11 condition during UNICODE. A logic 1 shall indicate TR8 mode.

| Bit | Function | Type | Default |
| --- | --- | --- | --- |
| Bit 15–12 | Unused | R | 0 |
| Bit 11 | TR8MD | R/W | 0 |
| Bit 10 | LOOPVT | R/W | 0 |
| Bit 9 | ASYNVT | R/W | 0 |
| Bit 8 | INVBIP2 | R/W | 0 |
| Bit 7 | DISAIS | R/W | 0 |
| Bit 6 | SWAIS | R/W | 0 |
| Bit 5 | YELLOW | R/W | 0 |
| Bit 4 | FERFSEL | R/W | 0 |
| Bit 3 | FERF | R/W | 0 |
| Bit 2–0 | LABEL | R/W | 0 |

The register bits shall be set to 0 following Power_up.

4.8.4.38. Register 74—Mapper Control VT #4

O bits of the asynchronous VT payload are inserted writing this register.

| Bit | Function | Type | Default |
| --- | --- | --- | --- |
| Bit 15–8 | Unused | R | 0 |
| Bit 7–4 | O-BITS second FR | R/W | 0H |
| Bit 3–0 | O-BITS for third FR | R/W | 0H |

The register bits shall be set to 0 following Power_up.

4.8.4.39. Register 72—Status Register Mapper & Demapper #4

SETDB: Indicates the slip condition of the Dual Bank data elastic store of the mapper. A logic 1 shall indicate a slip.

SETSIG: Indicates the slip condition of the Dual bank signaling elastic store of the mapper. A logic 1 shall indicate a slip.

DMSLIP: Demapper dsynchronizer elastic store slip indicator. A logic 1 shall indicate a slip.

| Bit | Function | Type | Default |
| --- | --- | --- | --- |
| Bit 15–3 | Unused | R | 0 |
| Bit 2 | SETDB | CL on RD | 0 |
| Bit 1 | SETSIG | CL on RD | 0 |
| Bit 0 | DMSLIP | CL on RD | 0 |

The register bits 0–2 are set to 0 following Power_up and when they are read by software.

4.8.4.40. Register 70—Status Register Demapper #4

O bits of the asynchronous VT payload are received in this register.

| Bit | Function | Type | Default |
| --- | --- | --- | --- |
| Bit 15–8 | Unused | R | 0 |
| Bit 7–4 | O-BITS second FR | R | 0H |
| Bit 3–0 | O-BITS for third FR | R | 0H |

The register bits shall be set to 0 following Power_up.

4.8.4.41. Register 6E—Demapper Control DS1 #4

DesynRef: Desynchronizer reference is switched from C1 SYNC into the J1 SYNC of the STS-1 payload. A logic 1 shall synchronize the interface with J1 sync.

DSDSP: It allows the ASIC to operate without a need for a DSP interface for locked mode mappings. A logic 1 shall disable the DSP control and the transmit DS1 clock shall be generated in a fixed sequence.

aisgen: A logic 1 shall generate DS1 AIS to be transmitted.

sigmode: The 12 or 24 frame multiframe signaling selection so the multiframe sync signal output is active once every 12 or 24 frames. A logic 0 indicates ESF and a logic 1 indicates SF.

mode: A logic 1 shall indicate the asynchronous DS1 mapping so the destuffing can be performed.

clkinv: DS1 clock can be inverted under software control. A logic 0 shall move the rising edge into the middle of the DS1 data (300 nsec setup 300 nsec hold) and a logic 1 level shall provide 50 nsec setup time and 600 nsec hold respect to data.

DISAIS: A logic 1 shall disable the AIS condition generated by hardware.

ccrb: It provides robbed bit or clear channel signaling control per DS0. A logic 1 shall indicate the robbed bit signaling. Ch 17–24 are controlled by this register.

| Bit | Function | Type | Default |
| --- | --- | --- | --- |
| Bit 15 | DISAIS | R/W | 0 |
| Bit 14 | clkinv | R/W | 0 |
| Bit 13 | mode | R/W | 0 |
| Bit 12 | sigmode | R/W | 0 |
| Bit 11 | aisgen | R/W | 0 |
| Bit 10 | DSDSP | R/W | 0 |
| Bit 9 | Unused | R/W | 0 |
| Bit 8 | DesynRef | R/W | 0 |
| Bit 7 | ccrb-DS0 Ch24 | R/W | 0 |
| Bit 6 | ccrb-DS0 Ch23 | R/W | 0 |
| Bit 5 | ccrb-DS0 Ch22 | R/W | 0 |
| Bit 4 | ccrb-DS0 Ch21 | R/W | 0 |
| Bit 3 | ccrb-DS0 Ch20 | R/W | 0 |
| Bit 2 | ccrb-DS0 Ch19 | R/W | 0 |
| Bit 1 | ccrb-DS0 Ch18 | R/W | 0 |
| Bit 0 | ccrb-DS0 Ch17 | R/W | 0 |

The register bits shall be set to 0 following Power_up.

4.8.4.42. Register 6C—demapper Control DS1 #4

It provides clear channel control bits for DS0 channels 1–16 for the DS1 #4.

| Bit | Function | Type | Default |
| --- | --- | --- | --- |
| Bit 15 | ccrb-DS0 Ch16 | R/W | 0 |
| Bit 14 | ccrb-DS0 Ch15 | R/W | 0 |
| Bit 13 | ccrb-DS0 Ch14 | R/W | 0 |
| Bit 12 | ccrb-DS0 Ch13 | R/W | 0 |
| Bit 11 | ccrb-DS0 Ch12 | R/W | 0 |
| Bit 10 | ccrb-DS0 Ch11 | R/W | 0 |
| Bit 9 | ccrb-DS0 Ch10 | R/W | 0 |
| Bit 8 | ccrb-DS0 Ch9 | R/W | 0 |
| Bit 7 | ccrb-DS0 Ch8 | R/W | 0 |
| Bit 6 | ccrb-DS0 Ch7 | R/W | 0 |
| Bit 5 | ccrb-DS0 Ch6 | R/W | 0 |
| Bit 4 | ccrb-DS0 Ch5 | R/W | 0 |
| Bit 3 | ccrb-DS0 Ch4 | R/W | 0 |
| Bit 2 | ccrb-DS0 Ch3 | R/W | 0 |
| Bit 1 | ccrb-DS0 Ch2 | R/W | 0 |
| Bit 0 | ccrb-DS0 Ch1 | R/W | 0 |

The register bits shall be set to 0 following Power_up.

4.8.4.43. Register 6A—SLC-96 Datalink Transmit #4

M1 bit: SLC-96 frame bit transmitted in the multiframe #5, frame 4.

M2 bit: SLC-96 frame bit transmitted in the multiframe #5, frame 6.

M3 bit: SLC-96 frame bit transmitted in the multiframe #5, frame 8.

A1 bit: SLC-96 frame bit transmitted in the multiframe #5, frame 10.

A2 bit: SLC-96 frame bit transmitted in the multiframe #5, frame 12.

S1 bit: SLC-96 frame bit transmitted in the multiframe #6, frame 2.

S2 bit: SLC-96 frame bit transmitted in the multiframe #6, frame 4.

S3 bit: SLC-96 frame bit transmitted in the multiframe #6, frame 6.

S4 bit: SLC-96 frame bit transmitted in the multiframe #6, frame 8.

| Bit | Function | Type | Default |
| --- | --- | --- | --- |
| Bit 15–9 | Unused | R | 0 |
| Bit 8 | M1 Bit | R/W | 0 |
| Bit 7 | M2 Bit | R/W | 0 |
| Bit 6 | M3 Bit | R/W | 0 |
| Bit 5 | A1 Bit | R/W | 0 |
| Bit 4 | A2 Bit | R/W | 0 |
| Bit 3 | S1 Bit | R/W | 0 |
| Bit 2 | S2 Bit | R/W | 0 |
| Bit 1 | S3 Bit | R/W | 0 |
| Bit 0 | S4 Bit | R/W | 0 |

The register bits shall be set to 0 following Power_up.

4.8.4.44. Register 68—SLC-96 Datalink Transmit #4

C1 bit: SLC-96 frame bit transmitted in the multiframe #2, frame 12.

C2 bit: SLC-96 frame bit transmitted in the multiframe #3, frame 2.

C3 bit: SLC-96 frame bit transmitted in the multiframe #3, frame 4.

C4 bit: SLC-96 frame bit transmitted in the multiframe #3, frame 6.

C5 bit: SLC-96 frame bit transmitted in the multiframe #3, frame 8.

C6 bit: SLC-96 frame bit transmitted in the multiframe #3, frame 10.

C7 bit: SLC-96 frame bit transmitted in the multiframe #3, frame 12.

C8 bit: SLC-96 frame bit transmitted in the multiframe #4, frame 2.

C9 bit: SLC-96 frame bit transmitted in the multiframe #4, frame 4.

C10 bit: SLC-96 frame bit transmitted in the multiframe #4, frame 6.

C11 bit: SLC-96 frame bit transmitted in the multiframe #4, frame 8.

| Bit | Function | Type | Default |
|---|---|---|---|
| Bit 15–11 | Unused | R | 0 |
| Bit 10 | C1 Bit | R/W | 0 |
| Bit 9 | C2 Bit | R/W | 0 |
| Bit 8 | C3 Bit | R/W | 0 |
| Bit 7 | C4 Bit | R/W | 0 |
| Bit 6 | C5 Bit | R/W | 0 |
| Bit 5 | C6 Bit | R/W | 0 |
| Bit 4 | C7 Bit | R/W | 0 |
| Bit 3 | C8 Bit | R/W | 0 |
| Bit 2 | C9 Bit | R/W | 0 |
| Bit 1 | C10 Bit | R/W | 0 |
| Bit 0 | C11 Bit | R/W | 0 |

The register bits shall be set to 0 following Power_up.

4.8.4.45. Register 66—BIP-2 Error Accumulator VT #4

BIP-2 errors are accumulated for VT performance monitoring. The accumulator is accessible directly by software. The 12-bit value can accumulate maximum errors for 1.024 sec. The accumulator is an up counter which rolls to 0 from maximum count.

| Bit | Function | Type | Default |
|---|---|---|---|
| Bit 15–12 | Unused | R | 0 |
| Bit 11–0 | BIP-2 Error Accum. | R | 000H |

The accumulator shall be set to 0 following Power_up.

4.8.4.46. Register 64—FEBE Accumulator VT #4

Received FEBE bits are accumulated for VT performance monitoring. The accumulator is accessible directly by software. The 11-bit value can accumulate maximum FEBEs for 1.024 sec. The accumulator is an up counter which rolls to 0 from maximum count.

| Bit | Function | Type | Default |
|---|---|---|---|
| Bit 15–11 | Unused | R | 0 |
| Bit 10–0 | FEBE Accumulator | R | 000H |

The accumulator shall be set to 0 following Power_up.

4.8.4.47. Register 62—Positive Justification Accumulator #4

Received VT pointer increments are accumulated for VT performance monitoring. The accumulator is accessible directly by software. The 9-bit value can accumulate maximum pointer adjustments for 1.024 sec. The accumulator is an up counter which rolls to 0 from maximum count.

| Bit | Function | Type | Default |
|---|---|---|---|
| Bit 15–9 | Unused | R | 0 |
| Bit 8–0 | PJ Accumulator | R | 000H |

The accumulator shall be set to 0 following Power_up.

4.8.4.48. Register 60—Negative Justification Accumulator VT #4

Received VT pointer decrements are accumulated for VT performance monitoring. The accumulator is accessible directly by software. The 9-bit value can accumulate maximum pointer adjustments for 1.024 sec. The accumulator is an up counter which rolls to 0 from maximum count.

| Bit | Function | Type | Default |
|---|---|---|---|
| Bit 15–9 | Unused | R | 0 |
| Bit 8–0 | NJ Accumulator | R | 000H |

The accumulator shall be set to 0 following Power_up.

4.8.4.49. Register 40-5E—VT Slice Registers #3

Same as explained in the registers 60-7E, but it contains the information for the DS1 and VT interface #3.

4.8.4.50. Register 20-3E—VT Slice Registers #2

Same as explained in the registers 60-7E, but it contains the information for the DS1 and VT interface #2.

4.8.4.51. Register 00-1E—VT Slice Registers #1

Same as explained in the registers 60-7E, but it contains the information for the DS1 and VT interface #1.

4.8.5. Timing between the Slice and Bus Interfaces

Each slice is capable of selecting the clock from either A side or B side. A latch has been included into the design for every signal transferred from the bus interface into the DS1 and VT slices or vice versa. These latches shall provide half a clock period hold time for every signal transferred between the blocks.

FIG. 4-24 shows the signal flow from the transmit bus interface into the slice and FIG. 4-25 shows the signal flow from the slice into the transmit bus interface.

The signal flow from the receive bus interface into the slice is shown in FIG. 4-26.

What is claimed is:

1. An apparatus for mapping signals between virtual tributaries and digital signal formats for transmission to and from customer instruments and a telecommunications system along optical and wire paths, comprising the combination of:

optical interface means for receiving optical signals, converting said optical signals into electrical signals and demultiplexing said electrical signals from an optical channel format to a synchronous transport signal, STS, format;

STS multiplexing means for receiving the demultiplexed STS signals and generating an output of parallel STS signals arranged in at least one virtual tributary group, VTG, comprising a selected number of virtual tributaries;

digital interface means for receiving digital signals from and transmitting digital signals to wire paths coupled to the telecommunications system and customer instruments;

VTG circuit means for mapping and demapping a virtual tributary group and configured to perform at least one mapping operation from a group of operations consisting of mapping at least one of said virtual tributaries to at least one of said digital signals, mapping at least one of said virtual tributaries to a different one of said virtual tributaries, and mapping at least one of said digital signals to at least one of said virtual tributaries;

channel unit means for receiving and processing said virtual tributary group and for delivering said virtual tributary group to predetermined customer instruments; and a common equipment device and a channel device connected by an optical communication link;

wherein said optical interface means, said STS multiplexing means, and said VTG circuit means operate in said common equipment device, and said channel unit means operates in said channel device.

2. An apparatus according to claim 1, wherein said STS multiplexing means comprises means for sending loop-back signals for diagnosing faults in said optical interface means and said VTG circuit means.

3. An apparatus for handling communication signals comprising the combination of:

optical interface means for receiving optical signals, converting said optical signals into electrical signals and demultiplexing said electrical signals from an optical channel format to a synchronous transport signal, STS, format;

STS multiplexing means for receiving the demultiplexed STS signals and generating an output of parallel STS signals arranged in at least one virtual tributary group, VTG;

VTG circuit means for mapping and demapping a virtual tributary group;

channel unit means for receiving and processing said virtual tributary group and for delivering said virtual tributary group to predetermined customer instruments;

line interface circuit means comprising an input and an output for receiving and transmitting DS1 data streams, respectively, said line interface circuit means being operable to perform line decoding and clock recovery on received DS1 data streams; and VT mapper means coupled to said line interface circuit means for mapping data from the received DS1 data streams to a virtual tributary in one direction of signal flow, and for demapping asynchronous or byte-synchronous virtual tributaries to DS1 data streams for transmission by said line interface circuit means in the opposite direction of signal flow.

4. An apparatus according to claim 1, further comprising a local area network, a local area network interface for each of a plurality of devices comprising said optical interface means, said STS multiplexing means, and said VTG circuit means, and signal processor means having a local area network interface for communicating with each of said plurality of devices.

5. An apparatus according to claim 3, wherein said STS multiplexing means comprises means for sending loop-back signals for diagnosing faults in said optical interface means and said VTG circuit means.

6. An apparatus according to claim 3, further comprising a local area network, a local area network interface for each of a plurality of devices comprising said optical interface means, said STS multiplexing means, and said VTG circuit means, and signal processor means having a local area network interface for communicating with each of said plurality of devices.

7. A VTG circuit for processing DS1 data streams and virtual tributary groups, and for interfacing with circuit means leading to channel units, the VTG circuit comprising the combination of:

line interface circuit means comprising an input and an output for receiving and transmitting DS1 data streams, respectively, said line interface circuit means being operable to perform line decoding and clock recovery on received DS1 data streams; and virtual tributary mapper means coupled to said line interface circuit means for mapping data from the received DS1 data streams to virtual tributaries in one direction of signal flow, and to said circuit means leading to channel units for demapping asynchronous or byte-synchronous virtual tributaries therefrom to DS1 data streams for transmission by said line interface circuit means in the opposite direction of signal flow.

8. An apparatus for mapping signals between virtual tributaries and digital signal formats for transmission to and from subscriber equipment and a telecommunications system along optical and wire paths, comprising:

a first bus interface connected to said telecommunications system for receiving signals from and transmitting signals to an optical path in said telecommunications system which are formatted as synchronous transport signals comprising virtual tributaries;

a second bus interface connected to said subscriber equipment for receiving signals from and transmitting signals to an optical path interconnecting a first plurality of said subscriber equipment which are formatted as synchronous transport signals comprising virtual tributaries and overhead bytes;

a digital signal interface for receiving digital signals from and transmitting digital signals to wire paths coupled to said telecommunications system and a second plurality of said subscriber equipment; and a mapper circuit connected to said first bus interface, said second bus interface and said digital signal interface, and configured to perform at least one mapping operation from a group of operations consisting of mapping at least one of said virtual tributaries to at least one of said digital signals, mapping at least one of said virtual tributaries to a different one of said virtual tributaries, and mapping at least one of said digital signals to at least one of said virtual tributaries.

* * * * *